(12) United States Patent
Butcher, III et al.

(10) Patent No.: US 8,417,606 B2
(45) Date of Patent: Apr. 9, 2013

(54) METHOD, SOFTWARE PROGRAM, AND SYSTEM FOR STRUCTURING RISK IN A FINANCIAL TRANSACTION

(75) Inventors: George H. Butcher, III, New Rochelle, NY (US); Stephen T. Mark, Redding, CT (US)

(73) Assignee: The BondFactor Company LLC, New York, NY (US)

( * ) Notice: Subject to any disclaimer, the term of this patent is extended or adjusted under 35 U.S.C. 154(b) by 13 days.

(21) Appl. No.: 12/955,835

(22) Filed: Nov. 29, 2010

(65) Prior Publication Data

US 2011/0131065 A1   Jun. 2, 2011

Related U.S. Application Data

(60) Provisional application No. 61/265,135, filed on Nov. 30, 2009.

(51) Int. Cl.
*G06Q 40/00* (2006.01)

(52) U.S. Cl. .................................. 705/35; 705/4

(58) Field of Classification Search .............. 705/35–40, 705/4
See application file for complete search history.

(56) References Cited

U.S. PATENT DOCUMENTS

| | | | |
|---|---|---|---|
| 5,550,734 A | 8/1996 | Tarter et al. | 705/2 |
| 6,125,355 A | 9/2000 | Bekaert et al. | 705/36 R |
| 6,460,021 B1 | 10/2002 | Kirksey | 705/35 |
| 7,099,843 B1 * | 8/2006 | Cassidy et al. | 705/38 |
| 7,324,967 B1 | 1/2008 | Sankaran et al. | 705/35 |
| 7,333,950 B2 | 2/2008 | Shidler et al. | 705/35 |
| 7,386,502 B1 | 6/2008 | Butcher, III | 705/38 |
| 7,848,983 B1 * | 12/2010 | Butcher, III | 705/35 |
| 2003/0208428 A1 | 11/2003 | Raynes et al. | 705/36 |
| 2005/0010517 A1 | 1/2005 | Lowenstein et al. | 705/37 |

FOREIGN PATENT DOCUMENTS

| | | |
|---|---|---|
| WO | WO 96/21903 A1 | 7/1996 |
| WO | WO 01/25997 A2 | 4/2001 |

OTHER PUBLICATIONS

"Asian Capital Markets/Structured Finance, Sanwa to sell novel linked %75bn CLO via Delphi Ltd," Euroweek, p. 013; Publisher: Euromoney Electronic Publications; Sep. 18, 1998.

Steven Bavaria, "Bear Stearns Launches CBO with Unusual Construction," The Investment Dealers' Digest: IDD. New York: Feb. 10, 1992, vol. 58, Iss. 6; p. 14, 3 pgs.

Darrell Duffie et al., "Risk and Valuation of Collateralized Debt Obligations," Graduate School of Business, Stanford University, First Draft, Aug. 20, 1999.

(Continued)

*Primary Examiner* — Thu Thao Havan
(74) *Attorney, Agent, or Firm* — Winston & Strawn LLP

(57) ABSTRACT

A computer-implemented method, system, apparatus, and media is directed to minimizing a risk associated with an anticipated value of an investment. An insurer establishes a capital structure within a computer memory of a computer system, the capital structure designed to minimize risk and structured with regulatory capital and a cash stream that is pledged to fund a default associated with the investment. Establishing the capital structure can include allocating regulatory capital based on a coverage factor multiplied by an average annual depression scenario default percentage for the investment and determining a portion of the capital structure for a pledged insuring investment that produces at least a portion of the cash stream. A determination of whether the established capital structure is sufficient to obtain a minimal target credit rating for the insurer is generated. The desired target rating is electronically provided based on the determination.

27 Claims, 78 Drawing Sheets

OTHER PUBLICATIONS

Lang Gibson, "Evaluating Credit Enhancement Floors in Equipment ABS," The Securitization Conduit, vol. 3, No. 3-4, 2000, pp. 11-16.
R. Russell Hurst, "Collateralized Debt Obligations (CDOs): Identity Crisis," The Securitization Conduit, vol. 3, No. 3-4, 2000, pp. 17-37.
Kenneth E. Kohler,"Collateralized Loan Obligations: A Powerful New Portfolio Management Tool for Banks," The Securitization Conduit, vol. 1, No. 2, 1998, pp. 6-20.
Morton N. Lane, "CDOS As Self-Contained Reissurance Structures," Trade Notes, Lane Financial LLC, Dec. 10, 2000.
Olivier Melennec, " CBO, CLO, CDO: A Practical Guide for Investors," The Securitization Conduit, vol. 3, No. 1-2, 2000, pp. 21-34.
Steve Quickel, "The ABS Market Catches a Second Wind,"Institutional Investor, Dec. 1993; 27, 12, p. 125.
The Classic M and A Handbook—The Art of M and A—A Merger Acquisition Buyout Guide, Third Edition, McGraw-Hill, 1998, 33 pgs.
The Handbook of Fixed Income Securities, by Frank J. Fabuzzi, CFA et al., Published by Business One Irwin, Homewood, IL, 1991 (pp. 393-413 plus cover sheet).

* cited by examiner

| | Year 1 | Year 2 | Year 3 | Year 4 | Year 5 | Insured Bonds |
|---|---|---|---|---|---|---|
| | $24,735 | $24,735 | $24,735 | $24,735 | $24,735<br>$970,000<br>$994,735 | Insured Coupon (2.55%)<br>Principal |
| | | | ⇐ Issues #1 thru 100 ⇒ | | | All Issues<br>• General Obligation Bonds<br>• "A" underlying rating<br>• "AAA" insured rating |
| | $24,735 | $24,735 | $24,735 | $24,735 | $994,735 | Total P & I |

| | Year 1 | Year 2 | Year 3 | Year 4 | Year 5 | Insuring Bonds |
|---|---|---|---|---|---|---|
| | $1,125<br>$ 970 | $1,125<br>$ 970 | $1,125<br>$ 970 | $1,125<br>$ 970 | $1,125<br>$970<br>$30,000<br>$32,095 | Tax-Exempt Coupon (3.75%)<br>Taxable Coupon (3.23%)<br>Principal |
| | | | ⇐ Issues #1 thru 100 ⇒ | | | • Year 5 Insuring Bond event-trigger creates 31% payback<br>• 0% yield net of full payback of principal to insuring Bondholder |
| | $2,095 | $2,095 | $2,095 | $2,095 | $32,095 | Total P & I |

FIG. 14A

Insured Bonds
"AAA" Guarantee
$1,000,000 par amount
AA GO MMD Scale Proxy
5 years @ 2.25%

Trust Bonds
"A2" GO
$50,000 par amount
MMD Scale
5 years @ 3.25%
Supplemental Coupon @ 2.00%

| AAA Insured Bonds | 1 | 2 | 3 | 4 | 5 |
|---|---|---|---|---|---|
| AAA Tax-Exempt Coupon (2.25%) Insured Principal | $22,500 | $22,500 | $22,500 | $22,500 | $22,500<br>$1,000,000 |
| Total Principal and Interest | $22,500 | $22,500 | $22,500 | $22,500 | $1,022,500 |
| A2 Credit: Moody's Expected Loss | 0 | $1 | $2 | $3 | $154 |
| Baa3 Credit:Moody's Expected Loss | $4 | $9 | $15 | $22 | $1,253 |

| Trust Bonds | 1 | 2 | 3 | 4 | 5 |
|---|---|---|---|---|---|
| A2 Tax-Exempt Coupon (3.25%)<br>Supplemental Coupon (2.00%)<br>Principal (5% Pledged Bonds) | $1,625<br>1,000 | $1,625<br>1,000 | $1,625<br>1,000 | $1,625<br>1,000 | $1,625<br>1,000<br>50,000 |
| Available Intercept Single Bond | $2,625 | $2,625 | $2,625 | $2,625 | $52,625 |
| Available Intercept 100 Bond Portfolio | $262,500 | $262,500 | $262,500 | $262,500 | $5,262,500 |

FIG. 14B

| Loss Position Subclass (from low to high) | Insured Bond Rating Supported by Subclass, together with Lower Subclasses | Targeted Subclass Structure Rating | Default Percentage | Minimum Coverage | Discount Percentage (Based on Bond Issue Rating vs. Subclass Structure Rating for next higher Subclass) | Coverage Factor | Aggregate Loss Subclass Percentage | Subclass Percentage |
|---|---|---|---|---|---|---|---|---|
| 1st | BB | NR | 7/4=1.75 | .56 | 2 Steps lower; 15% | 3/1.25=2.4 | .35 | .35 |
| 2nd | BBB | BB | 7/4=1.75 | .64 | 1 Step lower; 20% | 3/1.25=2.4 | .53 | .18 |
| 3rd | A | BBB | 7/4=1.75 | .80 | Same; 25% | 3/1.25=2.4 | .84 | .31 |
| 4th | AA | A | 7/4=1.75 | 1.00 | 1 step higher; 100% | 3/1.25=2.4 | 4.20 | 3.36 |
| 5th | AAA | AA | 7/4=1.75 | 1.25 | 2 step higher; 100% | 3/1.25=2.4 | 5.25 | 1.05 |
| Insured Bonds | | AAA | | | | | | 5.25 |

FIG. 14D

| Step 1 Identify secondary market bonds | | Step 2 Add AAA guarantee | | Step 3 Reoffer bonds with AAA guarantee | |
|---|---|---|---|---|---|
| Issuer: | Santa Clara School District | AAA dollar price: | 114.24 | Total proceeds: | $112,904,000 |
| CUSIP/State: | 27528IW66 / CA | AAA yield: | 3.58% | less Acquisition cost: | $100,500,000 |
| Par for illustration: | $100,000,000 | Acquisition price: | $100,500,000 | less Supple. coupon: | $2,246,300 |
| Maturity: | 02/01/21 (nc) | Trust Bonds: | 9.75% @ 200bps | less Commissions: | $646,300 |
| Current dollar price: | 100.50 | AAA Bond Par: | $90,250,000 | less Legal and admin: | $100,000 |
| Coupon/Yield: | 5.10% / 5.04% | Trust Bond Par: | $9,750,000 | less Capital markets %: | TBD |
| Commissions AAA/Trust: | 5% / 1.5% | AAA Bond Proceeds: | $103,105,200 | Net to Bond Model: | $9,811,400 |
| Issuer underlying ratings: | Baa1/A+ | Trust Bond Proceeds: | $9,798,800 | | |
| Issue Insured ratings: | Baa1/A (MBIA) | Total Proceeds: | $112,904,000 | | |

| Ratings | CCC | B | BB | BBB | A | AA | AAA | Single-Risk Category |
|---|---|---|---|---|---|---|---|---|
| General Obligation | | | | | | | | |
| States | 30 | 21 | 15 | 4 | 2 | 2 | 1 | 1 |
| Cities and counties | 100 | 70 | 50 | 13 | 7 | 5 | 4 | 1 |
| Schools - elementary and secondary | 40 | 28 | 20 | 5 | 3 | 2 | 2 | 1 |
| Special district | 120 | 84 | 60 | 16 | 8 | 6 | 5 | 1 |
| Community college district | 100 | 70 | 50 | 13 | 7 | 5 | 5 | 1 |
| Tax-Supported Debt | | | | | | | | |
| Sales, gas, excise, gas and vehicle registration | | | | | | | | |
| Local | 150 | 105 | 75 | 20 | 11 | 8 | 6 | 2 |
| Statewide | 80 | 56 | 40 | 10 | 6 | 4 | 3 | 1 |
| Guaranteed entitlements | 100 | 70 | 50 | 13 | 7 | 5 | 5 | 1 |
| Special assessments, Mello Roos, tax increment financings | 250 | 175 | 125 | 33 | 18 | 13 | 10 | 4 |
| Hotel/motel | 250 | 175 | 125 | 33 | 18 | 13 | 10 | 4 |
| Personal income | | | | | | | | |
| Less than 1.0 million population | 150 | 105 | 75 | 20 | 11 | 8 | 6 | 2 |
| More than 1.0 million population | 80 | 56 | 40 | 10 | 6 | 4 | 3 | 1 |
| Cigarette, liquor | 250 | 175 | 125 | 33 | 18 | 13 | 10 | 4 |
| Health Care | | | | | | | | |
| Hospitals | 350 | 245 | 175 | 46 | 25 | 18 | 14 | 6 |
| Hosptal systems (three or more hospitals with geographic dispersion) | 300 | 210 | 150 | 39 | 21 | 15 | 12 | 5 |
| Hospital equipment loan program | 350 | 245 | 175 | 46 | 25 | 18 | 14 | 6 |
| Health maintenance organization | 350 | 245 | 175 | 46 | 25 | 18 | 14 | 6 |
| Clinic practices closely affiliated with hospital | 350 | 245 | 175 | 46 | 25 | 18 | 14 | 6 |
| Nursing home | 350 | 245 | 175 | 46 | 25 | 18 | 14 | 6 |
| Nursing home system (three or more homes with geographic dispersion) | 300 | 210 | 150 | 39 | 21 | 15 | 12 | 5 |
| Life-care center | 350 | 245 | 175 | 46 | 25 | 18 | 14 | 6 |
| Life-care center system (three or more centers with geographic dispersion) | 300 | 210 | 150 | 39 | 21 | 15 | 12 | 5 |
| Human service providers | 200 | 140 | 100 | 26 | 14 | 10 | 8 | 3 |
| Utilities | | | | | | | | |
| Public power agencies and utilities with special project risk (1) | 400 | 280 | 200 | 52 | 28 | 20 | 16 | 6 |
| Public power agencies and utilities with high dependence on nuclear (2) | 300 | 210 | 150 | 39 | 21 | 15 | 12 | 5 |

FIG. 27A

| A | B | C | D |
|---|---|---|---|
| Callable vs Noncallable | Bds Callable | | |
| Credit Type | Hospital Systems | | |
| Underlying Bond Rating | BBB | | |
| Insd only or LP Insg Subclasses also Enhanced | Insured | | |
| Bond Term | 20 | | |
| Target Bond Proceeds ($millions) | $100 | | |
| Insuring Bond Par ($millions) & Denominations | $24.7 | $5,000 | |
| Call Provision | Bds Callable | | |

| E | F | G | H | |
|---|---|---|---|---|
| % of 3/20/2009 Market Spreads to MMD Used in Analyses | | | 60% | |
| Mnln Prem as % of Benefit/ Strctr % Benefit to Issuer | | | 89.99% | |
| Upfront Structure Premium as % of Monoline | | | 9.99% | |
| Monoline Insurer Hard Cost as % of Premium | | | 1.00% | |
| Insuring Bond % | | | 24.48% | |
| Coverage of Insured Bond Debt Service | | | 1.324 | |
| Target and Actual 4-Year Default Tolerance | | | 62.4% | 97.9% |

| J | K | L | M | N | O | P |
|---|---|---|---|---|---|---|
| | | | Insuring Bond target coverage of assumed defaults | | 1.60 | |
| | % of assumed deflts at which covg >= 1.25x (1) insg bds only (b) with cash equity | | | | 49.73% | 59.48% |
| | % of assumed deflts at which covg >= 1.00x (1) insg bds only (b) with cash equity | | | | 59.48% | 69.23% |
| | Monoline Cash equity covg target of assmd defit & Structure cash as % of mnln equity | | | | 1.00 | 11.27% |
| | % of Annual Assumed Insured Defaults covered by Structure Cash Equity | | | | 100.00% | |
| | Target and Actual Amt of Junior Bds as % of 1st LP Subclass Bds | | | | 65.0% | 66.5% |

FIG. 27B

| Call Provision Bds Callable | Uninsured Bonds | Monoline Insured Bonds | Total Structure Bonds | Issuer Level Structure Insured Bonds | Structure Insuring Bonds | Total of Structure Components |
|---|---|---|---|---|---|---|
| Bond Par | 100,950,000 | 114,475,000 | 102,120,000 | 77,405,000 | 24,715,000 | 102,120,000 |
| Bond Proceeds | 101,012,317 | 114,132,659 | 101,903,651 | 77,173,683 | 24,729,968 | 101,903,976 |
| Net Bond Proceeds | 100,005,192 | 100,006,438 | 100,008,114 | 75,524,708 | 24,483,405 | 100,000,527 |
| Average Maturity | 5,047,500 | 5,723,750 | 5,106,000 | 3,870,250 | 1,235,750 | 5,106,000 |
| Bond Rating | BBB | AAA | | AAA | | |
| Base Yld without any Additional Coupon or Annual Charge | 5.745% | 4.127% | 4.527% | 4.127% | 5.745% | 4.527% |
| Base Yld incl Addit'l Interest Cpn or Annual Fees | 5.745% | 4.127% | 5.456% | 4.127% | 9.506% | 5.194% |
| All-in Yld with Up Front Premium & Additional Cpn or Charge | 5.892% | 6.004% | 5.733% | 4.428% | 9.679% | 5.467% |
| Tax-exempt Portion of Yield | 5.745% | 4.127% | 4.527% | 4.127% | 5.745% | 4.527% |
| Taxable Portion of Yield | 0.00 | 0.00 | 92.87 | 0.00 | 376.07 | 66.69 |
| Taxable Equivalent Yield | 8.838% | 6.349% | 8.393% | 6.349% | 12.599% | 7.991% |
| % Increase in Txble Equiv Real Return after 2% Inflation | 57.2% | 0.0% | | (0.0%) | | |
| Yield Benefit vs Unisured before Cost of Enhancment | 0.00 | 161.76 | 121.78 | 161.77 | (0.03) | 121.78 |
| Yield Benefit vs Uninsured before Upfront Costs | 0.00 | 161.76 | 28.91 | 161.77 | (376.10) | 55.09 |
| All-in Yield Benefit (Cost) to Issuer vs Uninsured | 0.00 | (11.22) | 15.92 | 146.33 | (378.76) | 42.43 |
| Yld Benefit (Cost) to Issuer vs Insured before Upfront Costs | (161.76) | 0.00 | (132.85) | 0.00 | (537.86) | (106.67) |
| All-in Yield Benefit (Cost) to Issuer vs Insured | 11.22 | 0.00 | 27.13 | 157.54 | (367.54) | 53.64 |
| Up Front Cost | 14.70 | 187.67 | 27.69 | 30.13 | 17.35 | 27.36 |
| Up Front Cost of Enhancement (Premium, HLP Ins & Addt'l Tkdn) | 0.00 | 172.98 | 12.99 | 15.44 | 2.66 | 12.66 |
| Annual Cost of Credit Enhancement | 0.00 | 0.00 | 92.87 | 0.00 | 376.07 | 66.69 |
| Additional Base Cost of Insuring Bonds vs Insured | 0.00 | 0.00 | 39.98 | 0.00 | 0.00 | 39.98 |
| Total Cost of Credit Enhancement | 0.00 | 172.98 | 145.84 | 15.44 | 378.73 | 119.33 |
| BP to Call Retained by Program (Prog Revs and Surplus Int) | | | 26.51 | | | |

FIG. 27C

| Call Provision | Structure Level | | Total HLP (Investment Grade) Insuring Subclasses |
|---|---|---|---|
| | Structure Insured Bonds | Structure Insuring Components | |
| Bond Par | 77,405,000 | 24,715,000 | 21,555,000 |
| Bond Proceeds | 77,173,683 | 24,730,293 | 21,568,367 |
| Net Bond Proceeds | 75,524,708 | 24,475,818 | 21,353,329 |
| Average Maturity | 3,870,250 | 1,235,750 | 1,077,750 |
| Bond Rating | AAA | - | - |
| | Statistics Based on Yields to Maturity | | |
| Base Yld without any Additional Cpn or Annual Charge | 4.232% | 5.817% | 5.817% |
| Base Yld incl Addit'l Interest Cpn or Annual Fees | 4.232% | 8.505% | 8.018% |
| All-in Yld with Up Front Premium & Additional Cpn or Charge | 4.478% | 8.648% | 8.157% |
| Tax-exempt Portion of Yield | 4.232% | 5.817% | 5.817% |
| Taxable Portion of Yield | 0.00 | 268.79 | 220.15 |
| Taxable Equivalent Yield | 6.510% | 11.637% | 11.150% |
| % Increase in Txble Equiv Real Return after 2% Inflation | (0.0%) | | |
| Yield Benefit vs Unsured before Cost of Enhancment | 158.51 | (0.01) | 0.00 |
| Yield Benefit vs Uninsured before Upfront Costs | 158.51 | (268.80) | (220.15) |
| All-in Yield Benefit (Cost) to Issuer vs Insured | 146.06 | (270.90) | (221.86) |
| Yld Benefit (Cost) to Issuer vs Insured before Upfront Costs | 0.00 | (427.31) | (378.66) |
| All-in Yield Benefit (Cost) to Issuer vs Insured | 130.13 | (286.83) | (237.79) |
| Up Front Cost | 24.65 | 14.30 | 13.91 |
| Up Front Cost of Enhancement (Premium, HLP Ins & Addit'l Tkdn) | 12.45 | 2.10 | 1.71 |
| Annual Cost of Credit Enhancement | 0.00 | 268.79 | 220.15 |
| Additional Base Cost of Insuring Bonds vs Insured | 0.00 | 0.00 | 0.00 |
| Total Cost of Credit Enhancement | 12.45 | 270.89 | 221.86 |
| BP to Maturity Retained by Program (Prog Revs and Surplus Int) | | | |

FIG. 27D

| | Uninsured Bonds | Monoline Insured Bonds | Total Structure Bonds | Issuer Level Structure Insured Bonds | Structure Insuring Bonds | Total of Structure Components |
|---|---|---|---|---|---|---|
| Bond Par | 100,950,000 | 114,475,000 | 102,120,000 | 77,405,000 | 24,715,000 | 102,120,000 |
| Bond Proceeds | 101,012,317 | 114,132,659 | 101,903,651 | 77,173,683 | 24,729,968 | 101,903,976 |
| Net Bond Proceeds | 100,005,192 | 100,006,438 | 100,008,114 | 75,524,708 | 24,483,405 | 100,000,527 |
| Average Maturity | 5,047,500 | 5,723,750 | 5,106,000 | 3,870,250 | 1,235,750 | 5,106,000 |
| Bond Rating | BBB | AAA | | AAA | | |
| Base Yld without any Additional Cpn or Annual Charge | 5.817% | 4.232% | 4.626% | 4.232% | 5.817% | 4.626% |
| Base Yld incl Addit'l Cpn or Annual Fees | 5.817% | 4.232% | 5.556% | 4.232% | 9.562% | 5.294% |
| All-in Yld with Up Front Premium & Additional Cpn or Charge | 5.939% | 5.780% | 5.787% | 4.478% | 9.713% | 5.521% |
| Tax-exempt Portion of Yield | 5.817% | 4.232% | 4.626% | 4.232% | 5.817% | 4.626% |
| Taxable Portion of Yield | 0.00 | 0.00 | 92.99 | 0.00 | 374.48 | 66.76 |
| Taxable Equivalent Yield | 8.949% | 6.510% | 8.548% | 6.510% | 12.694% | 8.144% |
| % Increase in Txble Equiv Real Return after 2% Inflation | 54.1% | 0.0% | | (0.0%) | | |
| Yield Benefit vs Uninsured before Cost of Enhancement | 0.00 | 158.51 | 119.07 | 158.51 | (0.01) | 119.07 |
| Yield Benefit vs Uninsured before Upfront Costs | 0.00 | 158.51 | 26.08 | 158.51 | (374.49) | 52.31 |
| All-in Yield Benefit (Cost) to Issuer vs Uninsured | 0.00 | 15.92 | 15.21 | 146.06 | (377.44) | 41.81 |
| Yld Benefit (Cost) to Issuer vs Insured before Upfront Costs | (158.51) | 0.00 | (132.43) | 0.00 | (533.00) | (106.20) |
| All-in Yield Benefit (Cost) to Issuer vs Insured | (15.92) | 0.00 | (0.71) | 130.13 | (393.37) | 25.88 |
| Up Front Cost | 12.20 | 154.78 | 23.07 | 24.65 | 15.15 | 22.70 |
| Up Front Cost of Enhancement (Premium, HLP Ins & Addit'l Tkdn) | 0.00 | 142.58 | 10.87 | 12.45 | 2.95 | 10.50 |
| Annual Cost of Credit Enhancement | 0.00 | 0.00 | 92.99 | 0.00 | 374.48 | 66.76 |
| Additional Base Cost of Insuring Bonds vs Insured | 0.00 | 0.00 | 39.44 | 0.00 | 0.00 | 39.44 |
| Total Cost of Credit Enhancement | 0.00 | 142.58 | 143.29 | 12.45 | 377.43 | 116.70 |
| BP to Maturity Retained by Program (Prog Revs and Surplus Int) | | | 26.59 | | | |

FIG. 27E

| Call Provision | Structure Level | | | Total HLP (Investment Grade) Insuring Subclasses |
|---|---|---|---|---|
| | Structure Insured Bonds | Structure Insuring Components | | |
| Bond Par | 77,405,000 | 24,715,000 | | 21,555,000 |
| Bond Proceeds | 77,173,683 | 24,730,293 | | 21,568,367 |
| Net Bond Proceeds | 75,524,708 | 24,475,818 | | 21,353,329 |
| Average Maturity | 3,870,250 | 1,235,750 | | 1,077,750 |
| Bond Rating | AAA | | | |
| | Statistics Based on Yields to Call | | | |
| Base Yld without any Additional Coupon or Annual Charge | 4.127% | 5.745% | | 5.745% |
| Base Yld incl Addit'l Interest Cpn or Annual Fees | 4.127% | 8.445% | | 7.956% |
| All-in Yld with Up Front Premium & Additional Cpn or Charge | 4.428% | 8.611% | | 8.119% |
| Tax-exempt Portion of Yield | 4.127% | 5.745% | | 5.745% |
| Taxable Portion of Yield | 0.00 | 270.03 | | 221.14 |
| Taxable Equivalent Yield | 6.349% | 11.539% | | 11.050% |
| % Increase in Txble Equiv Real Return after 2% Inflation | (3.6%) | | | |
| Yield Benefit vs Unisured before Cost of Enhancment | 161.77 | (0.03) | | (0.03) |
| Yield Benefit vs Uninsured before Upfront Costs | 161.77 | (270.06) | | (221.17) |
| All-in Yield Benefit (Cost) to Issuer vs Uninsured | 146.33 | (271.95) | | (222.71) |
| Yld Benefit (Cost) to Issuer vs Insured before Upfront Costs | 0.00 | (431.82) | | (382.93) |
| All-in Yield Benefit (Cost) to Issuer vs Insured | 157.54 | (260.73) | | (211.49) |
| Up Front Cost | 30.13 | 16.58 | | 16.23 |
| Up Front Cost of Enhancement (Premium, HLP Ins & Addit'l Tkdn) | 15.44 | 1.89 | | 1.54 |
| Annual Cost of Credit Enhancement | 0.00 | 270.03 | | 221.14 |
| Additional Base Cost of Insuring Bonds vs Insured | 0.00 | 0.00 | | 0.00 |
| Total Cost of Credit Enhancement | 15.44 | 271.92 | | 222.67 |
| BP to Maturity Retained by Program (Prog Revs and Surplus Int) | | | | |

| | |
|---|---|
| % of Monoline Premium assumed to fund hard costs of Insurer | 1.0% |
| Yield (above the investment return) on Mnln Equity to maturity from Premim (net of hard costs) | 19.214% |
| Yield (above the investment return) on Monoline Equity to call from Premim (net of hard costs) | 22.362% |
| Yield (above the base return) on Strctr Equity to maturity (after Insg Bds, Iqdty & Insurer cost) | 43.756% |
| Yield (above the base return) on Strctr Equity to call (after Insg Bds, liquidity & Insurer cost) | 44.313% |
| Junior 1st LP Subclass Yield & Spread to Next Higher Subclass (bp) | 10.683% 171.7 |
| Senior 1st LP Subclass Yield & Spread to Next Higher Subclass (bp) | 12.404% 171.8 |
| | |
| Yld to Maturity Retained By Program for Expense and Profit | 26.59 |
| Yield to Call Retained By Program for Expenses and Profit | 26.51 |
| Issuer Savings versus Monoline to maturity | (0.71) |
| Issuer Savings versus Monoline to call | 27.13 |
| | |
| Annual Yield Available for Program | 26.59 |
| Annual Yield Used for Liquidity and Return on Equity | 3.21 |
| Net Annual Yield Available for Program | 23.38 |

FIG. 27F

| | |
|---|---:|
| Net Upfrt Stctr Prem | 447,125 |
| Adj to HLP Insg Bd Prcds | 0 |
| Prem on Strctr Insd Bds | 879,637 |
| Addtl Tkdn on Insg Bds | 432,513 |
| Total Up Front Strctr Prem | 879,637 |
| Strctr Prem as % of Mnln | 6.76% |
| Total Cost of Structure | 143.29 |
| Annual Cost of Structure | 92.99 |
| % of Annual Cost to Insuring Bonds | 71.78% |
| Annual Cost of Insuring Bonds | 66.75 |
| Upfront Cost of Structure | 23.07 |
| % of Upfront Cost for Insg Bd Tkdwn | 49.17% |
| Upfront Cost of Insg Bonds | 11.34 |
| Cost of Insg Bds as a % of Strtr Cost | 54.5% |
| Prog Cost, Addtl Yld on Equity & Profit | 65.20 |
| % of Total Cost of Strctr Avail | 45.5% |
| Upfront $ equivalent to % Available | 1,444,213 |
| Max Upfront $ net of program costs | 1,408,443 |
| Annual $ equivalent to % Available | 4,639,653 |

FIG. 27G

| Insuring Bond Percentages | | |
|---|---|---|
| Subclass | % of Bd Issue | Cumulative % |
| 4th Loss Bds (AA) | 4.810% | 24.200% |
| 3rd Loss Bds (A) | 3.870% | 19.390% |
| 2nd Loss Bds (BBB) | 12.430% | 15.520% |
| 1st Loss Snr Bds (BB) | 1.030% | 3.090% |
| 1st Loss Jnr Bds (NR) | 2.060% | 2.060% |

FIG. 27H

| | A | B | C | D | E | F | G | H | I |
|---|---|---|---|---|---|---|---|---|---|
| 1 | | | Insuring Subclass Sizing | | | | | | |
| 2 | Strctr Covg of Assumed Def. Mnin Covg of of Df | 1.60 | 1.50 | Insg Bd Size | | | | | |
| 3 | Asmd Strct Annual Defaults and Total Mnin Capital | 9.75% | 14.63% | >Suggested | | | | | |
| 4 | Covg of AAA min represented by 1.6x Covg) | 1.28 | | Size bcs it | Potential Increase in Insuring Bonds | | | | |
| 5 | Suggested Insuring Bond Size | 15.60% | O.K. | reflects | | | | % Incrs | Adj Size |
| 6 | Actual Insuring Bond Size and Coverage of Asmd Def | 24.48% | 2.51 | asmd | maintaining upfront prem & prog revs | | | 35.49% | 0.00% |
| 7 | Size of Strctr Pool>-10,20,50 & Assumed Dflt | 20 | 25% | dwngrdes | maintaining prog revs (without prem) | | | 51.97% | 0.00% |
| 8 | Max Dflt where Covg> 1.25x Insg bds & w/ cash | 49.7% | 59.5% | | covering out-of-pockets (without prem) | | | 47.21% | 0.00% |
| 9 | Rounding for Bonds, Insg Bonds, Insg Subclasses | $5,000 | $5,000 | $5,000 | O.K. | | | | |
| 10 | Takedown: Uninsd Bds, Add Tkdn, Insg Bds | 7.50 | 17.50 | 25.00 | | | | | |
| 11 | | | O.K. w/ Bonds Only | | | | | | |
| 12 | | | Sizing of Incuring Loss Position Subclasse | | | | | | |
| 13 | | Min % of Insuring Bds | Est. Subclass Size | Proposed Subclass Size | Actual Subclass Size | | | | Adjusted Cov Reqr/Actual Covg/Margin |
| 14 | | | | | | | | | |
| 15 | | | | | | | | | |
| 16 | Structure Insured | | | O.K. | | | O.K. | | |
| 17 | 4th LP Subclass (AA Target Rating) | 22.85% | 22.86% | 20.00% | 19.85% | (2.97%) | 0.00 | | 1.25/3.18/1.93 |
| 18 | 3rd LP Subclass (A Target Rating) | 17.40% | 17.40% | 16.00% | 15.98% | (1.42%) | 0.03 | | 1/2.8/1.8 |
| 19 | 2nd LP Subclass (BBB Target Rating) | 48.99% | 48.99% | 51.20% | 51.35% | 2.36% | 0.04 | | 0.8/2.43/1.63 |
| 20 | 1st LP Subclass (senior tranche) (BB Target Rating) | 3.81% | 10.78% | 12.80% | 4.27% | 0.45% | 0.02 | | 0.16/0.77/0.61 |
| 21 | 1st LP Subclass (junior tranche) | 6.95% | | | 8.52% | 1.57% | 0.02 | | 0.1/0.58/0.48 |
| 22 | Insuring Bond Totals | 100.00% | 100.00% | 100.00% | 100.00% | | | | |
| 23 | New Insuring Bond Size | | | increase 0.00% | | | | | |
| 24 | | Relative Cost of Tranche | Relative Cost of Subclass | Max Incrs with Prog Revs % | % Incrs allocated to Sbclss | Adj Subclass | Revised Sbclss Keeping Prog Revs | | Proposed Subclass Sizes |
| 25 | | | | | | | | | |
| 26 | | | | | | | | | |
| 27 | 4th LP Subclass (AA Target Rating) | 17.078% | 17.08% | | | 19.89% | 19.89% | | |
| 28 | 3rd LP Subclass (A Target Rating) | 14.831% | 14.83% | | | 15.98% | 15.98% | | |
| 29 | 2nd LP Subclass (BBB Target Rating) | 52.769% | 52.77% | | | 51.35% | 51.35% | | |
| 30 | 1st LP Subclass (senior tranche) (BB Target Rating) | 4.828% | 15.32% | 0.00% | 50.0% | 4.27% | 12.79% | | |
| 31 | 1st LP Subclass (junior tranche) | 10.493% | | 0.00% | 50.0% | 8.52% | | | |
| 32 | | 100.00% | | | | | 100.00% | | |

| | Sizing of Monoline Insr Prem and Structure Upfront Prem-Adjust Percentages and Use Bond Ins Prem Calculation Macro | | |
|---|---|---|---|
| | | Target | Inputs Actual |
| 34 | | | |
| 35 | Total Benefit of Monoline Insurance (in basis points) | 158.51 | |
| 36 | Breakeven Monoline Premium vs Uninsured Bonds | 845.11 | |
| 37 | Target & Actual Monoline Premium as % of Breakeven | 90% | 90.0% |
| 38 | Suggested and Actual Monoline Premium | 760.6 | 760.5  760.5 |
| 39 | Target & Actual Structure Premium as % of Monoline | 10.0% | 10.0% |
| 40 | Suggested and Actual Structure Premium | 76.1 | 76.0  76 |
| 41 | Max Upfront Premium % (given existing program costs) | 31.5% | |
| 42 | Max Upfront Premium (bp) given existing program costs | 239.3 | |
| 43 | Max Upfront Premium % with $0 program costs | 32.3% | |
| 44 | Max Upfront Premium (bp) with $0 program costs | 245.4 | |
| 45 | | | |
| 46 | Total Cost of Structure | 143.29 | |
| 47 | Annual Cost of Structure | 92.99 | |
| 48 | Annual Cost of Insuring Bonds | 66.75 | |
| 49 | Net Annual Costs | 26.24 | |
| 50 | Annual Expenses (incl Program Revs) | 1.00 | |
| 51 | Annual Expenses (out of pocket only) | 4.39 | |
| 52 | Upfront Costs | 23.07 | |
| 53 | Upfront Costs of Insuring Bonds | 11.34 | |
| 54 | Net Upfront Costs | 11.73 | |
| 55 | Amt Avail (Net Annual + Upfront) | 37.97 | |
| 56 | Amt Avail (net of upfront & program revenues) | 25.24 | |
| 57 | Amount Available (net of program revenues) | 36.97 | |
| 58 | Amount Available (net of out of pockets) | 33.58 | |
| 59 | Factors for Determining: | | |
| 60 | Max Upfront Premium (Net of Program Revs) | 3.15 | |
| 61 | Max Upfront Premium (if Program Revs = $0) | 3.23 | |
| 62 | Max Annual Revenues | 1.45 | |
| 63 | Target Additional Return on Structure Equity | 1.00% | |
| 64 | Base Investment Return on Cash Equity | 5.00% | |
| 65 | Investment Return on Upfront Mnlm & CES Premium | 4.00% | |
| 66 | Discount Rate Used to Determine PVs of CES Revs | 8.00% | |
| 67 | % of Mnln Prem Allocated to Hard Prog Expenses | 1.00% | |

Reduce Monoline % of Breakeven

Margin Over Reqd Covg of Assumed Dflt By Insuring Subclass

| | Base Deflt | 1 Cat Dwngrd | 2 Cat Dwngrd |
|---|---|---|---|
| Insured Bonds (AAA) | 1.94 | (0.42) | (0.66) |
| 4th Loss Bds (AA) | 1.80 | (0.27) | (0.48) |
| 3rd Loss Bds (A) | 1.64 | (0.17) | (0.35) |
| 2nd Loss Bds (BBB) | 0.61 | (0.44) | (0.50) |
| 1st Loss Snr Bds (BB) | 0.48 | 0.02 | (0.41) |

To increase Margin Over Reqd Coverage for any Subclass, increase the relative size of the lower subclasses

O.K.

Insuring Bond Sizing Worksheet for SRF Criteria

| | Actual Size | Target Size | Revised Subclass % | Subclass % for Entry | |
|---|---|---|---|---|---|
| 4th Loss Bds (AA) | 4,915,000 | | 100.00% | 100.00% | 4.813% |
| 3rd Loss Bds (A) | 3,950,000 | | 100.00% | 100.00% | 3.868% |
| 2nd Loss Bds (BBB) | 12,690,000 | | 100.00% | 100.00% | 12.427% |
| 1st Loss Snr Bds (BB) | 1,055,000 | | 100.00% | 100.00% | 1.033% |
| 1st Loss Jr Bds (NR) | 2,105,000 | | 100.00% | 200.00% | 2.061% |
| | 24,715,000 | | | | |

Equity and Liquidity Worksheet

| | Target | Actual |
|---|---|---|
| Annual assmd deflt under Mnln Criteria | 566,557 | |
| CES cash coverage multiple for Equity | 1.0 | |
| Target Cash Equity Amount | 566,557 | 566,557  100.00% |
| Ces coverage multiple for Liquidity | 2.5 | |
| Target Liquidity Amount | 1,422,494 | 1,422,494  100.00% |

| J | K | L | M | N | O | P | Q | R | S | T | U |
|---|---|---|---|---|---|---|---|---|---|---|---|
| BBB-rated Hospital Systems | | | | | | | | Bond Issue No N | Insg Bd Pricing | Difference | |
| Bond Term | 20 | | | | | Base HLP Yield | | 8.04% | 8.02% | 0.02% | |
| % of Current Market Spreads being used/ Adj Cpns? | 60.0% | Yes | | | | All-in HLP Yield | | 8.18% | 8.16% | | |
| Cash Equity as % of Insuring Bond DS | 62.50% | | | | | Base LLP Yield | | 11.78% | 11.83% | (0.05%) | |
| Surplus Interest from Insg Bd Pricing | 3,084,207 | O.K. | | | | All-in LLP Yield | | 11.95% | 11.95% | | |
| Surplus Interest for Bond Issue No N | 3,051,746 | | | | These will be different The Insuring | | BP on Insg Bds contributing to an | | | 0.01% | |
| Discrepancy | (32,461) | | | | Bond Pricing Calculation is more | | Increase or (Decrease) in the Insg | | | | |
| | | | | | precise. But the difference should be a | | Bd Pricing Surplus | | | | |
| O.K. Recalculation Complete | | | | | % of the calculation, not a multiple. | | | | | | |

Structure Spreads to Unenhanced Yields - Only Insured Bonds are Enhanced

| | Unenhanced Spreads to MMD for BBB Rated Bonds (bp) | Unenhanced Bond Spreads to AAA for Rating category (bp) | Adj to Yld for Structure Rating Discrepancy | Structure Insured Spread to MMD | Actual Current Adjmts | Total Targeted Sprd to MMD before Adjustment to Market Rates | Total Targeted Sprd to MMD after Adjustment to Market Rates | Total Targeted Sprd to Uninsrd after Adjmt to Market Rates | Sprd to Uninsrd Adjstd for Taxable Interest | Incremental Spread to Uninsured after all Adjstmts |
|---|---|---|---|---|---|---|---|---|---|---|
| The Current Selection is Insured | | | | | | | | | | |
| Strctr Insd Sprd to Unenhanced | NA | 0 | 0 | 41 | 0 | 40.7 | 24.4 | | | |
| AA Strctr Insg Sprd to Uninsured | 328 | 20 | 20 | NA | 20 | 348.0 | 208.8 | 12.0 | 33.8 | 33.8 |
| A Strctr Insg Sprd to Uninsured | 328 | 146 | 146 | NA | 146 | 474.0 | 284.4 | 87.6 | 150.2 | 116.3 |
| BBB Strctr Insg Sprd to Uninsured | 328 | 328 | 328 | NA | 328 | 656.0 | 393.6 | 198.8 | 318.2 | 168.0 |
| BB Strctr Insg Sprd to Uninsured | 328 | 511 | 511 | NA | 511 | 839.0 | 503.4 | 306.6 | 487.1 | 168.9 |

Structure Spreads to Monoline Insured for the Respective Rating - Insuring LP Subclasses are also Enhanced

| | Structure Sprds to MMD | Monoline Insd Sprds to MMD | Monoline Sprds to Bds with same Rating | Additional Adjustment to Insuring LP Yields | Total Current Adjstnts | Total Structure Sprd to MMD | Actual Sprds for 60% of Mkt Rates |
|---|---|---|---|---|---|---|---|
| Strctr Insured Sprd to AAA Monoline Insured | 40.7 | 40.7 | 40.7 | | 0 | 40.7 | |
| AA Structure Insured Spread to AA Monoline Insured | 347.9 | 60.3 | 40.7 | | 20 | 367.9 | |
| A Structure Insured Spread to A Monoline Insured | 473.9 | 186.2 | 40.7 | | 146 | 619.9 | |
| BBB Structure Insuring Spread to BBB Monoline Insured | 655.9 | 368.5 | 40.7 | | 328 | 983.9 | |
| The Current Selection is | | | | | | | |

1st Loss (Jnr) vs BB and BB vs BBB as Multiples of Sprds for next higher sbcls 1.00
O.K.

Yields on Senior and Junior 1st Loss Position Insuring Bonds

| | Yields | Spread to Unenhanced Increment | Actual vs Tgt Increment | Additional LP Coupon | Additional HLP Coupon | Tranche Increment | Input for Yield Limit | Current Value |
|---|---|---|---|---|---|---|---|---|
| Unenhanced Bond Yield | 5.816% | | | | | | O.K. | |
| 4th LP Subclass Yield (AA) | 6.147% | 0.331% | (0.01%) | | | | | |
| 3rd LP Subclass Yield (A) | 7.300% | 1.153% | (0.01%) | | | | | |
| 2nd LP Subclass Yield (BBB) | 8.966% | 1.666% | (0.01%) | | | | | |
| Target 1st LP Subclasse (senior tranche_BB) Yield | 10.686% | 4.870% | 0.03% | | | | | |
| Target 1st LP Subclasse (junior tranche_NR) Yield | 12.406% | 6.590% | | | | | | |
| Actual Senior Tranche Yield | 10.683% | 4.867% | 0.03% | | | | | |
| Actual Junior Tranche Yield | 12.404% | 6.588% | (0.00%) | | | | | |

O.K.

| | | | Targets | Current Actual | First Approx of Increment |
|---|---|---|---|---|---|
| | | 491 Senior Bonds | 491.3 | 491.0 | 487 |
| | | 604 Tgt for Total | 604.2 | 604.0 | 601.5 |
| | | 0.30 Junior Bonds | 665.0 | 664.8 | 659.0 |
| | | 0.20 | | | |

Are there any senior bonds? Yes   O.K.

Is Additonal Interest on Insuring Bonds Taxable? Yes
Marginal Tax Rate 35.0%

Revenues Available to Cure an Insured Default (revenues includes amortization and earnings on upfront premium)

| | % Available |
|---|---|
| Net Program Revenues After All Outflows | 50% |
| Revs Equal to Targeted Addtnl Equity Return | 50% |
| Amounts Reserved for Hard Prog Expenses | 50% |

Downgrade Analysis

Assumes Rating Downgrade to BB
Capital Charge for Credit Type 150.00%
Annual Capital Charge (over 4 yrs) 37.50%

| | Gross Reqd Covg of Assmd Rating | Reqd Covg for Initial Rating | Min Capital for Rating Category | Orig Capital Supporting Structure | Orig Excess Capital | Req'r for Downgrade Analysis | Min Cap Reqr Assuming Dngrde | Increase in Min Capital Req'd for Downgrade | % of Sbclss that can be dngrded w/out causing a dwngrd | % that can default w/out default | % that can default w/out a dngrade |
|---|---|---|---|---|---|---|---|---|---|---|---|
| | Def | | | | | | | | | | |
| Min Req'd Covg of Assmd Dflts for Insd Strctr Bds | 1.25 | 1.25 | 13.879% | 24.480% | 10.601% | 1.25 | 88.235% | 74.356% | 14.26% | 24.480% | 10.601% |
| Min Req'd Covg of Assmd Dflts for AA Insg Bds | 1.00 | 1.00 | 10.803% | 19.612% | 8.808% | 1.00 | 60.000% | 49.197% | 17.90% | 19.612% | 8.808% |
| Min Req'd Covg of Assmd Dflts for A Insg Bds | 0.80 | 0.80 | 8.460% | 15.699% | 7.239% | 0.80 | 42.857% | 34.397% | 21.05% | 15.699% | 7.239% |
| Min Req'd Covg of Assmd Dflts for BBB Insg Bds | 0.64 | 0.16 | 1.585% | 3.130% | 1.545% | 0.64 | 31.579% | 29.994% | 5.15% | 3.130% | 1.545% |
| Min Req'd Covg of Assmd Dflts for BB Insg Bds | 0.52 | 0.10 | 1.024% | 2.085% | 1.061% | 0.13 | 5.125% | 4.100% | 25.87% | 2.085% | 1.061% |

FIG. 28E

| | A | B | C | D | E |
|---|---|---|---|---|---|
| 1 | | Structure | General Inputs | | |
| 2 | | Insured & | | | |
| 3 | | Insuring | | | |
| 4 | | Bonds for | | Bond Issue | BBB-rated Hospital Systems |
| 5 | | BBB-rated | | | |
| 6 | | Hospital | Comment | | |
| 7 | | Systems | Target Amount | 100,000,000 | |
| 8 | | Total /Avg = | Target Type (Par or Proceeds)? | Proceeds | O.K. |
| 9 | | | Specify Principal Amortization? | No | O.K. |
| 10 | | Payment | Specify Debt Service Shape | No | O.K. |
| 11 | Key | Dates | Dated Date | 3/15/2009 | |
| 12 | Dates | | Issue Date | 3/15/2009 | |
| 13 | 0 | | First Interest Payment Date | 8/15/2009 | O.K. |
| 14 | Dated Date | 3/15/2009 | First Principal Payment Date | 2/15/2010 | O.K. |
| 15 | 1st Interest | 8/15/2009 | First Maturity | 2/15/2010 | O.K. |
| 16 | 1st Maturity | 2/15/2010 | Annual Maturities? | Yes | O.K. |
| 17 | | 8/15/2010 | Call Date and Call Price on Initial Call Date | 2/15/2020 | 100.00 |
| 18 | | 2/15/2011 | First Callable Maturity | 2/15/2021 | Bds Callable |
| 19 | | 8/15/2011 | Last Noncall Maturity | | NA |
| 20 | | 2/15/2012 | Final Maturity | 2/15/2029 | O.K. |
| 21 | | 8/15/2012 | Bond Term and Bond Amortization Period | 19.9 | 19.9 |
| 22 | | 2/15/2013 | Cost of Issuance $ & Additional Underwriter's Discount for Insuring Bonds | $250,000 | $17.50 |
| 23 | | 8/15/2013 | Specify Underwriters Discount? | No | O.K. |
| | | | Specified Underwriters Discount | $0.00 | O.K. |
| | | | Use the following % of Current Spreads to MMD & Adjust Coupons in addition to Yields | 60.0% | Yes |

| | | Specific Inputs for Structure Bonds | | |
|---|---|---|---|---|
| 24 | 2/15/2014 | Credit Type & Underlying Bond Rating | Hospital Systems | BBB |
| 25 | 8/15/2014 | AAA Capital Charge for Credit Type & Strctr Insd Sprd to Unenhanced | 12% | 0 |
| 26 | 2/15/2015 | AA Monoline Capital Charge for Credit Type & AA Strctr Insg Sprd to Uninsured | 15% | 20 |
| 27 | 8/15/2015 | A Monoline Capital Charge for Credit Type & A Strctr Insg Sprd to Uninsured | 21% | 146 |
| 28 | 2/15/2016 | BBB Monoline Capital Charge for Credit Type & BBB Strctr Insg Sprd to Uninsured | 39% | 328 |
| 29 | 8/15/2016 | BB Monoline Capital Charge for Credit Type | 150% | 511 |
| 30 | 2/15/2017 | NR Capital Charge for Credit Type | 210% | |
| 31 | 8/15/2017 | Capital Charge for Credit Type (i.e., expected 4-yr depression loss) & Annual Capital Charge (over 4 yrs) | 39.00% | 9.75% |
| 32 | 2/15/2018 | Insured Bond Percentage & Insuring Bond Percentage | 75.52% | 24.48% |
| 33 | 8/15/2018 | Max Additional Yld on Lowest Loss Position Bonds? If Yes, specify the maximum basis points in the adjacent cell. | Yes | 604 |
| 34 | 2/15/2019 | LLP Senior Bond % & Coupon Limit for Senior LLP Bonds | 35.0% | 491 |
| 35 | 8/15/2019 | Junior LLP Bond % & Junior LLP Bond Coupon Limit | 65.0% | 665 |
| 36 | 1st Call 2/15/2020 | Do the Lower LP Insuring Subclasses Enhance the Higher LP Insuring & Insured Bonds (Insuring) or only the Insured Bonds (Insured) | Insured | O.K. |
| 37 | 8/15/2020 | $4,915,000 AA Rated Insuring Subclass: % of Insuring Bonds & % of All Bonds | 20.00% | 4.90% |
| 38 | 1st Cble Mat 2/15/2021 | $3,950,000 A Rated Insuring Subclass: % of Insuring Bonds & % of All Bonds | 16.00% | 3.92% |
| 39 | 8/15/2021 | $12,690,000 BBB Rated Insuring Subclass: % of Insuring Bonds & % of All Bonds | 51.20% | 12.53% |
| 40 | 2/15/2022 | $3,160,000 BB or Unrated Insuring Subclass: % of Insuring Bonds & % of All Bonds | 12.80% | 3.13% |
| 41 | 8/15/2022 | $24,715,000 Insuring Bond Par | 100.0% | 24.48% |
| 42 | 2/15/2023 | Number of Insuring Subclasses | 4 | O.K. |
| 43 | 8/15/2023 | Minimum Req'd Covg of Assumed Defaults for AAA Insd Structure Bds & Adj Reqr/Actual Covg/Margin | 1.25 | 1.25 / 3.18 / 1.93 |
| 44 | 2/15/2024 | Minimum Req'd Covg of Assumed Defaults for Insg Bds Rated AA & Adjusted Reqr/Actual Covg/Margin | 1.00 | 1 / 2.8 / 1.8 |
| 45 | 8/15/2024 | Minimum Req'd Covg of Assumed Defaults for Insg Bds Rated A & Adjusted Reqr/Actual Covg/Margin | 0.80 | 0.8 / 2.43 / 1.63 |
| 46 | 2/15/2025 | Minimum Req'd Covg of Assumed Defaults for Insg Bds Rated BBB & Adjusted Reqr/Actual Covg/Margin | 0.64 | 0.16 / 0.77 / 0.61 |
| 47 | 8/15/2025 | Minimum Req'd Covg of Assumed Defaults for Insg Bds Rated BB & Adjusted Reqr/Actual Covg/Margin | 0.52 | 0.1 / 0.58 / 0.48 |
| 48 | 2/15/2026 | Percentage of Surplus Interest Available for Insured Bond Debt Service | 50.0% | O.K. |
| 49 | 8/15/2026 | Rating (BB or NR) for Assessing Structure Capacity to Withstand Downgrades & Annual Capital Charge | BB | 37.50% |
| 50 | 2/15/2027 | Average 4-year Total of the Annual Weighted Average Default Tolerances | 114.37% | |
| 51 | 8/15/2027 | Average Annual Weighted Average Default Tolerances & Coverage of Worst Case Assumed Defaults | 31.08% | 3.18x |
| 52 | 2/15/2028 | Average Worst Case Assumed Annual Defaults | 9.75% | |
| 53 | 8/15/2028 | Insuring Bonds Issued Noncall even though Insured Bonds are Callable? | No | O.K. |
| 54 | Final Mat 2/15/2029 | Structure Upfront Premium (charge on Insured Bonds) in bp on (a) Insd Bonds and (b) Structure Insured Bonds) | 76.0 | 9.9% of Monoline |
| 55 | | Annualized Upfront Struture Premium (charge on Insured Bonds) in bp on (a) Insd Bonds and (b) Structure Bonds | 15.15 | 23.07 |
| 56 | | Target for Additional Structure Benefit to Issuer vs Benefit of Monoline Insurance (bp) | 1.50 | O.K. |
| 57 | | Actual Structure Benefit to Issuer vs Monoline Insured & Yield Available for Insuring Bonds (in basis points) | (0.71) | 92.40 |
| 58 | | Total Structure Benefit vs Uninsured: Actual and Targeted (basis points) | 15.16 | 17.37 |
| 59 | | $ Retained for Annual Program Revs, Liquidity Fees, and Return on Equity: BP on All Bds & BP on Insg Bds | 1.00 | 4.08 |
| 60 | | Lowest Loss Position Tranche of Insuring Bonds (% Insuring Bonds & Par) | 12.8% | $3,160,000 |

FIG. 28F

| | | | |
|---|---|---|---|
| | Marketing Penalty Inputs | | |
| 62 | Higher Loss Position (HLP) Insuring Bonds Penalty for Trust Structure | 10.0 | basis points |
| 63 | Tax Rate and Inflation Rate | 35.0% | 2.00% |
| 64 | Additional Penalty if a portion of the marketing penalty is taxable | 0.0 | basis points |
| 65 | Should Taxable Yld and Tx-expt credit sprd be reflected in the Bd "Coupon" or as a "Discount" to the Purchase Price? | Coupon | O.K. |
| 66 | | | |
| | Bond Insurance Inputs | | |
| 67 | Underlying Bonds | | O.K. |
| 68 | Price callable Bds at Par (a) for unenhanced or Insrg Bonds & (b) for monoline or Structure Insrd Bds? | No | No |
| 69 | Does the issuer have access to AAA monoline bond insurance for the underlying bonds? Indicate "Yes" or "No" based on availability of monoline bond insurance. | Yes | O.K. |
| 70 | | | |
| 71 | Calculate breakeven monoline premium by doing a sizing with an estimated premium greater than zero. Even if insr is not available for underlying bds, since insr is used to calculate the the premium for the HLP Bonds, must show insr as available with a premium equal to the breakeven premium. | | |
| 72 | | | |
| 73 | | | |
| 74 | Monoline Bond Insurance Premium as a % of total debt Service & as % of breakeven premium (smaller is conservative) | 760.50 | 89.99% |
| 75 | Monoline Insurance Annualized Cost & Net Benefit to Issuer (in basis points) | 142.64 | 15.87 |
| 76 | Total Benefit of Monoline Insurance (in basis points) | 158.51 | |
| 77 | Breakeven Monoline Insurance Premium vs Uninsured Bonds | 845.11 | O.K. |

FIG. 28G

| | | | |
|---|---|---|---|
| 78 | Structure Insured Bonds | | |
| 79 | To reflect the availability of monoline insurance for Structure Insured: First, do a bond sizing with no insurance available. Second, paste the | | |
| 80 | value of the insurance benefit and equivalent upfront premium into the cells to the right. Third, do another bond sizing with insurance available. | | |
| 81 | Is AAA monoline insurance available for the Structure Insured Bonds? | No | O.K. |
| 82 | Net Pricing Benefit of Monoline Bond Insurance on the Structure Insured Bonds | (0.00) | |
| 83 | Estimate of Upfront Premium (of increase therein) Equivalent to Net Benefit | (0.01) | |
| 84 | Percentage of Monoline Insurance Benefit Paid to Bond Insurer (larger is conservative, e.g. 100%) | 100.0% | |
| 85 | Annualized Upfront Premium for Structure Insured Bonds/Net bp available for Insuring Bonds and Program | 0.00 | O.K. |
| 86 | Upfront Monoline Insurance Premium for Structure Insured Bonds | 0.00 | 0.00 |
| 87 | Insuring Bonds | | |
| 88 | Is monoline insurance available for the higher loss position Insuring Bonds? | No | O.K. |
| 89 | Is available monoline insurance "AAA"? | No | |
| 90 | Benefit of Bd Insr on the HLP Insuring Bonds (1) vs the initial Uninsured pricing & (2) adjusted for HLP credit spread | 0.00 | 0.00 |
| 91 | Monoline insurance premium (reflecting (1) Insd vs initial pricing and (2) the HLP credit sprd vs the initial pricing plus (1) | 0.00 | 0.00 |
| 92 | Percentage of Monoline Insurance Benefit Paid to Bond Insurer (larger is conservative) | 100.0% | |
| 93 | | DS on HLP Bnds | DS on all Insrg Bds |
| 94 | Annualized Monoline Premium for HLP Bonds & premium converted to basis points on all insuring bonds | 0.00 | 0.00 |
| 95 | Upfront Monoline Insurance Premium for HLP Bonds & premium covered to basis points on DS on all Insuring Bonds | 0.00 | 0.00 |
| 96 | Benefit of Bond Insr on HLP Bonds Net of Bond Insr Premium & HLP Credit Spread | 0.00 | 0.00 |

FIG. 28H

| | | | |
|---|---|---|---|
| 97 | Rounding Inputs | | |
| 98 | Rounding conventions for Uninsured, Monoline Insured, and Structure Insured Bonds | | |
| 99 | Rounding ($5000, $1000, $100, $10, $1) | $5,000 | O.K. |
| 100 | Rounding Multiple for Contingency | 1 | |
| 101 | Rounding conventions for Insuring Bonds only | | |
| 102 | Rounding ($5000, $1000, $100, $10, $1) | $5,000 | O.K. |
| 103 | Rounding Multiple for Contingency | 1 | |
| 104 | Rounding conventions for Insuring Subclasses only | | |
| 105 | Rounding ($5000, $1000, $100, $10, $1) | $5,000 | O.K. |
| 106 | Liquidity and Equity Inputs | | |
| 107 | Liquidity as % of Insuring Bond DS (25% of Annual Capital Charge*Coverage) and Liquidity as % of total Insured & Insuring Bond DS | 100.00% | 24.48% |
| 108 | Liquidity in $ & Liquidity Fee (in Basis Points on Amount of Liquidity) | 1,422,494 | 150 |
| 109 | Equity as % of Insuring Bond DS (25% of Annual Capital Charge times covg) and % of 4 Year Assumed default covered by structure cash equity | 62.50% | 100.00% |
| 110 | Equity in $ & Return on Equity Above Investment Return (in Basis Points) | 566,557 | 100 |
| 111 | Investment Return on Cash Equity and Investement Return on Upfront Premium | 5.00% | 4.00% |
| 112 | Comparison of Structure to Monoline Insurance and Conventional CDOs | | |
| 113 | Portion of Monoline Premium Allocated to Hard Program Expenses | 1.0% | |
| 114 | Monoline Cash Equity Capital Amount (1.5x expected losses) & Unrated Insg Bds Earning an Equity-Like Return | $5,027,333 | $3,160,000 |
| 115 | Marketing penalty on Insured CDO Bonds & Tax on reallocated interest in basis points on all Bonds | 7.55 | 32.30 |

FIG. 28I

| W | X | Y | Z | AA | AB | AC | AD | AE | AF | AG | AH | AI |
|---|---|---|---|---|---|---|---|---|---|---|---|---|

Sizing of Insuring Bonds and Insuring Subclasses to Take Account of Assumed Portfolio Downgrades Discounts for Bonds At or Higher Than the Insuring Subclass Rating

- Same Rating Pct 25%
- 1 Rating Higher Pct 20%
- 2 Ratings Higher Pct 15%
- 3 Ratings Higher Pct 10%
- 4 Ratings Higher Pct 0%

| Underlying Rating | BBB | AAA | AA | A | BBB | BB | B | CCC |
|---|---|---|---|---|---|---|---|---|
| | | | | Capital Charges for indicated rating category | | | | |
| | 4 Yr | 12% | 15% | 21% | 39% | 150% | 210% | 100% |
| | 1 Yr | 3.000% | 3.750% | 5.250% | 9.750% | 37.500% | 52.500% | 25.000% |
| AAA | | | 50.0% | 50.0% | | | | |
| AA | | | 20.0% | 60.0% | 20.0% | | | |
| A | | | | 75.0% | 25.0% | | | |
| BBB | | | | | 80.0% | 20.0% | | |
| BB | | | | | | 100.0% | | |
| B | | | | | | | 100.0% | |

For bonds with the underlying rating indicated to the right, the %s equal the portions of the related insuring bonds to be structured with ratings indicated above

|  | Four Year Assumed Defaults | Annual Assumed Defaults |
|---|---|---|
| O.K. | 18.000% | 4.500% |
| O.K. | 23.400% | 5.850% |
| O.K. | 25.500% | 6.375% |
| O.K. | 61.200% | 15.300% |
| O.K. | 150.000% | 37.500% |
| O.K. | 210.000% | 52.500% |

Aggregate Subclass Size Including Indicated Subclass
Incremental Subclass Size for Particular Insuring Subclass
Incremental Subclass Size With 1.6x Covg Over Asmd Dflts Given Asmd Downgrades
Cumaulative Insuring Bond% of Bond Issue
Subclass Percentage of Insuring Bonds

FIG. 29A

| AJ | AK | AL | AM | AN |
|---|---|---|---|---|
| Sizing of Insuring Bonds and Insuring Subclasses to Take Account of Assumed Portfolio Downgrades | | | | |
| 4th Loss | 3rd Loss | 2nd Loss | 1st Loss Snr | 1st Loss Jnr |
| | | Target Rating of Next Higher Subclass | | |
| AAA | AA | A | BBB | BB |
| AA | A | BBB | BB | C |
| 1.25 | 1.00 | 0.80 | 0.64 | 0.52 |
| | | Target Rating of This Subclass | | |
| 0.000% | 0.000% | 0.000% | 0.000% | 0.000% |
| 0.000% | 0.000% | 0.000% | 0.000% | 0.000% |
| 0.000% | 0.000% | 0.000% | 0.000% | 0.000% |
| 19.125% | 15.300% | 12.240% | 2.448% | 1.591% |
| 0.000% | 0.000% | 0.000% | 0.000% | 0.000% |
| 0.000% | 0.000% | 0.000% | 0.000% | 0.000% |
| 19.125% | 15.300% | 12.240% | 2.448% | 1.591% |
| 3.825% | 3.060% | 9.792% | 0.857% | 1.591% |
| 4.896% | 3.917% | 12.534% | 1.097% | 2.037% |
| 24.480% | 19.584% | 15.667% | 3.133% | 2.037% |
| 20.000% | 16.000% | 51.200% | 4.480% | 8.320% |

FIG. 29B

| | B | BT | BU | BV | BW | BX | BY | BZ | CA | CB | CC | CD |
|---|---|---|---|---|---|---|---|---|---|---|---|---|
| 1 | Structure | | | | | | | | Structure Insured Bonds 75.5% | | | |
| 2 | Insured & | Level D/S for Insd Bds | | | 5,810,842 | | Bond Proceeds | | 77,173,683 | | Base Yield | All-in Yield |
| 3 | Insuring | Bond Proceeds Target | | | 77,168,975 | | Up Frt & Ins Premium | | 879,637 | Bond Yield | 4.232% | 4.478% |
| 4 | Bonds for | Prelim Bond Proceeds | | | 77,168,975 | | Underwriters' Disc | | 580,538 | Proceeds | 77,173,683 | 75,524,708 |
| 5 | BBB-rated | O.K. | | | 0 | | Cost of Issuance | | 188,800 | PV | 77,173,683 | 75,524,708 |
| 6 | Hospital | Final Bond Par | | | 77,405,000 | | Total COI | | 1,648,975 | | | |
| 7 | Systems | Surplus vs Target | | | 4,708 | | Net Bond Proceeds | | 75,524,708 | 7.5 per bd | 0 | (0) |
| 8 | Total /Avg = | 77,168,975 | 77,400,370 | 2,880,177 | 77,173,683 | 77,405,000 | 2,880,385 | 115,741,737 | 115,741,737 | 580,538 | 77,173,683 | 75,524,708 |
| 9 | | | | | Structure Insured Bond Sizing | | | | | | Base Yield | All-in Yield |
| 10 | | | Preliminary | | | Final | | | | | PV | PV |
| 11 | Payment | Bond | Bond | Maturity | Bond | Bond | Maturity | Semiannual | Annual | Bond | of Debt | of Debt |
| 12 | Dates | Proceeds | Par | Interest | Proceeds | Par | Interest | D/S | D/S | Takedown | Service | Service |
| 13 | | | | | | | | | 5,811,301 | | | |
| 14 | 3/15/2009 | | | | | | | | | | | |
| 15 | 8/15/2009 | | | | | | | 1,200,160 | | | | |
| 16 | 2/15/2010 | 2,689,372 | 2,686,443 | 24,071 | 2,687,927 | 2,685,000 | 24,058 | 4,125,192 | 5,325,352 | 20,138 | 1,179,401 | 1,178,216 |
| 17 | 8/15/2010 | | | | | | | 1,428,163 | | | 3,969,844 | 3,961,074 |
| 18 | 2/15/2011 | 2,951,929 | 2,954,736 | 40,303 | 2,952,193 | 2,955,000 | 40,306 | 4,383,163 | 5,811,327 | 22,163 | 1,345,904 | 1,341,312 |
| 19 | 8/15/2011 | | | | | | | 1,408,010 | | | 4,045,114 | 4,026,451 |
| | | | | | | | | | | | 1,272,494 | 1,265,096 |

FIG. 30A

| CE | CF |
|---|---|

Structure Insured Cost vs Monoline Insured
(0.00)

Structure Insured Benefit vs Uninsured Bonds
158.51

Analysis of Structure Economics Based on the Base Yield Benefit of Structure Insd vs Uninsd Bds Base Yield Benefit of Structure Insured vs Uninsured Bds (in bp on Structure Insd Bds)
158.51

Less: Annualized Bond Insurance Premium on Structure Insured Bonds
0.00

Less: Annualized Upfront Structure Premium on Structure Insured Bonds
(13.15)

(1) Less: Benefit of monoline bond insurance retained by Issuer
(15.87)

(2) Less: Additional benefit to the Issuer provided by the Stucture
(1.50)

Sum of (1) & (2), each of which is stated in bp on the entire bond issue
(17.37)

The amount stated in basis points on the Structure Insd Bds that is equivalent to the indicated sum
(23.00)

Plus: Gross Tax-Exempt Benefit of HLP Insg Bds vs Uninsrd, 0 in bp on the Structure Insrd Bds
0.00

Less: Premium for Mono Insr on HLP Bds or up front premium or additional takedown on Insuring Bonds, 0 converted to bp on issue
(0.00)

Less: Tax-Exempt Interest on HLP Bonds Avail for Mktg Pnlty 0 in bp on the Structure Insrd Bds
0.00

Net benefit from Structure Insured Bonds that is available for Insg Bonds
122.36

Net benefit available for Insuring Bonds (in basis points on the Insuring Bonds)
377.46

FIG. 30B

| | B | CG | CH | CI | CJ | CK | CL | CM | CN | CO | CP | CQ | CR |
|---|---|---|---|---|---|---|---|---|---|---|---|---|---|
| 1 | Structure | | | | Structure Insured Bonds 75.5% | | | | | | | | Aggrgte |
| 2 | Insured & | Level D/S for Insd Bds | | | 2,128,483 | Bond Proceeds | | | 24,730,293 | | Base Yield | All-in Yield | Base Yld |
| 3 | Insuring | Bond Proceeds Target | | | 24,726,563 | Bond Insur on Insg Bids | | | 0 | Bd Yield | 5.817% | 5.939% | 4.626% |
| 4 | Bonds for | Prelim Bond Proceeds | | | 24,726,563 | Underwriters' Disc | | | 185,363 | Proceeds | 24,730,293 | 24,483,731 | 101,903,976 |
| 5 | BBB-rated | O.K. | | | 0 | Cost of Issuance | | | 61,200 | PV | 24,730,293 | 24,483,731 | 101,903,976 |
| 6 | Hospital | Final Bond Par | | | 24,715,000 | Total COI | | | 246,563 | 7.5 + 17.5 = | (0) | 0 | 0 |
| 7 | Systems | Surplus vs Target | | | 3,731 | Net Bond Proceeds | | | 24,483,731 | 25 | | | |
| 8 | Total /Avg = | 24,726,563 | 24,711,320 | 1,355,864 | 24,730,293 | 24,715,000 | 1,356,160 | 42,401,705 | 42,401,705 | 617,875 | 24,730,293 | 24,483,731 | 101,903,976 |
| 9 | | | | | Structure Insured Bond Sizing | | | | | | Base Yield | All-in Yield | |
| 10 | | | Preliminary | | | | Final | | | | PV | PV | |
| 11 | Payment | Bond | Bond | Maturity | Bond | Bond | Maturity | Semianual | Annual | Bond | of Debt | of Debt | |
| 12 | Dates | Proceeds | Par | Interest | Proceeds | Par | Interest | D/S | D/S | Takedown | Service | Service | |
| 13 | | | | | | | | | 2,128,956 | | | | |
| 14 | 3/15/2009 | | | | | | | | | | | | |
| 15 | 8/15/2009 | | | | | | | 565,067 | | | 551,727 | 551,454 | 1,731,908 |
| 16 | 2/15/2010 | 707,455 | 708,234 | 18,414 | 704,225 | 705,000 | 18,330 | 1,383,080 | 1,948,147 | 17,625 | 1,312,262 | 1,310,837 | 5,282,125 |
| 17 | 8/15/2010 | | | | | | | 668,915 | | | 616,727 | 615,693 | 1,965,518 |
| 18 | 2/15/2011 | 791,160 | 791,033 | 27,591 | 795,127 | 795,000 | 27,730 | 1,463,915 | 2,132,830 | 19,875 | 1,311,557 | 1,308,581 | 5,356,367 |

FIG. 30C

| | B | CS | CT | CU | CV | CW | CX | CY | CZ | DA | DB | DC | DD |
|---|---|---|---|---|---|---|---|---|---|---|---|---|---|
| 1 | Structure | | Adjusted Structure Insuring Bonds: Issuer Level Pricing | | | | | | | | | | |
| 2 | Insured & | Increment to Insuring Bond yields to maturity for all insuring maturities (of which | | | | | | | | | | | |
| 3 | Insuring | 4.08 bp represent Program Revenues, Liquidity Fees and Return on Equity) and | | | | | | | | | Total Original Proceeds | | 24,730,293.20 |
| 4 | Bonds for | 222.5 bp represent taxable marketing penalty and credit spread | | | | | | | | | Total Adjusted Proceeds | | 24,729,967.80 |
| 5 | BBB-rated | | | | O.K. | | | | 3.770% | | Discrepancy | | (325) |
| 6 | Hospital | | | | | | | | | | | | |
| 7 | Systems | | | | | | | | | | | | |
| 8 | Total /Avg = | | 5.223% | | | 8.993% | | | 8.990% | 3.776% | | | |
| 9 | | Priced to | Orignal | Orignal | Insuring | Adjusted | Est Adjst | Initial vs Est | Est Adjst | Incremental | Adjusted | Adjusted | Adjusted |
| 10 | | Call or | Yields to | Yields to | Bond | Yields to | Price to | Adjusted | Maturity | Maturity | Yields to | Price to | Bond |
| 11 | Payment | Maturity | Maturity | Call | Price | Worst | Worst | Price to Worst | Coupon | Coupon | Best | Worst | Proceeds |
| 12 | Dates | | | | | | | | | | | | |
| 13 | | | | | | | | | | | | | |
| 14 | 3/15/2009 | | | | | | | | | | | | |
| 15 | 8/15/2009 | | | | | | | | | | | | |
| 16 | 2/15/2010 | Maturity | 2.721% | 2.721% | 99.890 | 6.491% | 99.890 | 0.000 | 6.374% | 3.774% | 6.492% | 99.890 | 704225 |
| 17 | 8/15/2010 | | | | | | | 0.000 | 0.000% | | | | |
| 18 | 2/15/2011 | Maturity | 3.478% | 3.478% | 100.016 | 7.248% | 100.016 | 0.000 | 7.263% | 3.775% | 7.249% | 100.017 | 795135 |
| 19 | 8/15/2011 | | | | | | | 0.000 | 0.000% | | | | |
| 20 | 2/15/2012 | Maturity | 3.766% | 3.766% | 99.833 | 7.536% | 99.833 | 0.000 | 7.475% | 3.769% | 7.536% | 99.833 | 813639 |
| 21 | 8/15/2012 | | | | | | | 0.000 | 0.000% | | | | |
| 22 | 2/15/2013 | Maturity | 4.204% | 4.204% | 100.032 | 7.974% | 100.031 | -0.001 | 7.987% | 3.773% | 7.974% | 100.032 | 850272 |

| | B | DE | DF | DG | DH | DI | DJ | DK | DL | DM | DN | DO |
|---|---|---|---|---|---|---|---|---|---|---|---|---|
| 1 | Structure | | | | | Adjusted Structure Debt Service Reflecting Issuer Level Pricing | | | | | | |
| 2 | Insured & | Total Structure Bond Par 102,120,000 | | | | Insuring Bonds: Base Yield All-in Yield | | Insng Bd Yld | Total Structure: Base Yield All-in Yield | | | |
| 3 | Insuring | Bond Proceeds 101,903,651 | | | | Bond Yield | 9.562% | 9.713% includes 4 BP for Bond Yield | | 5.556% | 5.787% | |
| 4 | Bonds for | Up Frt & Ins Premium | | 879,637 | | Proceeds | 24,729,968 | 24,483,405 | Annual Revs, | Proceeds | 101,903,651 | 100,008,114 |
| 5 | BBB-rated Hospital | Underwriters' Discount | | 765,900 | | PV | 24,729,968 | 24,483,405 | Liqdty Fees & | PV | 101,903,651 | 100,008,114 |
| 6 | Systems | Cost of Issuance | | 250,000 | | | 0 | 0 | Equity Return. | | (0) | 0 |
| 7 | | Net Proceeds 100,008,114 Insuring Bd Yield Increase | | | | | 3.745% | 3.774% | Benefit to Issuer vs Insured Bds | | -0.71 basis points | |
| 8 | Total /Avg = | 24,715,000 | | | | 53,762,100 | 24,729,968 | 24,483,405 | 169,503,837 | 169,503,837 | 101,903,651 | 100,008,114 |
| 9 | | | | | | | Base Yield | All-in Yield | | | Base Yield | All-in Yield |
| 10 | | | Adjusted Insuring Debt Service | | | | Adjusted | 2,699,352 | | | | |
| 11 | Payment | Insuring Bond | Interest | Maturity | Semi-Annual | Adjusted Annual | PV of Debt | PV of Debt | Total Semi-annual | Annual | PV of Debt | PV of Debt |
| 12 | Dates | Par | Coupons | Interest | DS | Insuring D/S | Service | Service | Structure DS | Strctr D/S | Service | Service |
| 13 | | | | | | | | | | | | |
| 14 | 3/15/2009 | | | | | | | | | | | |
| 15 | 8/15/2009 | | | | 954,126 | | 917,708 | 917,155 | 2,154,287 | 8,510,653 | 2,105,653 | 2,103,686 |
| 16 | 2/15/2010 | 705000 | 6.374% | 44,937 | 1,849,952 | 2,804,078 | 1,698,154 | 1,695,904 | 5,975,144 | 8,129,431 | 5,682,397 | 5,670,724 |
| 17 | 8/15/2010 | | | | 1,122,483 | | 983,365 | 981,353 | 2,550,647 | | 2,360,116 | 2,352,628 |
| 18 | 2/15/2011 | 795000 | 7.263% | 57,741 | 1,917,483 | 3,039,967 | 1,603,188 | 1,598,751 | 6,300,647 | 8,851,294 | 5,672,417 | 5,648,081 |
| 19 | 8/15/2011 | | | | 1,093,613 | | 872,639 | 869,595 | 2,501,623 | | 2,191,315 | 2,179,468 |
| 20 | 2/15/2012 | 815000 | 7.475% | 60,921 | 1,908,613 | 3,002,226 | 1,453,473 | 1,447,356 | 6,316,623 | 8,818,247 | 5,383,538 | 5,348,430 |

FIG. 31C

| | DQ | DR | DS | DT | DU | DV | DW | DX | DY | DZ | EA |
|---|---|---|---|---|---|---|---|---|---|---|---|
| | \multicolumn{11}{l|}{Adjusted Structure Level Pricing for Higher Loss Position Insuring Bonds: Structure Level Pricing} | | | | | | | | | | |
| 1 | Structure | | | | | | | | | | |
| 2 | Insured & | Increment to HLP Insuring Bond yields for taxable portion | | | | | | | | | |
| 3 | Insuring | of the marketing penalty & taxable credit spread = | | | 2.2300% | | | | | | |
| 4 | Bonds for | | | | | | | | Original Proceeds | | 24,730,293 |
| 5 | BBB-rated | | | O.K. | | Taken as an adjustment to | | | Adjusted Proceeds | | 24,730,325 |
| 6 | Hospital | | | | | the HLP Bond Coupons | | | Discrepancy | | 32 |
| 7 | Systems | | | | | | | | HLP Discrepancy | | 28 |
| 8 | Total /Avg = | | | | | | 7.449% | | | | |
| 9 | | | Original | | Estimated | Initl vs Est | Ajusted | Addtnl | Adjst | Adjst | Adjusted |
| 10 | | Orignal | Orignal | Insuring | Adjusted | Adjusted | Adjusted | Maturity | Maturity | Yld to | Price to | Bond |
| 11 | Payment | Yields to | Yields to | Bond | Yields to | Price to | Price | Coupon | Coupon | Best | Worst | Proceeds |
| 12 | Dates | Maturity | Call | Price | Worst | Worst | to Worst | | | | | |
| 13 | | | | | | | | | | | | |
| 14 | 3/15/2009 | | | | | | | | | | | |
| 15 | 8/15/2009 | | | | | | | | | | | |
| 16 | 2/15/2010 | 2.721% | 2.721% | 99.890 | 4.951% | 99.890 | 0.000 | 4.832% | 2.232% | 4.952% | 99.890 | 704225 |
| 17 | 8/15/2010 | | | | | | 0.000 | 0.000% | | | | |
| 18 | 2/15/2011 | 3.478% | 3.478% | 100.016 | 5.708% | 100.016 | 0.000 | 5.720% | 2.232% | 5.708% | 100.015 | 795119 |
| 19 | 8/15/2011 | | | | | | 0.000 | 0.000% | | | | |
| 20 | 2/15/2012 | 3.766% | 3.766% | 99.833 | 5.996% | 99.833 | 0.000 | 5.935% | 2.229% | 5.996% | 99.832 | 813631 |
| 21 | 8/15/2012 | | | | | | 0.000 | 0.000% | | | | |
| 22 | 2/15/2013 | 4.204% | 4.204% | 100.032 | 6.434% | 100.032 | 0.000 | 6.446% | 2.232% | 6.435% | 100.033 | 850281 |

| EB | EC |
|---|---|

Analysis of the Economics of Insuring Bond Subclasses

(A) Increment over Uninsured Yield Available to Insuring Bonds (in bp on all Insuring Bonds)
377.46

Higher Loss Position Subclass Economics

Marketing Pnlty due to Structure on HLP Bonds (rounded) (10.00)
Tax-exempt portion 0.00
Taxable Portion 10.00
Taxable HLP Credit Spread 134.65
Total HLP Taxable Yield 144.65

Adjustment to HLP Yield (223.00)
(C) Increment to HLP Cpn (223.00)

Lowest Loss Position Subclass Economics

(D) Incremental yield (above uninsured yield & the taxable portion of the marketing penalty on HLP Insuring Tranches).
D=A+C
154.46

(F) BP Retained for Annual Program Revenues, Liquidity Fees and Return on Equity
(4.08)

(G) Yield available for LLP Bonds (i) above the Uninsured Bond Yield and taxable portion of the HLP Bond Marketing Penalty and (ii) net of Progam Revs, Liqidity Fees & Equity Return.
G=D+F
150.38

(H) 150.38 bp, converted to yield on the Lowest Loss Position Bonds (3.13% of total issue & 12.8% of Insuring Bonds)
1174.87

| | B | ED | EE | EF | EG | EH | EI | EJ | EK | EL | EM | EN | EO |
|---|---|---|---|---|---|---|---|---|---|---|---|---|---|
| 1 | Structure Insured & Insuring Bonds for BBB-rated Hospital Systems | Adjusted Structure Level Pricing for Lowest Loss Position Insuring Bonds | | | | | | | | | | | |
| 2 | | Due to rounding of the portions of of the Insuring Bonds for each maturity, the ratio of the Net Incremental Coupon, Collum (I), to the Equivalent Incremental Coupon for the Lowest Subclass, Collumn (II), varies by maturity | | | | | | | | | | | |
| 3 | | | | | | | | | | | | | |
| 4 | | | | | | | | | | | | | |
| 5 | | | | | | Additional Coupon Limited to 604 basis points | | | | | | | |
| 6 | | | | | | | | | | | | | |
| 7 | | | | | | Predicted Average 11.749% | | Weighted Average 11.520% | 6.037% | 11.517% | 6.030% | 6.029% |
| 8 | Total /Avg = | | | | | 11.167% | | 10.721% | 5.750% | 10.719% | 5.745% | 5.744% |
| 9 | | Adjusted Coupons on Insuring only for HLP Coupon | Coupons Adjusted for Mktg Pnlty | Prog Revs, Liq Fees and Equity | (I) Net Addtnl Cpn on Cpn on Insg Bds | (II) Equiv Addtnl Cpn on LLP | Addit LLP Subcl Cpn Subclass | Total Coupon | Yield to Maturity | Additional Yield to LLP Subcl Call on | Yield to Lowest Subcl Subclass | LLP Yield to Maturity | LLP Subcl Yield to Worst |
| 10 | | | | | | | After any Lowest Cpn Limit | | | | | | |
| 11 | Payment Dates | | | | | | | | | | | | |
| 12 | | | | | | | | | | | | | |
| 13 | | | | | | | | | | | | | |
| 14 | 3/15/2009 | | | | | | | | | | | | |
| 15 | 8/15/2009 | | | | | | | | | | | | |
| 16 | 2/15/2010 | 6.374% | 4.832% | 0.041% | 1.501% | 11.759% | 3.808% | 8.640% | 8.753% | 6.032% | 8.753% | 6.032% | 6.032% |
| 17 | 8/15/2010 | | | | | | | | | | | | |

FIG. 31F

| | B | EP | EQ | ER | ES | ET | EU | EV | EW | EX | EY | EZ | FA |
|---|---|---|---|---|---|---|---|---|---|---|---|---|---|
| 1 | | Verification of Calculations of Insuring Bond Debt Service and Interest Coupons | | | | | | | | | | | |
| 2 | Structure Insured & Insuring Bonds for BBB-rated Hospital Systems | % of Total & Par 87.21% | | | % of Total & Par 12.79% | | | % of Total & Par 100.0% | | | | | |
| 3 | | | | | | | | | | | | | |
| 4 | | | | | | | | | | | | | |
| 5 | | | | | | | | | | | | | |
| 6 | | 21,555,000 | 42,852,000 | | 3,160,000 | 7,735,464 | | 24,715,000 | 50,587,463 | 3,051,746 | 122,608 | 53,762,100 | 282.39 |
| 7 | | Par of Higher Loss Position on HLP Insuring Bonds | DS on Mat Int Insg Bonds | Higher Loss Insuring Bonds | Par of Lowest Loss Position on LLP Insuring Bonds | Mat Int Insuring Bonds | Lower Loss Insuring Bonds | Par of Insuring Bonds Subclasses | Debt Service on Various Insrg Bds Subclasses | Surplus Int Due to Cpn Limit on LLP Bds or No LLP Bonds | BP for Annual Prog Revs, Liq Fees &Return on Equity Subclasses | Total DS on Insuring Bds Before Subdivision into various Subclasses | Surplus DS on Insg Bds from Truncating HLP Subclass Yields |
| 8 | Total /Avg = | | | | | | | | | | | | |
| 9 | | | | | | | | | | | | | |
| 10 | | | | | | | | | | | | | |
| 11 | Payment Dates | | | | | | | | | | | | |
| 12 | | | | | | | | | | | | | |
| 13 | | | | | | | | | | | | | |
| 14 | 3/15/2009 | | | | | | | | | | | | |
| 15 | 8/15/2009 | | | 693,717 | | | 151,751 | | 845,468 | 104,447 | 4,202 | 954,126 | 10.37 |
| 16 | 2/15/2010 | 615,000 | 29,717 | 1,447,460 | 90,000 | 7,776 | 272,102 | 705,000 | 1,719,561 | 125,336 | 5,042 | 1,849,952 | 12.44 |
| 17 | 8/15/2010 | | | 817,601 | | | 178,214 | | 995,815 | 121,759 | 4,898 | 1,122,483 | 11.81 |

Structure Insured & Insuring Bonds for BBB-rated Hospital Systems

Summary of Bond Yields and Yield Related Calculations

Bond Yield Definitions:

Base Yield = the yield at which the gross proceeds of an issue are borrowed, i.e., the yield target is gross proceeds All-in Yield = the Base Yield plus the annualized cost of any upfront monoline insurance premium or upfront Structure premium. Since annualized structure-related costs are funded from interest, they are already reflected in the yield calculations.

Total / Avg =

Payment Dates:
- 3/15/2009
- 8/15/2009
- 2/15/2010
- 8/15/2010
- 2/15/2011
- 8/15/2011
- 2/15/2012
- 8/15/2012
- 2/15/2013
- 8/15/2013
- 2/15/2014
- 8/15/2014
- 2/15/2015
- 8/15/2015
- 2/15/2016
- 8/15/2016
- 2/15/2017
- 8/15/2017
- 2/15/2018
- 8/15/2018
- 2/15/2019
- 8/15/2019

Bond Yields Paid by the Issuer

|  |  | Base Yield | All-in Yield |
|---|---|---|---|
| Uninsured Bonds (rated BBB) | A | 5.817% | 5.939% |
| Monoline Insured Bonds | B | 4.232% | 5.780% |
| Structure Insured Bonds | C | 4.232% | 4.478% |
| Initial Insuring Bonds (tax-exempt interest) | D | 5.817% | 5.939% |
| Adjusted Insuring Bonds (including additional interest) | E | 9.562% | 9.713% |
| Structure Insured and Insuring Bonds (before additional interest coupon) | | 4.626% | 4.844% |
| Structure Insured and Insuring Bonds (including additional interest coupon) | F | 5.556% | 5.787% |

Bond Yields on Insuring Bonds as further adjusted within the Structure. Yields are tax-exempt up to 5.817%

| Higher Loss Position Insuring Bonds | G | 8.036% | 8.175% |
|---|---|---|---|
| Lowest Loss Position Insuring Bonds (rated NR) | H | 11.783% | 11.953% |
| Tax-Exempt Equivalent Yield of Lowest Loss Position Bonds | | 9.695% | 9.848% |
| Taxable Equivalent Yield of Lowest Loss Position Bonds | | 14.915% | 15.151% |

Comparison of Financing Alternatives

FIG. 31G

| | | | | |
|---|---|---|---|---|
| 36 | 2/15/2020 | | | |
| 37 | 8/15/2020 | Monoline Insured Bonds | | |
| 38 | 2/15/2021 | Base Yield Benefit of Insured Bonds vs Uninsured | 158.51 | IA-IB |
| 39 | 8/15/2021 | Annualized Cost of Monoline Bond Insurance | (142.64) | IB-IIB |
| 40 | 2/15/2022 | All-in Yield Benefit to Issuer of Monoline Bond Insurance vs Uninsured | 15.92 | IA-IIB |
| 41 | 8/15/2022 | | | |
| 42 | 2/15/2023 | Structure Insured Bonds | | |
| 43 | 8/15/2023 | Base Yield Cost of Structure Insured vs Monoline Insured | (0.00) | IC-IB |
| 44 | 2/15/2024 | Base Yield Benefit of Structure Insured vs Uninsured | 158.51 | IA-IC |
| 45 | 8/15/2024 | Annualized Upfront Premium for Structure Insured | (13.15) | IC-IIC |
| 46 | 2/15/2025 | Portion of Upfront Premium Allocable to Monoline Bond Insurance | 0.00 | |
| 47 | 8/15/2025 | Net Upfront Premium for Structure Insured Bonds | (13.15) | |
| 48 | 2/15/2026 | All-in Yield Benefit of Structure Insured vs Uninsured | 146.06 | IIA-IIC |
| 49 | 8/15/2026 | | | |
| 50 | 2/15/2027 | All-in Yield Benefit of Structure Insured vs Monoline Insured | 130.13 | IIB-IIC |
| 51 | 8/15/2027 | | | |
| 52 | 2/15/2028 | Structure Insuring Bonds | | |
| 53 | 8/15/2028 | Initial Base Cost of Insuring Bonds vs Uninsured Bonds J | (0.01) | IA-ID |
| 54 | 2/15/2029 | Annualized Bond Insurance Premium for Higher Loss Position Insuring Bonds K | 0.00 | ID-IID |
| 55 | | Cost of Additional Takedown on Insuring Bonds L | 0.00 | M-K-J |
| 56 | | Initial All-in Cost of Insuring Bonds vs Uninsured Bonds M | (0.01) | IIA-IID |
| 57 | | | | |
| 58 | | | | |
| 59 | | Initial Base Cost of Insuring Bonds vs Monoline Insured Bonds | (158.52) | IB-ID |
| 60 | | Initial All-in Cost of Insuring Bonds vs Monoline Insured Bonds | (15.93) | IIB-IID |
| 61 | | | | |
| 62 | | Adjusted Base Cost of Insuring Bonds vs Uninsured Bonds | (374.49) | IA-IE |
| 63 | | Annualized Bond Insurance Premium for Insuring Bonds and Additonal Takedown | (2.95) | |
| 64 | | Adjusted All-in Cost of Insuring Bonds vs Uninsured Bonds | (377.44) | IIA-IIE |
| 65 | | | | |
| 66 | | Aggregate Structure Insured and Insuring Bonds | | |
| 67 | | Aggregate Base Structure Benefit vs Uninsured | 26.08 | IA-IF |
| 68 | | Less: Incremental Costs for Structure Bonds (Premiums, Takedown, | | |
| 69 | | and Additional Interest) | (10.87) | |
| 70 | | Aggregate All-in Benefit of Structure Bonds vs Uninsured Bonds | 15.21 | IIA-IIF |
| 71 | | Less: Benefit to Issuer from Monoline Insurance | (15.92) | |
| 72 | | Aggregate All-in Benefit of Structure Bonds vs Monoline Insured Bonds | (0.71) | IIB-IIF |
| 73 | | | | |
| 74 | | | | |
| 75 | | Additional Yield on Higher Loss Position Bonds vs Uninsured Bonds | 235.85 | |
| 76 | | Additional Yield on Lowest Loss Position Bonds vs Uninsured Bonds | 596.59 | |

| | B | FU | FV | FW | FX | FY | FZ | GA | GB | GC | GD | GE | GF |
|---|---|---|---|---|---|---|---|---|---|---|---|---|---|
| 1 | Structure | | | | | | Components of Adjusted Insuring Debt Service | | | | | | |
| 2 | Insured & | | | | | | Annual Revenue Inadequate in Some Years to pay Fees and Return on Equity | | | | | | |
| 3 | Insuring | | | | | | LLP Bond Par | 3,160,000 | Total Program Revenues | | | Net Premium | |
| 4 | Bonds for | | | | | | Surplus Revs from Truncating Insng Subclass Yields | | | 3,083,654 | | 446,827 | |
| 5 | BBB-rated Hospital | | | | | | | | Surplus Revs from Cpn Limit | | 282 | | |
| 6 | Systems | Surplus Int due to Cpn Limit | | | | | Adjtmts to Bd Proceeds due to Yield Adjtmts | | | 3,051,746 | | | |
| 7 | | on or No LLP Bonds | | | | | Upfront Strctr Premium (less Add'l Tkdn) | | | (297) | Discrepancy | (0) | |
| 8 | Total /Avg = | 3,160,000 | | 3,051,746 | 11,360,395 | | 5,868,110 | 190,864 | 2,317,649 | 537,809 | (415,201) | 3,052,028 | 11,360,395 |
| 9 | | Par of | Semi | | Addtnl | Taxable | Taxable | Additional | Additional | Liquidity | Annual | Surplus Int | Total Amts |
| 10 | | LLP | Surplus | Annual | DS on | Mktng | Mktng | Yield on | Yield on | & Equity | Progam | frm Cpn Limit | to Insrg |
| 11 | Payment | Insuring | Maturity | Surplus | Insuring | Penalty | Penalty | LLP | LLP Bonds | Expense | Revenues | & Truncating | Bds |
| 12 | Dates | Bonds | Interest | Interest | Bds | on HLP | on HLP | Maturities | (596.6 bp) | (1bp) | | Insg Bd Ylds | and the |
| 13 | | | | | (374.4 bp) | Insuring | Insuring | | | | | | Program |
| 14 | 3/15/2009 | | | | | Maturities | Bonds | | | | | | |
| 15 | 8/15/2009 | | | 104,447 | 389,060 | | 200,874 | | 79,527 | 11,251 | (7,050) | 104,457 | 389,060 |
| 16 | 2/15/2010 | 90,000 | 7,155 | 125,336 | 466,872 | 13,727 | 241,049 | 5,436 | 95,432 | 13,501 | (8,460) | 125,348 | 466,872 |
| 17 | 8/15/2010 | | | 121,759 | 453,568 | | 234,186 | | 92,714 | 13,501 | (8,603) | 121,770 | 453,568 |

Detailed Structure Level Cash Flows for 4th Loss Position (AA) Insuring Bonds

| | | | | | | | | | | | | | | |
|---|---|---|---|---|---|---|---|---|---|---|---|---|---|---|
| Structure Insured & Insuring Bonds for BBB-rated Hospital Systems | | AAA Monoline Insured No | | | | | | | | | | | | |
| | | AA Monoline Insured No | | | | | | | | | | | | |
| | | | | | | | Avg Ylds for AA Insg Subclass | 0.114% | 0.000% | 0.114% | 0.095% | 0.000% | 0.095% | 0.322% |
| | | | 8.990% | | | | Adj Avg Ylds for AA Insg Subclass | 0.096% | 0.000% | 0.096% | 0.080% | 0.000% | 0.080% | 0.272% |
| | | 4,915,000 | Adjstd Cpn on Subclass | Base Insrg Cpn | Insrg Bond Yield | Bond Yield Structure | Sprd to Enhanced | Tax-Expt Base Yield | Taxable Credit Spread | Credit Spread | Mktg Pnlty | Tx-Expt Mktg Pnlty | Net Tx-Expt Yield/ Cpn | Total Txble Net Yld Avail |
| Bond Term | Key Dates | Payment Dates | Principal | Cpn on Bond | | | | | | | | | | |
| | Dated Date | 3/15/2009 | | | | | | | | | | | | |
| | 1st Interest | 8/15/2009 | | | | | (5.82) | | | | | | | |
| 0.92 | 1st Maturity | 2/15/2010 | 140,000 | 6.374% | 2.600% | 2.720% | 2.840% | 0.120% | 0.120% | 0.120% | 0.100% | 0.100% | | |
| | | 8/15/2010 | | | | | | | | | | | | |
| 1.92 | | 2/15/2011 | 160,000 | 7.263% | 3.488% | 3.478% | 3.598% | 0.120% | 0.120% | 0.100% | 0.100% | 0.100% | | |

FIG. 32B

| | C | Q | R | S | T | U | V | W | X | Y | Z |
|---|---|---|---|---|---|---|---|---|---|---|---|
| | | | | Detailed Structure Level Cash Flows for 4th Loss Position (AA) Insuring Bonds | | | | | | | |
| 1 | Structure Insured & Insuring Bonds for BBB-rated Hospital Systems | Coupon | | | | | | | Total Original Subclass Proceeds | 4,917,957 | |
| 2 | | | | | | | | | Total Adjusted Subclass Proceeds | 4,917,957 | |
| 3 | | | | | | | | | Excess Shortfall) in Subcl Proceeds | 0 | |
| 4 | | | | | | | | | | | |
| 5 | | | | | | | | | | | |
| 6 | | | | | | | | | | | |
| 7 | | | | | | -0.0010 | | | | | |
| 8 | | Total Net Yield From Bond Tx-E & Txbl Bd Cpn | Original Insuring Bond Price | Adjustd Insuring Bond Price | Interest Coupon Surplus or Shortfall % | Estimated Adjusted vs Target Price to Worst | Est Adjstd Maturity Coupon | Final Insuring Bond Coupon | | | |
| 9 | | | | | | | | | 4,917,957 | 4,917,957 | (16,429.57) |
| 10 | | | | | | | | | Original Bond Proceeds | Adjusted Bond Proceeds | Interest Coupon Surplus or Shortfall $ |
| 11 | Payment Dates | | | | | | | | | | |
| 12 | | | | | | | | | | | |
| 13 | | | | | | | | | | | |
| 14 | 3/15/2009 | | | | | | | | | | |
| 15 | 8/15/2009 | | | | | | | | | | |
| 16 | 2/15/2010 | 3.058% | 99.890 | 99.890 | (0.338%) | 0.000 | 2.938% | 2.938% | 139846 | 139846 | (472.62) |
| 17 | 8/15/2010 | | | | | 0.000 | 0.000% | | | | |

FIG. 32C

| | C | CV | CW | CX | CY | CZ | DA | DB | DC |
|---|---|---|---|---|---|---|---|---|---|
| 1 | Structure Insured & Insuring Bonds for BBB-rated Hospital Systems | | | | | Calculation of Reallocated Interest Available for LLP Bonds from the HLP Bonds | | | |
| 2 | | | | | | Interest Reallocated from HLP Bds to LLP Bds | 4,084,187 | | |
| 3 | | | | | | Impact of HLP Credit and Mktg Pnlty | (5,825,622) | | |
| 4 | | | | | | Interest Reallocated to HLP Bds | 9,909,809 | | |
| 5 | | | | | | | (36,983,890) | | |
| 6 | | Total HLP Debt Service | 36,983,890 | | | | | | |
| 7 | | 21,555,000 | 1,182,821 | 36,983,890 | | 1,997,179 | 46,893,698 | 9,909,809 | |
| 8 | | Par of HLP Insuring Bonds | Original HLP Maturity Interst | Original HLP Devt Service | HLP Interest Rate incl Realloc Int frm Strctr Insrd Bds | HLP Mat Int Incl Realloc Interest frm Structure Insrd Bds | HLP Debt Service Including Reallocated Interest | Realloc Int on HLP Bds from Strctre Insured Bonds $ | Realloc Int on HLP Bds from Strctre Insrd Bds % of Par |
| 9 | Payment Dates | | | | | | | | |
| 10 | | | | | | | | | |
| 11 | | | | | | | | | |
| 12 | | | | | | | | | |
| 13 | | | | | | | | | |
| 14 | 3/15/2009 | | | | | | | | |
| 15 | 8/15/2009 | | | 492,842 | | | 832,158 | 339,316 | 3.778% |
| 16 | 2/15/2010 | 615,000 | 15,990 | 1,206,411 | 6.374% | 39,200 | 1,613,589 | 407,179 | 3.778% |
| 17 | 8/15/2010 | | | 583,416 | | | 978,989 | 395,574 | 3.778% |

FIG. 32D

| C | DD | DE | DF | DG | DH | DI | DJ | DK | DL | DM | DN | DO |
|---|---|---|---|---|---|---|---|---|---|---|---|---|
| 1 | Structure | | | | | Calculation of Reallocated Interest Available for LLP Bonds from the HLP Bonds | | | | | | |
| 2 | Insured & | Adjtd AA Subcl Proceeds 4,917,957 | | Adjtd A Subcl Proceeds 3,952,506 | | | Adj BBB Subcl Proceeds 12,697,904 | | | | Total HLP Bond Proceeds 21,568,367 | |
| 3 | Insuring Bonds for | Bd Ins Prem | | 0 | Bd Ins Prem | | 0 | Bd Ins Prem | | 0 | Bd Ins Prem | 0 |
| 4 | BBB-rated | COI | 12,171 | | | COI | 9,781 | | COI | 31,423 | COI | 53,375 |
| 5 | Hospital | Base Takedown | 36,863 | | Base Takedown | | 29,625 | Base Takedown | | 95,175 | Base Takedown | 161,663 |
| 6 | Systems | Net Bond Proceeds 4,868,924 | | | Net Bond Proceeds 3,913,100 | | | Net Bond Proceeds 12,571,305 | | | Net Bond Proceeds 21,353,329 | |
| 7 | | | 8,633,703 | | | 7,498,102 | | 1,099,892 | 26,677,707 | 42,809,512 | 5,825,622 | 4,084,187 |
| 8 | | Fourth | Fourth | Fourth | Third | Third | Third | Second | Second | Second | HLP Insrg | Net $ Impact Realloc Int |
| 9 | | Loss | Loss | Loss | Loss | Loss | Loss | Loss | Loss | Loss | Bd D/S | of Credit Spd frm HLP |
| 10 | | Subclass | Subclass | Subclass | Subclass | Subclass | Subclass | Subclass | Subclass | Subclass | Adjusted for | and Mktng Bds Avail |
| 11 | Payment | Interest | Maturity | Debt | Interest | Maturity | Debt | Interest | Maturity | Debt | Credit Sprd & | Penalty on for LLP Bds |
| 12 | Dates | Rate | Interest | Service | Rate | Interest | Service | Rate | Interest | Service | Mktg Pnlty | HLP Bonds & Prog Exp |
| 13 | | | | | | | | | | | | |
| 14 | 3/15/2009 | | | | | | | | | | | |
| 15 | 8/15/2009 | | | 119,232 | | | 114,981 | | | 458,288 | 692,500 | 199,658 | 139,657 |
| 16 | 2/15/2010 | 2.938% | 4,113 | 283,078 | 4.102% | 4,717 | 252,977 | 5.783% | 20,819 | 909,946 | 1,446,001 | 239,590 | 167,589 |
| 17 | 8/15/2010 | | | 141,021 | | | 135,618 | | | 539,536 | 816,176 | 232,760 | 162,813 |

FIG. 32E

Calculation of the Total Reallocated Interest Available for the LLP Bonds (before allocation to Senior and Junior LLP Bonds)

Structure Insured & Insuring Bonds for BBB-rated Hospital Systems

| | | | |
|---|---|---|---|
| Total Original HLP Proceeds | (21,568,367) | Excess (Shortfall) in HLP Proceeds % of HLP Par | 0.000% |
| Total Adjusted HLP Proceeds | 21,568,367 | Excess (Shortfall) in HLP Proceeds % of LLP Par | 0.000% |
| Net Bond Proceeds | 0 | from HLP Bds | 4,084,187 |
| | | from LLP Bds | 1,450,586 |
| | | Prog Exp | (122,608) |
| 3,160,000 | | 1,450,586 | (122,608) | 5,412,165 | LLP Realloc | 444,479 |

| Payment Dates | LLP Insuring Bond Par | Strctr Insd Bds % | Realloc Int on LLP Bds | Realloc Int to LLP Bds per Maturity $ | Semi-An Int Bds frm Strctr Insd Bonds $ | Realloc to Program Revs, Liquidity & Equity | Program Revs, Liquidity & Equity | Total Interest Reallocated to LLP Insrg Bonds $ | Int Reallocated Interest on LLP Par | Addt'l Cpn on LLP Insuring Int on LLP Insg Bd Matur $ | Interest on LLP Insrg Bond Mat | Bond Coupon on LLP Insrg Bd Mat | Yield on LLP Insrg Bd Mat |
|---|---|---|---|---|---|---|---|---|---|---|---|---|---|
| 3/15/2009 | | | | | | | | | | | | | |
| 8/15/2009 | | | | | 49,744 | | | 185,200 | 1406.581 | | | | |
| 2/15/2010 | 90,000 | 3.774% | 3397 | | 59,693 | 0.041% | (288) | (4,202) | 222,240 | 1406.581 | 12660 | 14.066% | 16.666% | 16.744% |
| 8/15/2010 | | | | | 57,994 | | | (5,042) | 215,910 | 1406.579 | | | | |
| 2/15/2011 | 100,000 | 3.775% | 3775 | | 57,994 | 0.041% | (324) | (4,898) | 215,910 | 1406.579 | 14209 | 14.209% | 17.697% | 17.654% |
| 8/15/2011 | | | | | 56,107 | | | (4,736) | 208,805 | 1406.097 | | | | |

FIG. 32F

| | EC | ED | EE | EF | EG | EH | EI | EJ | EK | EL | EM | EN | EO | EP | EQ |
|---|---|---|---|---|---|---|---|---|---|---|---|---|---|---|---|
| 1 | Structure | | | | | Allocation of LLP Reallocated Interest to Senior and Junior LLP Bonds | | | | | | | | | |
| 2 | Insured & | | | | | | | | | | | | | | |
| 3 | Insuring Bonds for | | | | | | Additonal Tkdn | Base Tkdn | Cost of Issue | Net Proceeds | | | | | |
| 4 | BBB-rated | | | Senior LLP Bond Proceeds | 1,055,648 | | 7,913 | 2,612 | 1,045,123 | | | | | | |
| 5 | Hospital | | | Junior LLP Bond Proceeds | 2,106,237 | | 15,788 | 5,212 | 2,085,237 | | Total Int Reallocated to LLP Subclass | | 5,412,165 | | |
| 6 | Systems | | | Total LLP Bond Proceeds | 3,161,885 | | 23,700 | 7,825 | 3,130,360 | | Int Reallocated to Snr LLP Bds | | 630,301 | | |
| 7 | | max (491 bp) | | | | 630,301 | | | max (664.8 bp) | | Int Reallocated to Junior LLP Bds | | 1,697,657 | | |
| 8 | | 1,055,000 | 51,801 | | | | | | 2,105,000 | 139,950 | | 1,697,657 | | | 3,084,207 |
| 9 | | Senior | | Add Cpn | Interest | Bd Yld | Interest | Junior | | Add Cpn | Interest | Bd Yld | Interest | Interest | |
| 10 | | LLP | Realloc | on Snr | Cpn on | on Snr | Realloc to | LLP | Realloc | on Junr | Cpn on | on Junr | Realloc | Realloc | Surplus |
| 11 | | Insuring | Int on | LLp Insg | Snr LLP | LLP Insg | Snr LLp | Insuring | Int on | LLp Insg | Junr LLP | LLP Insg | to Junr | to Junior | Interest |
| 12 | Payment | Bond | Snr LLP | Bond | Insg Bd | Bond | Insuring | Bond | Junr LLP | Bond | Insg Bd | Bond | LLP Insg | LLP Insg frm Cpn | |
| 13 | Dates | Par | Mat $ | Mat | Mat | Mat | Bonds $ | Par | Mat $ | Mat | Mat | Mat | Bonds $ | Bonds % | Limit |
| 14 | 3/15/2009 | | | | | | | | | | | | | | |
| 15 | 8/15/2009 | | | | | | 21,584 | 491.000 | | | | | 58,313 | 664.846 | 105,304 |
| 16 | 2/15/2010 | 30,000 | 1,473 | 4.910% | 7.510% | 7.625% | 25,900 | 491.000 | 60,000 | 3,989 | 6.648% | 9.248% | 9.359% | 69,975 | 664.846 | 126,364 |
| 17 | 8/15/2010 | | | | | | 25,164 | 491.000 | | | | | 67,981 | 664.846 | 122,766 |
| 18 | 2/15/2011 | 35,000 | 1,719 | 4.910% | 8.398% | 8.382% | 25,164 | 491.000 | 65,000 | 4,322 | 6.648% | 10.136% | 10.117% | 67,981 | 664.846 | 122,766 |

| | B | IQ | IR | IS | IT | IU | IV | IW | IX | IY | IZ | JA | JB |
|---|---|---|---|---|---|---|---|---|---|---|---|---|---|
| 1 | Structure | | Average Annual Worst Case Assumed Defaults | | | | 9.75% | Effect of 1 | 37.50% | 52.50% | % of Bds that can default or be downgraded | | |
| 2 | Insured & | | Average Annual Weighted Average Default Tolerance | | | | 5.71% | or 2 | 5.713% | 5.713% without affecting the Insg Sbcls Rating | | | |
| 3 | Insuring Bonds for | | | Coverage of Target Default Tolerance | | | 0.59 | Dngrades | 0.15 | 0.11 | Default w.out Dwngrd | | 1.061% |
| 4 | BBB-rated | | Minimum BB Covg Reqr & % of Base Covg Reqr (0.52x) | | | | 0.10 | 20% | 0.13 | 0.52 | Downgrade to BB | | 25.87% |
| 5 | Hospital | | Margin of Actual over Reqd Covg of Assumed Defaults | | | | 0.48 | 0.00 | 0.02 | (0.41) | Default w.out Default | | 8.820% |
| 6 | Systems | | | | | Credit Enhancement Provided to the Insured Bonds by the Junior LLP Bonds | | | | | | | |
| 7 | | Senior Par | Junior Par | | | | | | | | | | |
| 8 | Total /Avg = | 1,055,000 | 2,105,000 | 1,717,822 | 115,741,737 | 122,764,467 | 1.088 | | | | | | |
| 9 | | | | | | Senior LLP Subclass % of Insuring Bonds (35%) | | | | | | | |
| 10 | | | (a) | (b) | (c) Covered | (d) Total | (e) | Semi-An | Annual | 4-Year | Reqd 4yr | Exess over | Subclass |
| 11 | Payment | Senior LLP | Junior LLP | Other | Debt | Amt Avail | Covg | Default | Wghtd Avg | Default | Default | Reqd x | % of Insg |
| 12 | Dates | DS | DS | Available Moneys | Service | for Insd DS =a+b+c | =d/c | Tolerance =(e-1)/e | Def Tol | Tolerance | Tolerance | Coverage | Bonds |
| 13 | | | | | | | | | | | | | |
| 14 | 3/15/2009 | | | | | | | | | | | | |
| 15 | 8/15/2009 | 45,712 | 106,409 | 58,480 | 1,200,160 | 1,365,049 | 1.137 | 12.079% | | 28.53% | 39.00% | 0.63 | |
| 16 | 2/15/2010 | 84,854 | 187,691 | 68,541 | 4,125,192 | 4,381,424 | 1.062 | 5.848% | 7.33% | 28.53% | 39.00% | 0.63 | 8.51% |
| 17 | 8/15/2010 | 53,728 | 124,916 | 66,670 | 1,428,163 | 1,619,750 | 1.134 | 11.828% | | 28.07% | 39.00% | 0.62 | |
| 18 | 2/15/2011 | 88,728 | 189,916 | 66,670 | 4,383,163 | 4,639,750 | 1.059 | 5.530% | 7.16% | 28.07% | 39.00% | 0.62 | 8.18% |
| 19 | 8/15/2011 | 52,258 | 121,622 | 64,547 | 1,408,010 | 1,594,179 | 1.132 | 11.678% | | 27.57% | 39.00% | 0.60 | |
| 20 | 2/15/2012 | 87,258 | 191,622 | 64,547 | 4,408,010 | 4,664,179 | 1.058 | 5.492% | 7.07% | 27.57% | 39.00% | 0.60 | 8.59% |
| 21 | 8/15/2012 | 50,750 | 117,998 | 62,422 | 1,380,350 | 1,560,770 | 1.131 | 11.560% | | 27.03% | 39.00% | 0.59 | |

FIG. 33A

| | B | ID | IE | IF | IG | IH | II | IJ | IK | IL | IM | IN | IO | IP |
|---|---|---|---|---|---|---|---|---|---|---|---|---|---|---|
| 1 | Structure | | Average Annual Worst Case Assumed Defaults | | | 9.75% | | | Effect of 1 | 37.50% | 52.50% | % of Bds that can default or be downgraded |
| 2 | Insured & | | Average Annual Weighted Average Default Tolerance | | | 7.547% | | | or 2 | 7.547% | 7.547% | without affecting the Insg Sbcls Rating |
| 3 | Insuring Bonds for | | Coverage of Target Default Tolerance | | | 0.77 | | | Dngrades | 0.20 | 0.14 | Default w.out Dwngrd | 1.545% |
| 4 | BBB-rated | Minimum BBB Covg Reqr & % of Base Covg Reqr (0.64x) | | | | 0.16 | 25% | | | 0.64 | 0.64 | Downgrade to BB | 5.15% |
| 5 | Hospital | Margin of Actual over Reqd Covg of Assumed Defaults | | | | 0.61 | 0.00 | | | (0.44) | (0.50) | Default w.out Default | 11.523% |
| 6 | Systems | | Credit Enhancement Provided to the Insured Bonds by the Subclasses Below BBB |
| 7 | | 12.79% |
| 8 | Total /Avg = | 3,160,000 | | 7,745,772 | 1,717,822 | 115,741,737 | 125,205,331 | 1.115 |
| 9 | | | | | | Unrated-Subclass (12.8%) |
| 10 | | | | (a) | (b) | (c) Covered | (d) Total | (e) | | Semi-An | Annual | 4-Year | Reqd 4yr | Exess over Subclass |
| 11 | Payment | | Maturity | Subclass | Other Available | Debt | Amt Avail | Covg | | Default | Wghtd Avg | Default | Default | Reqd 0.16x | % of Insg |
| 12 | Dates | Par | Interest | DS | Moneys | Service | for Insd DS | =d/c | | Tolerance | Def Tol | Tolerance | Tolerance | Coverage | Bonds |
| 13 | | | | | | | =a+b+c | | =(e-1)/e |
| 14 | 3/15/2009 | | | | | | | | | | | | | |
| 15 | 8/15/2009 | | | 152,121 | 58,480 | 1,200,160 | 1,410,761 | 1.175 | 14.928% | | | 36.67% | 39.00% | 0.78 |
| 16 | 2/15/2010 | 90,000 | 7,802 | 272,545 | 68,541 | 4,125,192 | 4,466,278 | 1.083 | 7.637% | 9.39% | 36.67% | 39.00% | 0.78 | 12.77% |
| 17 | 8/15/2010 | | | 178,644 | 66,670 | 1,428,163 | 1,673,477 | 1.172 | 14.659% | | 36.10% | 39.00% | 0.77 | |
| 18 | 2/15/2011 | 100,000 | 9,528 | 278,644 | 66,670 | 4,383,163 | 4,728,477 | 1.079 | 7.303% | 9.23% | 36.10% | 39.00% | 0.77 | 12.58% |
| 19 | 8/15/2011 | | | 173,880 | 64,547 | 1,408,010 | 1,646,437 | 1.169 | 14.481% | | 35.52% | 39.00% | 0.75 | |
| 20 | 2/15/2012 | 105,000 | 10,264 | 278,880 | 64,547 | 4,408,010 | 4,751,437 | 1.078 | 7.228% | 9.09% | 35.52% | 39.00% | 0.75 | 12.88% |
| 21 | 8/15/2012 | | | 168,748 | 62,422 | 1,380,350 | 1,611,520 | 1.167 | 14.345% | | 34.88% | 39.00% | 0.73 | |
| 22 | 2/15/2013 | 110,000 | 11,340 | 278,748 | 62,422 | 4,430,350 | 4,771,520 | 1.077 | 7.150% | 8.97% | 34.88% | 39.00% | 0.73 | 12.94% |
| 23 | 8/15/2013 | | | 163,078 | 60,194 | 1,348,478 | 1,571,750 | 1.166 | 14.205% | | 34.17% | 39.00% | 0.72 | |

FIG. 33B

| | B | HQ | HR | HS | HT | HU | HV | HW | HX | HY | HZ | IA | IB | IC |
|---|---|---|---|---|---|---|---|---|---|---|---|---|---|---|
| 1 | Structure | Average Annual Worst Case Assumed Defaults | | | | | 9.75% | | Effect of 1 or | 37.50% | 52.50% | % of Bds that can default or be downgraded | | |
| 2 | Insured & | Average Annual Weighted Average Default Tolerance | | | | | 23.754% | | 2 Dngrades | 23.754% | 23.754% | without affecting the Insg Sbcls Rating | | |
| 3 | Insuring Bonds for | Coverage of Target Default Tolerance | | | | | 2.44 | | | 0.63 | 0.45 | Default w.out Dwngrd | | 7.239% |
| 4 | BBB-rated | Minimum A Covg Reqr & % of Base Covg Reqr (0.8x) | | | | | 0.80 | 100% | | 0.80 | 0.80 | Downgrade to BB | | 21.05% |
| 5 | Hospital | Margin of Actual over Reqd Covg of Assumed Defaults | | | | | 1.64 | 1.44 | | (0.17) | (0.35) | Default w.out Default | | 39.892% |
| 6 | Systems | Credit Enhancement Provided to the Insured Bonds by the Subclasses Below A | | | | | | | | | | | | |
| 7 | | 51.35% | | | | | | | | | | | | |
| 8 | Total /Avg = | 12,690,000 | 1,099,892 | 26,677,707 | 9,463,594 | 115,741,737 | 151,883,038 | 1.399 | | | | | | |
| 9 | | | | | | | BBB-Subclass (51.2%) | | | | | | | |
| 10 | | | (a) | (b) Lower | (c) Covered | (d) Total | | | Semi-An | Annual | 4-Year | Reqd 4yr | Exess over | Subclass |
| 11 | Payment | | Maturity | Subclass Sbcls DS | Debt | Amt Avail | (e) | | Default | Wghtd Avg | Default | Default | Reqd 0.8x | % of Insg |
| 12 | Dates | Par | Interest | DS plus Other | Service | for Insd DS | Covg | | Tolerance | Def Tol | Tolerance | Tolerance | Coverage | Bonds |
| 13 | | | | Available Moneys | =a+b+c | | =d/c | | =(e-1)/e | | | | | |
| 14 | 3/15/2009 | | | | | | | | | | | | | |
| 15 | 8/15/2009 | 360,000 | 20,819 | 458,288 | 210,601 | 1,200,160 | 1,869,049 | 1.557 | 35.788% | 26.50% | 104.84% | 39.00% | 1.89 | 51.06% |
| 16 | 2/15/2010 | | | 909,946 | 341,086 | 4,125,192 | 5,376,224 | 1.303 | 23.270% | | 104.84% | 39.00% | 1.89 | |
| 17 | 8/15/2010 | 410,000 | 27,359 | 539,536 | 245,314 | 1,428,163 | 2,213,014 | 1.550 | 35.465% | 26.36% | 104.03% | 39.00% | 1.87 | 51.57% |
| 18 | 2/15/2011 | | | 949,536 | 345,314 | 4,383,163 | 5,678,014 | 1.295 | 22.805% | | 104.03% | 39.00% | 1.87 | |
| 19 | 8/15/2011 | 420,000 | 28,921 | 525,857 | 238,426 | 1,408,010 | 2,172,294 | 1.543 | 35.183% | 26.09% | 103.09% | 39.00% | 1.84 | 51.53% |
| 20 | 2/15/2012 | | | 945,857 | 343,426 | 4,408,010 | 5,697,294 | 1.292 | 22.630% | | 103.09% | 39.00% | 1.84 | |
| 21 | 8/15/2012 | 435,000 | 32,181 | 511,396 | 231,170 | 1,380,350 | 2,122,917 | 1.538 | 34.979% | 25.89% | 102.15% | 39.00% | 1.82 | 51.18% |
| 22 | 2/15/2013 | | | 946,396 | 341,170 | 4,430,350 | 5,717,917 | 1.291 | 22.518% | | 102.15% | 39.00% | 1.82 | |

FIG. 33C

| | B | HD | HE | HF | HG | HH | HI | HJ | HK | HL | HM | HN | HO | HP |
|---|---|---|---|---|---|---|---|---|---|---|---|---|---|---|
| 1 | Structure | | Average Annual Worst Case Assumed Defaults | | | | 9.75% | | 37.50% | 52.50% | % of Bds that can default or be downgraded | | | |
| 2 | Insured & | | Average Annual Weighted Average Default Tolerance | | | | 27.338% | Effect of 1 or | 27.338% | 27.338% | without affecting the Insg Sbcls Rating | | | |
| 3 | Insuring Bonds for | | Coverage of Target Default Tolerance | | | | 2.80 | 2 Dngrades | 0.73 | 0.52 | | Default w.out Dwngrd | 8.808% | |
| 4 | BBB-rated | | Minimum AA Covg Reqr & % of Base Covg Reqr (1x) | | | | 1.00 | 100% | 1.00 | 1.00 | | Downgrade to BB | 17.90% | |
| 5 | Hospital | | Margin of Actual over Reqd Covg of Assumed Defaults | | | | 1.80 | | (0.27) | (0.48) | | Default w.out Default | 47.47% | |
| 6 | Systems | | | | | Credit Enhancement Provided to the Insured Bonds by the Subclasses Below AA | | | | | | | | |
| 7 | | 15.98% | | | | | | | | | | | | |
| 8 | Total /Avg = | 3,950,000 | 275,953 | 7,498,102 | 36,141,300 | 115,741,737 | 159,381,140 | 1.475 | | | | | | |
| 9 | | | | | | A-Subclass (16%) | | | | | | | | |
| 10 | | | (a) | (b) Lower | (c) Covered | (d) Total | | | Semi-An | Annual | Reqd 4yr | Exess over | Subclass | |
| 11 | Payment | Maturity | Subclass | Sbclss DS | Debt | Amt Avail | | Default | Wghtd Avg | 4-Year | Default | Reqd1x | % of Insg | |
| 12 | Dates | Par | Interest | DS | plus Other | Service | for Insd DS | Covg | Tolerance | Def Tol | Default Tolerance | Tolerance | Coverage | Bonds |
| 13 | | | | | Available Moneys | | =a+b+c | =d/c | =(e-1)/e | | | | | |
| 14 | 3/15/2009 | | | | | | | | | | | | | |
| 15 | 8/15/2009 | | | 114,981 | 668,889 | 1,200,160 | 1,984,029 | 1.653 | 39.509% | | 118.99% | 39.00% | 2.05 | |
| 16 | 2/15/2010 | 115,000 | 4,717 | 252,977 | 1,251,032 | 4,125,192 | 5,629,201 | 1.365 | 26.718% | 30.05% | 118.99% | 39.00% | 2.05 | 16.31% |
| 17 | 8/15/2010 | | | 135,618 | 784,850 | 1,428,163 | 2,348,632 | 1.645 | 39.192% | | 118.16% | 39.00% | 2.03 | |
| 18 | 2/15/2011 | 125,000 | 6,239 | 260,618 | 1,294,850 | 4,383,163 | 5,938,632 | 1.355 | 26.192% | 29.88% | 118.16% | 39.00% | 2.03 | 15.72% |
| 19 | 8/15/2011 | | | 132,499 | 764,283 | 1,408,010 | 2,304,792 | 1.637 | 38.909% | | 117.27% | 39.00% | 2.01 | |
| 20 | 2/15/2012 | 130,000 | 6,768 | 262,499 | 1,289,283 | 4,408,010 | 5,959,792 | 1.352 | 26.038% | 29.63% | 117.27% | 39.00% | 2.01 | 15.95% |
| 21 | 8/15/2012 | | | 129,115 | 742,566 | 1,380,350 | 2,252,031 | 1.631 | 38.706% | | 116.36% | 39.00% | 1.98 | |
| 22 | 2/15/2013 | 135,000 | 7,717 | 264,115 | 1,287,566 | 4,430,350 | 5,982,031 | 1.350 | 25.939% | 29.43% | 116.36% | 39.00% | 1.98 | 15.88% |

FIG. 33D

| | B | C | GP | GQ | GR | GS | GT | GU | GV | GW | GX | GY | GZ | HA | HB | HC |
|---|---|---|---|---|---|---|---|---|---|---|---|---|---|---|---|---|
| 1 | Structure | | Average Annual Worst Case Assumed Defaults | | | | | | 9.75% | Effect of 1 | 37.50% | 52.50% | | % of Bds that can default or be downgraded | | |
| 2 | Insured & | | Average Annual Weighted Average Default Tolerance | | | | | | 31.075% | or 2 | 31.075% | 31.075% | | without affecting the Insd Bond Rating | | |
| 3 | Insuring | O.K. | Coverage of Target Default Tolerance | | | | | | 3.19 | Dngrades | 0.83 | 0.59 | Default w.out Dwngrd | | 10.601% | |
| 4 | Bonds for | Aggregate | Minimum AAA Covg Reqr & % of Base Covg Reqr (1.25x) | | | | | | 1.25 | 100% | 1.25 | 1.25 | Downgrade to BB | | 14.26% | |
| 5 | BBB-rated Hospital | Insuring | Margin of Actual over Reqd Covg of Assumed Defaults | | | | | | 1.94 | | (0.42) | (0.66) | Default w.out Default | | 55.81% | |
| 6 | Systems | Subclass | Credit Enhancement Provided to Insured Bonds by Insuring Subclasses | | | | | | | | | | | | | |
| 7 | | | 19.89% | | | | | | | | | | | | | |
| 8 | Total /Avg = | 24,715,000 | 4,915,000 | 286,156 | 8,633,703 | 43,639,403 | 115,741,737 | 168,014,843 | 1.558 | | | | | | | |
| 9 | | | | | | | | AA-Subclass (20%) | | | | | | | | |
| 10 | | Total | | | (a) | (b) Lower | (c) Covered | | (d) Total | | Semi-An | Annual | 4-Year | Reqd 4yr | Exess over Subclass | |
| 11 | Payment | Insuring | | Maturity | Subclass | Sbclss DS | Debt | | Amt Avail | | Default | Wghtd Avg | Default | Default | Reqd1x | % of Insg |
| 12 | Dates | DS | Par | Interest | DS | plus Other | Service | | for Insd DS | | Covg Tolerance | Def Tol | Tolerance | Tolerance | Coverage | Bonds |
| 13 | | | | | | Available Moneys | | | =a+b+c | | =d/c | =(e-1)/e | | | | |
| 14 | 3/15/2009 | | | | | | | | | | | | | | | |
| 15 | 8/15/2009 | 844,621 | | | 119,232 | 783,869 | 1,200,160 | | 2,103,261 | | 1.752 | 42.94% | | 133.15% | 2.16 | |
| 16 | 2/15/2010 | 1,718,545 | 140,000 | 4,113 | 283,078 | 1,504,009 | 4,125,192 | | 5,912,279 | | 1.433 | 30.23% | 33.56% | 133.15% | 2.16 | 19.86% |
| 17 | 8/15/2010 | 994,820 | | | 141,021 | 920,468 | 1,428,163 | | 2,489,653 | | 1.743 | 42.64% | | 132.39% | 2.14 | |
| 18 | 2/15/2011 | 1,789,820 | 160,000 | 6,122 | 301,021 | 1,555,468 | 4,383,163 | | 6,239,653 | | 1.424 | 29.75% | 33.43% | 132.39% | 2.14 | 20.13% |
| 19 | 8/15/2011 | 970,196 | | | 137,961 | 896,782 | 1,408,010 | | 2,442,753 | | 1.735 | 42.36% | | 131.52% | 2.12 | |
| 20 | 2/15/2012 | 1,785,196 | 160,000 | 6,470 | 297,961 | 1,551,782 | 4,408,010 | | 6,257,753 | | 1.420 | 29.56% | 33.15% | 131.52% | 2.12 | 19.63% |
| 21 | 8/15/2012 | 943,984 | | | 134,725 | 871,681 | 1,380,350 | | 2,386,757 | | 1.729 | 42.17% | | 130.68% | 2.10 | |
| 22 | 2/15/2013 | 1,793,984 | 170,000 | 7,738 | 304,725 | 1,551,681 | 4,430,350 | | 6,286,757 | | 1.419 | 29.53% | 33.01% | 130.68% | 2.10 | 20.00% |
| 23 | 8/15/2012 | 914,496 | | | 130,856 | 843,834 | 1,348,478 | | 2,323,168 | | 1.723 | 41.96% | | 129.75% | 2.08 | |

FIG. 33E

| | GG | GH | GI | GJ | GK | GL | GM | GN | GO |
|---|---|---|---|---|---|---|---|---|---|
| 1 | | | | Default Tolerance Analysis for Structure Insured Bonds | | | | | |
| 2 | | | | | | | Average Annual Worst Case Assumed Defaults | 9.750% | |
| 3 | | | | | | | Average Annual Weighted Average Default Tolerance | 31.105% | |
| 4 | | Adjusted D/S | 169,503,837 | | | | Coverage of Target Default Tolerance | 3.19 | |
| 5 | | Original D/S | (158,143,442) | | | | Minimum AAA Covg Reqr & % of Base Covg Reqr | 1.25 | 100% |
| 6 | | Addtnl Interest | 11,360,395 | | | | Margin of Actual over Required Coverage | 1.94 | |
| 7 | | | | | | | | | |
| 8 | Total /Avg = | 158,143,442 | 169,503,837 | 168,014,844 | 1.558 | | 31.105% | 114.375% | 9.750% |
| 9 | | | | Structure | | | | | Wost Case |
| 10 | | Original | Adjusted | Adj DS + Amort | | Covg of | Semi-Annual | Annual | 4-Year | Assumed |
| 11 | Payment | Semi-annual | Semi-annual | & int on Prem - | Insured | Insured | Default | Weighted Avg | Default | Annual |
| 12 | Dates | Structure DS | Structure DS | "- Liq fees & Other" Revs Not Avail | Debt Service | D/S | Tolerance | Default Tol | Tolerance | Defaults |
| 13 | | | | | | | | | | |
| 14 | 3/15/2009 | | | | | | | | | |
| 15 | 8/15/2009 | 1,765,227 | 2,154,287 | 2,103,261 | 1,200,160 | 1.752 | 42.94% | | 133.29% | |
| 16 | 2/15/2010 | 5,508,272 | 5,975,144 | 5,912,279 | 4,125,192 | 1.433 | 30.23% | 33.60% | 133.29% | 9.75% |
| 17 | 8/15/2010 | 2,097,079 | 2,550,647 | 2,489,653 | 1,428,163 | 1.743 | 42.64% | | 132.54% | |
| 18 | 2/15/2011 | 5,847,079 | 6,300,647 | 6,239,653 | 4,383,163 | 1.424 | 29.75% | 33.47% | 132.54% | 9.75% |
| 19 | 8/15/2011 | 2,063,061 | 2,501,623 | 2,442,753 | 1,408,010 | 1.735 | 42.36% | | 131.67% | |
| 20 | 2/15/2012 | 5,878,061 | 6,316,623 | 6,257,753 | 4,408,010 | 1.420 | 29.56% | 33.19% | 131.67% | 9.75% |

FIG. 33F

METHOD, SOFTWARE PROGRAM, AND SYSTEM FOR STRUCTURING RISK IN A FINANCIAL TRANSACTION

RELATED APPLICATION

This application claims the benefit of Provisional Patent Application No. 61/265,135 entitled "METHOD, SYSTEM, DEVICE, AND MEDIA FOR MANAGING DEBT SUPPORT" filed Nov. 30, 2009, the entire content of each of which is expressly incorporated herein by reference thereto.

TECHNICAL FIELD

The present invention relates to a method, system, apparatus, and media for managing insurance of debts. More particularly, but not exclusively, the present invention relates to insuring against defaults on bond obligations.

BACKGROUND

Bond insurers are monoline (single industry) insurance companies that provide credit enhancement in the form of a financial guaranty for bondholders. Traditional bond insurers rely on invested cash capital to support their claims paying ability. Capital has historically been provided by a holding company that raises funds by issuing stock (common and preferred) and debt and then depositing a substantial portion of the proceeds in a wholly owned operating subsidiary to capitalize the insurance company. The subsidiary's capital base is used to support guarantee underwriting. For each insured credit, the rating agencies can require that a portion of the insurance subsidiary's capital be set aside to offset the risk exposure. The amount set aside for each credit, which is known as a capital charge, is based on two measures of the quality of the risk underwritten:

The credit type, e.g. state GO, city GO, water and sewer system, school district, toll road, or hospital system; and The rating of the individual credit for which the capital charge is being assessed.

The availability of capital to fund the capital charges for new insured credits serves as a constraint on the insurance capacity of the monoline insurer, which can be addressed by raising additional capital.

The basis for the capital charges is the rating agencies' assessment of the risk of municipal default for each credit type and each rating category thereof during a four-year depression scenario. The capital charges represent the anticipated percentage defaults within the insurer's portfolio for each such credit type and rating category. To achieve a AAA monoline rating the insurer's capital can cover the aggregate capital charges (i.e., its assumed four-year depression scenario defaults) by at least 1.25 times. In practice the monoline insurers have been capitalized at slightly higher level, e.g., 1.5 times to 1.6 times. Based on these parameters, monoline insurers habitually accumulated risk exposure at insured risk-to-capital ratios in excess of 100:1. If insured defaults occurred or the credit quality of the portfolio deteriorated so as to increase the monoline insurer's capital charges beyond its available capital, the insurer was expected to raise additional capital to pay claims and to maintain its AAA ratings. But, in a financial crises, raising capital at the time it is needed to fund potential defaults may be difficult or impractical.

The value of the bond insurance product to municipal governments is in the interest cost savings that can be achieved by being able to issue bonds based on the top available long term ratings. The value of bond insurance for the bond investor is based on their willingness to forgo a portion of future investment return (the credit spread) for being directly exposed to the underlying repayment risk of a purchased bond in favor of a lower return on an insured bond rated on the basis of the claims paying ability assigned by the nationally recognized rating services to the bond insurer. In return for providing the additional margin of safety represented by the bond insurance policy, bond insurers charge an insurance premium that is paid, usually upfront, by the municipal bond issuer. The premium is paid from bond proceeds and represents a portion of the issuer's debt service savings.

Monoline insurers may use Collateralized Bond Obligations ("CBO"). CBO creates strong credits (such as loans, bonds, or other obligations) by tranching a large pool of individual credits. The pool can be a large pool of unrated credits such as credit card receivables or a relatively small (e.g., 20 borrowers) pool of rated and/or unrated credits in the case of a municipal State Revolving Fund ("SRF"). The high quality of the more senior CBO tranche(s) is achieved at the expense of the quality of the more junior tranche(s). As the pools get larger, the percentage of underlying credits that can be expected to default decreases even though the absolute number increases. Thus, as the pool becomes larger, the smaller the percentage of total pool that is required to be subordinate, but the more likely it is that a subordinate tranche will in fact sustain losses. The most subordinate tranche is viewed as similar to equity (in the case of an SRF, it is funded with program equity) and bears a large credit and yield penalty.

In general, because the subordinate tranche(s) bear the risk of a default of an underlying credit and adding more credits increases the likelihood that the subordinate tranche(s) will sustain losses (even though losses may decrease on a percentage basis), pools are generally closed unless consent is obtained from the holder(s) of the subordinate tranche(s). As a result, CBOs are generally only used in situations where there is a wide credit and yield spread between the quality of the underlying credits and that of the senior tranche(s) or where there is a compelling business need for someone to hold the equity (e.g., to get the underlying loans off the balance sheet).

Thus, there is a need for new ways to protect against defaults on bond obligations and the present invention provides some solutions to this problem.

SUMMARY OF THE INVENTION

The invention relates to a computer-implemented for minimizing a financial risk associated with an anticipated value of an investment. The method includes the step of establishing by a computer system of an insurer a capital structure within a computer memory of a computer system, the capital structure designed to minimize the risk and being structured with regulatory capital and a cash stream that is pledged to fund a default on payments associated with the investment; generating by the computer system a determination of whether the established capital structure is sufficient to cover a depression scenario period to obtain a minimal target credit rating for the insurer; and electronically receiving the target rating based on the generated determination. In one embodiment, the investment comprises an insured bond issued by an issuer, and the cash stream is produced from a trust bond issued by the issuer.

In one embodiment, the investment comprises an insured bond issued by an issuer, and the cash stream is produced from an insuring bond issued by the issuer. In another embodiment, the investment comprises at least one of a debt, a bond or a loan, wherein the cash stream is produced from the investment, or a dividend or an account receivable associated with the investment.

Establishing the capital structure can include allocating the regulatory capital in the computer memory to an amount equal to at least a coverage factor multiplied by an average annual depression scenario default percentage for the investment; selecting by the computer system an investment criteria to invest the regulatory capital to create an investment return; determining by the computer system a portion of the capital structure for a pledged insuring investment that produces at least a portion of the cash stream; and/or securing a draw on sources of the regulatory capital based on the portion of the cash stream.

In one embodiment, the method can further include the step of including a capital pre-funding in the capital structure; and determining by the computer system an amount of the capital pre-funding by the insurer in an amount that is a multiple of an average annual depression scenario default percentage that is based on an underlying credit rating of the investment.

The method can include the step of including a capital pre-funding in the capital structure; determining by the computer system an amount of the capital pre-funding by the insurer that is sufficient to cover a default and that is calculated by (a) at least a pre-funding coverage factor multiplied by (b) a downgrade function that is applied to an average annual depression scenario default percentage for the investment based on the credit rating of the investment; examining by the computer system, a capital adequacy of the insurer's capital structure to cover a default based on a default scenario that occurs during or at an end of the depression scenario period; and determining the credit rating for the trust based on the determined capital pre-funding and the examined capital adequacy.

In one embodiment, the method can further include determining a credit rating of the insurer based on the determined credit rating of the trust.

In a preferred embodiment, the downgrade function comprises a weighted sum of a percentage of a given insured investment issued by a given issuer that is at a current credit rating falling to a lower credit rating multiplied by another default percentage that is associated with the given issuer's industry and the lower credit rating.

In one embodiment, the investment is an insured bond. The method can further include evaluation, by the computer system, of issuer data about proceeds (and/or the insured bonds) for minimizing the risk of default of the insured bond; sizing, by the computer system, an insuring bond based on the received data about the insured bond, wherein the sized insuring bond produces the cash stream that provides the capital structure necessary to achieve the target credit rating; establishing, by the computer system, a trust certificate, wherein a payment from the insuring bond is pledged to be paid to a holder of the trust certificate; and routing payments by the computer system of the payment to the holder of the trust certificate based on a legal obligation to pay secured holders of a plurality of insured bonds, which includes the insured bonds, wherein the legal obligation is recorded in the computer memory.

In yet another embodiment, the method can further include, based on an early redemption of the insured bonds, providing savings of fees that are not paid to the insurer for insuring the insured bonds in a remaining period for the insured bonds.

Sizing of the insuring bond can include determining a default criteria based on the depression scenario, wherein the default criteria comprises a plurality of default percentages for a plurality of issuers based on the depression scenario, and wherein insurance coverage based on a factor of one of the plurality of default percentages is sufficient to achieve the target credit rating; determining a downgrade function for the insured bond based on at least a portion of a plurality of insured bonds insured by the insurer being downgraded to a lower credit rating; and determining the debt service coverage provided by the insuring bond for the insured bond based on the default criteria and the downgrade function.

Establishing the trust certificate can include establishing a loss category subclass for the trust certificate; and determining, in the computer memory, for the trust certificate, a type of the loss category subclass, wherein a type comprises (i) a horizontal loss position subclass wherein a loss that obligates payment is allocated based on a position within a plurality of loss position subclasses, with each of the loss position subclasses allocating the loss based on a category rating within that loss position subclass, or (ii) a vertical loss position subclass, wherein the loss is allocated based on another position within a plurality of categories, with each category allocating the loss based on a loss position rating within that category.

Establishing the trust certificate can instead include establishing a plurality of loss category subclasses; and determining a yield above a coupon amount for the insuring bond for each position in the loss category subclasses, wherein the yield increases as the position decreases.

The method can further include allocating, with the computer system, a first credit having a first obligation to make specified payments and a second credit having a second obligation to make specified payments, each of the first credit and second credit being in a non-default state when a respective obligation is met and being in a default state when a respective obligation is not met; associating, with the computers system, a first senior holder and a first subordinate holder with the first credit using (a) a respective first senior holder financial instrument through which payments from the first credit flow to the first senior holder and (b) a respective first subordinate holder financial instrument through which payments from the first credit flow to the first subordinate holder; associating, with the computer system, a second senior holder and a second subordinate holder with the second credit using (a) a respective second senior holder financial instrument through which payments from the second credit flow to the second senior holder and (b) a respective second subordinate holder financial instrument through which payments from the second credit flow to the second subordinate holder; and structuring the first senior holder financial instrument and the first subordinate holder financial instrument in the computer memory to give priority to payments due the first senior holder prior to payments due the first subordinate holder in the event the first credit enters the default state.

Intercepting the coupon payment can include using payments from the second subordinate holder financial instrument to perform the first obligation of the first credit for the benefit of the first senior holder to the extent that the first credit enters the default state and payments due the first senior holder are not available, wherein both the first subordinate holder and the second subordinate holder are junior to the first senior holder.

Determining the credit rating can include increasing in the at least one computer memory the credit rating for the first credit based on an increased likelihood that a payment default can be fully absorbed, wherein the credit rating is representative of a probability of a party owing the first obligation to make specified payments for the first credit to meet the first obligation.

The invention also relates to a computer-implemented system for minimizing a financial risk associated with an anticipated value of an investment. The system includes a company computer implemented component for establishing by an insurer a capital structure within a computer memory of a computer system, the capital structure designed to minimize the risk and being structured with regulatory capital and a cash stream that is pledged to fund a default associated with the investment; generating a determination of whether the established capital structure is sufficient to cover a depression scenario period to obtain a minimal target credit rating for the insurer; and electronically receiving the target rating based on the generated determination.

In one embodiment, the target credit rating is AAA, wherein the investment comprises an insured bond issued by an issuer, and the cash stream is produced from an insuring bond issued that is related to the insured bond and that is issued by the issuer. In another embodiment, the investment comprises a previously issued bond issued by an issuer, and the cash stream is produced by an investment unrelated to the issuer and is used as insurance or re-insurance for the previously issued bond.

The system may also include a guarantor computer component configured for allocating the regulatory capital in the computer memory to an amount equal to a coverage factor multiplied by an average annual depression scenario default percentage for the investment; and selecting by the computer system an investment criteria to invest the regulatory capital to create an investment return. The system may also include a trust computer component configured for determining by the computer system a portion of the capital structure for a pledged insuring investment that produces at least a portion of the cash stream; and securing a draw on sources of the regulatory capital based on the portion of the cash stream.

In one embodiment, the company computer component can be further configured for allocating the regulatory capital in the computer memory to an amount equal to a coverage factor multiplied by an average annual depression scenario default percentage for the investment; selecting by the computer system an investment criteria to invest the regulatory capital to create an investment return; determining by the computer system a portion of the capital structure for a pledged insuring investment that produces at least a portion of the cash stream; and securing a draw on sources of the regulatory capital based on the portion of the cash stream.

In another embodiment, the system can further include a user interface component. The user interface component can be configured for receiving input relating to the insured bond and the insuring bond to generate a model of applying the insuring bonds to enhance the insured bond's credit rating; providing a break-even comparison of applying established capital structure to a monoline insurance of the insured bond; generating an indication of the determination of whether the established capital structure is sufficient to cover the depression scenario period to obtain the minimal target credit rating for the insurer; and sending a message to the company computer system to establish the capital structure based on the model and the indication.

The invention also relates to a non-transitory processor readable medium for minimizing a financial risk associated with an anticipated value of an investment, comprising processor readable instructions that when executed by a processor causes the processor to perform actions. The actions include establishing by an insurer a capital structure within a computer memory of a computer system, the capital structure designed to minimize the risk and being structured with regulatory capital and a cash stream that is pledged to fund a default associated with the investment; generating a determination of whether the established capital structure is sufficient to cover a depression scenario period to obtain a minimal target credit rating for the insurer; and electronically receiving the target rating based on the generated determination.

BRIEF DESCRIPTION OF THE DRAWINGS

Further features of the invention, its nature and various advantages will be more apparent from the following detailed description, taken in conjunction with the accompanying drawings in which like reference characters refer to like parts throughout, and in which:

FIGS. 14A to 14D, 15 to 20, 21A, 21B, 22A, 22B, 23 to 25 are an examples of computer-implemented process and models for managing debt insurance according to embodiments of the present invention;

FIG. 26 shows an example of a data model for determining a percentage of possible defaults over a 4 year depression scenario for a type of debt;

FIGS. 27A to 27H and 28A to 28I show examples of a method, data model, and interfaces for providing calculations of a summary of the application of the BECM an a comparison against monoline systems;

FIGS. 29A and 29B show an example of a method, data model, and interface for computing a downgrade function, and sizing the insuring bond and loss class and/or category subclasses;

FIGS. 30A to 30C show examples of a method, data model, and interfaces for providing calculations of sizing of structured insured and insuring bonds;

FIGS. 31A to 31I show examples of a method, data model, and interfaces for providing calculations of coupons, proceeds, and yields paid by an issuer for insuring bonds;

FIGS. 32A to 32F show examples of a method, data model, and interfaces for providing calculations of coupons, proceeds, and yields payable to holders of loss position subclasses; and FIGS. 33A to 33F show examples of a method, data model, and interfaces for providing calculations of debt service coverage based on debt insurance.

DETAILED DESCRIPTION OF THE INVENTIVE EMBODIMENTS

Figure 1:
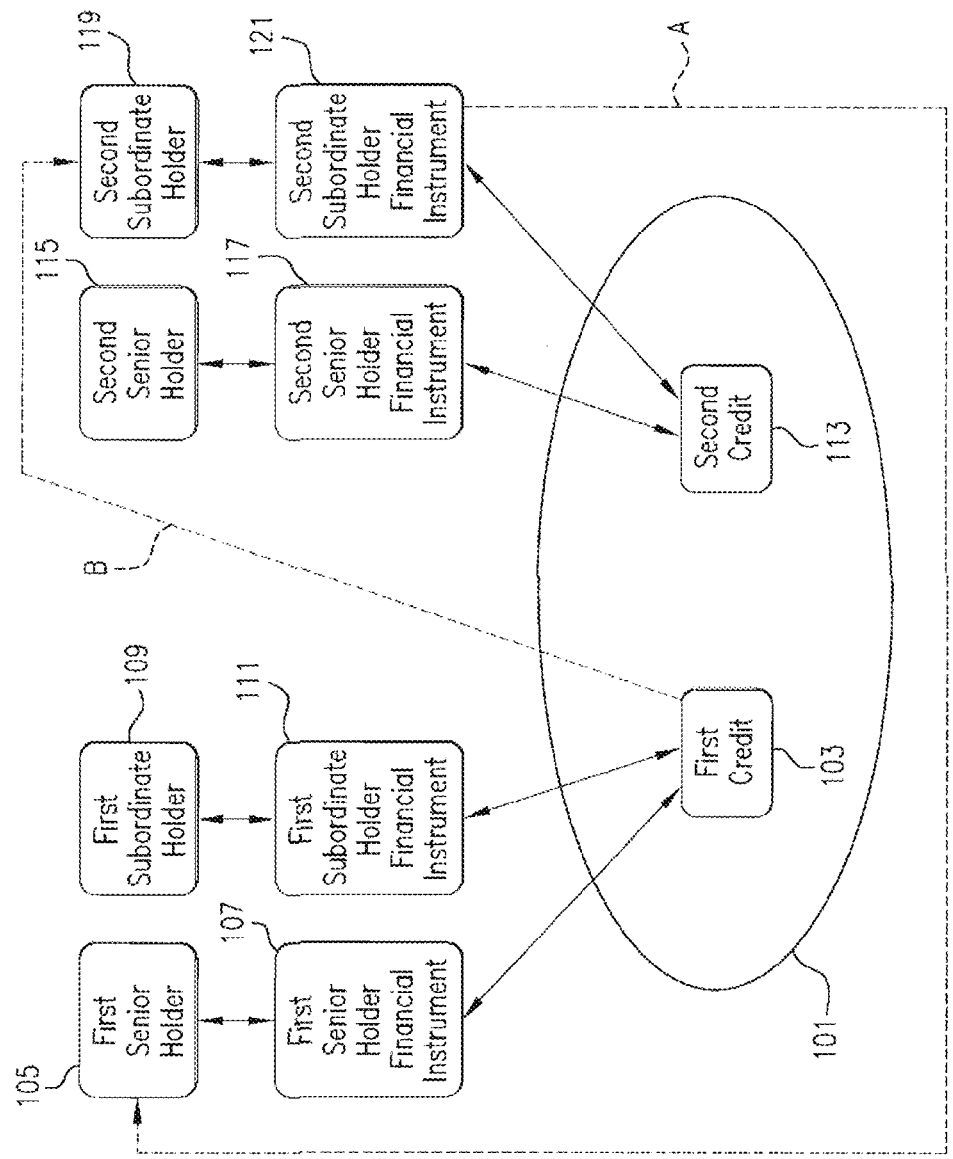
FIG. 1 shows a flowchart of a method according to an embodiment of the present invention.

The following description is presented to enable any person of ordinary skill in the art to practice the present invention. Various modifications to the preferred embodiment will be readily apparent to those of ordinary skill in the art, and the principles defined herein may be applied to other embodiments and applications without departing from the spirit and scope of the invention. Thus, the invention is not intended to be limited to the specific embodiments shown, but the claims are to be accorded an appropriate scope consistent with the principles and features disclosed herein as understood by skilled artisans. The figures are not necessarily to scale, some features may be exaggerated to show details of particular components. Therefore, specific structural and functional details disclosed herein are not to be interpreted as limiting, but merely as a basis for the claims and as a representative basis for teaching one skilled in the art to variously employ the present invention.

The disclosure of U.S. application Ser. No. 11/876,228, filed Oct. 22, 2007, now U.S. Pat. No. 7,593,894 is fully incorporated herein by reference thereto. That application generally describes the creation of loss classes which can be incorporated into the methods and systems of the present invention.

In a specific embodiment, a method of structuring risk in a financial transaction is provided, including: allocating to a transaction pool a first credit having an obligation to make specified payments and a second credit having an obligation to make specified payments, each of the first credit and second credit being in a non-default state when a respective obligation is met and being in a default state when a respective obligation is not met; associating a first senior holder and a first subordinate holder with the first credit using a) a respective first senior holder financial instrument through which payments from the first credit flow to the first senior holder and b) a respective first subordinate holder financial instrument through which payments from the first credit flow to the first subordinate holder; associating a second senior holder and a second subordinate holder with the second credit using a) a respective second senior holder financial instrument through which payments from the second credit flow to the second senior holder and b) a respective second subordinate holder financial instrument through which payments from the second credit flow to the second subordinate holder; structuring the first senior holder financial instrument and the first subordinate holder financial instrument to give priority to payments due the first senior holder prior to payments due the first subordinate holder in the event the first credit enters the default state; using payments from the second subordinate holder financial instrument to perform the obligation of the first credit for the benefit of the first senior holder to the extent that the first credit enters the default state and payments due the first senior holder are not available; and providing the second subordinate holder the benefit of the obligation of the first credit to the extent that payments due the second subordinate holder were used to perform the obligation of the first credit.

This method may further include: structuring the second senior holder financial instrument and the second subordinate holder financial instrument to give priority to payments due the second senior holder prior to payments due the second subordinate holder in the event the second credit enters the default state; using payments from the first subordinate holder financial instrument to perform the obligation of the second credit for the benefit of the second senior holder to the extent that the second credit enters the default state and payments due the second senior holder are not available; and providing the first subordinate holder the benefit of the obligation of the second credit to the extent that payments due the first subordinate holder were used to perform the obligation of the second credit.

Preferably, at least one of the first senior holder financial instrument, the second senior holder financial instrument, the first subordinate holder financial instrument, the second subordinate holder financial instrument, the first credit, and the second credit may include a bond. Also, at least one of the first credit and second credit may include a credit of the type selected from a municipal credit, a hospital credit, an industrial credit, and a high-yield credit.

At least one of a) the step of providing the second subordinate holder the benefit of the obligation of the first credit to the extent that payments due the second subordinate holder were used to perform the obligation of the first credit may be carried out through an assignment and b) the step of providing the first subordinate holder the benefit of the obligation of the second credit to the extent that payments due the first subordinate holder were used to perform the obligation of the second credit may be carried out through an assignment. Alternatively, these steps may be carried out through subrogation, by providing a recovery value associated with second credit, or by providing a liquidation value associated with second credit.

Preferably, at least one of a) the first senior financial instrument and the first subordinate financial instrument may be included in a first master financial instrument and b) the second senior financial instrument and the second subordinate financial instrument may be included in a second master financial instrument. At least one of the first master financial instrument and the second master financial instrument generally form a series of bonds having a senior/subordinate structure. Also, the transaction pool may comprise a trust.

In another embodiment, a method of structuring risk in a financial transaction is provided, including: allocating to a transaction pool n credits, each of the credits having an obligation to make specified payments and each of the credits being in a non-default state when a respective obligation is met and being in a default state when a respective obligation is not met; associating a senior holder and a subordinate holder with each of the credits using a) a respective senior holder financial instrument through which payments from a respective credit flow to the senior holder and b) a respective subordinate holder financial instrument through which payments from a respective credit flow to the subordinate holder; structuring each senior holder financial instrument and each subordinate holder financial instrument to give priority to payments due each respective senior holder prior to payments due each respective subordinate holder in the event a respective credit enters the default state; using payments from at least one subordinate holder financial instrument associated with a credit in the non-default state to perform the obligation of a credit in the default state to the extent that payments due the senior holder associated with the credit in the default state are not available; and providing each subordinate holder at least a portion of the benefit of the obligation of the credit in the default state to the extent that payments due each subordinate holder were used to perform the obligation of the credit in the default state; wherein n is an integer in the range of 1 to 1000. In this embodiment, the transaction pool may comprise a trust.

In yet another embodiment, a method of structuring risk in a financial transaction is provided, including: allocating to a transaction pool a first sub-pool containing a first credit having an obligation to make specified payments and a second credit having an obligation to make specified payments, each of the first credit and second credit being in a non-default state when a respective obligation is met and being in a default state when a respective obligation is not met; allocating to the transaction pool a second sub-pool containing a third credit having an obligation to make specified payments and a fourth credit having an obligation to make specified payments, each of the third credit and fourth credit being in a non-default state when a respective obligation is met and being in a default state when a respective obligation is not met; associating a first senior holder and a first subordinate holder with the first credit using a) a respective first senior holder financial instrument through which payments from the first credit flow to the first senior holder and b) a respective first subordinate holder financial instrument through which payments from the first credit flow to the first subordinate holder; associating a second senior holder and a second subordinate holder with the second credit using a) a respective second senior holder financial instrument through which payments from the second credit flow to the first senior holder and b) a respective second subordinate holder financial instrument through which payments from the second credit flow to the second subordinate holder; associating a third senior holder and a third subordinate holder with the third credit using a) a respective third senior holder financial instrument through which payments from the third credit flow to the third senior holder and b) a respective third subordinate holder financial instrument through which payments from the third credit flow to the third subordinate holder; associating a fourth senior holder and a fourth subordinate holder with the fourth credit using a) a respective fourth senior holder financial instrument through which payments from the fourth credit flow to the fourth senior holder and b) a respective fourth subordinate holder financial instrument through which payments from the fourth credit flow to the fourth subordinate holder; structuring the first senior holder financial instrument and the first subordinate holder financial instrument to give priority to payments due the first senior holder prior to payments due the first subordinate holder in the event the first credit enters the default state; structuring the second senior holder financial instrument and the second subordinate holder financial instrument to give priority to payments due the second senior holder prior to payments due the second subordinate holder in the event the second credit enters the default state; structuring the third senior holder financial instrument and the third subordinate holder financial instrument to give priority to payments due the third senior holder prior to payments due the third subordinate holder in the event the third credit enters the default state; structuring the fourth senior holder financial instrument and the fourth subordinate holder financial instrument to give priority to payments due the fourth senior holder prior to payments due the fourth subordinate holder in the event the fourth credit enters the default state; using payments from the second subordinate holder financial instrument to perform the obligation of the first credit for the benefit of the first senior holder to the extent that the first credit enters the default state and payments due the first senior holder are not available; using payments from at least one of the third subordinate holder financial instrument and the fourth subordinate holder financial instrument to perform the obligation of the first credit for the benefit of the first senior holder to the extent that the payments of the second subordinate holder financial instrument used for the benefit of the first senior holder do not cover the obligation of the first credit; providing each of the third subordinate holder and the fourth subordinate holder the benefit of the obligation of the first credit to the first senior holder to the extent that the payments of the third subordinate holder financial instrument and the fourth subordinate holder financial instrument are used for the benefit of the first senior holder; and providing the second subordinate holder the benefit of the obligation of the first credit to the first senior holder to the extent that payments of the second subordinate holder financial instrument were used to perform the obligation of the first credit and to the extent that a benefit exists after any benefit is provided the third subordinate holder and the fourth subordinate holder.

In this embodiment, all credits allocated to a particular sub-pool may have a substantially similar risk of entering the default state. In particular, the all credits allocated to a particular sub-pool may be selected from one of a traditional municipal credit, a hospital credit, an industrial corporate credit, and a high-yield credit. Preferably, the transaction pool may comprise a trust.

The methods of the invention may also include structuring a transaction pool with n sub-pools; allocating to each of the sub-pools between j and k credits, each credit having an obligation to make specified payments and each credit being in a non-default state when a respective obligation is met and being in a default state when a respective obligation is not met; associating a senior holder and a subordinate holder with each of the credits using a) a respective senior holder financial instrument through which payments from the credit flow to the senior holder and b) a respective subordinate holder financial instrument through which payments from the credit flow to the subordinate holder; structuring each senior holder financial instrument and each subordinate holder financial instrument to give priority to payments due the respective senior holder prior to payments due the respective subordinate holder in the event the associated credit enters the default state; using payments from each subordinate holder financial instrument associated with credits within the same sub-pool as a defaulting credit to perform the obligation of the defaulting credit for the benefit of the associated senior holder to the extent that payments due the senior holder associated with the defaulting credit are not available; using payments from each subordinate holder financial instrument associated with credits outside the sub-pool containing the defaulting credit to perform the obligation of the defaulting credit for the benefit of the associated senior holder to the extent that the payments of each subordinate holder financial instrument associated with credits within the same the sub-pool as the defaulting credit which were used for the benefit of the senior holder do not cover the obligation of the first credit; providing each subordinate holder associated with credits outside the sub-pool containing the defaulting credit the benefit of the obligation of the defaulting credit to the associated senior holder to the extent that the payments due each subordinate holder associated with credits outside the sub-pool containing the defaulting credit were used to perform the obligation of the defaulting credit; and providing each subordinate holder associated with credits within the same sub-pool as the defaulting credit the benefit of the obligation of the defaulting credit to the associated senior holder to the extent that payments due each subordinate holder associated with credits within the same sub-pool as the defaulting credit were used to perform the obligation of the defaulting credit and to the extent that a benefit exists after any benefit is provided each subordinate holder associated with credits outside the sub-pool containing the defaulting credit; wherein n, j, and k are integers in the range of 1 to 1000.

Alternatively, the methods can include: structuring a transaction pool with n sub-pools, each of the sub-pools containing between j and k mini-pools; allocating to each of the mini-pools between j and k credits and allocating to each of the sub-pools between j and k credits, each credit having an obligation to make specified payments and each credit being in a non-default state when a respective obligation is met and being in a default state when a respective obligation is not met; associating a senior holder and a subordinate holder with each credit using a respective senior holder financial instrument through which payments from the credit flow to the senior holder and a respective subordinate holder financial instrument through which payments from the credit flow to the subordinate holder; structuring each senior holder financial instrument and each subordinate holder financial instrument to give priority to payments due the respective senior holder prior to payments due the respective subordinate holder in the event the associated credit enters the default state; using payments from each subordinate holder financial instrument associated with credits within the same mini-pool as the defaulting credit to perform the obligation of the senior holder financial instrument associated with the defaulting credit for the benefit of the senior holder to the extent that payments due the senior holder associated with the defaulting credit are not available; using payments from each subordinate holder financial instrument associated with credits outside the mini-pool with the defaulting credit but within the same sub-pool as the defaulting credit to perform the obligation of the senior holder financial instrument associated with the defaulting credit for the benefit of the senior holder to the extent that the payments of each subordinate holder financial instrument associated with credits within the same mini-pool as the defaulting credit which were used for the benefit of the senior holder do not cover the obligation of the defaulting credit; using payments from each subordinate holder financial instrument associated with credits outside the sub-pool containing the defaulting credit to perform the obligation of the senior holder financial instrument associated with the defaulting credit for the benefit of the senior holder to the extent that the payments of each subordinate holder financial instrument associated with credits within the same sub-pool as the defaulting credit which were used for the benefit of the senior holder do not cover the obligation of the defaulting credit; providing each subordinate holder associated with credits outside the sub-pool containing the defaulting credit the benefit of the obligation of the defaulting credit to the associated senior holder to the extent that the payments due each subordinate holder associated with credits outside the sub-pool containing the defaulting credit were used to perform the obligation of the defaulting credit; providing each subordinate holder associated with credits within the same sub-pool as the defaulting credit the benefit of the obligation of the defaulting credit to the associated senior holder to the extent that payments due each subordinate holder associated with credits within the same sub-pool as the defaulting credit were used to perform the obligation of the defaulting credit and to the extent that a benefit exists after any benefit is provided each subordinate holder associated with credits outside the sub-pool containing the defaulting credit; and providing each subordinate holder associated with credits within the same mini-pool as the defaulting credit the benefit of the obligation of the defaulting credit to the associated senior holder to the extent that payments due each subordinate holder associated with credits within the same mini-pool as the defaulting credit were used to perform the obligation of the defaulting credit and to the extent that a benefit exists after a) any benefit is provided each subordinate holder associated with credits outside the sub-pool containing the defaulting credit and b) after any benefit is provided each subordinate holder associated with credits outside the mini-pool containing the defaulting credit and within the sub-pool containing the defaulting credit; wherein n, j, and k are integers in the range of 1 to 1000. If desired, all credits allocated to a particular mini-pool within a particular sub-pool may be selected from a sub-category associated with the credits allocated to the particular sub-pool.

In another embodiment, a method of structuring risk in a financial transaction is provided, comprising: allocating to a trust a first issuer credit having an obligation to make specified payments and a second issuer credit having an obligation to make specified payments, each of the first issuer credit and second issuer credit being in a non-default state when a respective obligation is met and being in a default state when a respective obligation is not met; associating a first senior holder and a first subordinate holder with the first issuer credit using a) a respective first senior holder trust instrument through which payments from the first issuer credit flow to the first senior holder and b) a respective first subordinate holder trust instrument through which payments from the first issuer credit flow to the first subordinate holder; associating a second senior holder and a second subordinate holder with the second issuer credit using a) a respective second senior holder trust instrument through which payments from the second issuer credit flow to the second senior holder and b) a respective second subordinate holder trust instrument through which payments from the second issuer credit flow to the second subordinate holder; structuring the first senior holder trust instrument and the first subordinate holder trust instrument to give priority to payments due the first senior holder prior to payments due the first subordinate holder in the event the first issuer credit enters the default state; using payments from the second subordinate holder trust instrument to perform the obligation of the first issuer credit for the benefit of the first senior holder to the extent that the first issuer credit enters the default state and payments due the first senior holder are not available; and providing the second subordinate holder the benefit of the obligation of the first issuer credit to the extent that payments due the second subordinate holder were used to perform the obligation of the first issuer credit. In this embodiment, at least one of the first senior holder trust instrument, the first subordinate holder trust instrument, the second senior holder trust instrument, and the second subordinate holder trust instrument may be a bond issued by the trust.

In yet another embodiment, a method of structuring risk in a financial transaction is provided, comprising: allocating to a trust an issuer credit having an obligation to make specified payments, wherein the issuer credit is in a non-default state when the obligation is met and is in a default state when the obligation is not met; associating a senior holder and a subordinate holder with the issuer credit using a) a senior holder trust instrument through which payments from the issuer credit flow to the senior holder and b) a subordinate holder trust instrument through which payments from the issuer credit flow to the subordinate holder; and structuring the senior holder trust instrument and the subordinate holder trust instrument to give priority to payments due the senior holder prior to payments due the subordinate holder in the event the issuer credit enters the default state. Preferably, at least one of the senior holder trust instrument and the subordinate holder trust instrument is a bond issued by the trust.

The present invention provides for what will hereinafter be referred to as the Tranche Subordinated Bond approach (or "TSB" approach), wherein each senior and subordinate holder is primarily exposed to a particular identified ("related") credit and only secondarily exposed to the impact of a default of any other ("unrelated") credit. This is achieved by tranching each individual credit as well by creating a pool of credits. In other words, each senior TSB holder is primarily exposed to (and perhaps even owns an interest in) a particular credit of the pool. The senior TSB holder cannot be affected by any underlying default except a default on its related credit and only if the amount of the default exceeds the amount of the subordinate TSBs related to the same underlying credit. It is believed that this should also have the benefit of avoiding concentration and capacity problems for holders of senior TSBs, analogous to bond insurance for which holder capacity is based on the underlying credit. If a default exceeds the amount of the related subordinate TSBs (i.e., the subordinate TSBs that are primarily exposed to the same underlying credit), then amounts payable to the holders of unrelated subordinate TSBs would be applied to make the holders of the related senior TSBs whole and the unrelated subordinate TSB holders would become owners of or become subrogated to the claim of the related senior TSB holders.

If the amount of the senior TSBs is less than the expected recovery value in the event of a default of the underlying credit, then the unrelated subordinate TSB holders would be exposed to a temporary non-payment ("timing risk") but not to a permanent non-payment ("ultimate payment risk") in the event of a default on the underlying credit since unrelated subordinate holders would be reimbursed from recovery value when it is realized. Another characteristic of the TSB approach is that the amount of senior TSBs created may be limited to increase the likelihood that a payment default could be fully absorbed by the holders of the related subordinate TSB holders. Consequently, there may be an intermediate tranche which is in effect a pass-through of the underlying credit with neither the benefit nor burden of the tranching of the pool. In one example, the intermediate tranche would have the identical credit characteristics of the related underlying credit, with the possible exception that all of the recovery value of the loan may be devoted first to amounts due to the related senior TSBs (including such amounts to which unrelated subordinate TSBs have become subrogated).

Thus, when a new credit is added to the pool or the amount of an existing credit is increased, the risk to the unrelated subordinated TSB holders can be minimized, first, because the first loss is borne by holders of the related subordinate TSBs and, second, because the risk to the unrelated subordinate TSB holders is essentially timing risk rather than ultimate payment risk. Credits could be added to the pool either at the behest of an issuer or by a holder of an underlying credit. This approach could be targeted toward credits that in fact are directly held in the public debt markets such as investment grade rated credits or high-yield credits that are directly held by institutional buyers. Both ultimate payment risk and timing risk to unrelated subordinate TSB holders could effectively be eliminated through the use of sub-pools and/or mini-pools as described below.

To further reduce the risk to holders of unrelated subordinate TSBs, it may be desirable to create sub-pools within the larger pool where the nature of the risk to subordinate TSB holders within the sub-pool is similar. For example, traditional municipal credits, hospital credits, industrial corporate credits, and high-yield credits (including municipal) might be separated. Also, credits of a particular rating category might be separated from credits of a different rating category. It is believed that the senior TSBs within the sub-pool should be able to independently achieve high-grade ratings. To maximize the credit benefit to all senior TSBs, however, all senior TSBs could ultimately be secured by all subordinate TSBs. To further insulate subordinate TSB holders from risk associated with a different sub-pool, the method can require that, in order to combine sub-pools, the senior TSBs within each sub-pool must meet a specified rating standard (e.g., triple-A) without the benefit of any cross-subsidization from any other sub-pool. Hence, no subordinate TSB from a different pool would be affected unless a credit that is triple-A on its own (the senior TSBs within the other sub-pool) would default without the benefit of the cross-subsidization. This reduces the risk to each subordinate TSB holder from credits that are qualitatively different, while maintaining the benefit to the senior TSBs of having the largest and most diverse possible pool of subordinate TSBs securing the senior TSBs.

From a credit and disclosure perspective, it is believed that an important factor to a senior TSB holder are the quality of the underlying credit (which the TSB holder is explicitly choosing) and the quality of the credit enhancement provided by the entire pool. Given the diversity of the pool, it is believed that it would be unnecessary to provide disclosure on any particular credit. In any case, it is likely that all of the underlying credits would be registered or otherwise have publicly available disclosure that could be incorporated by reference. The ability to identify each underlying credit and incorporated disclosure by reference could be important to providing adequate disclosure to subordinated TSB holders who are on a secondary or tertiary basis exposed to credits across the pool. It is believed, however, that the relevant disclosure on an unrelated sub-pool should be no more than would be required for the senior tranche of a stand alone pool (since no subordinate TSB holder would be affected by a default on a credit within an unrelated pool unless the senior tranche would otherwise default), which for a large and diverse pool would be a standard disclosure only.

Alternatively, for a particular type of credit where sub-pools representing different rating categories are provided, the integrity of the sub-pools could be maximized in the event of a downgrade of the rating of an underlying credit by transferring the credit from the higher rated sub-pool to the lower rated sub-pool. This should not materially affect the holders of the related senior TSBs since they are secured by the whole pool. It is believed that this may slightly disadvantage the holders of the related subordinate TSBs in that they would be exposed to secondary risk related to an underlying default in the lower rated sub-pool. However, it would impose on the subordinate TSB holder who chose the credit the full burden of the credit deterioration rather than sharing it with the holders of unrelated subordinate TSBs within the higher rated sub-pool. The holders in the sub-pool to which the credit is transferred would not be hurt since their exposure would be no different than that related to adding any other qualifying credit to the sub-pool. Similarly, if an underlying credit has its rating increased, that credit could be transferred to the higher rated sub-pool for that credit type. For the same reasons as just stated, there would be no detriment to the holders in the sub-pool to which the credit is transferred and the transfer would give the holder of the transferred subordinate TSB the full benefit of the appreciation of the credit.

Any actual default would be primarily the responsibility of the subordinate TSB holders in the related sub-pool (and their transferees) at the time of the default and secondarily the responsibility of the unrelated subordinate TSB holders within the pool. Alternatively, the program manager could at some earlier point identify a troubled credit as the responsibility of the subordinate TSB holders as of that date (and their transferees). Thus, a problem with a particular credit can be isolated so as not to affect the ability to add other credits to the pool. Otherwise, a troubled credit could disincentivize potential subordinated TSB holders from participating in the related pool since a loss on that credit would be shared by the new subordinated TSB holder.

In a further embodiment, for credits without significant recovery values, such as credits in bankruptcy which may or may not have liquidation values (for which it is impossible to eliminate ultimate payment risk by tranching an individual credit), or simply to eliminate timing risk to unrelated TSBs, or to increase the proportion of the securities that can be converted into senior TSBs, it may be necessary or desirable for the subordinate TSB structure to be based on groups of underlying credits (e.g., a "mini-pool") rather than a single underlying credit. The structure of a mini-pool would be similar to that of a sub-pool in that any default within the pool would first be borne by the holders of the subordinate TSBs within the mini-pool before the holders of any unrelated subordinate TSBs would be affected. Each mini-pool might contain credits of a particular sub-category of the type of credits in the corresponding sub-pool (e.g., credits related to a particular industry, such as telecommunications). The senior TSBs related to a mini-pool could still be based on individual credits rather than on the mini-pool of credits. The test for addition of a mini-pool to a sub-pool could be significantly less rigorous than the test for addition of a sub-pool to the pool. It may only be necessary that the ultimate payment risk and/or timing risk to holders of unrelated subordinate TSBs be made comparable to the risk posed by each other underlying credit or pool of mini-credits within the sub-pool.

Using the TSB approach, an institutional holder (e.g., a pension fund) could create high-grade, credit enhanced, more liquid senior TSBs related to either individual securities or a mini-pool of securities that it holds. As the pool gets larger, the credit quality of the senior TSBs would increase (or at least the probability of any non-payment would get less and less). It is further believed that the result for the senior TSBs would be similar to adding bond insurance to municipal bonds: a) an increase in price or b) a decrease in market yield. Alternatively, rather than being reflected in the price of the senior TSBs, the economic benefit of the TSB structure could be reflected in a higher retained yield on the subordinate TSBs.

Referring now to FIG. 1, a flowchart showing a method according to an embodiment of the invention is shown. As seen in this FIG. 1, Pool 101 contains First Credit 103. First Credit 103, which includes an obligation to make specified payments, can be in a non-default state if the obligation is met or a default state if the obligation is not met. First Senior Holder 105 is associated with First Credit 103 using First Senior Holder Financial Instrument 107, through which payments flow from First Credit 103 to First Senior Holder 105. First Subordinate Holder 109 is associated with First Credit 103 using First Subordinate Holder Financial Instrument 111, through which payments flow from First Credit 103 to First Subordinate Holder 109. First Senior Holder Financial Instrument 107 and First Subordinate Holder Financial Instrument 111 may be structured to provide for the priority of payments from First Credit 103 to First Senior Holder 105 prior to payments from First Credit 103 to First Subordinate Holder 109.

Pool 101 also contains Second Credit 113. Second Credit 113, which includes an obligation to make specified payments, can be in a non-default state if the obligation is met or a default state if the obligation is not met. Second Senior Holder 115 is associated with Second Credit 113 using Second Senior Holder Financial Instrument 117, through which payments flow from Second Credit 113 to Second Senior Holder 115. Second Subordinate Holder 119 is associated with Second Credit 113 using Second Subordinate Holder Financial Instrument 121, through which payments flow from Second Credit 113 to Second Subordinate Holder 119. Second Senior Holder Financial Instrument 117 and Second Subordinate Holder Financial Instrument 121 may be structured to provide for the priority of payments from Second Credit 113 to Second Senior Holder 115 prior to payments from Second Credit 113 to Second Subordinate Holder 119.

In the event that First Credit 103 enters the default state any payments available from First Credit 103 are first applied to First Senior Holder 105 (at the expense of First Subordinate Holder 109). To the extent that the payments to First Senior Holder 105 are still not sufficient to cover the obligation of First Credit 103 then payments due Second Subordinate Holder 119 are used to cover the obligation to First Senior Holder 105 (this is shown by the dashed line marked A in FIG. 2). Further, to the extent that any benefit remains in the obligation of First Credit 103 to First Senior Holder 105 then Second Subordinate Holder 119 is provided such remaining benefit (this is shown by the dashed line marked B in FIG. 2).

Of course, if Second Credit 113 enters the default state rather than First Credit 103 an analogous operation is carried out with regard to First Subordinate Holder 109, Second Senior Holder 115, and Second Credit 113.

Figure 2:
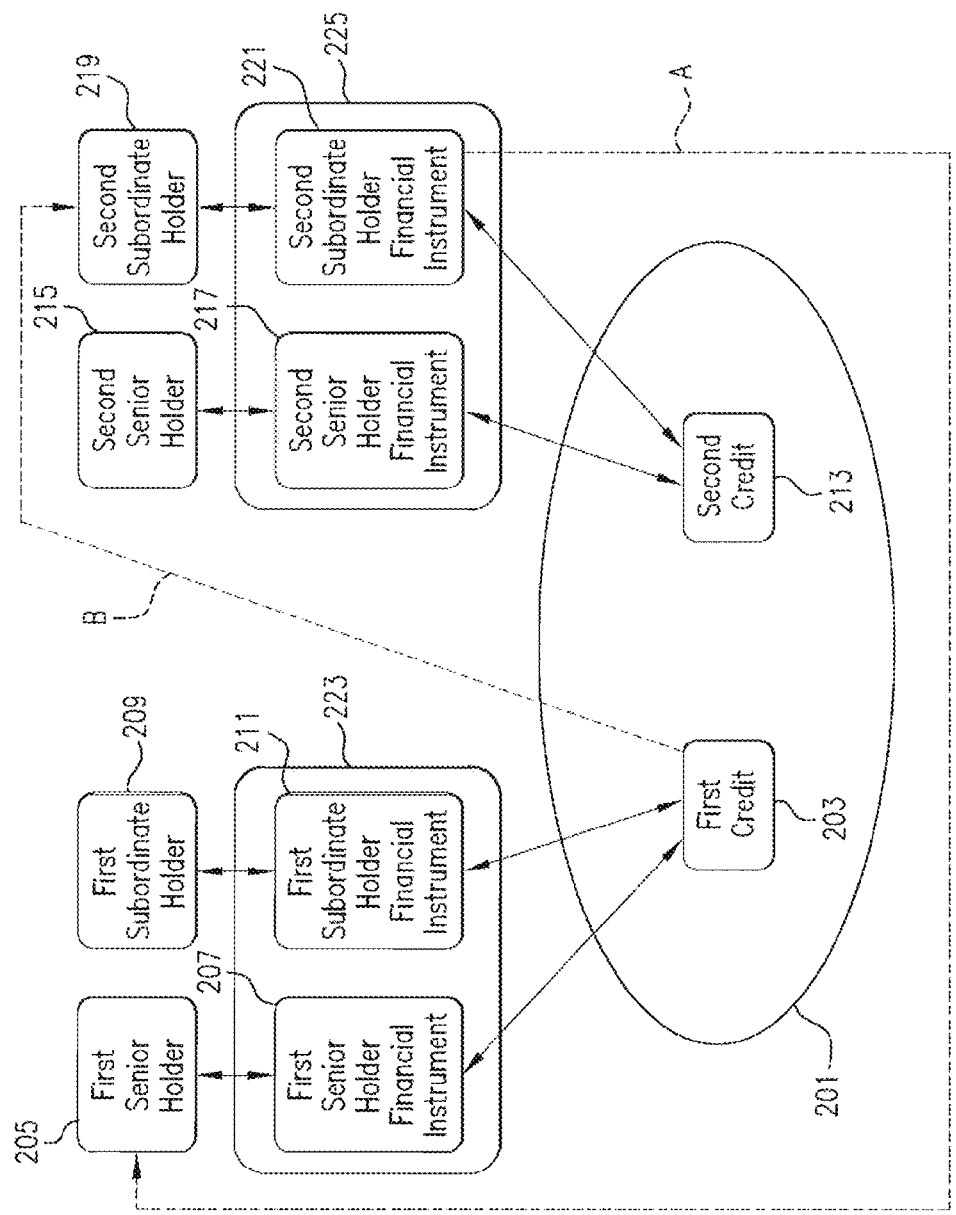
FIG. 2 shows a flowchart of a method according to another embodiment of the present invention.

Referring now to FIG. 2, a flowchart showing a method according to another embodiment of the present invention is shown. This embodiment is similar to the embodiment of FIG. 1 and elements of FIG. 1 corresponding to elements of FIG. 2 will not be described again in detail. The principle difference between the embodiments of FIGS. 1 and 2 is that in the embodiment of FIG. 2 the First Senior Holder Financial Instrument 207 and the First Subordinate Holder Financial Instrument 211 are included within a First Master Financial Instrument 223 and the Second Senior Holder Financial Instrument 217 and the Second Subordinate Holder Financial Instrument 221 are included within a Second Master Financial Instrument 225 The two embodiments otherwise operate in a similar manner.

Figure 3:
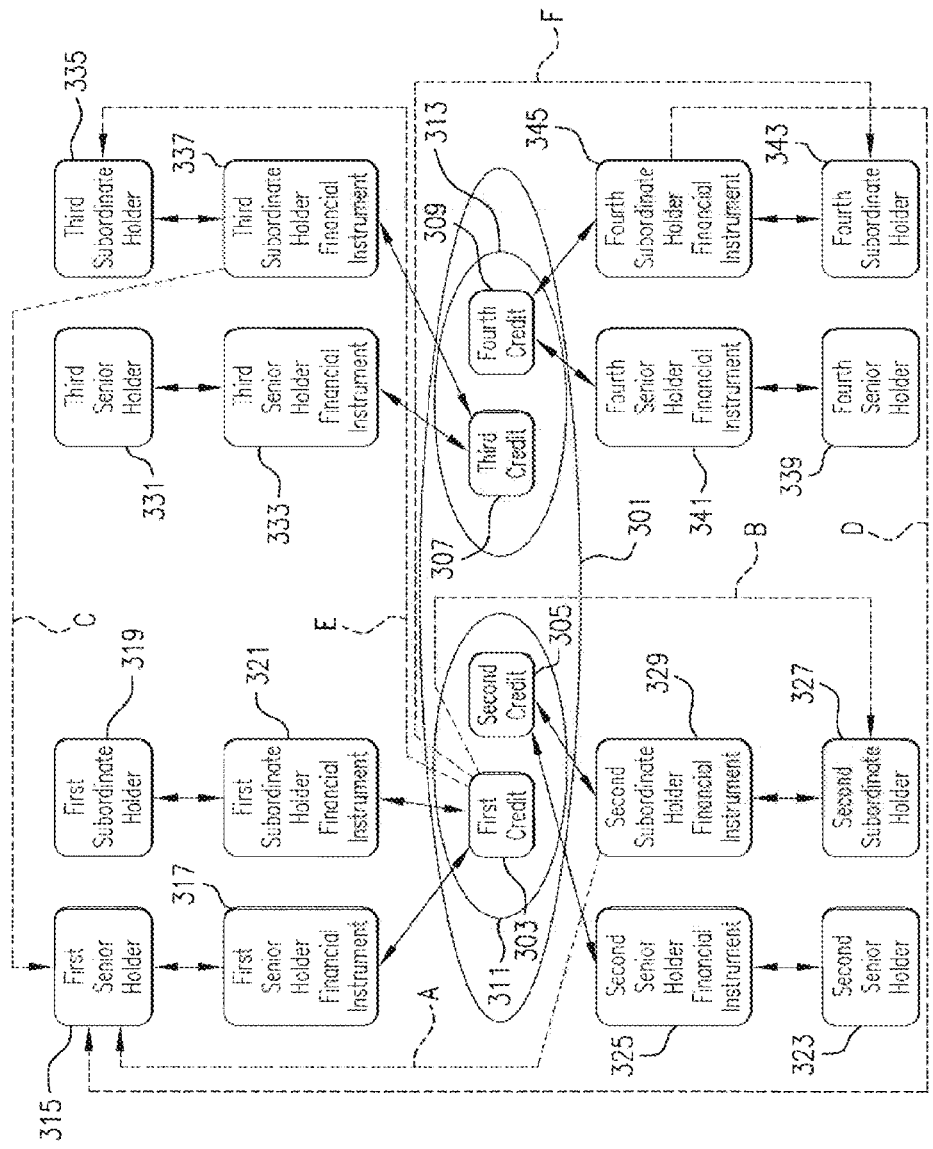
FIG. 3 shows a flowchart of a method according to another embodiment of the present invention.

Referring now to FIG. 3, a flowchart showing a method according to another embodiment of the invention is shown. As seen in this Fig., Pool 301 contains First Credit 303, Second Credit 305, Third Credit 307, and Fourth Credit 309. First Credit 303 and Second Credit 305 are included within First Sub-Pool 311 and Third Credit 307 and Fourth Credit 309 are included within Second Sub-Pool 313. Each of First Credit 303, Second Credit 305, Third Credit 307, and Fourth Credit 309 includes an obligation to make specified payments and each of First Credit 303, Second Credit 305, Third Credit 307, and Fourth Credit 309 can be in a non-default state if a respective obligation is met or a default state if the obligation is not met.

First Senior Holder 315 is associated with First Credit 303 using First Senior Holder Financial Instrument 317, through which payments flow from First Credit 303 to First Senior Holder 315. First Subordinate Holder 319 is associated with First Credit 303 using First Subordinate Holder Financial Instrument 321, through which payments flow from First Credit 303 to First Subordinate Holder 319. First Senior Holder Financial Instrument 317 and Second Senior Holder Financial Instrument 321 may be structured to provide for the priority of payments from First Credit 303 to First Senior Holder 315 prior to payments from First Credit 303 to First Subordinate Holder 319.

Further, as shown in FIG. 3, each of second through fourth Senior Holders and Subordinate Holders are associated with respective Credits through respective Financial Instruments.

The various Financial Instruments may be structured as described above with reference to the priority of payments between corresponding Senior Holders and Subordinate Holders.

In the event that First Credit 303 enters the default state any payments available from First Credit 303 are first applied to First Senior Holder 315 (at the expense of First Subordinate Holder 319). To the extent that the payments to First Senior Holder 315 are still not sufficient to cover the obligation of First Credit 303 then payments due Second Subordinate Holder 327 are used to cover the obligation to First Senior Holder 315 (this is shown by the dashed line marked A in FIG. 3).

Further, to the extent that the payments to First Senior Holder 315 which had been due Second Subordinate Holder 327 are insufficient to fulfill the obligation of First Credit 303 the payments due Third Subordinate Holder 335 and Fourth Subordinate Holder 343 may be used (shown by the dashed lines marked C and D in FIG. 3). Thereafter, to the extent that any benefit remains in the obligation of First Credit 303 to First Senior Holder 315, and to the extent that payments due Third Subordinate Holder 335 and Fourth Subordinate Holder 343 had been directed to First Senior Holder 315, Third Subordinate Holder 335 and Fourth Subordinate Holder 343 are provided such remaining benefit (this is shown by the dashed lines marked E and F in FIG. 3). Finally, to the extent that any benefit remains in the obligation of First Credit 303 to First Senior Holder 315 after Third Subordinate Holder 335 and Fourth Subordinate Holder 343 have been made whole, Second Subordinate Holder 327 is provided such remaining benefit (this is shown by the dashed line marked B in FIG. 3).

Of note is the fact that the operation of Sub-Pool 311 is similar to the operation of Pool 101 of FIG. 1. Also of note is the fact that any remaining benefit may not be applied to Second Subordinate Holder 327 (associated with a Credit in the same Sub-Pool as the defaulting Credit) until Third Subordinate Holder 335 and Fourth Subordinate Holder 343 (associated with a Credit in a different Sub-Pool than the defaulting Credit) have been made whole. In another example, if a Credit other than First Credit 303 enters the default state then an analogous operation is carried out with regard to each Subordinate Holder, each Senior Holder, and each Credit.

Figure 4:
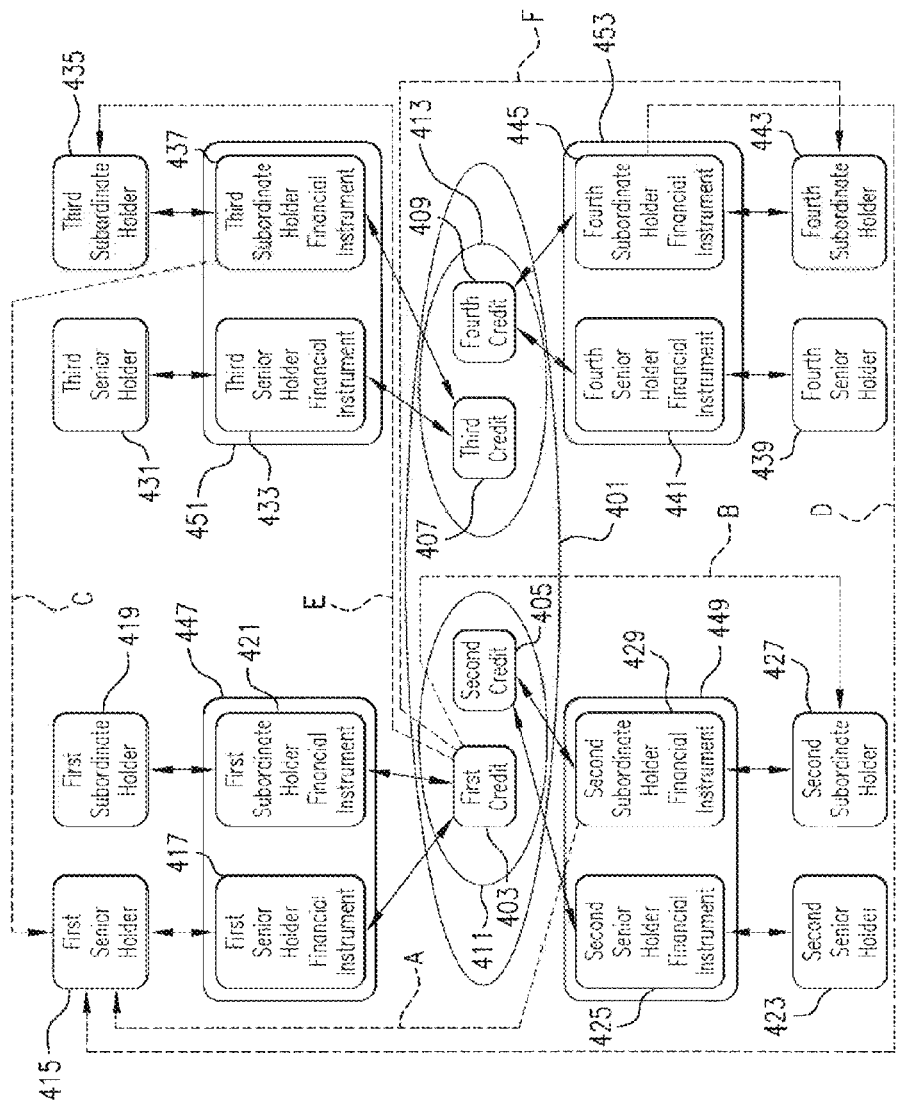
FIG. 4 shows a flowchart of a method according to another embodiment of the present invention.

Referring now to FIG. 4, a flowchart showing a method according to another embodiment of the present invention is shown. This embodiment is similar to the embodiment of FIG. 3 and elements of FIG. 3 corresponding to elements of FIG. 4 will not be described again in detail. The principle difference between the embodiments of FIGS. 3 and 4 is that in the embodiment of FIG. 4 each associated Senior Holder Financial Instrument and Subordinate Holder Financial Instrument is included within a Master Financial Instrument. The two embodiments otherwise operate in a similar manner.

Figure 5:
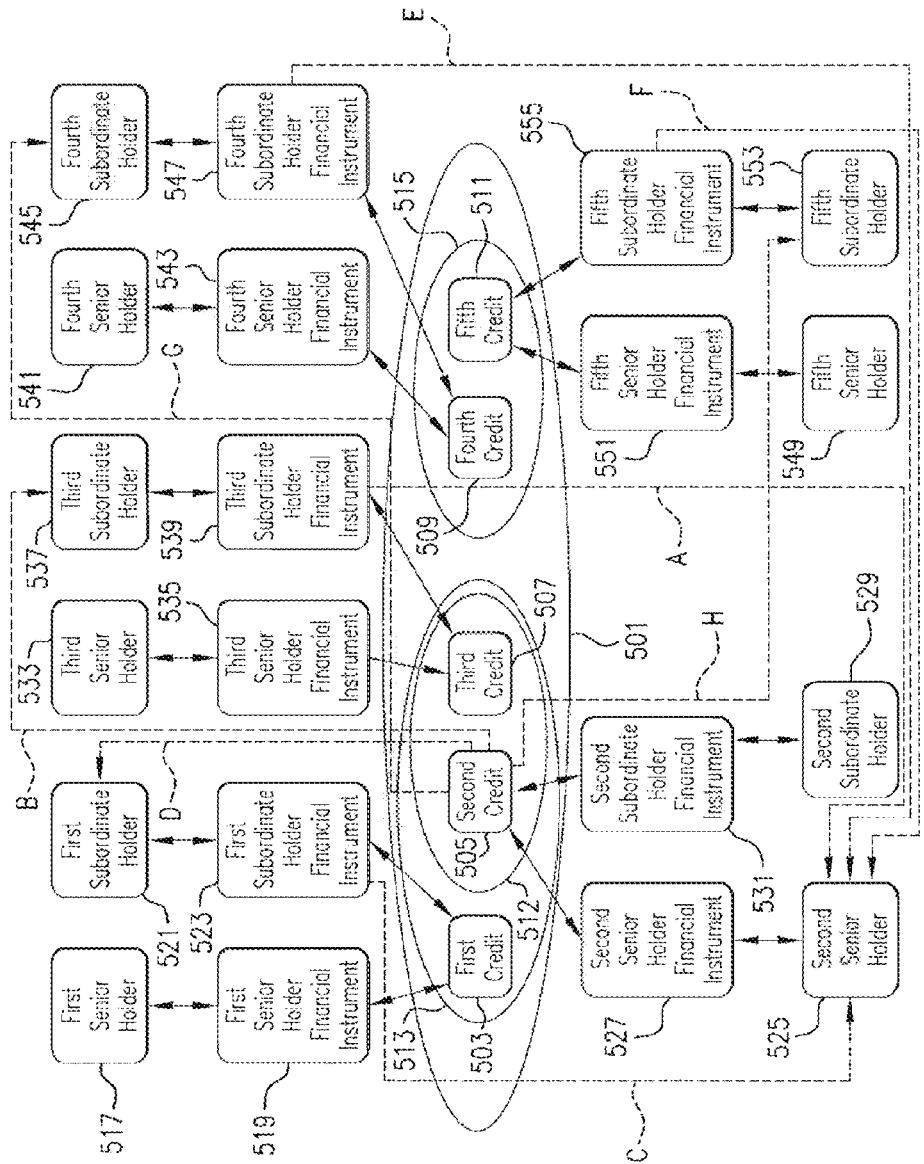
FIG. 5 shows a flowchart of a method according to another embodiment of the present invention.

Referring now to FIG. 5, a flowchart showing a method according to another embodiment of the invention is shown. As seen in this Fig., Pool 501 contains First Credit 503, Second Credit 505, Third Credit 507, Fourth Credit 509 and Fifth Credit 511. Second Credit 505 and Third Credit 507 are included within Mini-Pool 512 which in turn is included within First Sub-Pool 513. First Credit 503 is also included within First Sub-Pool 513. Further, Fourth Credit 509 and Fifth Credit 511 are included within Second Sub-Pool 515. Each of First Credit 503, Second Credit 505, Third Credit 507, Fourth Credit 509 and Fifth Credit 511 includes an obligation to make specified payments and each of First Credit 503, Second Credit 505, Third Credit 507, Fourth Credit 509 and Fifth Credit 511 can be in a non-default state if a respective obligation is met or a default state if the obligation is not met.

First Senior Holder 517 is associated with First Credit 503 using First Senior Holder Financial Instrument 519, through which payments flow from First Credit 503 to First Senior Holder 517. First Subordinate Holder 521 is associated with First Credit 503 using First Subordinate Holder Financial Instrument 523, through which payments flow from First Credit 503 to First Subordinate Holder 521. First Senior Holder Financial Instrument 519 and First Subordinate Holder Financial Instrument 523 may be structured to provide for the priority of payments from First Credit 503 to First Senior Holder 517 prior to payments from First Credit 503 to First Subordinate Holder 521.

Further, as shown in FIG. 5, each of second through fifth Senior Holders and Subordinate Holders are associated with respective Credits through respective Financial Instruments. The various Financial Instruments may be structured as described above with reference to the priority of payments between corresponding Senior Holders and Subordinate Holders.

In the event that Second Credit 505 enters the default state any payments available from Second Credit 505 are first applied to Second Senior Holder 525 (at the expense of Second Subordinate Holder 529). To the extent that the payments to Second Senior Holder 525 are still not sufficient to cover the obligation of Second Credit 505, payments due Third Subordinate Holder 537 are used to cover the obligation to Second Senior Holder 525 (this is shown by the dashed line marked A in FIG. 5). Further, to the extent that the payments to Second Senior Holder 525 which had been due Third Subordinate Holder 537 are insufficient to fulfill the obligation of Second Credit 505, payments due First Subordinate Holder 521 may be used (shown by the dashed line marked C in FIG. 5).

Further still, to the extent that the payments to Second Senior Holder 525 which had been due First Subordinate Holder 521 are insufficient to fulfill the obligation of Second Credit 505, payments due Fourth Subordinate Holder 545 and Fifth Subordinate Holder 553 may be used (shown by the dashed lines marked E and F in FIG. 5).

Thereafter, to the extent that any benefit remains in the obligation of Second Credit 505 to Second Senior Holder 525, and to the extent that payments due Fourth Subordinate Holder 545 and Fifth Subordinate Holder 553 had been directed to Second Senior Holder 525, Fourth Subordinate Holder 545 and Fifth Subordinate Holder 553 are provided such remaining benefit (this is shown by the dashed lines marked G and H in FIG. 5). Next, to the extent that any benefit remains in the obligation of Second Credit 505 to Second Senior Holder 525 after Fourth Subordinate Holder 545 and Fifth Subordinate Holder 553 have been made whole, and to the extent that payments due First Subordinate Holder 521 had been directed to Second Senior Holder 525, First Subordinate Holder 521 is provided such remaining benefit (this is shown by the dashed line marked D in FIG. 5):

Finally, to the extent that any benefit remains in the obligation of Second Credit 505 to Second Senior Holder 525 after First Subordinate Holder 521, Fourth Subordinate Holder 545 and Fifth Subordinate Holder 553 have been made whole, Third Subordinate Holder 537 is provided such remaining benefit (this is shown by the dashed line marked B in FIG. 5).

Of note is the fact that the operation of Mini-Pool 512 is similar to the operation of both Sub-Pool 311 of FIG. 3 and Pool 101 of FIG. 1. Also of note is the fact that: a) any remaining benefit may not be applied to Third Subordinate Holder 537 (which is associated with a Credit in the same Mini-Pool as the defaulting Credit) until First Subordinate Holder 521 (which is associated with a Credit outside the Mini-Pool with the defaulting Credit) has been made whole; and b) any remaining benefit may not be applied to First Subordinate Holder 521 (which is associated with a Credit in the same Sub-Pool as the defaulting Credit) until Fourth Subordinate Holder 545 and Fifth Subordinate Holder 553 (which are associated with Credits outside the Sub-Pool with the defaulting Credit) have been made whole.

Of course, if a Credit other than Second Credit 505 enters the default state then an analogous operation is carried out with regard to each Subordinate Holder, each Senior Holder, and each Credit.

Figure 6:
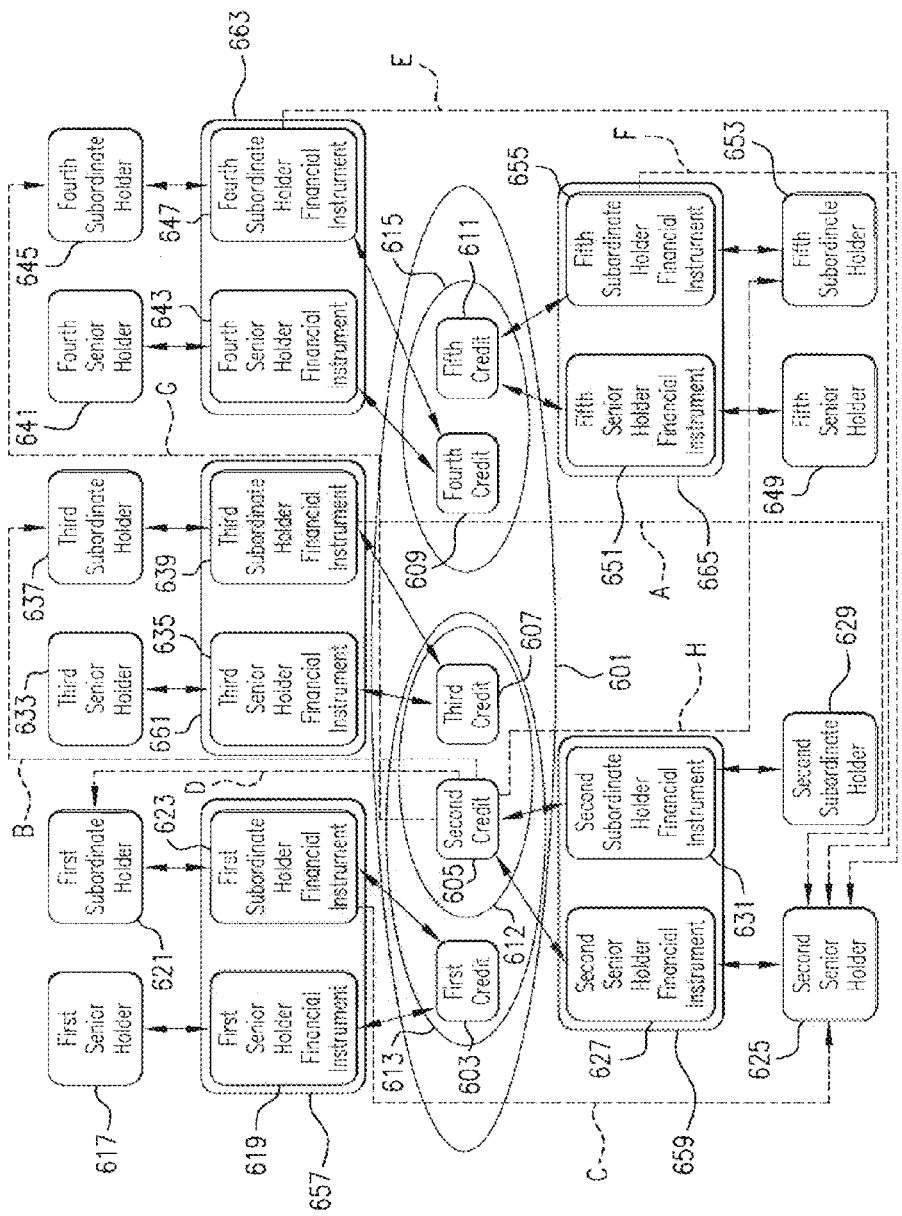
FIG. 6 shows a flowchart of a method according to another embodiment of the present invention.

Referring now to FIG. 6, a flowchart showing a method according to another embodiment of the present invention is shown. This embodiment is similar to the embodiment of FIG. 5 and elements of FIG. 5 corresponding to elements of FIG. 6 will not be described again in detail. The principle difference between the embodiments of FIGS. 5 and 6 is that in the embodiment of FIG. 6 each associated Senior Holder Financial Instrument and Subordinate Holder Financial Instrument is included within a Master Financial Instrument. The two embodiments otherwise operate in a similar manner.

Figure 7:
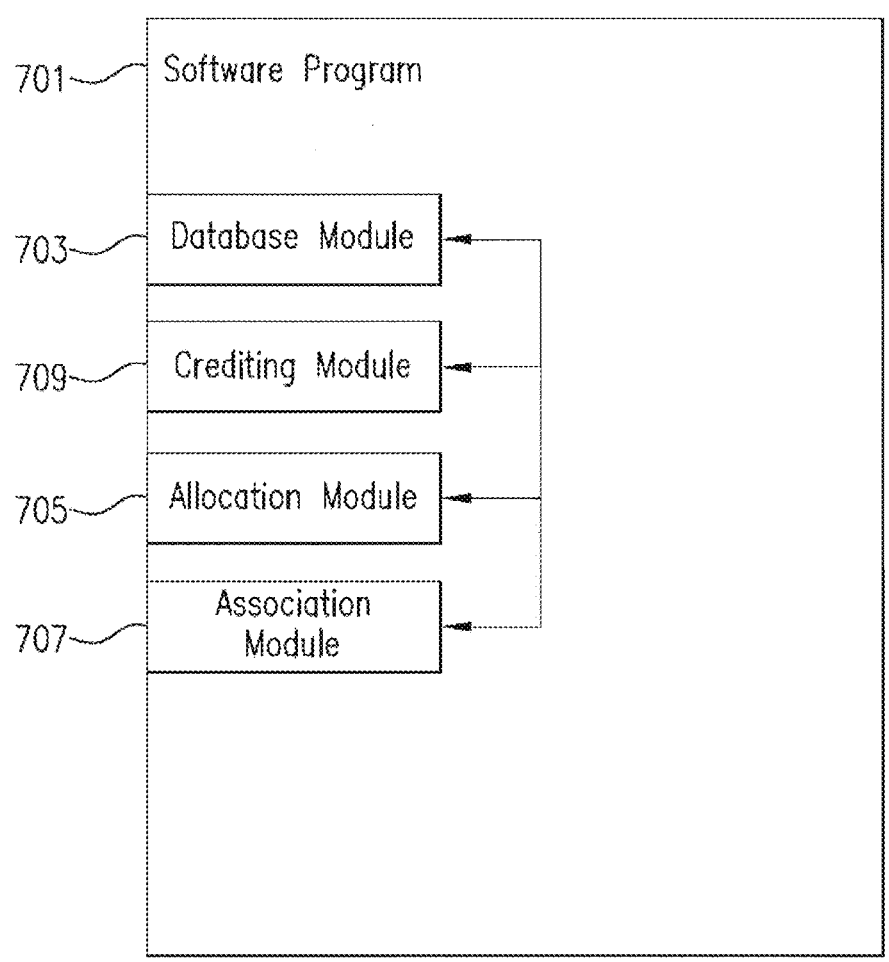
FIG. 7 shows a block diagram of a software program according to another embodiment of the present invention.

Referring now to FIG. 7, a block diagram of a software program according to another embodiment of the present invention is shown. As seen in this Fig., Software Program 701 includes: 1) Database Module 703 for storing data concerning each credit, each senior holder, each subordinate holder, each senior holder financial instrument, each subordinate holder financial instrument, the transaction pool, each sub-pool, and each mini-pool; 2) Allocation Module 705 for allocating sub-pools to the transaction pool, for allocating mini-pools to each of the sub-pools, and for allocating credits to each of the mini-pools, sub-pools, and transaction pool; 3) Association Module 707 for associating a senior holder and a subordinate holder with each of the credits by associating a) a senior holder with a respective senior holder financial instrument through which payments from a respective credit flow to the senior holder and b) a subordinate holder with a respective subordinate holder financial instrument through which payments from a respective credit flow to the subordinate holder; and 4) Crediting Module 709 for: i) crediting payments from each subordinate holder financial instrument associated with credits within the same mini-pool as a defaulting credit to perform the obligation of the senior holder financial instrument associated with the defaulting credit for the benefit of the senior holder to the extent that payments due the senior holder associated with the defaulting credit are not available; ii) crediting payments from each subordinate holder financial instrument associated with credits outside the mini-pool with the defaulting credit but within the same sub-pool as the defaulting credit to perform the obligation of the senior holder financial instrument associated with the defaulting credit for the benefit of the senior holder to the extent that the payments of each subordinate holder financial instrument associated with credits within the same mini-pool as the defaulting credit which were used for the benefit of the senior holder do not cover the obligation of the defaulting credit; iii) crediting payments from each subordinate holder financial instrument associated with credits outside the sub-pool containing the defaulting credit to perform the obligation of the senior holder financial instrument associated with the defaulting credit for the benefit of the senior holder to the extent that the payments of each subordinate holder financial instrument associated with credits within the same sub-pool as the defaulting credit which were used for the benefit of the senior holder do not cover the obligation of the defaulting credit; iv) crediting each subordinate holder associated with credits outside the sub-pool containing the defaulting credit with the benefit of the obligation of the defaulting credit to the associated senior holder to the extent that the payments due each subordinate holder associated with credits outside the sub-pool containing the defaulting credit were used to perform the obligation of the defaulting credit; v) crediting each subordinate holder associated with credits within the same sub-pool as the defaulting credit with the benefit of the obligation of the defaulting credit to the associated senior holder to the extent that payments due each subordinate holder associated with credits within the same sub-pool as the defaulting credit were used to perform the obligation of the defaulting credit and to the extent that a benefit exists after any benefit is provided each subordinate holder associated with credits outside the sub-pool containing the defaulting credit; and vi) crediting each subordinate holder associated with credits within the same mini-pool as the defaulting credit with the benefit of the obligation of the defaulting credit to the associated senior holder to the extent that payments due each subordinate holder associated with credits within the same mini-pool as the defaulting credit were used to perform the obligation of the defaulting credit and to the extent that a benefit exists a) after any benefit is provided each subordinate holder associated with credits outside the sub-pool containing the defaulting credit and b) after any benefit is provided each subordinate holder associated with credits outside the mini-pool containing the defaulting credit and within the sub-pool containing the defaulting credit.

Figure 8:
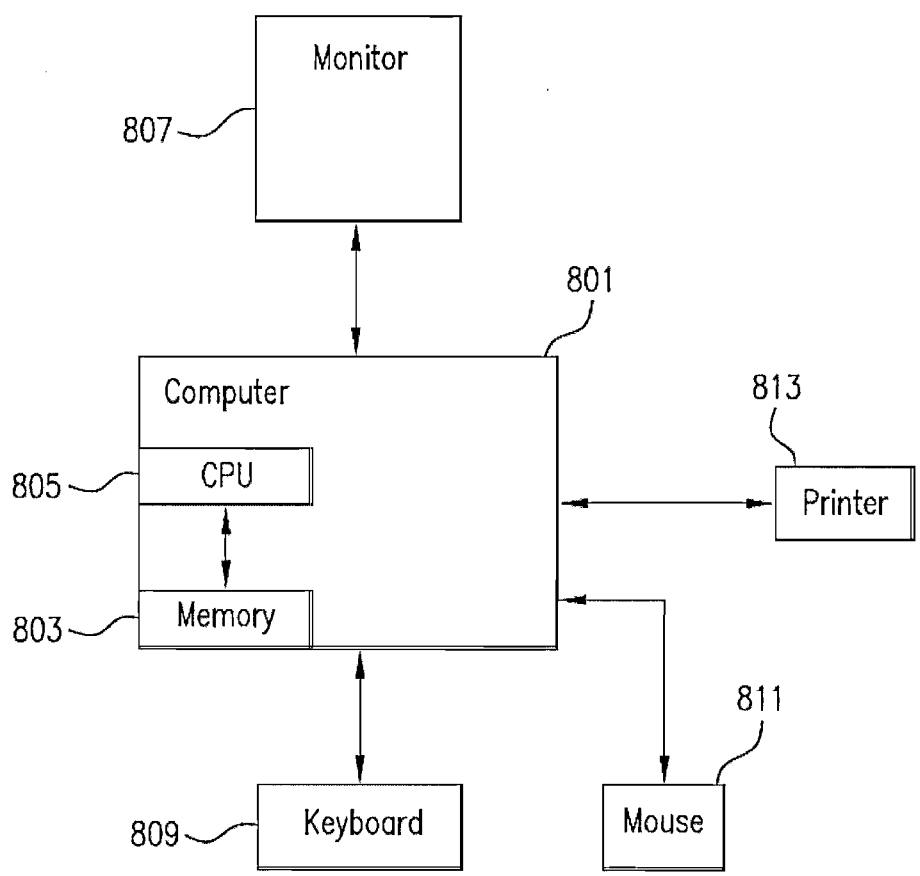
FIG. 8 shows a block diagram of a system according to another embodiment of the present invention.

Referring now to FIG. 8, a block diagram of a system according to another embodiment of the present invention is shown. As seen in this figure, Computer 801 includes Memory 803 for storing a software program (not shown) and CPU 805 for processing the software program. Monitor 807, Keyboard 809, Mouse 811, and Printer 813 are connected to Computer 801 to provide user input/output. The software program stored in Memory 803 and processed by CPU 805 may of course be the software program of the present invention. In any case, the details of each of Computer 801, Memory 803, CPU 805, Monitor 807, Keyboard 809, Mouse 811, and Printer 813 are well known to those of ordinary skill in the art and will not be discussed further.

Figure 9:
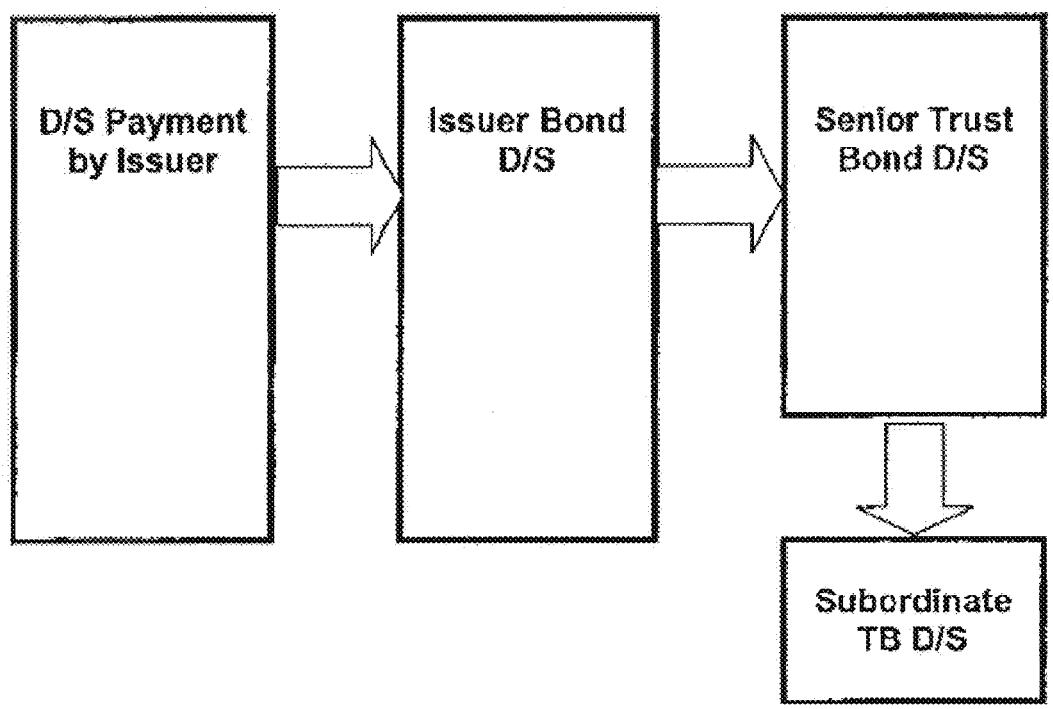
FIG. 9 shows a block diagram of a flow of funds according to another embodiment of the present invention.

Referring now to yet another embodiment of the present invention, credit tranches may be created by having an issuer's bonds (hereinafter "Issuer Bonds" or "IBs") deposited in a trust which in turn issues various classes of securities (hereinafter "Trust Bonds" or "TBs"). Such Trust Bonds may be related to the Issuer Bonds and may be issued to the public and/or to any other appropriate group. It is believed that this approach may work to permit credit tranching for securities, such as General Obligations, for which the issuer may not have authority to create tranches directly. In the event of a payment of less than all of the amount due on the Issuer Bond(s), the entire amount received on the Issuer Bond(s) would go first to secure payment of debt service on the related senior Trust Bond(s) with any balance going to pay the debt service on the subordinate Trust Bond(s). FIG. 9 shows a diagram of such a flow of funds (debt service is abbreviated as "D/S" in this Figure).

In one example of the present embodiment the terms of the Trust Bonds, such as, for example, amount, payment dates, and redemption provisions, but excluding interest rates, would substantially mirror the provisions of the related Issuer Bond(s).

For any Issuer Bond(s) for which there is express provision for the application of available monies to pay debt service in the event of a shortfall, in one example, this approach may create high grade credit tranches and/or credit tranches with high coverage.

It is noted that outside of the housing sector, senior bonds are traditionally assigned only a slightly higher rating than the subordinate bonds. This suggests that either: i) there is still a perceived risk that notwithstanding the provisions for apportionment of monies in the event of a shortfall, no payment will be made; or ii) the portion of an issue that could be assigned a high grade rating using the traditional senior/subordinate approach is significantly smaller generally than is the case in housing. A possible explanation is that the percentage change in the revenues of the issuer necessary to result in a non-payment of the senior bonds is not sufficiently different from that necessary to cause a non-payment of the subordinate bonds to provide a materially higher level of protection. However, for issuers with a heavy debt burden, it is believed that the difference should be material.

With respect to the risk of non-payment, in the case of Issuer Bonds according to the present invention which are secured by a net revenue pledge, the other creditors are provided for prior to the payment of any debt service. So, given an explicit provision on the allocation of funds in the event of an insufficiency, the risk of non-payment should be insignificant. Consequently, a gross pledge of revenues may present a greater risk that there could be a period of non-payment while a court determines how much gets applied to the cost of operations. Even so, the risk to the senior Trust Bonds would predominantly be with respect to the timing of payment rather than with respect to payment itself.

In this regard, one method of reducing the timing risk to the senior TBs would be to find a reserve for them as soon as a payment default occurred on the IBs and prior to the payment of debt service on the subordinate TBs. This process would effectively result in application of the entire reserve (hereinafter "debt service reserve fund", or "DSRF") to secure the senior TBs and, for a typical situation, provide protection with respect to timeliness of payment for a period of, for example, 1.5 to 2 years (depending on the proportion of senior TBs). Of note is the fact that there may be tax issues with respect to the use of the reserve in this manner. Also, the aforementioned approach of funding a reserve would increase the probability of an actual non-payment with respect to the subordinate TBs (since they would not get any benefit from the DSRF).

If no special reserve is created for the senior TBs, then there is substantially no difference in the probability of a non-payment event between the Issuer Bonds and the Trust Bonds. However, in the event of a non-payment event, the severity of the non-payment event is more severe for the subordinate TBs than for the IBs, and less severe for the senior TBs.

Figure 10:
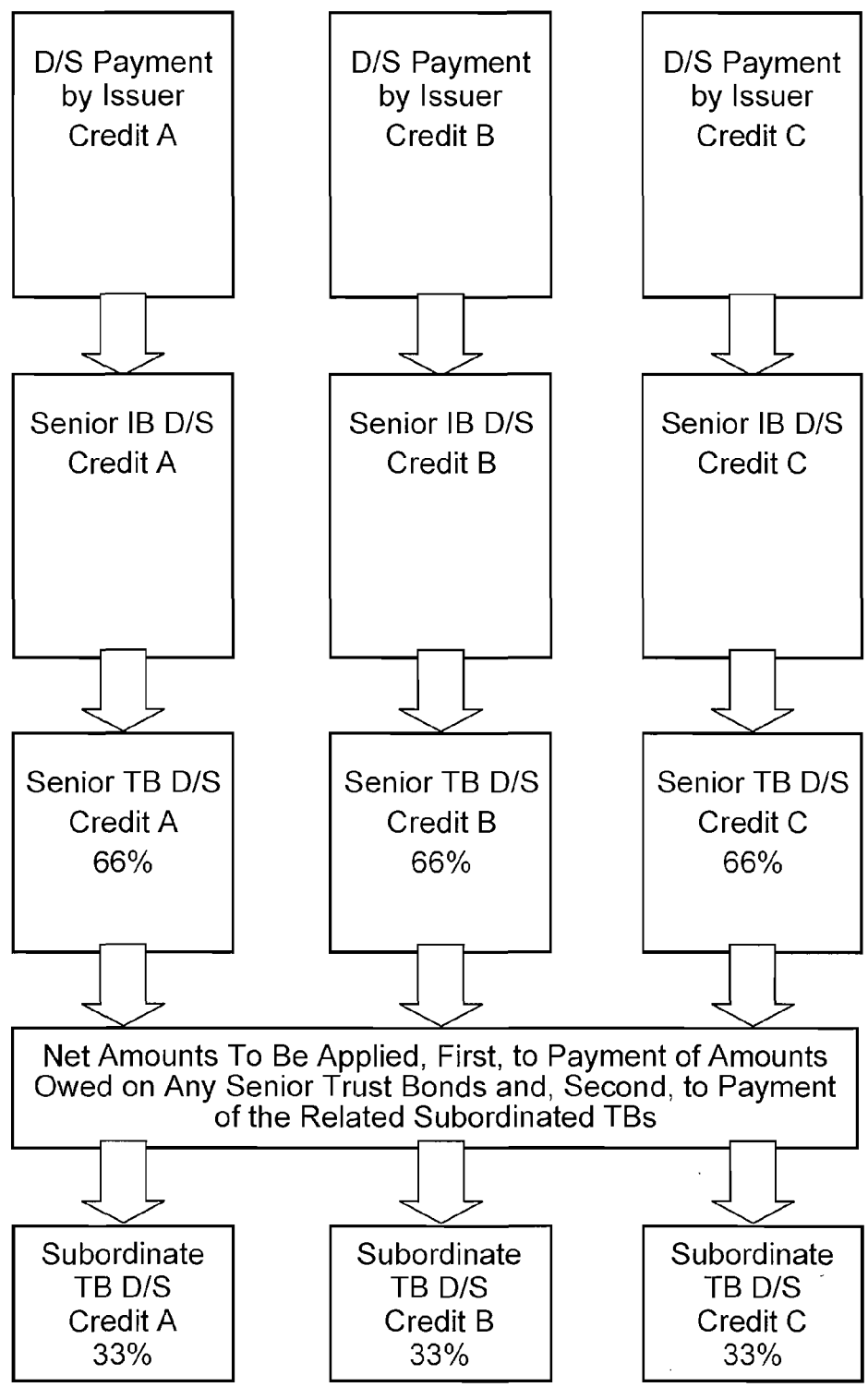
FIG. 10 shows a block diagram of a method according to another embodiment of the present invention.

Referring now to yet another embodiment of the present invention, an approach which addresses concerns regarding the timeliness of payment of senior TBs may be accomplished as follows: pool together two or more Issuer Bond credits such that amounts available after payment of the senior TBs for each credit are used to secure the payment of the other senior TBs in the event that the amounts received for payment of the related Issuer Bonds are not sufficient to pay the senior TBs. In other words, payments allocable to each series of subordinate TBs are applied first, to the extent needed, to pay unpaid amounts on any of the senior TBs. FIG. 10 shows a diagram of the credit structure of such an approach (debt service is abbreviated as "D/S" in this Figure).

In one example, the following discussion of the aforementioned pooling approach assumes that substantially equal amounts of bonds are issued for each credit, that the bonds are issued substantially simultaneously, and that the bonds are payable on substantially the same dates.

In any case, it is noted that if the ratio of senior to subordinate TBs is 2-to-1 (i.e., 66% senior TBs), then the senior TBs of each credit are fully secured by the sum of the amounts allocable to the subordinate tranches for the other two credits. However, the ratio of total senior obligations to the total amounts securing them is 1 to 1.33.

Further, if the ratio of senior to subordinate TBs is 1-to-1 (i.e., 50% senior TBs), the senior TBs of each credit are over-collateralized 2×. by the sum of the amounts allocable to the subordinate tranches for the other two credits. Also, the ratio of total senior obligations to the total amounts securing them is 1 to 2.

Applying the principles typically applicable to two-party-pay situations, the senior TBs should be rated from A to triple-A, depending on such criteria as the percentage of senior debt, the strength of the underlying credits, and the degree of correlation between the underlying credits. Each of the senior TB tranches would have both: i) an underlying rating determined on the basis of the tranching of the individual credit; and ii) an enhanced rating based on the impact of pooling.

On the other hand, each of the subordinate TBs could be rated as low as the weakest rating (without regard to pooling) of any of the senior TB tranches. The credit impact of the proposed structure on the subordinate TBs could be mitigated by: i) first applying amounts related to the same underlying credit; and ii) then applying amounts securing the weakest of the other underlying credits (thereby reducing the possibility that the subordinate TBs related to the stronger underlying credit would be affected).

In one example, if the senior tranches can achieve at least double-A category ratings, it is believed that the savings from this structure could accrue both from lower interest rates on the senior bonds as well as from the avoided cost of bond insurance on the senior bonds. Those savings would be reduced in part by any increase in yield necessary to market the subordinate TBs and by any increase in the costs of bond insurance. However, the net benefit could be used to reduce the issuer's cost of funds.

Further, it is noted with regard to the present example that if the underlying ratings of all three credits are the same, the subordinate TBs would arguably have the same ratings as the Issuer Bonds while the senior TBs should receive significantly higher ratings. As mentioned earlier, the probability of a non-payment event would be substantially the same for both the Issuer Bonds and the subordinate TBs. However, if such an event did occur, the severity of the event could be greater for the subordinate TBs. (This runs counter to the idea that the issuer would not make any payment in the event of a shortfall).

A specific example of a pooled Trust Bond embodiment of the present invention will now be described with reference to the credit tranching and pooling of three New York City credits. More particularly, the discussion will be a simplified analysis of the credit tranching and pooling of the General Obligation credit ("NYCGO"), the Municipal Water Finance Authority ("NYCWFA"), and the Transitional Finance Authority ("NYCTFA").

In one example, the analysis assumes that the MOODYS, STANDARD & POORS, and FITCH ratings of the bonds secured by the credits are as shown in Table 1:

TABLE 1

|  | NYCWFA | NYCGO | NYCTFA |
|---|---|---|---|
| MOODYS | A1 | A3 | Aa3 |
| STANDARD & POORS | A | A− | AA |
| FITCH | AA− | A− | AA+ |

Moreover, the analysis assumes that the pool includes two-thirds senior and one-third subordinate TBs. Therefore, as long as not more than one credit defaults at any time, the defaulting senior Trust Bonds will be fully secured by amounts allocable to the subordinate TBs of the other two credits. Also, the credit tranching within each credit provides protection except during any period in which the issuer is making no payments on that credit. In essence, the only time that there could be a problem with payment of the senior TBs in this example would be in the situation where the City (i.e., the credit issuing entity) was simultaneously making no payments on two of the three credits.

Accordingly, it is believed that even though the TBs are not fully covered by the obligations of two parties, given: i) the low correlation among the three credits (other than with respect to general economic conditions); and ii) the fact that the diversification of the credits and credit tranching would allow the structure to accommodate significant simultaneous payment shortfalls (up to 50%) with respect to two credits without a non-payment of senior TBs, application of the two-party pay criteria in assessing the impact of the structure on the ratings of the senior Trust Bonds should be appropriate.

Note that for each senior TB to be fully secured by two credits, the senior TBs could not exceed 50% of each series. Given the ratings of the three NYC credits, a literal application of the two-party pay criteria would result in triple-A ratings on two-thirds of the senior Trust Bonds and double-A ratings on the remaining third. As in the case of the 66% senior TBs, the structure cannot withstand total non-payment of two of the credits at the same time. With 50% senior bonds, the structure could withstand a simultaneous 75% payment shortfall by two of the credits. However, this would result in a structure having a larger amount of subordinate TBs. Minimizing the amount of subordinate TBs is important (unless the underlying credits all have the same or very similar ratings) since the rating of the subordinate TB s may be the lowest common denominator of the three credits. Minimizing the amount of subordinate TBs also spreads the benefit of the higher ratings on the senior tranche across a larger amount of bonds.

Figure 11:
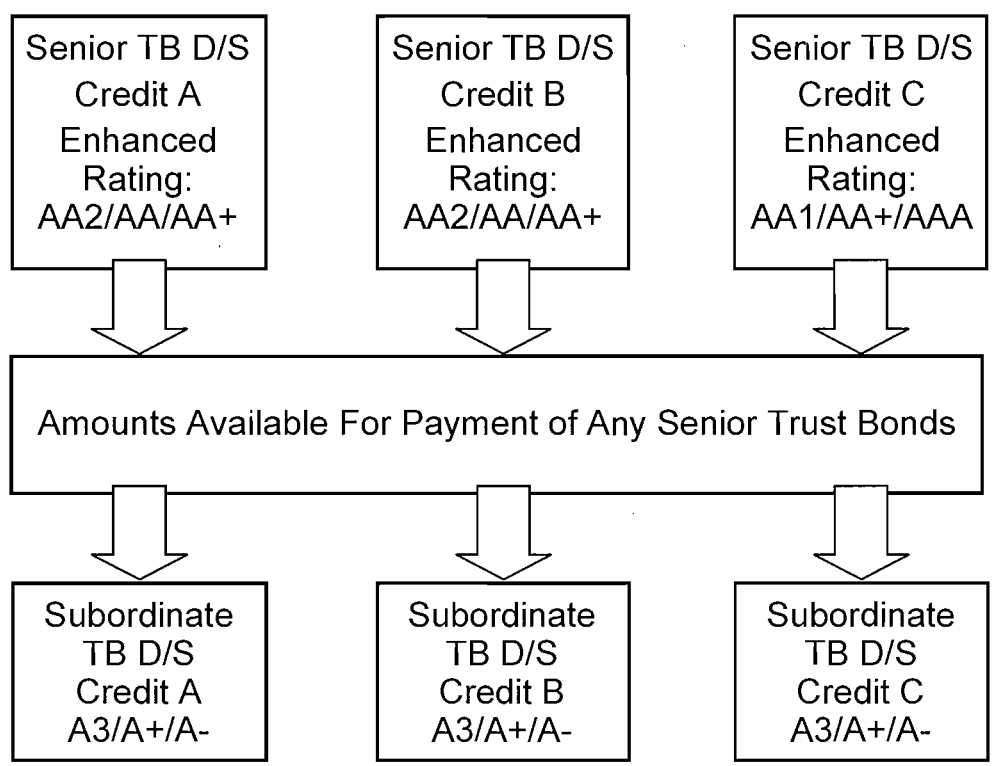
FIG. 11 shows a block diagram of a method according to another embodiment of the present invention.

Applying, for example, MOODY's two-party pay criteria to the scenario with two-thirds senior bonds results in the senior TB ratings indicated in FIG. 11 (debt service is abbreviated as "D/S" in this Figure). The two-party pay criteria were applied assuming a medium correlation among the credits. Further, for each senior TB series, the two-party pay criteria were applied using the related underlying credit together with the weakest of the other two credits.

Interestingly, given the Trust Bond ratings in this example, the City would be selling substantially the same amount of A3/A−/A− Trust Bonds as it would have been selling NYC-GO's with the same rating. However, it is believed that the present system would enhance the ratings on all of the other bonds. Possibly these "natural" double-A Trust Bonds could trade flat to or through insured bonds. The benefit of the bond issue to the City (or other credit issuing entity) would be the sum of: i) avoided cost of bond insurance on the senior TBs; plus ii) the interest savings attributable to the credit spread between the ratings on the senior TBs and the underlying ratings on any related Issuer Bonds; minus iii) any increase in the interest cost or cost of bond insurance for the subordinate TBs as compared with what such costs would have been for the underlying bonds.

Moreover, by separately applying the two-party pay criteria to the portion of each series of senior TBs that is secured by each of the other series, it should be possible to assign an even higher rating to at least half of the senior TBs.

It is noted that the examples discussed above do not take into account a variety of issues, including: i) relative size of issuance among the different credits; ii) different timing of issuance among the different credits; iii) intra-period timing issues with respect to debt service payments on the different categories of Issuer Bonds; iv) differences in the shape of debt service among the different credits; v) disclosure issues raised by the structure (e.g., disclosure on all three credits could be material to every series of both senior and subordinate bonds); vi) tax issues; and vii) legal authority of the Issuer to implement the structure, but these can be provided for in the present system to the extent that they are applicable.

Another example of a slightly different application of the present invention would be for the issuing entity, e.g., New York City to: i) have a single class of TB tranches for each of the GO, WFA and TFA credits; and ii) have the amounts allocable to the GO and WFA TBs secure payment of TBs issued for the TFA. Since the TFA is rated higher, the exposure to the TFA credit should not hurt the ratings of the GO and WFA TBs. However, the TFA TBs should be rated triple-A.

Referring now to another example of a pooled Trust Bond embodiment of the present invention, a credit structure combines the revenues from two or more systems as part of a single security package. More particularly, a trust could hold senior lien obligations from the two or more systems. In one example, the trust may be single purpose trust. The trust could have the authority to issue securities against those securities held in the trust. Each system could be legally responsible for their respective obligations to the trust. The trust, in turn, could issue securities to the public in a senior/subordinate structure. The revenue stream flowing out of the trust from the obligations of the two or more systems (e.g., a water system and a sewer system), which could mirror the principal and interest on the publicly held debt, could provide bondholder security. The senior/subordinate structure could allow the trust to tranche the securities with differing coverage ratios. Such tranched securities could allow for the senior lien obligations to be rated higher than the underlying obligations on their own.

A more specific example of the aforementioned embodiment of the present invention is as follows: A water system and a sewer system could each issue bonds in the total amount of $200 million to the trust (i.e., $100 million each). The trust could then issue bonds to the public consisting of $100 million senior lien bond(s) and $100 million junior lien bond(s). Bondholders in general would benefit because the revenues used to pay debt service would be coming from both the water and sewer systems. In addition, the senior lien bondholders would benefit because their bonds would have coverage of two times (at least $200 million in revenues to pay $100 million in senior lien obligations). If there were to be a default by either the water or sewer system to the trust, the senior lien bondholders would be secured because the non-defaulting system's revenues would cover the senior lien obligations. A structure like this should allow the senior lien bond(s) to achieve a rating of at least Aa2/AA (by STANDARD &

POORS, for example), while the junior lien bonds would receive ratings at the lower of the water or sewer system ratings.

While a number of embodiments of the present invention have been described, it is understood that these embodiments are illustrative only, and not restrictive, and that many modifications may become apparent to those of ordinary skill in the art. For example, while the present invention has been described with reference to each credit being associated with a single senior holder financial instrument and a single subordinate holder financial instrument any desired number of tiered seniority senior holder financial instruments and/or tiered seniority subordinate holder financial instruments could be used. Further still, while the present invention has been described with reference to each senior holder financial instrument and each subordinate holder financial instrument being associated with a single respective senior holder and a single respective subordinate holder any desired number of senior holders and/or subordinate holders could be associated with each respective senior holder financial instrument and subordinate holder financial instrument. Further still, each TSB holder (i.e., each senior holder or each subordinate holder) could directly own the respective underlying credit or have a pass-through interest in the form of ownership of an interest in a mutual find, trust, partnership, or corporation (either debt or equity). Further still, the obligation of subordinate holders to cover for senior holders could be in the form a guarantee, an insurance policy, or an agreement to purchase (either all payments or defaulted payments). Further still, each credit and associated senior holder financial instrument and/or subordinate holder financial instrument could be incorporated into a single instrument. Further still, the present invention may be implemented with or without the cooperation of a credit issuer. Further still, the pooled credits could be from related issuers and/or from separate issuers. Further still, the pool may have a relatively large number of credits (a larger pool should allow for smaller subordinate TB tranches.) Further still, even for a large pool of general infrastructure type credits (excluding bonds such as appropriation bonds, with significant event risk), it should be valid to assume that not more than two or three credits would ever be in a non-payment mode at the same time.

Further Embodiments

As used herein, the terms "component", "computer based component" or "computer implemented component" refer to hardware or software executed by and combined with hardware, including software stored in tangible processor readable media. The hardware can be a device using a computer processor, a specialized processor such as an application-specific integrated circuit (ASIC), or the like. As used herein, the term "debt" or "obligation" refer to bonds, mortgages, loans, or any other obligation which requires payments by debtor of the principal of the debt and at least some interest, and wherein the payments occurs at a plurality of times over a time period. Such debt obligations, and the terms for the debt, including the amount of principal, interest, payment amounts, payment times, time period, or the like, may be specified in a financial instrument, such as an electronic financial instrument. While various embodiments of the invention are directed to insuring bonds, applications to other types of debt are also within the scope of the invention.

While the descriptions refers may refer to insuring bonds or debts and/or insured bonds or debts, generally the systems, processes, media, devices, and components described herein can be adapted to manage trust bonds or support bonds (in place of insuring bonds) and supported bonds (in place of insured bonds), without departing from the scope of the invention. Generally, where appropriate, the term "trust bonds" or "support bonds" can be used interchangeably with the terms "insuring bonds" or "insuring debts" and the term "supported bonds" can be used interchangeably with the terms "insured bonds" or "insured debts."

The various processes, systems, apparatuses, and media described herein are operated by a processor and/or computer based systems and can produce a tangible results and transformations of the attributes of the computer based components described herein, including an improved credit rating, additional funds, improved resources for issuers to borrow funds and provide services.

Further embodiments of the invention are directed to a computer-implemented method, system, apparatus, and media for minimizing a risk associated with an anticipated value of an investment. An insurer establishes a capital structure within a computer memory of a computer system, the capital structure designed to minimize risk and structured with regulatory capital and a cash stream that is pledged to fund a default on payments associated with the investment. Establishing the capital structure can include allocating regulatory capital based on a coverage factor multiplied by an average annual depression scenario default percentage for the investment and determining a portion of the capital structure for a pledged insuring investment that produces at least a portion of the cash stream. A determination of whether the established capital structure is sufficient to obtain a minimal target credit rating for the insurer is generated. The desired target rating is electronically provided based on the determination.

Other aspects of the invention are directed to a method, system, apparatus and media for managing debt, including managing insurance of debt. Insuring for a default of a debt is managed by establishing an insuring debt related to an insured debt of a debtor based on an insured debt amount of the insured debt. The debts can be bonds issued by a municipality. A first loss class and a second loss class can be allocated in an insuring trust. A first class holder can be entitled to a payment from the insuring debt based on a debt owed to the first class holder from an established insuring fund of the insuring trust. The insuring fund is used to insure for a default of the insured debt. If the insured debt is not in default, the payment is allocated to the first class holder. Otherwise, the payment is intercepted, and an insuring payment from the insuring fund is paid to a holder of the insured debt to cure the default.

At least one objective of the various embodiments of the invention is to operate the various components described herein in a way that assures their long-term creditworthiness and viability including: covering defaults significantly in excess of rating criteria and for the full term of the Insured Bonds; avoiding certain event risks that would be permissible under rating agency criteria; and fully funding capital upon issuance of the Insured Bonds versus reliance upon uncertain future funding, when needed. The various aspects of the invention provide advantages that include significant credit strengths relative to a conventional cash-based equity structure that will create a pricing advantage with bond purchasers and increased confidence among bond issuers e.g., higher default tolerance and for the full term of the bonds; reduced sensitivity to changes in insured portfolio credit profile; superior returns on cash equity and greatly reduced risk; and significant benefits to issuers both to maturity and to the call date from using insurance.

FIGS. 12A to 12E, 13, 14A to 14D, 15 to 20, 21A, 21B, 22A, 22B, 23 to 26, 27A to 27H, 28A to 28I, 29A, 29B, 30A to 30C, 31A to 31I, 32A to 32F, and 33A to 33F show various embodiments of methods, data models and interfaces directed to insuring defaults on debt obligations, including bond obligations using a computer implemented Bond Enhanced Capital Model ("BECM") that is operated by computer systems and electronic exchanges related to the operations of a BECM management company (the "Company"). As used herein, the "Company" refers to a company or other organization that is managing a trust or other transaction pool using the BECM computer based methodology of the present invention. In various embodiments, the BECM is embodied in a method, system, apparatus, and media for funding the capital charges of a bond insurer (i.e., funding potential defaults under a depression scenario) that utilizes a plurality of sources of capital, including Debt service payable on pledged bonds (the "Insuring Bonds") representing a pro-rata portion of each maturity of every Insured Bond Issue; and/or Cash capital derived from a public or private investment.

As used herein, "Insured Bonds" refers to any bonds that are the beneficiaries of a Trust Guaranty by the Insuring Trust. Each Insured Bond Issue can meet certain requirements set forth by the Company at the time that that any portion thereof is designated as Insured Bonds. Insuring Bonds includes bonds deposited into to the Insuring Trust at the direction of the Company and related to a specified Insuring Certificate. In one embodiment, the Insuring Certificate can include the various classes of securities issued by the Trust (e.g., Trust Bonds).

The "Insuring Trust" or "Trust" refers to any entity holding the certain trust certificates and obligated to make payments according to legal obligations using the BECM methods as described herein.

"Insuring Certificate" refers to a trust certificate issued by the Insuring Trust and recorded in computer readable media which grants based on a computer determination to the holder the right to receive the following payments ("Insuring Certificate Payments"), subject to the terms of the trust recorded in computer media and used to program the computer system of the trust, with respect to the right and obligation of the Trustee to intercept such payments to secure each Trust Guaranty made by the Insuring Trust. The programmed terms can include:

Payments of principal on a specific Insuring Bond (the "related" Insuring Bond)

A specified portion of the payments of interest payable on such related Insuring Bond A specified portion of the payments of interest payable (e.g., from a supplemental coupon) on such related Insuring Bond (the coupons is an obligation of the issuer that is characterized in computer processing as a debt of instead of a fee paid by the issuer).

A specified portion of any other payments of interest payable with respect to the Insured Bonds of the same Insured Bond Issue (the "related" Insured Bonds) or Insuring Bonds of the same Insured Bond Issue (the "related" Insuring Bonds)

Other specified amounts from funds available to the Trust including:

Debt service payments on related Insuring Bonds that
            are received by the Trust and that
            are not payable with respect to a specific Insuring Certificate Fees payable to the Trust with respect to the related Insured Bonds Investment income or other funds received by the Insuring Trust "Trust Guaranty" refers to a guaranty of the payment of debt service on designated bonds, which guaranty is programmed to be secured by the right and obligation of the Trustee:

To intercept Insuring Certificate Payments in an amount sufficient to cure any payment default with respect to such designated bonds and To apply such intercepted amounts:
        To the guaranteed payments or
        In the event that such guaranteed payments have been made on behalf of the Insuring Trust from another source (including, without limitation, by the Company or by a liquidity provider), to reimburse such amounts and interest thereon.

The Trust Guaranty may also include (A) a guaranty of the payments due with respect to a line of credit or letter of credit, insurance or reinsurance policy, or similar instrument that secures payment of such designated bonds and (B) a guaranty of the ongoing payments (but not termination payments) due on any interest rate swap or similar interest rate exchange agreement with respect to such designated bonds. A designation of a bond by the Company of Insured Bonds can be recorded in computer media as occurring at the time that the Company enters into a contractual agreement based on such designation, (in one embodiment, regardless of whether such agreement is subject to conditions).

At or around the time that an Insured Bond is designated by the Company, the related Insured Bond Issue can be determined (or required) to meet the following requirements:

The rating of such Insured Bonds can be in one of the four highest rating categories by each Rating Agency (e.g., Baa, A, Aa, or Aaa) then rating such bonds Such Insured Bonds can be categorized as within
        The 1st, 2nd, or 3rd Single Risk categories by Standard and Poor's. In other embodiments, the 1st and $2^{nd}$ categories may be used. In yet other embodiments, only the $1^{st}$ category may be used.
        The 1st, 2nd, or 3rd Municipal Finance Class by Fitch-Ratings, or
        Can be determined by each Rating Agency and the Rating Agency can analyze such bonds to represent an equivalent credit risk (e.g., Moody's Loss Given Default).

A "rating" refers to a credit rating assigned to any Insured Bonds or Insuring Bonds by a Rating Agency. In one embodiment, for purposes of the Insuring Trust, the rating assigned to any such bonds may be recorded as no higher than the credit rating requested by the Company from any such Rating Agency with respect to such bonds.

A "Rating Agency" refers to (e.g., with respect to any series or subclass of Insured Bonds or Insuring Bonds) any nationally recognized rating agency which has provided a rating for such series or subclass at the request of the Company.

In carrying out its business, the Company's computer system can provide guarantees of bonds or other obligations that benefit from a Guaranty by the Insuring Trust. In one embodiment, the provision of guarantees can be performed provided that in the event that the Company makes a payment with respect to its guaranty, it will be entitled based on computer code, triggers, etc. to automatically be reimbursed therefore pursuant to the terms of such Guaranty by the Insuring Trust.

In some embodiments, the computer system of the Company and the Trust may be programmed to exclude the guarantee of Accelerated payments of bond principal unless such accelerated payments (together with the Insured Bond Issue) would meet the Company's and the Insuring Trust's underwriting standards, Swap payments (including accelerated swap termination payments) unless such payments (together with the Insured Bond Issue) would meet the Company's and the Insuring Trust's underwriting standards.

A computer system of the Company and the Trust can also provided online access to real time snapshots of the Insured Bond and Insuring Bond portfolio, thereby providing transparency, and avoiding of event risk and moral hazard risk, including avoiding providing Guaranties of appropriation debt.

Table 2 below is a summary of comparisons of features of the BECM against an Alternate Monoline like model. In some embodiments, some of the BECM features may be present and some of the features may be mixed an/or replaced with the Alternate Monoline like model without departing from the scope of the invention.

TABLE 2

| Structural Elements | Alternate Monoline Like Model | BECM |
|---|---|---|
| Time period withstand depression scenario defaults | Four to six years | Maturity of the Insured Bond |
| Cash Capital | First loss | Second loss behind Insuring Bonds |
| Future capital requirements | Yes | To grow insured portfolio |
| Insured credit portfolio profile | Credit criteria determined company by company. | Investment grade and single risk categories of the highest quality (in other embodiments, different BECM entities may be established to guarantee differing risk categories); Minimize event risk; no: Appropriation debt, Highly correlated credits (e.g., tobacco bonds), and Termination payments and/or acceleration. |
| ROE cash capital | Historic ROE of 15% achieved by incorporating non-municipal credits and lower rated municipals. | 15% ROE with previously stated ratings guidelines. |
| Insurance premium payments | 100% charged upfront to the issuer, refunding bonds permits no recovery of insurance premium either before or after the call date. | 25% will be charged upfront with the balance charged over time a as a coupon on the Insuring Bonds. In other embodiments, this 25% may be variable, changed, or modified as a parameter of the system. The coupon can be characterized as a debt instead of a fee. BECM has a much smaller upfront fee requirement because a portion of the overall fee is paid upfront and the rest of the fee paid over time. If the bonds are refunded, the issuer captures the savings inherent to not paying the premium after the call date. The issuer's cost of insurance to the call date is equal to its cost to maturity. |
| Benefit of unamortized insurance premium due to early bond redemptions | Zero benefit to issuer; all benefits accrues to bond insurer. | Bond issuer pays premium to bond call date. Insuring Bonds create possibility of a large gain for Insuring Bondholders upon redemption on an insured issue. The Insuring Bonds trade as pre-refunded up until the call date. The Company and Regulatory Capital retains the full benefit of the upfront portion of the premium even if bonds are redeemed plus the annual premium while the bonds remain outstanding. |
| Insuring Bonds market dynamics | N/A | Highly dynamic and resilient to market conditions: Wide credit spreads (current market) provide the necessary premium/inducement to the Insuring Bonds. When spreads are narrow, the spreads necessary to induce the Insuring Bondholders will be correspondingly less. |

TABLE 2-continued

| Structural Elements | Alternate Monoline Like Model | BECM |
|---|---|---|
| Leverage Ratio Calculation as percentage of insured par | Assumptions for rating services required cash set asides to cover debt service in case of a default: Four year depression-scenario 1.75% defaults each year Coverage factor 1.5 × Annual debt service equals 8% of par Dedicated Capital = 4 years * 1.75 defaults each year * 1.5 coverage * 8% annual debt service as percent of par 4 * 1.75 * 1.5 * 8% = .84% Leverage ratio = 1/.84% = 119× | BECM dedicates capital in at least two forms: Insuring Bonds equal to a percentage of the total issue. In one embodiment, the percentage is 4%. The percentage can be as high as 1.75% * 3 = 5.25%. Allocated cash = 1.75% defaults each year * 8% annual debt service as percent of par Dedicated Capital = Insuring Bonds + Allocated Capital 4% + (1.75% * 8%) = 4.14% Leverage ratio = 1/4.14% = 24× |
| Years of coverage | Debt service can only cover default for 4 years | Debt service can cover default for life of bond (e.g., 20 years) because there will be constantly new Insuring Bonds added to the pool which has cash streams which can be intercepted for the debt service. In one embodiment, the non-defaulting borrower's cash stream can be used to also cover the default. |

Further differences in the features of the BECM against an Alternate Monoline like model are described below in Table 3. In some embodiments, some of the BECM features may be present and some of the features may be mixed an/or replaced with the Alternate Monoline like model without departing from the scope of the invention.

TABLE 3

| Structural Elements | Alternate Monoline Like Model | BECM |
|---|---|---|
| Regulatory (Cash) Capital requirement | $500 million to $1.0 billion Funded as Common Equity | $200 million Funded as Preferred Equity |
| Cash Capital exposure | First loss | Second loss behind |
| Future additional Cash Capital requirements Common Equity | Yes, pursuant to existing/future rating agency and regulatory Cash Capital requirements Minimum $500 million Common Equity required for Cash Capital Company's net revenues allocated to $500 million Common Equity holders Common Equity diluted by future Cash Capital requirements | Incremental Cash Capital may be required above guarantee portfolio of $120 billion $20 million Common and/or Preferred Equity used to fund Company's infrastructure requirements Company's net revenues allocated to: $20 million Common Equity [$XX] million existing Common Equity No future Common Equity requirements and/or dilution |
| Credit criteria of guarantee portfolio | Credit criteria unique to individual guarantee companies Modified at will by senior management | Pre-defined credit criteria: Investment grade issuers Three most conservative single risk categories (in other embodiments the two most conservative or the single most conservative risk categories may be used instead) Not permitted: Appropriation debt Highly correlated credits (e.g., tobacco bonds) |
| Payment by municipal issuer of Guarantee premiums | 100% charged upfront to the issuer Upon bonds being refunded, no recovery of insurance premium by issuer after the call date | 25% charged upfront with the balance charged annually as a supplemental coupon Upon bonds being refunded, issuer captures the savings inherent to not paying the premium after the call date |

TABLE 3-continued

| Structural Elements | Alternate Monoline Like Model | BECM |
|---|---|---|
| Benefits due to early bond redemptions | Zero benefit to issuer All benefits accrue to bond guarantor | Bond issuer pays premium to bond call date Material gain for Trust Certificates upon refunding |
| Amount of time Guarantor able to withstand depression scenario default of 1.75% per year Standard & Poor's AAA requirement: | Four years Depression Scenario covered 1.5 times | Final maturity of the guaranteed bond portfolio Depression Scenario |
| Leverage Ratio Calculation as percentage of guaranteed par | Assumptions for rating services required Cash Capital to cover debt service in case of a default: Four year depression scenario 1.75% defaults each year Coverage factor 1.5 × Annual debt service equals 8% of par | Dedicated Capital = 4 years * 1.75 defaults each year * 1.5 coverage * 8% annual debt service as percent of par 4 * 1.75 * 1.5 * 8% = .84% Leverage ratio = 1/.84% =119× BECM's dedicated Cash Capital comprises: Trust Bonds equal to 5% of the total issue Allocated cash = 1.75% defaults each year * 8% annual debt service as percent of par Dedicated Capital = Insuring Bonds + Allocated Capital 5% + (1.75% * 8%) = 5.14% Leverage ratio =1/5.14% =19× |
| Example: | Dedicated Capital cost for $100 million Issue A− rated City GO 20 year level debt $7,800,000 annual debt service Legacy Insurer ROE-15% Dedicated Capital Cost: 7% * $7.8 mm * 1.5 × $819,000 Annual Cost of Dedicated Capital: 15% * $819,000 $123,000 | Dedicated Capital Cost Trust Bond Cost: $5.0 mm * 1.25% $62,500 Cash Capital Cost: 15% * 1.75% * $7.8 mm $20,500 Annual Cost of Dedicated Capital: $62,500 + $20,500 |

As described herein, a computer system can be programmed to perform actions for managing the BECM, including paying funds, issuing obligations, credits, or the like. Such financial transactions include recording data in a tangible readable medium in accounts of the parties involved in the transactions and/or transmitting data over a computer network, such recording and transmitting comprising an electronic exchange.

FIGS. 12A to 12E show embodiments of systems for managing debt insurance over a computer network. As shown, network/communication medium 1206 provides communication to a plurality of computer based components, including debt holder(s) 1202, guarantor 1204, issuers 1206-108, trust 1220, trust certificate holders 1216-1217, trustee 1218, and rating agency 1214. The network/communication medium 1206 can be a computer network, such as a wireless network, Local Area Network (LAN), Wide Area Network (WAN), or the like, and/or the memory and/or bus of a computing device. As shown, each of the components of the systems of FIGS. 12A to 12E are computer implemented components. The components can communicate with each other using a networking interface, a networking protocol, in memory operating system calls, remote procedure calls, or the like. The components may provide a interface for receiving commands from users and/or providing information to users. The components can be combined in one device, separated into several different devices, or the like, without departing from the scope of the invention. In one embodiments, the components may be included in or configured as the device of FIG. 13. In one embodiments, the components may use the data models and user interfaces of FIGS. 14A to 14E, 26 to 33F to perform their operations. In one embodiment, the components of the systems of FIGS. 12A to 12E can be perform the processes of FIGS. 15 to 25.

In one embodiment, the components of FIG. 12A to 12E may be programmed with parameters and instructions to reflect the instructions for structuring the various components of the BECM system in accordance with the requirements of ATTACHMENT A. ATTACHMENT A shows one example of a definition for implementing the BECM system.

Under the BECM, bonds 1211 that an issuer 1208 wants to insure can be subdivided into two parity series which can be sold simultaneously:

insured debt 1209 sold with the benefit of an AAA guaranty by an monoline insurer or similar guarantor to debt holders 1202

Insuring debt 1210, representing a pro-rata portion of every maturity, sold on an uninsured basis In general, issuers 1206-1208 can include any computer implemented component configured for establishing an insured debt 1209 related to an insuring debt 1210 of a debtor based on an insured debt amount representing at least a proportion of the insured debt, wherein the proportion is maintained constant for any redemption from the insured or insuring debts. As shown, issuer 1208 may include insured debt 1209 and insuring debt 1210. Insured debt 1209 and insuring debt 1210 can comprise any computer based component, including software executing and combined with hardware, a database, or the like, configured to maintain records relating to payment, obligations to debt holders such as those associated with at least one of debt holder(s) 1202, and other terms (interest, maturity date, etc.) for the respective debts.

Debt holder(s) 1202 can include any computer implemented component configured to assume, retire, or otherwise manage debts for a holder of debts. Debt holder(s) 1202 can include computer interface for managing such debts, trading the debts, transferring funds, amounts paid from coupons, or the like.

The portion of each maturity represented by the insuring debt 1210 can be sized so that the debt service thereon exceeds the level of average annual defaults that can occur under the rating agencies 1214 four-year depression scenario plus coverage sufficient to meet the AAA rating criteria. For example, for an A rated city Governmental (GO) bond 1211, the capital charge is 7%, representing an annual default of 1.75% per annum over the four-year period. At a 2 times coverage multiple, the insuring debt 1210 can represent 3.5% of the total bonds of each maturity. Correspondingly, at a 3 times coverage multiple, the insuring debt 1210 can equal 5.25% of each maturity. In those two examples, the insured debt 1209 can be sized at 96.5% and 94.75% of the total bond 1211 issue, respectively.

In general, rating agency 1214 can include any computer implemented component configured for receiving, over the network 1206, a credit information record of the insured debt based on insurance payment structuring for the insured debt; and providing an increase in a credit rating for the insured debt based on the received credit information record.

The proceeds of the Insured Bond 1209 and insuring debt 1210 can equal 100% of the proceeds required by the issuer(s) 1206-108, just as in the case of an uninsured issue or a conventionally structured monoline insured issue. In the 2 times coverage example, approximately 96.5% of the proceeds can be raised from the sale of the insured debt 1209 while the remaining 3.5% can be raised from the sale of the insuring debt 1210. The insured debt 1209 can be priced with an insured coupon and the insuring debt 1210 can be priced with an uninsured coupon.

The cost of the credit enhancement can represent a targeted percentage (e.g., 75%) of the total yield benefit between uninsured bonds and AAA insured bonds (e.g., insured debt 1209), leaving the issuer(s) 1206-1208 the remainder of the benefit of (e.g., 25%). One difference in the BECM approach from the historic monoline practice is that most of the cost of insurance can be paid by the issuer(s) 1206-1208 over time. For example, a smaller portion (e.g., 25% of the 75%) of the cost can be paid up front (step 12016 and 12032) and the remainder (e.g., 75% of the 75%) can be paid over time (step 12046). The credit enhancement payment over time can be structured as an additional coupon on the insuring debt 1210, for example, as an additional 250 basis points on each insuring debt 1210 maturity. This reduction in the upfront cost of insurance can have a significant benefit to issuers 1206-1208 since their cost of insurance to the call date can be significantly reduced. This process may eliminate a significant shortcoming of traditional monoline insurance—that the issuer's savings to the call date were significantly lower and, perhaps, nonexistent.

In addition to the use of two series (one insured and one uninsured) and the payment of an additional coupon on the uninsured bonds, there is one other requirement on the issuer that is unique to the BECM. The issuer(s) 1206-1208 can be configured such that a redemption of the bonds can be executed pro rata among the Insured and Insuring Bonds of each maturity so as not to reduce the percentage of Insuring Bonds in any maturity (step 12606).

The issuer 1206's insured debt 1209 can be sold to the public in a typical manner. However, the insuring debt 1210 can be priced by the issuer 1206 as uninsured bonds, but may not be sold directly to the public. Rather, the insuring debt 1210 can be deposited into a trust 1220 (e.g., the Insuring Trust) (step 12022) in exchange for payment of the proceeds thereof (steps 12024, 12020, 12014, and 12030).

The Insuring trust 1220 can simultaneously raise an identical amount of proceeds (steps 12026, 12028) by selling trust certificates 1216-1217 (step 12026) with respect to the insuring debt 1210 that may pass through to the purchaser of each certificate 1216-1217 (a) the following payments made with respect to a specific corresponding insuring debt 1210: the bond principal and the bond interest (at the uninsured rate) (step 12044) and (b) a portion of the bond interest payable with respect to the Insuring Bonds, which may exceed the interest payable on such specific insuring debt (steps 12064, 12066).

In order to permit the insuring debt 1210 sold through the trust 1220 to be priced efficiently, they can be divided into various subclasses 1221-1222. In one embodiment, the various subclasses can be the various sub-pool described above where the nature of the risk within the sub-pool is similar. There are two basic types of subclasses: loss position subclasses 1221-1222 and loss category subclasses. The purpose of the various subclasses is to create efficient pricing of the insuring debt 1210 by making it simple for insuring bondholders 1220 (and associated certificate holders 1216-1217) to understand the risk that their cash flows can be intercepted (steps 12064, 12066). In particular, the risk to Insuring Bondholders of having their cash flows intercepted can be configured to be as similar as possible to the risk of nonpayment of their underlying bonds. Conversely, the risk that cash flows can be intercepted to fund a default within a riskier credit type may be extremely remote. Loss category subclasses are intended to group Insuring Bonds into subclasses where the underlying bonds have similar risks. For example, GO bonds and sales tax bonds can be in different loss category subclasses. Loss position 1221-1222 subclasses are intended to indicate the order in which Insuring Bond cash flows can be intercepted within the same loss category subclass.

For example, the insuring debt 1210 can be divided by the trust 1220 into several "loss position" subclasses 1221-1222 which are subject to having their cash flows intercepted (in the case of a default) in a prescribed order (steps 12064, 12066). The number of loss classes is not critical and will generally range from 2 to 10 and preferably is 2 to 5. In one embodiment, the insuring subclasses 1221-1222 do not enhance each other, but only the insured debt 1209 (steps 12064, 12066). Accordingly, the insuring subclasses 1221-1222 for each insured issue have two rating attributes:

The "underlying rating" of the issuer 1208—in our example above, an A rating; and The "structure rating" of the insuring subclass 1221-1222—a separate target rating of the subclass that reflects the risk that the debt service of the subclass can be intercepted to fund an insured default.

Insured Bonds—AAA
$5^{th}$ loss—AA
$4^{th}$ loss—A
$3^{rd}$ loss—BBB
$2^{nd}$ loss—BB
$1^{st}$ loss—NR In the event of a default by an issuer 1206-1208 whose bonds are insured under the BECM, the loss can be allocated, first, to the insuring debt 1210 of that same issuer 1206 (the "related" Insuring Bonds) by loss position subclass 1221-1222 (step 12066) and, second, to the Insuring Bonds of other issuers 1208 ("nonrelated" Insuring Bonds), also by loss position subclass 1221-1222 (step 12064). In the event that payments due to a nonrelated Insuring Bondholder are diverted to cure a default (step 12064), future payments due to the related Insuring Bondholders can be intercepted to make the nonrelated Insuring Bondholders whole (step 12064). The subordination of the Insuring Bonds of each issuer(s) 1206-1208 in the case of a default by that issuer 1206 not only to the insured debt 1209 of that issuer 1206, but also to all other insured debts, together with a conservative underwriting approach, as described below, make it highly unlikely that Insuring Bonds will suffer an ultimate nonpayment (as compared to a temporary nonpayment) due to a default of a nonrelated issuer 1208.

In general, trust 1220 can include any computer implemented component configured for allocating, in an insuring trust, a first loss class having a first loss class holder associated with one of debt holder(s) 1202 and a second loss class having a second loss class holder associated with another one of debt holder(s) 1202. In one embodiment, trust 1220 is configured to provide the first loss class holder (of loss class 1221) with an first electronic certificate in the insuring trust related to the insured debt, and to provide the second loss class holder (of loss class 1222) with a second electronic certificate in the insuring trust unrelated to the insured debt, and wherein the insured and insuring debts are bonds. As shown, trust 1220 includes loss class 1221-1222. Loss class 1221-1222 can comprise any computer based component, including software executing and combined with hardware, a database, or the like, configured to maintain records relating to subordination of payments between the loss classes, payment terms for each loss class, or the like. Loss class 1221-1222 can include software combined with hardware for routing, over network 1206, payments from or to trust certificate holders 1216-1217 associated with the appropriate loss classes 1221-1222. For example, loss class 1221 may be associated with trust certificate holder 1216, and loss class 1222 may be associated with trust certificate holder 1217.

In one embodiment, trust 1220 is configured for routing, over the computer network 1206, a payment payable from the insuring debt 1210 to a first class holder in the first class, wherein the first class holder is entitled to the payment based on a debt to the first class holder of an insuring fund of the insuring trust 1220, and wherein the insuring fund is for insuring an obligation to make payments for the insured debt 1209.

In one embodiment, routing, by trust 1220, to the first loss class holder the related payment further comprises allocating the related payment, such that: (a) a portion of a defaulted insured debt service for a default of an obligation on the insured debt is deducted from the related payment; and (b) a portion of the defaulted insured debt service for the default of the obligation is deducted from the related payment, if another debtor defaults on an unrelated obligation and the first loss class is junior to the second loss class; and (c) a portion of the related payment is added to an unrelated payment, if a portion of a prior unrelated payment from an unrelated insuring debt was used to fund the defaulted insured debt service for the insured debt.

In one embodiment, trust 1220 is configured for routing to the second loss class holder the unrelated payment for an unrelated insuring debt, by allocating the unrelated payment, such that: (a) a portion of the defaulted insured debt service for a default of the unrelated obligation is deducted from the unrelated payment; and (b) a portion of the defaulted insured debt service for the default of the unrelated obligation is deducted from the related payment, if the debtor defaults on the obligation and the second loss class is junior to the first loss class; and (c) a portion of the unrelated payment is added to the related payment, if a portion of a prior related payment from the insuring debt was used to fund the defaulted insured debt service for the unrelated insured debt.

Trust certificate holders 1216-1217 can include any computer implemented component configured to assume, retire, or otherwise manage certificates of trust 1220 for a holder of certificates. Trust certificate holders 1216-1217 can include computer interface for managing such certificates, trading the certificates, transferring funds, amounts paid from coupons, or the like.

Trustee 1218 can include any computer implemented component configured for receiving, over the network 1206, non-default principal and interest payments for the insured debt and the insuring debt from the issuer component; and routing pro-rata amounts of the non-default payments between holders of the insured debt and the insuring trust that holds the insuring debt.

In the case of insured debt 1209 under the BECM, the Insured Bondholder is protected from the risk of nonpayment both by the issuer 1206-1208's credit and by the bond insurer 1204's credit. Although there are two relevant ratings, for bond insurer 1204 and bond issuer 1206-1208, since both ratings relate to the same risk (nonpayment of the issuer's bonds), the insured credit and rating supersede the uninsured credit and rating. However, in the case of the insuring debt 1210, the underlying rating and structure rating reflect two distinct credit risks for the trust certificate holders 1216-1217: the risk that the related borrower will not pay and the risk that the insuring debt 1210's debt service will be intercepted due to a default by a nonrelated issuer. The Insuring Bondholder 1220 (and related certificate holders 1216-1217)'s direct exposure to the underlying credit discourages adverse selection in the composition of the insured portfolio. Since the Insuring Bondholders 1220 (and related certificate holders 1216-1217) of each issuer 1206-1208 are primarily responsible for a default by that issuer, they are incentivized to make prudent decisions with respect to purchasing insured debt, which can in turn affect the viability of including weaker credits in the insured portfolio.

Although permitted to be insured under current monoline rating criteria, in one embodiment, the insured portfolio can exclude bonds with significant event risk. For example, appropriation bonds may not be insured by the trust 1220, with the possible exception of highly structure credits that effectively eliminate the possibility of non appropriation. The insured portfolio can be restricted to conservatively selected bonds (e.g., GO, special tax and revenue) with underlying ratings of BBB or better, of which the overwhelming majority can be rated in the A category. So, under conventional pooled rating criteria, all of the insuring subclasses 12212 can be rated BBB or higher. However, in the case of the 1st and 2nd loss position subclasses 1221-1222 the target structure rating reflects (a) the possibility of a deterioration in the underlying ratings of the insured portfolio and (b) the desire to maintain stable ratings for all of the insuring subclasses 1221-1222, even in the event of such a deterioration of the portfolio credit quality. Also, the rating criteria for monoline insurers with target ratings below AAA include a capital charge for all (or substantially all) insured debt 1209 with ratings below AAA, even if the rating of the Insured Bond 1209 is higher than the monoline insurer's target rating.

For example, an A rated monoline is required to cover the same assumed defaults as a AAA monoline based on credit type and rating category. However, the coverage for an A rated monoline is 0.8 times the assumed depression scenario defaults. Moreover, if an Insured Bond 1209 is rated at or above the target rating of a monoline insurer's, that coverage requirement is further reduced, e.g., to 0.25% thereof for a AA rated insured debt 1209 and to 0.2% thereof for an A rated Insured Bonds 1209. In structuring the insuring debt 1210, coverage targets can be extrapolated based on the existing criteria for AA and A rated monoline insurers in order to create coverage targets for a BBB (0.64 times assumed defaults) and BB rated monoline insurer (0.56 times assumed defaults).

Each insuring subclass 1221-1222 can be managed, stored, and used of as a monoline insurer whose function is to raise the structure rating of the insured debt 1209 (based on the monoline criteria discussed above) to the target rating of the next higher subclass. So, the 1st loss subclass 1221 can contain enough insuring debt 1210 to meet the capital charges and coverage levels that can be assessed on a BB monoline insurer that insured the underlying bonds. Similarly, the 2nd loss subclass 1222 can contain enough insuring debt 1210, together with the 1st loss subclass, to meet the capital charges and coverage levels that can be assessed on a BBB monoline insurer that insured the underlying bonds, and so on and so forth. However, the insuring subclasses 1221-1222 do not face the same adverse selection issues that can face a similarly rated conventional monoline insurer, which may rely on insuring credits which do may not appeal to more highly rated insurers.

The Insuring trust 1220 can hold the insuring debt 1210 of all of the participating issuers 1206-1208. In the event of a payment default of a particular issuer 1208, the Trust can intercept the debt service on the insuring class of bonds (in the order prescribed by the terms of the Insuring trust 1220), first those issued by the defaulting issuer 1208, and secondly other unrelated insuring debt 1210 payments from all other issuers 1206, to fund the payment shortfall of the defaulted Insured Bond debt service. In one embodiment, no local government are affected by the default of another issuer(s) 1206-108. The Insuring Bondholders 1220 (and related certificate holders 1216-1217) can be compensated for taking the first loss position relative to the insured debt 1209 by realizing a higher yield than the Insured Bondholder or a typical uninsured bondholder. As the loss position subclass 1221-1222 of the insuring debt 1210 gets lower, the higher the yields that can be paid to the Insuring Bondholders 1220 (and related certificate holders 1216-1217). The higher yield can come from the additional coupon paid by the issuer 1207. The portion of the coupon not paid to the Insuring Bondholders 1220 (and related certificate holders 1216-1217) can be applied by the trust 1220 either to pay operating expenses of the trust 1220 and guarantor 1204, to fund an appropriate return on the cash equity of the guarantor 1204, or to provide a profit margin to the trust 1220 and the guarantor 1204.

The use of the insuring debt 1210 deposited in the trust 1220 is to pre-fund, as the bonds are issued, an amount of capital that is sufficient to pay (ignoring timing issues) debt service for the full life of the portfolio on defaulted insured debt 1209 representing a significantly greater percentage of the insured portfolio than either (i) the assumed depression scenario defaults or (ii) the actual level of four-year defaults that have historically been covered by monoline equity. In other words, the BECM is much less leveraged than traditional monoline insurers due both to the higher coverage of assumed defaults and to covering that higher level of defaults for the life of the bonds. If permissible under rating criteria, for specific issues of bonds, the capital required under such criteria (e.g., four years of depression-scenario defaults at a minimum coverage of 1.25 times) can be funded with cash only.

Prior to the issuance of Insured Bonds 1209, the available capital can meet the capital requirement for existing insured debt 1209 after taking account of management policies with respect to coverage of assumed defaults and cash equity. For example, available capital can cover the annual depression-scenario assumed defaults by at least 2 times with Insuring Bond debt service and 1 time with cash equity. Such Insuring Bonds can inherently cover the annual depression-scenario assumed defaults by the same margin not only for the four-year depression period, but for the life of the insured portfolio.

If the available capital were to precisely meet such requirement, then at the time additional Insured Bonds were issued, additional capital comprised of insuring debt 1210 and equity can be identified to cover the incremental capital requirement relating to such additional bonds so that upon their issuance, the available capital meets the aggregate capital requirements for such insured debt 1209 and all outstanding insured debt 1209 of the guarantor 1204. In the case of an A rated city general obligation bond (1.75% assumed annual depression-scenario defaults), Insuring Bonds representing 3.5% of the issue, together with cash equity representing 1.75% of annual debt service, can meet the incremental capital requirement for the aggregate insured portfolio.

Note that while the insuring debt 1210 of each issue fund an amount of capital that helps to provide the incremental capital required to add such issue to the insured portfolio, such insuring debt 1210 may not provide the credit enhancement that enables the related insured debt 1209 to be rated AAA. Rather, the source of the AAA rating for such related Insured Bonds can be derived from the portfolio of nonrelated insuring debt 1210 whose debt service can be intercepted by the Insuring trust 1220 in the event of a default of the related borrower.

The extent to which the very defaults for which protection is sought can adversely affect the protection provided by the Insuring trust 1220 can be directly quantified. As noted, the insuring debt 1210 can represent a multiple of the assumed defaults under the rating criteria. However, assume that in the overall portfolio the actual defaults equal the same percentage as the insuring debt 1210, e.g., the insured debt 1209 equal 3.5% and the actual defaults equal 3.5% (2 times the assumed defaults). Under those assumptions, 3.5% of both the insured debt 1209 and insuring debt 1210 can default. So, the non-defaulting insuring debt 1210 can be 96.5% of 3.5% of the portfolio and the defaulting insured debt 1209 can equal 3.5% of 96.5% of the portfolio. In other words, even given defaults much higher than the assumed worst case, the non-defaulting insuring debt 1210 can be sufficient to fund the insured default. If we were to assume a default equal to the typical default tolerance of a traditional monoline, 1.5 times 1.75% or 2.625%, the non-defaulting insuring debt 1210 can equal 97.375% of 3.5% or 3.408% of the entire issue. The defaulting insured debt 1209 can equal 97.6% times 3.625% or 3.533% of the issue. So the non-defaulting insuring debt 1210 can cover the defaulting insured debt 1209 by 1.34 times. Moreover, a 2.625% default over four years can wipe out the capital of the traditional monoline, which may have to raise additional capital to maintain its claims-paying ability. Whereas, the BECM can continue to have insuring debt 1210 in subsequent maturity and do not, in one embodiment, suffer any diminution of its claims-paying ability.

Cash capital is also required to achieve a AAA rating. In one embodiment, the cash portion of the BECM capital will be held by a separate public or corporate entity associated with and managed by the computer component guarantor 1204. Such cash capital will be critical to supporting BECM during its start-up phase, when the insured and Insuring Bond portfolio is too small to compensate for loss anomalies that can arise within statistically small portfolios. It will also be needed to cover payment timing differences between insured debt 1209 and insuring debt 1210 that are not of the same bond series and payment date. Any draw on the guarantor 1204's cash capital can be reimbursed by the trust 1220 from intercepted debt service payments on insured debt 1210. Consequently, the risk to cash capital under the BECM is far lower than in a traditional monoline structure since such capital is protected by the insured debt 1210, which are structured at a level in excess of the rating agency(s) 1214's AAA criteria.

In one embodiment, the initial amount of cash equity (e.g., $200 million) can meet the rating agency(s) 1214's historical criteria for awarding a AAA rating to a start-up monoline insurer. Although the overall leverage of Insuring Bond and cash capital is much less that under a traditional monoline structure, the amount of leverage viewed against cash only is much higher. The amount of cash equity which may be appropriate to allocate to each insured credit, in one embodiment, equals the amount of one year's assumed defaults, or 1.75% in our A-rated example above. By contrast the capital allocation under a conventional monoline structure can be 1.5 times 1.75% for a four-year period, or six times the allocated cash equity under the BECM. Accordingly the bond insurance capacity under the BECM per dollar of cash equity is a multiple of the insurance capacity per dollar under a traditional approach.

Guarantor obligations to insured bondholders 1202 in the event of a borrower default are payable to the issuer(s) 1206-108's bond trustee 1218 or paying agent and can be covered by available assets in the following priority order:

Payments on related and unrelated insuring debt 1210 made available by the trust 1220

Draws on liquidity facilities of the guarantor 1204 or Insuring trust 1220; such facilities can be secured by the trust 1220's right to intercept debt service payment on the insured debt 1210

Draws on cash capital of the guarantor 1204 to the extent needed to (a) address payment timing differences of insuring debt 1210 and insured debt 1209 of different series and (b) support guarantor 1204 payment claims in the remote likelihood that insuring debt 1210's funds are depleted.

In general, guarantor 1204 can include any computer implemented component configured for guarantying a default by issuers 1206-108. Guarantor 1204 can include databases or other software combined with hardware for using over network 1206 for sending and receiving notifications of a sufficiency of funds in trust 1220, a need for paying an insured amount, interest or fees for guaranteeing the payment, or the like. In one embodiment, guarantor 1204 may be configured for receiving, over the network 1206, a payment by the trust 1220 for insuring the insured debt 1209; receiving an insuring trust payment in an amount of the defaulted insured debt service; and routing to the trustee component, based on the received insuring trust payment, a default amount sufficient to satisfy the obligation on the insured debt 1209. In one embodiment, guarantor 1204 may be configured for receiving, over the network 1206, an upfront payment from the issuer component 1208 for guarantying the insured debt; pre-funding at least a portion of the insuring trust 1220 with funds from the first loss class holder of loss class 1221 that are received in exchange for a first electronic certificate (e.g., held by trust certificate holders 1216-1217) for the first loss class 1221; receiving a contractual record indicating a right to receive a portion of the principal and interest in the insuring debt 1210's cash flow, if the default occurs; sending, to the insuring trust component 1220, a portion of the upfront payment, wherein the portion of the upfront payment is configured to be paid by the insuring trust component 1220 into the defaulted insured debt service if the default occurs. In one embodiment, guarantor 1204 may be configured for receiving, over the network 1206, a portion of interests in at least one of a plurality of debts managed by the insuring trust component 1220.

Figure 12A:
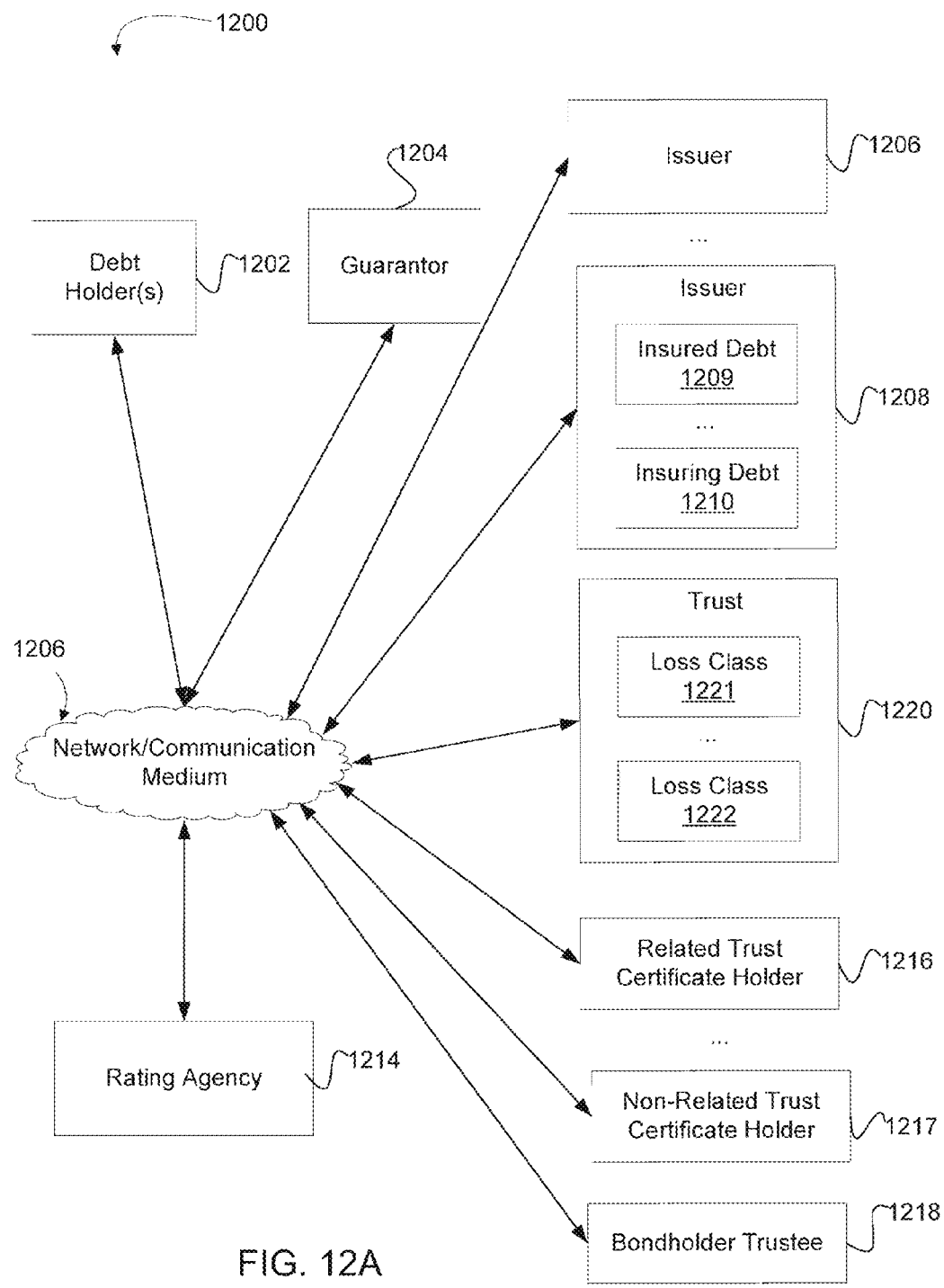
FIGS. 12A to 12E are functional block diagrams of illustrative systems for managing debt according to another embodiment of the present invention.
Figure 12B:
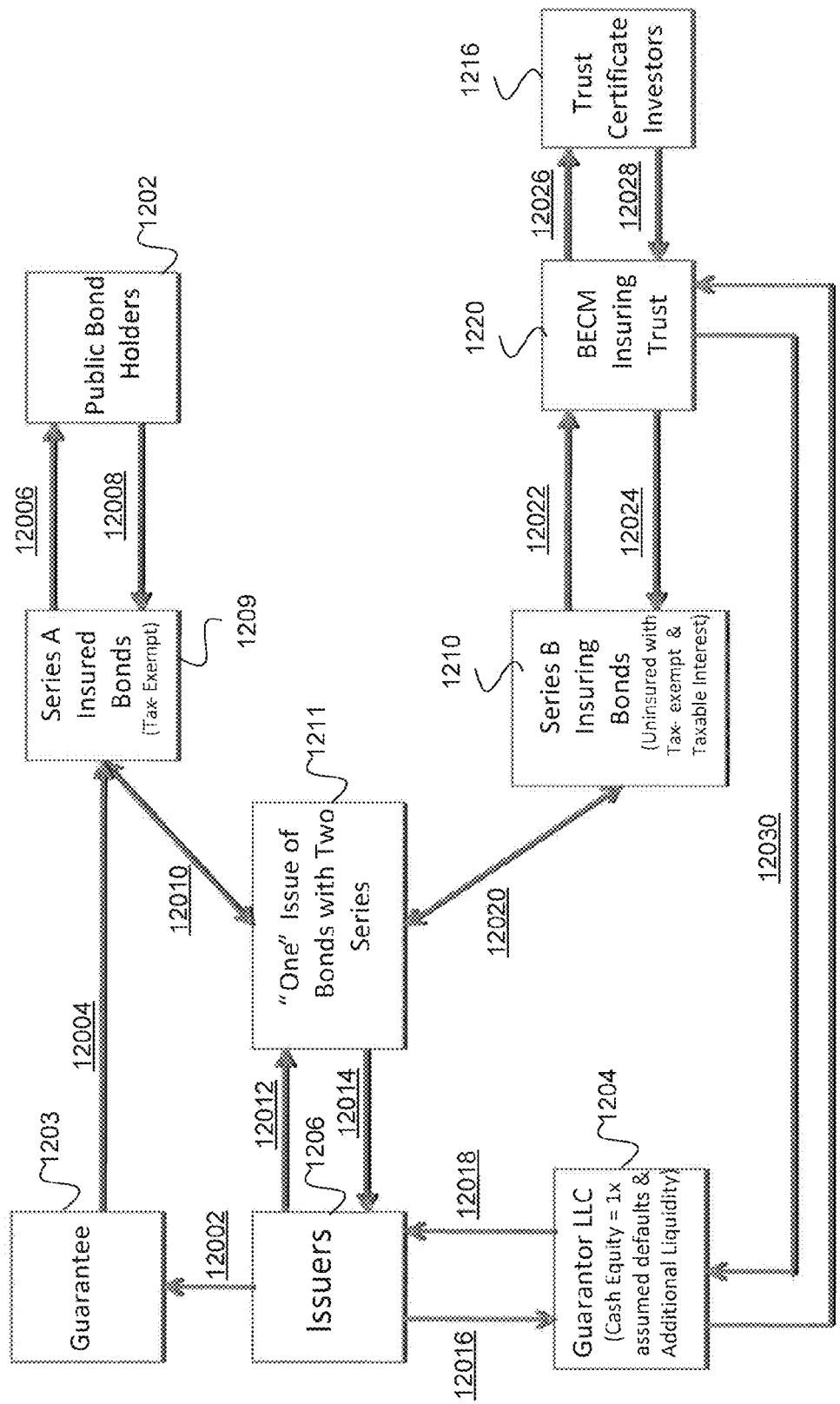

FIG. 12B shows a process and data flow between the various components upon issuance of insurance of the debts. The data transfers shown can be performed over network 1206 between computer based components. As shown in FIG. 12B, issuer 1206 may issue "one" issue of bond 1211 with two series, by sending bonds information for 100% of bonds to component 1211 using data transfer 12012. Bond component 1211 may issue a percentage of the bonds (e.g., 97%) to series A insured debt 1209 using data transfer 12010. Series A insured debt 1209 issues the bonds (e.g., 97% of the bond 1211) to public bond holders 1202 using data transfer 12006. Public bond holders 1202 then pays the net proceeds (e.g., 97% of the proceeds for bond 1211) to series A Insured Bonds using data transfer 12008. Series A insured debt 1209 then sends the net proceeds to bonds 1211 using data transfer 12010.

Bond component 1211 may issue another percentage of the bonds (e.g., 3%) to series B insuring debt 1210 using data transfer 12020. Series B insuring debt 1210 then issues the bonds to BECM insuring trust 1220 using data transfer 12022. BECM insuring trust issues certificates associated with at least some of the bonds to trust certificate investors 1216 (and/or 1217) using data transfer 12026. Trust certificate investors 1216 pays net proceeds (e.g., 3% of the proceeds for bond 1211) for the trust certificates (associated with the Insuring Bonds) to BECM insuring trust 1220 using data transfer 12028. BECM insuring trust 1220 pays the net proceeds to series B insuring debt 1210 using data transfer 12024. Series B insuring debt 1210 pays the net proceeds to bond 1211 using data transfer 12020. Bond component 1211 then pays the 100% of net proceeds by combining the net proceeds from series A insured debt 1209 and series B insuring bonds 1210 to issuers 1206 using data transfer 12014.

Issuers 1206 may send an upfront premium (CES) to guarantor 1204 using data transfer 12016. Guarantor 1204 may send a portion of the upfront premium paid to the BECM insuring trust 1220 using data transfer 12032. BECM insuring trust 1202 may retain the portion of the upfront premium and may create a record indicating a right to receive a portion of the principal and interest of Insuring Bonds, including series B insured debt 1210, in the vent of default of at least one of Insured Bonds, including series A Insured Bonds. BECM insuring trust 1202 may send the record indicating the right to guarantor 1204 using data transfer 12030. In response, guarantor 1204 may create a guarantee record for use in guaranteeing a debt, including series A Insured Bonds 1209. Guarantor 1204 may send the guarantee record to issuers using data transfer 12018.

Issuers 1206 may send information to the guarantee record for the series A insured debt 1209 to guarantee 1203 using data transfer 12002. Guarantee 1203 may then monitor and manage the guarantee of the series A Insured Bonds and may route appropriate payments to pay the interest, coupons, principal, or other obligation for series A Insured Bonds 1209. Guarantee 1203 may send a mechanism for receiving the guarantee to series A insured debt 1209 using data transfer 12004. The mechanism may include a password, identifier, or the like, to identify the guarantee obligation to series A Insured Bonds 1209.

Figure 12C:
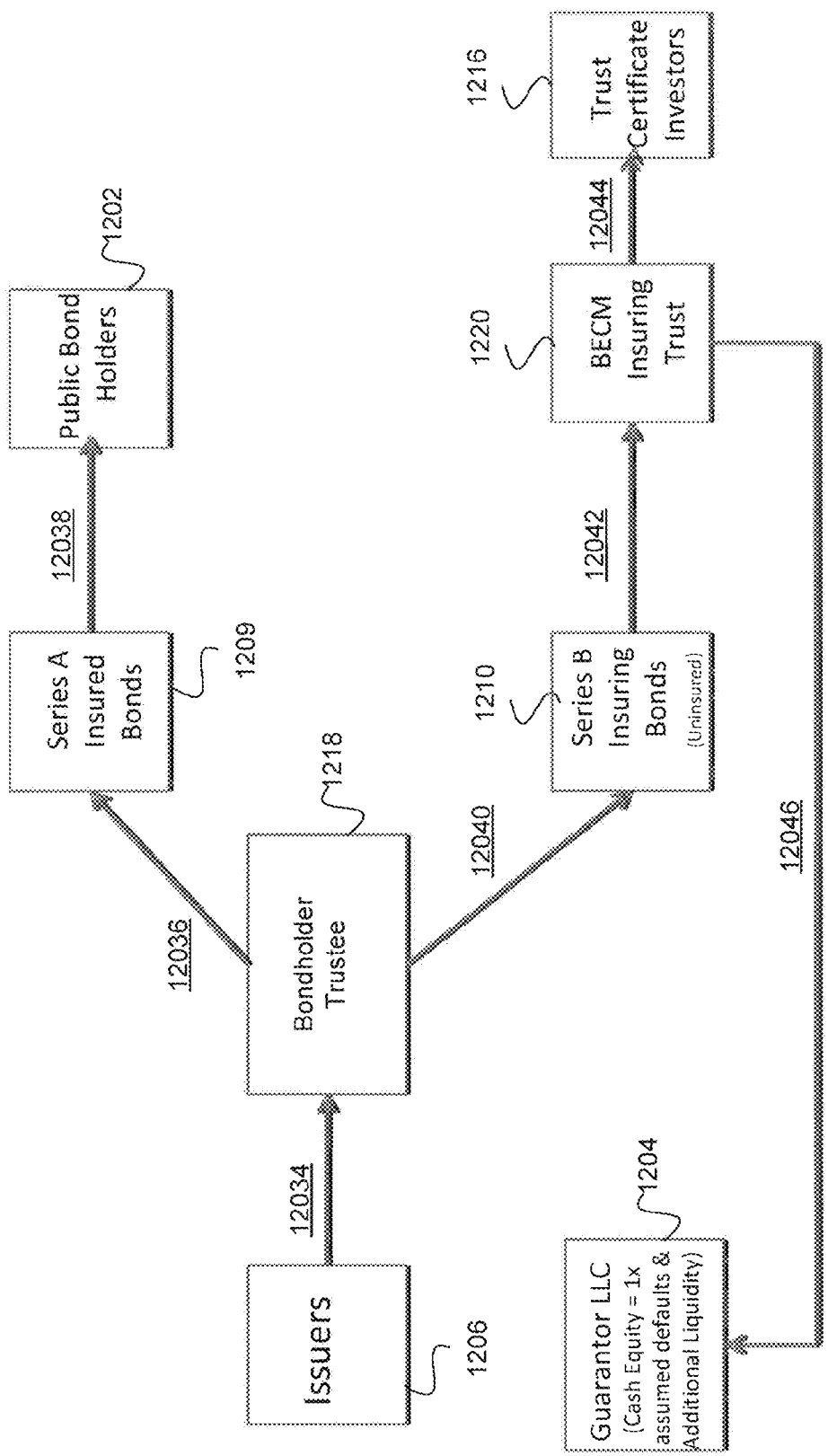

FIG. 12C shows a process and data flow between the various components during the on-going cash flows of the BECM. As shown, issuers 1205 pays principal and interest to trustee 1218 using data transfer 12034. Trustee 1218 pays the insured principal and interest payments to series A insured debt 1209 using data transfer 12036. Series A insured debt 1209 pays the repayment to the public bond holders 1202 for the bonds using data transfer 12038. Trustee 1218 also pays the uninsured principal and interest and interest payments to series B insuring debt 1210 using data transfer 12040. It should be noted that the upfront CE premium plus the interest on the uninsured bonds are similar or even equivalent to the monoline insurance premium and may equal a targeted percentage of the benefit of insuring the issuer's entire bond issue. The series B Insuring Bonds sends the payments to BECM insuring trust 1220 using data transfer 12042. The BECM insuring trust 1220 sends repayments to trust certificate investors 1216 using data transfer 12044. The BECM insuring trust 1220 also sends a portion of the interest paid to the guarantor 1204 using data transfer 12046.

Figure 12D:
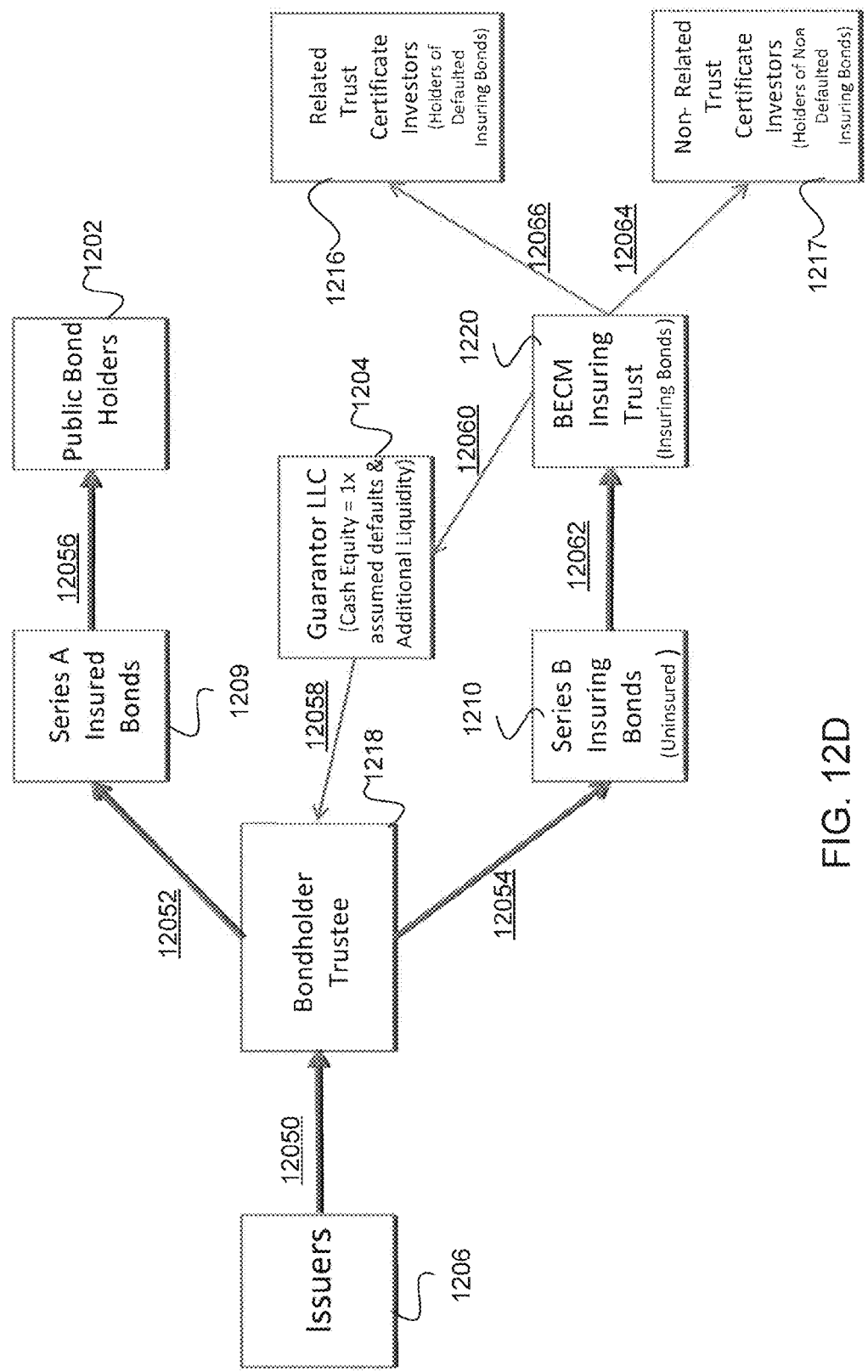

FIG. 12D shows a process and data flow between the various components upon issuer default. In this scenario, one of issuers 1208 defaults on a payment for insured debt 1209. Issuers 1206 pays non-defaulted principal and interest payments if any to trustee 1218 using data transfer 12050. Trustee 1218 pays a pro rata share of the non-defaulted uninsured principal and interest payments to series B insuring debt 1210 using data transfer 12054. Series B insuring debt 1210 pays a pro rata share of payments to BECM insuring trust 1220 using data transfer 12062. BECM insuring trust 1220 pays payments equal to the defaulted insured debt service to guarantor 1204 using data transfer 12060. BECM insuring trust 1220 may also pay a payment due less defaulted insured debt service to the related trust certificate holders 1216 who hold the insuring debt 1210 that are related to defaulted Insured Bonds 1209. BECM insuring trust 1220 may also pay a payment due less defaulted insured debt service net of payments made for related Insuring Bonds (e.g., previously made) to the non-related trust certificate holders 1217 who hold the Insuring Bonds that are related to defaulted Insured Bonds 1209. Guarantor 1204, using at least a portion of the payments received using data transfer 12060, sends a payment to make up deficiencies in the series A bonds' payments to trustee 1218 using data transfer 12058. Trustee 1218, using the received payment from data transfer 12058, sends pro rata share of non-defaulted insured principal and interest payments to series A insured debt 1209 using data transfer 12052. Series A insured debt 1209 sends a pro rata share of repayments to public bond holders 1202 using data transfer 12056.

Figure 12E:
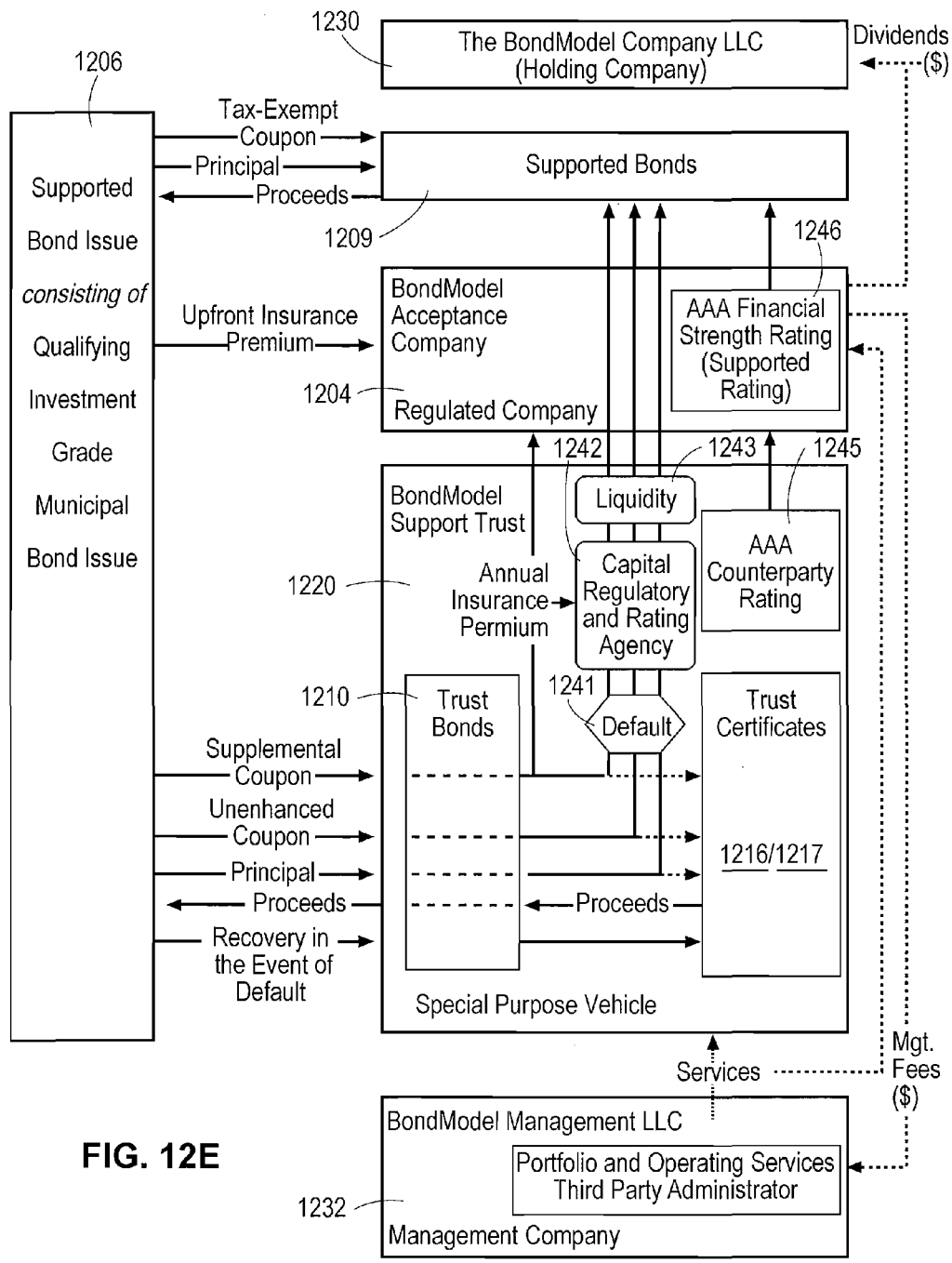

FIG. 12E shows a process and data flow between the various components of another embodiment of the BECM system. This system configuration is similar to the systems described above, except that the system includes BECM (BECM) holding company computer system 1230, BECM (BECM) Management LLC computer system 1232. Holding company 1230 holds a plurality of companies/guarantors. Moreover, BECM Acceptance Company (Guarantor) 1204 is configured to operate as a regulated company for insurance law purposes and holds adequate regulatory capital as required by insurance law. Guarantor/regulated company 1204 is paid an upfront insurance premium by issuer 1206.

BECM Capital Trust (BECM insuring trust) 1220 also includes additional sources of liquidity 1243, rating agency capital 1242 that is sufficient to satisfy a rating agency's amount of capital to rate the trust a pre-determined rating (e.g., AAA), and default determination mechanisms 1241. Proceeds from the sale of the trust certificates 1216/1217 are paid, for each trust bond(s) 1210, to the issuer 1206. Trust 1220 is configured as a special purpose vehicle.

In operations, issuer 1206 issues (from qualifying investment grade municipal bond issue) supported bond(s) 1209 and trust bond(s) 1210. Supported bond(s) 1209 pays proceeds to issuer 1206. The trust bond(s) 1210 is held in trust by trust 1220. Guarantor/company 1204 is pre-funded with capital, and trust 1220 is pre-funded with liquidity 1243 and/or regulatory and rating agency capital 1242. Issuer 1206 pays coupons to supported bond(s) 1209 and trust bond(s) 1210. Issuer 1206 also pays a supplemental coupon. Issuer 1206 also pays principal on the two bonds. The trust bond(s) 1210's coupons and supplemental coupons are received by the trust 1220, because the trust 1220 is the bond holder for the trust bond(s) 1210. At least a portion of the supplemental coupons are intercepted to pay the annual guarantee premium. At least a portion of the annual guarantee premium may be diverted to fund rating agency capital 1242. A remaining portion of the annual guarantee premium is sent to the Guarantor/regulated company 1204 (e.g., for operations, profits, and/or dividends). Any dividends (e.g., from return on investment on regulatory capital or profits) are also paid by regulated company 1204 to holding company computer system 1230.

The unenhanced and supplemental coupons, and principal flow through a default determination mechanism 1241. If it is determined that the issuer 1206 did not default, the unenhanced and supplemental coupons, and principal flow directly to the certificate holders of the trust certificates 1216-1217.

If it is determined that the issuer 1206 defaulted on paying the supported bond(s) 1209, the unenhanced and supplemental coupons, and principal are intercepted and sent to the guarantor/company 1204. Additional rating agency capital 1242 and additional liquidity 1243 may also be taped and used if the intercepted amounts are inadequate to pay the default. The amounts to cover the default are sent to guarantor/regulated company 1204.

Guarantor/regulated company 1204 then adds more regulatory capital 1244, if there is insufficient funds in the received amounts to cover the default. The aggregate amounts are paid to the supported bond(s) 1209's holders.

If the mechanism of Trust 1220 and/or Guarantor/regulated company 1204 were used to cover the default on payments to holders of the supported bonds 1209, issuer 1206 pays a recovery or repayment for to the trust bond(s) 1210's holder and to the trust certificates 1216-1217's holders.

Based on the ability to cover projected defaults, the trust 1220 is determined to have a high rating, for example, a AAA counterparty rating 1245. The rating flows to company/guarantor 1204 to give company/guarantor 1204, for example, AAA financial strength rating (supported rating) 1246.

Management company computer system 1232 provides portfolio and operating services and third-party administration and receives management fees from company/guarantor 1204. Services are provided to manage trust 1220, company/guarantor 1204. In turn, management fees are paid by company/guarantor 1204 to management company 1232. In one embodiment, management company 1232 can be trustee 1218.

Figure 13:
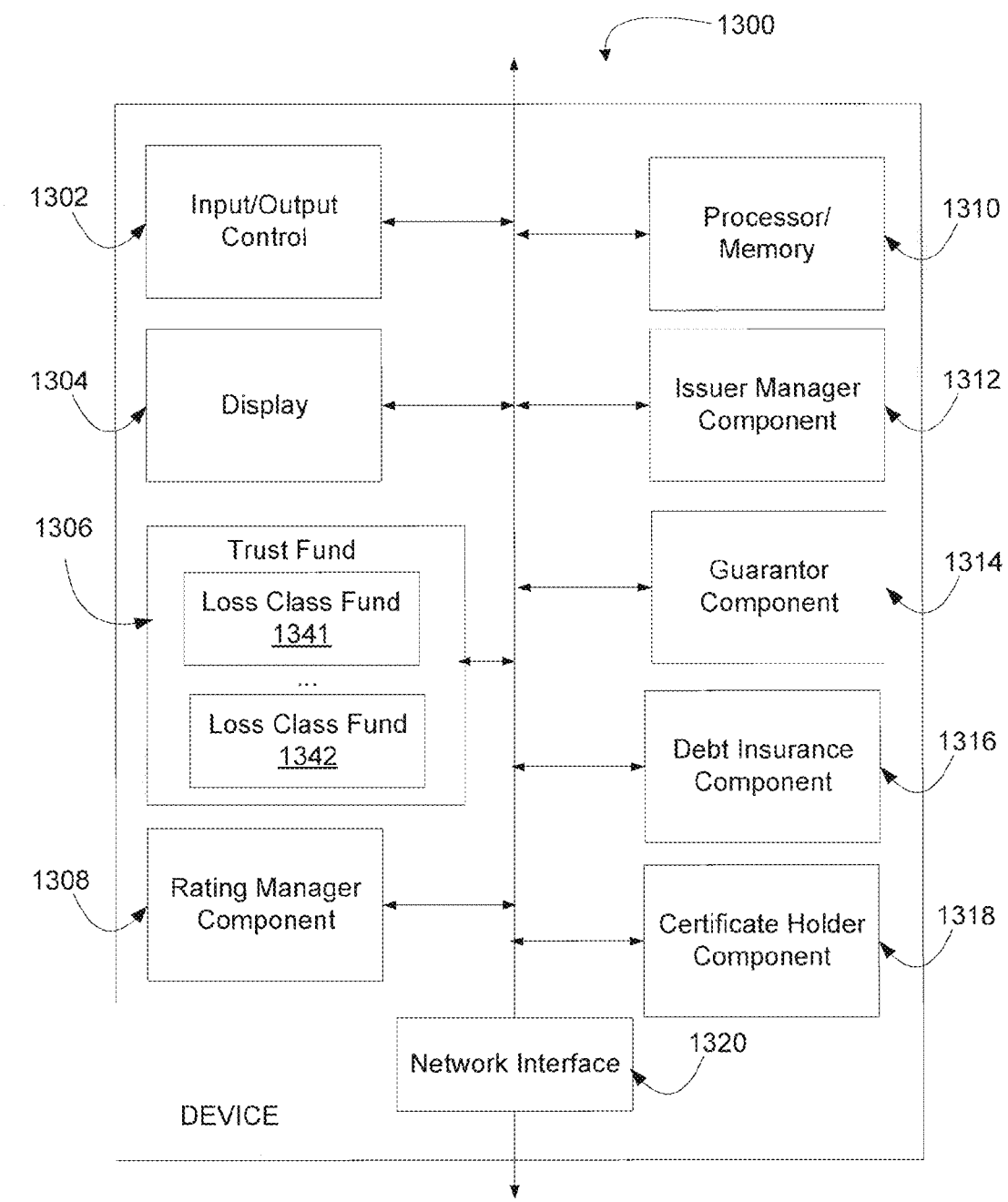
FIG. 13 is an example of a computing device operable to execute various aspects of the invention according to another embodiment of the present invention.

FIG. 13 shows a device for managing the BECM process, issuing insurance for debt, and the like. Device 1300 includes input/output control 1302, processor/memory 1310, display 1304, issuer manager component 1312, guarantor component 1314, debt insurance component 1316, certificate holder component 1318, trust fund component 1306, rating manager 1308, and network interface 1320. Trust fund component 1306 includes loss class fund 1341-1342. As shown, the components of device 1300 are in communication with each other, over, for example, a bus, a network, or the like. The components are also in communication with other devices over network interface 1320.

In one embodiment, the various components performs corresponds to similar components of FIG. 8. The various components may include a software program(s) comprising processor readable instructions that are stored on processor and/or computer readable media, such as the software program of FIG. 7. The instructions may be stored within memory 1310 and executed by processor 1310. In one embodiment, the various components are configured to perform at least some of the steps of the methods of FIGS. 1 to 6, 9 to 11, and 15 to 26.

In one embodiment, the components of FIG. 13 may be programmed with parameters and instructions to reflect the instructions for structuring the various components of the BECM system in accordance with the requirements of ATTACHMENT A. ATTACHMENT A shows one example of a definition for implementing the BECM system.

In one embodiment, input/output control 1302 may receive input to initiate managing a components using the BECM methodology described herein. Display 1304 may display various interfaces for managing BECM components, such as user interfaces of FIGS. 28 to 32. Issuer manager component 1312 can receive and manage information related to an issuer, such as a municipality. Information about the insured debts can be received and managed by component 1312. Component 1312 can size the appropriate insuring debt based on the insure debt, for example. Component 1312 can maintain issuer contact information and information related to the details of the bonds (interest, principal, period, etc.) Component 1312 may perform some of the operations of issuer(s) 106.

Guarantor component 1314 can receive and manage information related to maintaining sufficient capital structure to be able to insure the defaults of insured debts (bonds). Guarantor component 1314 may perform some of the operations of guarantor 104.

Certificate holder component 1318 can receive and manage information related to certificate holders, and can track the obligations to the certificate holders. Component 1318 may perform some of the operations of trustee 118 and/or BECM insuring trust 120.

Trust fund 1306 can receive and manage information related to the moneys (funds) flowing in, out-of, and/or maintained on behalf of the certificate holders related to various Insuring Bonds. In one embodiment, the funds may be separated in computer memory based on loss classes such as loss class funds 1341-1342. Component 1318 may perform some of the operations of BECM insuring trust 120.

Debt insurance component 1316 can receive and manage information related to insuring the possible defaults of an Insured Bonds. Component 1316 may monitor whether a default has occurred, may intercept coupons for an Insuring Bonds, and send the coupon payments to holders of an Insured Bonds, for example. Component 1316 may request information about certificate holders from component 1318, intercept funds from trust fund 1306 based on the information about certificate holders of the insuring trust, request information about bond holders for the appropriate insured trust from component 1316, and send the intercepted funds to the appropriate bond holders. In one embodiment, component 1318 may perform some of the operations of trustee 118 and/or BECM insuring trust 120.

Rating manager component 1308 can determine the projected and actual credit ratings of various BECM components based on the capital adequacy of the BECM components. Data about the capital adequacy can be received from issuer manager component 1312, guarantor component 1314, debt insurance component 1316, trust fund 1306 and/or certificate holder component 1318. Rating manager component 1308 can examine the capital adequacy and determine the credit ratings using for example, the process of FIG. 20 and/or FIG. 23, or any of the other credit rating determination processes described herein.

FIGS. 14A to 14E, and 15 to 25 show underlying data processes, models, and algorithms for managing insurance of debt. In one embodiment, the steps of the processes of FIGS. 14A to 14B and 15 to 25 can be performed by the components of FIGS. 7 to 13, and/or can use the data modules and/or user interfaces of FIGS. 29A to 33F.

FIG. 14A shows an example user interface for managing debt insurance and the application of the BECM to an example data scenario. This scenario includes various assumptions. The portfolio comprises 5-year bullet maturities. The Insuring Bond event—trigger requires a payout in year 5. There are 33% current credit spreads: (3.75% 2.55%) *33%=1.2%*0.33=40 basis points (bps). Insured Bonds are configured as "AAA" Insured, $970,000 per GO Issue, MMD Scale, paying over 5 years at 2.55%. The Insured Bond Portfolio includes a $97,000,000 Portfolio of 100 Issues. Insuring Bonds are configured as "A" GO, $30,000 per GO Issue, MMD Scale, paying over 5 years at 3.75%, with 10 bps of insurance premiums dedicated to coupon (3.23%). The Insuring Bond Portfolio includes a $3,000,000 Portfolio of 100 Issues. As shown, several issues (1 to 100) of Insured Bonds and Insuring Bonds pay their coupons over a period of years. Insuring Bonds pays both a coupon (e.g., 3.75%) and a coupon (3.23%). The coupons from the Insuring Bonds can be intercepted to pay any defaults for the insured coupons as described herein. The Insured Bonds have two ratings, a "A" underlying rating for the issuer, and a "AAA" insured rating due to the pledged Insuring Bonds payable in event of default.

FIG. 14B shows another example user interface for managing debt insurance and the application of the BECM to an example data scenario. As shown, the insured is configured to be a "AAA" guarantee with $1,000,000 par amount, AA GO MMD Scale Proxy, with a 5 year period at an annual 2.25% interest. The pledged or trust or Insuring Bonds are rated at an "A2" GO, $50,000 par amount, MMD Scale, with a 5 year period at an annual 3.25% interest and an additional supplement coupon at an annual 2% interest. As shown, for a plurality of years, the AAA Insured Bonds pay a coupon, and pays additionally a principal amount at year 5. The A2 Credit Moody's expected loss at each year is also shown along with an Baaa3 Credit Moody's expected loss. Also shown are the pledged or trust or Insuring Bonds and their coupons paid over a period of years. The available intercept amount per single bond for each year is also shown, along with the available intercept for all issues of bonds (e.g., 1000). In this example, the available intercept is much greater than the expected loss for each issue of Insured Bonds. Thus the amount of available intercept is sufficient to cover the expected loss, as described herein.

Figure 14C:
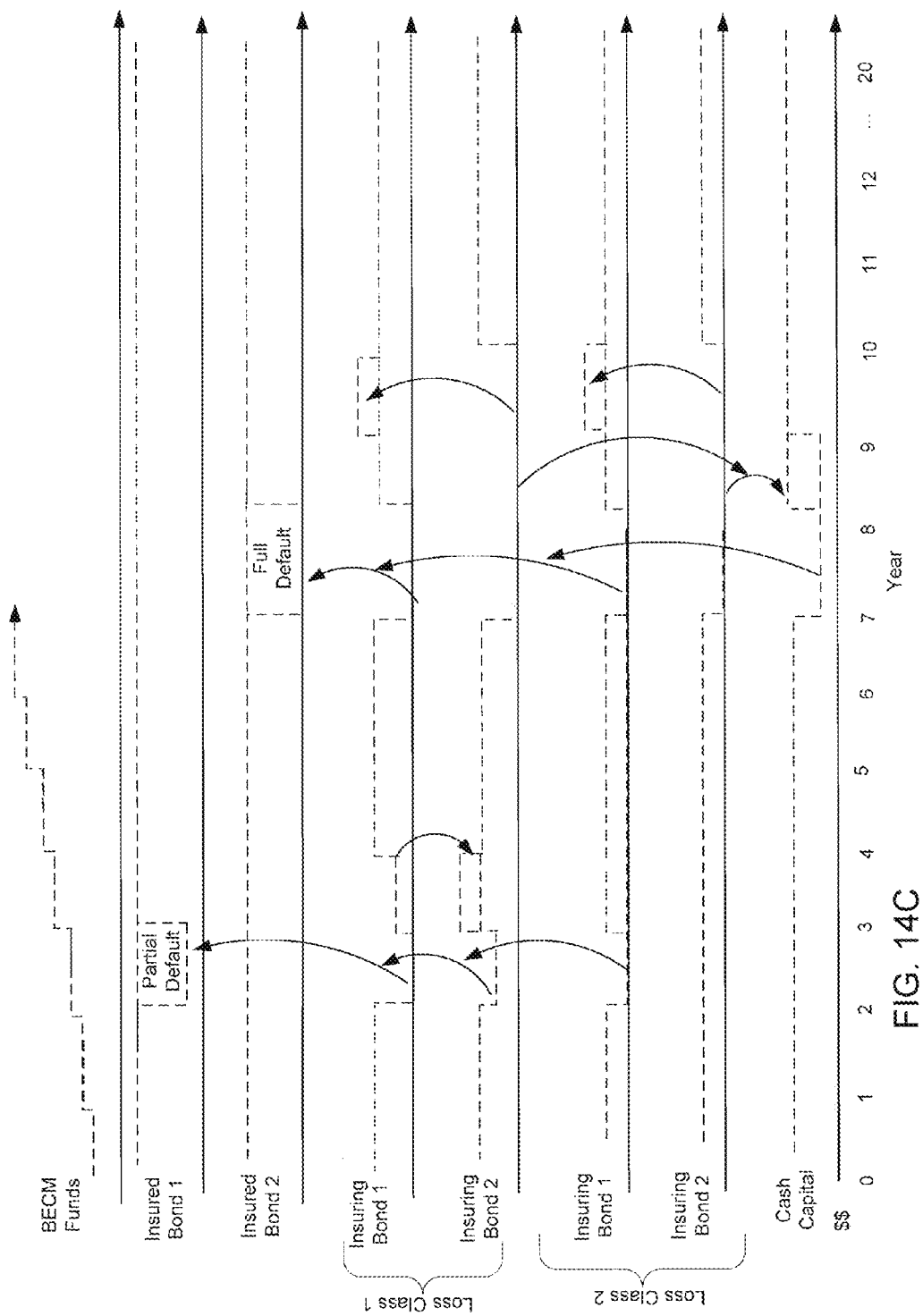

FIG. 14C shows another example cash flows between the BECM components, including flows between Company, cash capital of the Trust, the different Insuring Bonds and different Insured Bonds. The example scenarios show how Insuring Bonds' cash flow are first used to cure the default of the related Insured Bonds and how Insuring Bonds in a lower loss class are used to cure defaults before those in a higher class. The cash flows of the Insuring Bonds can include a plurality of types of coupons, and/or even the principal of the Insuring Bonds. FIG. 14C shows insured bond 1 with related insuring bond 1 in the first loss class and related insuring bond 1 in the second loss class, and insured bond 2 with related insuring bond 2 in the first loss class and related insuring 2 in the second loss class. More insured bonds and related insuring bonds and loss classes can be used without out departing from the scope of the invention.

At year 0, the Company is paid premiums into the BECM funds to set up the bond insurance for two bonds—bonds 1, and 2. Each of the bonds has two issues each, one for Insuring Bonds, and one for Insured Bonds. For simplicity, the loss class includes the loss position or category as described herein, but many more loss classes can be used. The cash flows of a first Insuring Bonds 1 and 2 are placed in the same loss class 1. The cash flow of the a second Insuring Bonds 1 and 2 are placed in loss class 2. Also at year 0 cash capital is established. The cash capital can be funded with proceeds from the sale of trust certificates that entitles the holders of the certificates to the cash flow of Insuring Bonds 1, 2.

At year 1, all the Insuring Bonds pay a part of their coupons to the Company funds. Over the course of the years, if an Insuring Bond's issuer does not default or the cash flow of the Insuring Bond is not intercepted, a portion of the cash flow of the Insuring Bonds are paid into the Company funds. A remaining portion of the cash flow is paid to those entitled to receive the cash flow, e.g., certificate holders in the Insuring Bonds.

At year 2, the issuer of Insured Bond 1 partially defaults. The cash flow of each of the Insuring Bonds1 in loss class 1 and loss class 2 are intercepted and used to pay the Insured Bond 1's holder because the identity of each of Insuring Bonds 1 are associated to the identity of Insured Bond 1. If the intercepted funds are inadequate to cure the default of insured bond 1, the cash flow of unrelated Insuring Bonds 2 are also intercepted and used to pay the Insured Bond 1's holder. The interception of unrelated insuring bonds 2 are intercepted from loss class 1 before loss class 2.

Although the cash flow of the intercepted Insuring Bonds are shown as being immediately intercepted in conjunction with this FIG. 14C, in other embodiments, the capital used to pay the Insured Bond holders can be drawn from cash capital or other sources of additional liquidity, and these draws can be secured by the cash flow of the intercepted cash flow. In one embodiment, the cash capital is used to pay defaults, and is the first to be paid back from the Insuring Bonds cash flow.

At year 3, a portion of the cash flow of Insuring Bond 1 in loss class 1 is intercepted to pay the bond holder of Insuring Bond 2 in loss class 1 to make them whole for having their cash flow intercepted at year 2.

At year 7, the issuer of Insured Bond 2 fully defaults. Accordingly, there is no cash flow for insuring bonds 2 to intercept. Instead, the cash flow of both the Insuring Bonds 1 in loss class 1 and loss class 2 are intercepted, with loss class 1's bonds intercepted first. Because the intercepted insuring bonds funds are inadequate to cover the default, cash capital is partially drained to pay the full default of Insured Bond 2.

At year 8, the cash flow of Insuring Bonds 2 are intercepted to replenish the cash capital that was used to pay the default by the issuer of Insured Bond 2.

At year 9, the cash flow of Insuring Bonds 2 are intercepted to make whole the bond holders of Insuring Bonds 1 for having their cash flows intercepted at year 6. This payment can be paid pro-rata, or one before the other in a pre-defined order. As shown, cash capital is paid before Insuring Bond holders 1 are paid.

FIG. 14D shows a calculation for an Aggregate Loss Subclass Percentage. "Aggregate Loss Subclass Percentage" means, for each Loss Position Subclass and with respect to each maturity of each Supported Bond Issue or Supported Transaction, the Average Annual Assumed Default multiplied by the Loss Subclass Minimum Coverage multiplied by the Loss Subclass Discount Percentage multiplied by the Loss Subclass Coverage Factor. This represents the sum of the Loss Subclass Percentage Requirements for each Loss Position Subclass and all of the lower Loss Position Subclasses. For example, as shown, initially, for an A rated city or county general obligation bond issue, the Aggregate Loss Subclass Percentage for the 4th Loss Position Subclass equals 1.75% multiplied by 1 multiplied by 100% multiplied by 2.4, or 4.2%. Correspondingly, the Aggregate Loss Subclass Percentage for the $3^{rd}$ Loss Position Subclass equals 1.75% multiplied by 0.8 multiplied by 25% multiplied by 2.4, or 0.84%.

Figure 15:
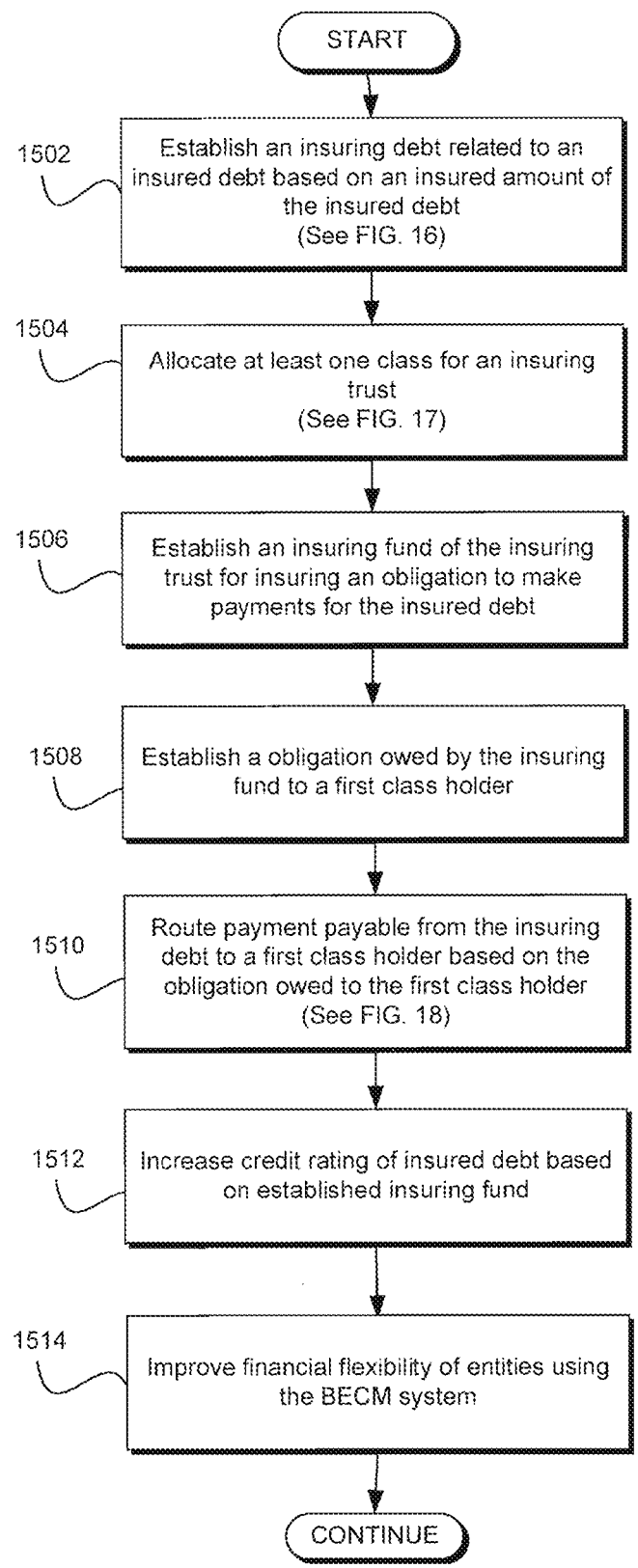

FIG. 15 shows a flow chart for a process for managing debt insurance. The process begins at step 1502, where an insuring debt related to an insured debt based on an insured amount of the insured debt is established. The issuer can receive 100% of the proceeds from both sets of bonds, thereby replicating the accepted underwriting process by banks and guaranty role of a monoline bond insurer.

Also to replicate the accepted underwriting process, yields of the insured and Insuring Bonds can be computed to keep the proceeds the same for the Insuring Bonds. That is, the yields can be paid in the amount as if the Insuring Bonds have the same yield characteristics as the Insured Bonds and to also to take into account an increase in each year with additional basis points or coupons to account for the added risk of the Insuring Bonds.

BECM's novel computer controlled capital structure reduces the insurer's leverage ratio from 100 to 1 to less than 30 to 1 by integrating Insuring Bonds into the capital mix rather than cash set asides, the practice of all other insurers. Traditional bond insurance technology requires $200 million of regulatory capital for guaranty protection on roughly $20 billion of municipal bonds. The same $200 million of regulatory capital can support approximately $125 billion of municipal bonds using BECM technology.

The Company's computer system and data for using the BECM's credit underwriting criteria can be pre-established or determined dynamically in computer memory for all guarantee commitments. The Company can be configured establish other subsidiaries for future "pools" with differing credit criteria in fully isolated guarantee companies. The underwriting criteria can encompass two screens: (i) credit ratings and (ii) risk categories. Using the BECM methodology, issues can be rated investment grade and can be restricted to the ratings services' most conservative risk categories, to include the information shown in TABLE 4:

TABLE 4

| General Obligations | Tax-Supported Debt | Essential Service Utilities |
|---|---|---|
| State and City | State-wide | Public Universities |
| School Districts | Guaranteed Entitlements | Guaranteed Student Loans |
| Community Colleges | Personal Income Tax | Federal grant secured |

The underwriting credit criteria data can exclude bond issues subject to annual appropriation, in one embodiment.

In one embodiment, as described herein, the BECM uses two sources of capital to fund potential defaults: debt service payable on pledged bonds (e.g., the Insuring Bonds) representing a pro-rata portion of each maturity of every Insured Bond issue; and cash capital derived from a public or private investment. Bond issues that benefit from the BECM can be subdivided into two parity series which will be sold simultaneously: Insured Bonds sold with the benefit of a Aaa guaranty; and Insuring Bonds, representing a pro-rata portion of every maturity, sold on an uninsured basis to an Insuring Trust, which would hold the Insuring Bonds of all participating issuers. The Aaa guaranty can be provided by a monoline insurer or similar public or private entity (e.g., the Guarantor), whose credit will be supported by an Insuring Trust.

In one embodiment, the issuer's Insured Bonds can be sold to the public in a typical manner. The Insuring Bonds would be priced by the issuer at an uninsured interest rate, but not sold directly to the public. In addition to the rate, the Insuring Bonds can also bear a interest coupon reflecting the annual portion of the cost of insurance. In one embodiment, Insuring Bonds can be deposited in the Insuring Trust in exchange for payment of the proceeds thereof. The Insuring Trust would simultaneously raise an identical amount of proceeds by selling trust certificates with respect to each Insuring Bond that pass through all payments of principal and interest and a portion of the coupon payments. Additional details for this step 1502 are described in more detail in conjunction with FIG. 16.

At step 1504, at least one loss class for the Insuring Trust is allocated. In one embodiment, to permit Insuring Certificates and Insuring Bonds to be priced efficiently, Insuring Certificates and corresponding Insuring Bonds can be grouped and sized into various subclasses. Additional details for this step 1504 are described in more detail in conjunction with FIG. 17.

At step 1506, an insuring fund of the insuring trust for insuring an obligation to make payments for the insured debt is established. Portfolio credit characteristics can be computed based on a risk appetite and underwriting discipline as well as trends in performance of the insured portfolio. An upfront fee (e.g., part of the premium) can be received from the issuer for insuring the Insured Bonds. In one embodiment, the premium can be paid partially upfront and partially overtime. In yet other embodiments, the fee may be paid fully upfront or fully overtime.

In one embodiment, the debt insurance may be directed to a municipal-only issuer with significant additional limitations versus rating criteria: (a) portfolio will overwhelmingly be general obligation, special tax and revenue bonds rated A or Baa with issuer concentration limits; (b) credits involving event risk will be avoided, e.g., appropriation indebtedness other that highly structured credits that practically eliminate non-appropriation risk; (c) no market value termination payments or principal accelerations will be insured that can turn a credit slide into a credit cliff.

Capital adequacy can reflect the ability to meet claims over time at a given confidence level to meet regulatory minimums and to maintain investor confidence. The BECM's system can create capital by structuring Insuring Bonds, whose debt service can be intercepted to fund an insured default, into every maturity of every insured issue. For example, BECM's portfolio of Insuring Bonds can create cash flow coverage that is available to fund insured defaults for the full life of the portfolio. Unlike a conventional monoline approach, BECM capital (including all or substantially all of the capital) that may be required can be fully funded at the time of issuance.

For example, capital can be reduced as bonds are retired or refunded, i.e., in relation to a reduction in the capital requirements. The BECM may require cash equity for startup capital, for liquidity, and to address runoff risk. However, the amount of cash equity needed is greatly reduced and the cash equity is protected from nonpayment risk by the Insuring Bonds In one embodiment, the level of defaults can be structured such that the defaults can be covered by the Insuring Bonds with a significant cushion. For example, in sizing the Insuring Bonds for all credit types, a deterioration of the portfolio credit quality can occur and the BECM system can apply 1.6 times coverage to those conservative capital charges. Such coverage of potential defaults can be net of the impact of any issuer defaults on the Insuring Bonds. In one embodiment, an even higher coverage level can be used: 3 times the assumed defaults for A rated GO bonds and 4 times such levels for Baa rated GO bonds.

Profitability can impact the capital adequacy and ability to access the capital market on reasonable terms. Since under the BECM, capital can be pre-funded with Insuring Bonds and cash for the full life of the insured portfolio, the impact of future profitability on the BECM credit may be much less than on a conventional monoline insurer. Additional cash capital would be required in order to grow the insured portfolio beyond the level supported by the existing cash capital. Because the need for cash equity is reduced, the amount of insurance capacity per dollar of cash equity can be much higher. That is, the BECM can operate with less dependence on profitability, as compared to monolines.

Because less cash equity may be needed and due to the efficiency of the BECM, the returns on cash equity under the BECM can be higher than for a conventionally capitalized monoline. Such returns can be achieved even though (1) the risk to the cash equity is significantly lower than under a traditional monoline structure and (2) without the need to benefit from the early redemption of Insured Bonds.

At step 1508, an obligation owed by the insuring fund trust to a first class holder is established. In one embodiment, a trust certificate is recorded in computer memory and the obligation can trigger payments on a periodic basis and/or as incoming funds for an associated insuring debt is received.

At step 1510, payment payable from the insuring debt to a first class holder is routed based on the obligation owed to the first class holder. Briefly, if a default of a related or unrelated insured debt occurs, the payment is intercepted, based on the priority described herein. Details for this step 1510 are described in more detail in conjunction with FIG. 18.

At step 1512, a credit rating of insured debt is increased based on the established insuring fund. A computer implemented algorithm can be used to compute the increase in credit rating based on the available debt service for the insured debt and other insured debt managed by the insuring fund. The algorithm can increase the credit rating based on a comparison of the amount of debt service to a projected annual depression-scenario assumed defaults percentage. For example, if the debt service is greater than a multiple, the rating can be increased to AAA.

At step 1514, financial flexibility of entities using the BECM system can be improved, thus providing a tangible result and a transformation of the attributes of the BECM components. For example, the BECM may provide improved creditworthiness of the entities (e.g., issuer, guarantor, trust, etc.) which can lead to lower interest rates for the entities when they issue debt, for example. Financial flexibility reflects a company's ability to access liquidity and capital in times of material stress, including issuer, guarantor, or trust's ability to access liquidity. Financial flexibility can be computer as a rate of access to capital. An increase in the flexibility can increase this rate. The calculated rate can be provided through a computer. Since under the BECM, capital can be pre-funded with Insuring Bonds and cash for the full life of the insured portfolio, the need for sufficient capital of the various components of the BECM in times of stress can be fully addressed. The Insuring Bond cash flows represent a pledged revenue stream that can also be used to obtain additional liquidity in the form of lines or letters of credit. A conventional monoline structure has no comparable source of liquidity. The Insuring Bond cash flows also protect BECM cash equity which will make it easier to attract additional cash equity. In the event of a significant credit event, future Insuring Bonds can be insulated from the impact thereof so that the ability to fund capital for future Insured Bonds will not be affected.

Various aspects of the BECM address other shortcomings identified in the existing monoline structure. For example, the BECM underwriting standards can avoid pools of credits with unusually correlated default risk and will be significantly more stringent than those of existing monoline insurers. The placement of the 1st loss from a defaulted issuer on that issuer's Insuring Bonds can provide protection against adverse selection in the insured portfolio and can provide protection to both unrelated Insuring Bonds and BECM cash equity from the risk of an ultimate nonpayment. The pre-funding of capital can avoid the risk that management will fail to recapitalize in a time of stress. The critical underwriting and capitalization decisions of BECM management can be analyzed and assessed on an ongoing basis based on computer implemented algorithms.

The use of the BECM Insuring Bond structure implemented with higher coverage margins can provide greatly enhanced ability to deal with assumed annual defaults and with broad declines in portfolio credit quality. The capital of the BECM (including Insuring Bonds and cash equity) may be much less leveraged than the capital of existing monoline insurers since BECM capital can provide coverage of assumed defaults that is higher than under a traditional monoline approach and that runs for the life of the portfolio. The lower leverage and greater credit stability of the CES can make it a much less fragile and less confidence-sensitive. The BECM can offer a higher level of both profitability and security than a conventional capital structure. Computing then continues to other steps for further processing.

FIG. 15 may be modified with alternate steps, embodiments, and implementations as explained below. In one embodiment, at step 1502, the credit enhancement approach described herein relates to allocating risks among a class of investments so that the return to one or more "insured" subclasses is guaranteed through the diversion, if necessary, of amounts that may otherwise be payable to one or more "insuring" subclasses. This general method may differ from a classic CDO approach (in which both the insured and insuring subclasses represent horizontal tranches of a pool of cash flows) as a result of several variations described herein, which can be employed separately or together and can be employed in combination with elements of a classic CDO approach. In an embodiment, the BECM system can be configured to perform various operations. For example, the BECM system can be configured for employing pooling technology to create CDO-like credit enhancement in the primary, rather than secondary market. In yet another embodiment of implementing the BECM Structure, the credit enhancement can be provided by the borrowers themselves.

At step 1504, the insuring subclasses can be structured or allocated in computer media so that any losses (shortfalls in the actual return relative to the guaranteed return) on an insured investment may be borne by the holder(s) of an individual insuring investment or subclass of insuring investments that is "related" to the investment with respect to which the insured loss is payable. So, rather than simply allocating the loss across one or more horizontal tranches in order of their loss position, the BECM Structure can limit the loss (to the extent possible) to the related investment or subclass (a limited vertical portion of the full potential horizontal tranches across which losses can potentially be allocated). In effect, investors that hold insuring investments which are related to a particular insured investment are primarily responsible for a failure of such investment to produce the guaranteed return. The nonrelated insuring investors are secondarily liable in the event that the related insuring investments are insufficient to produce the guaranteed return. The connection between the insured investment and an insuring investment or subclass that makes them "related" is that the holders of such related insuring investments have specifically accepted an investment risk that is the same as or similar to the investment risk on the insured investment on which the loss is payable. The acceptance of such risk can be either through the purchase of an insuring investment with an identical or similar underlying risk or by otherwise agreeing to provide a guarantee of an insured investment with such risks. Insuring investments that are not related to a particular insured investment are intended to provide marketing enhancement for the insured investment and not to bear any material risk from the failure of the insured investment to achieve the guaranteed return. However, without the secondary guaranty of the non-related insuring investments, the creditworthiness of the guaranty may not be sufficiently strong to optimize the pricing of the insured investments. If the risks to non-related insuring investors can be minimized and if an insuring obligation is identical to its related insured obligation, the insuring investor can realize a substantial increase in yield by taking essentially the same risk as if it purchased the underlying investment directly. In the context of municipal bonds, this is possible, both because municipal defaults are extremely rare and if they occur, they are likely to be temporary—involving timeliness of payment rather than a failure to pay. The increase in yield derived from being an insuring investor is achievable because of the marketing enhancement provided by the non-related insuring investors. The mere subordination of an individual related investor may produce a modest benefit and so may result in a modest increase in yield to the insuring investor who agrees to be subordinated.

At step 1506, the insured subclasses can be structured in computer media so that the holder of a particular insured investment cannot suffer a loss unless (a) the performance of that particular investment is insufficient to achieve the guaranteed return, (b) the performance of the related insuring investment is insufficient to fund the shortfall, (c) the enhancement provided by each related subclass of insuring investments is insufficient fully to fund the losses on the insured investments related to such subclass, and (d) the enhancement provided by all insuring subclasses is insufficient fully to fund the losses on all insured investments. The insured subclasses, in one embodiment, can be excluded from any trust or similar structure and can be marketed without any yield penalty relative to the trading level of the underlying security (whether or not insured).

At step 1508, the insuring subclasses may be deposited electronically into a computer account of a trust or similar structure in order to secure the guarantee. Such a structure might be representative of a public authority, 501(C)(3) or other tax-advantaged entity. The return enhancement is provided by configuring algorithmically the insured bonds the beneficiary (either directly or indirectly, e.g., by using the credit enhancement to secure more traditional return enhancement such as bond insurance) of the credit enhancement provided by the trust. The difference between the unenhanced and enhanced returns on the insured subclass is electronically diverted to the insuring investor without depositing the insured investment into a trust (e.g., having the diversion done by the issuer of the underlying security by providing for a higher interest coupon on the insuring subclass). In one embodiment, the impact of the higher coupon on the inflation-adjusted return of the Insuring Obligations for first-loss Insuring Obligations include an increase in the real return that can range from 20% to over 100%

Both the investor whose return can be guaranteed and the investor whose investment is used to secure the guarantee are owners of the underlying investments either directly (particularly in the case of the former) or indirectly through a trust, partnership, public entity, 501(c)(3), or similar structure.

Computer readable media can record and configure that the issuers of the underlying investments agree to divert a portion of the savings realized through the guarantee of the return of the insured investments to the owners of the investments that secure the guarantee. There may be a reallocation of a part of such portion of the savings among the subclasses of the investors whose investments secure the guarantee based on various factors such as the degree of risk taken by such subclasses.

In yet another alternate embodiment, the trust certificates can be funded with a supplemental coupon on the Trust Bonds. At least an annual portion of the Insurance Premium is funded as a separate series of Bonds—Series C—(e.g., small series) on parity with the Supported Bonds (Series A) and Trust Bonds (related to Series B). If sold to the public in order to fund the insurance premium, Series C would be a typical municipal issue. Series C would be delivered to the Trust in payment of the annual portion of the insurance premium. The BECM enabled computer system can be configured so that the unamortized portion of the Series C bond could be callable by the issuer without payment on any call date on which the Supported Bonds and Trust Bonds were called.

In this embodiment, splitting interest is avoided, because Series C could have small denominations (e.g., $1000 or $100 or $1) such that the bonds (together with the interest thereon) can be allocated among various uses (i.e., supplemental certificate payments and net annual BondModel Premium) without splitting interest coupons. For example, the Supported Bonds could be $95, the Trust Bonds $5, and the Series C Bonds $1 million. Certificate Holders would pay $5 million to purchase the Trust Bonds and 40% of the Series C Bonds in the total amount of $5,400,000. The different Loss Position Subclasses of Trust Certificates would own different percentages of the $400,000 so as to create different effective yields to the various loss positions.

In yet another embodiment, rather than using a separate bond issue (Series C) to fund the Supplemental Coupon, the size of Series B could be increased to accomplish a similar result. In one embodiment, the Series B bonds can be discounted bonds.

In an alternate embodiment, the process of FIG. 15 can be modified such that the use of a trust or similar structure may be avoided completely (so the investors whose investments secure the guaranteed can own such investments directly) by imbedding the mechanism through which the guarantee is provided in the legal documents of the issuers of the insuring investments. Alternately, the pooling of the insuring investments can be done through a public entity. In another alternate embodiment, the process of FIG. 15 of allocating risk can also be applied to other types of investments (such as equities) to produce (a) insured" subclass(es) of investments with returns that are lower than the expected return on the underlying investments, but are also more certain and (b) "insuring" subclasses of investments with leveraged returns.

The variations described above can be utilized so that (1) any losses funded by "insuring" investors are imposed to the extent possible on the holders of investments that are "related" to the investment on which the insured investor's loss is realized and (2) an individual "insured" investor's risk of loss requires the failure to produce the guaranteed return of both the related investment (including the insuring portion thereof) and the enhancement provided by the related and non-related insuring subclasses. Application to a particular class of investments may be configured such that the related insured and insuring investments will produce the guaranteed return on the insured investment and that the entire class of insured and insuring investments will produce the guaranteed return on the class of insuring investments. In yet another embodiment, an application in the context of equities may be to take a set of stocks of companies with strong expectations of earnings growth and have the insuring securities insure the earnings growth allocated to the insured securities.

In the embodiment, at step 1514, the resulting insured investment will result in characteristics like insured bonds.

In yet another embodiment, the BECM system can be configured to utilize a structured credit enhancement approach to compete with municipal bond insurers in the primary market.

For GO bonds, because the required size of the insuring tranches is small, the benefit of the credit enhancement (which is realized only on the principal amount of the insured tranches) is maximized relative to the benefit of bond insurance which is realized on the full amount of bonds. In fact, given working estimates of the additional yield required to be paid to the insuring bonds, a structured credit enhancement product may be significantly more efficient than bond insurance for such credits, which represent the largest segment of the market. For credits like hospital bonds, the structured approach may produce returns that are still superior to bond insurance. The ability to produce superior results across the full range of credits is a transformation of resources of the BECM and a tangible result.

FIG. 15 may be modified with alternate steps, embodiments, and implementations as explained below. At step 1502, in yet another embodiment, the objective of the BECM structure ("Structure") is to provide credit enhancement of a substantial portion of specified bond issues (Included Issues) sold by borrowers by additionally securing such portions (Insured Obligations) with payments that may normally be payable to the holders of all or a portion of the remaining bonds of the Included Issues (Insuring Obligations). A portion of the bonds (Non Obligations) may be neither Insured Obligations nor Insuring Obligations, i.e., an unenhanced and unburdened portion of the issue.

The holders of Insured Obligations (Insured Owners) may have several levels of security. First, each Insured Owner may own a bond (the "related" bond) of a borrower (the "related"

borrower) who sold an Included Issue (the "related" issue). Second, each Insured Owner may have a priority in the payments received from the related borrower over the holders ("Insuring Owners") of (i) Insuring Obligations of the related Included Issue (the "related" Insuring Obligations) and (ii) both Insured and Insuring Obligations of any other (i.e., a "nonrelated") borrower. Third, each Insured Owner may be additionally secured by the credit enhancement provided by Insuring Obligations of nonrelated borrowers (i.e., "nonrelated" Insuring Obligations). The credit enhancement provided by the BECM Structure may operate similarly to municipal bond insurance in that an Insured Owner could not experience a payment default without both (a) a default by the related borrower on the bond owned by the Insured Owner and (b) the credit enhancement provided by the Insuring Obligations also being insufficient. (In some circumstances, the Insuring Obligations related to particular Insured Obligations may be from a different bond issue and may be obligations of a different borrower.)

At step 1504, Insuring Obligations can be structured by tranching them into classes in a traditional CDO fashion—i.e., 1st loss through nth loss—with appropriate returns for each class. Distinctions from the traditional context in which CDOs have been structured are, first, that most, if not all, of the tranched securities will be investment grade or better on their own, without the benefit of tranching, second, that additional securities will be continually added to the CDO tranches on an ongoing basis, and, third, that all of the tranches (including the bottom or first loss tranche) may be securitized and sold to the public, rather than having the bottom tranche owned by an equity holder.

The traditional approach can be implemented by, first, sizing the aggregate amount of Insuring Obligations according the requirement to maintaining AAA ratings on the Insured Obligations. A portion of the Insuring Obligations can also be (1) Insured Obligations at the AA level, rather than the AAA level, (2) Insured Obligations at the A level, (3) Insured Obligations at the BBB level, and (4) Insured Obligations at rating levels below investment grade. In the traditional context, it may not be normal to view the AA obligations as both insured and insuring since they are simply entitled to receive cash flows available from the underlying portfolio of securities after the AAA obligations are paid.

In one embodiment, to maintain the interest on the Insuring Obligations, the obligation holders are configured to own or have rights to the cash flows from particular bonds (not just the rights to a certain priority in the aggregate cash flows) (e.g., step 1508). Thus, the Insuring Obligors are configured to have the right to the cash flows from a particular security and a contingent obligation to permit those cash flows to be diverted to ensure the payment of Insured Obligations at step 1510. Second, the underlying bonds will in most cases have investment grade ratings and unlike the investments that are typically securitized in CDOs, can be sold to the public on an unenhanced basis.

In one embodiment, the market identity of the individual Insuring Obligations or subclasses thereof are retained. Also, because of the underlying ratings and the municipal context (extremely low probability of default and high probability of resumed payments even if a default occurs) the amount of Insuring Obligations necessary to support AAA ratings on the Insured Obligations is small. These factors may allow AA-rated tranches of Insuring Obligations to be constructed either with or without (in the case of AA underlying securities) such tranches being enhanced by lower-rated tranches of Insuring Obligations.

The result of structuring the Insuring Obligations (in addition to supporting AAA ratings on the Insured Obligations) may be either to maximize the ratings or minimize the cost of funds on the Insuring Obligations or, correspondingly, to minimize the impact of the BECM Structure on the ratings and cost of funds of the Insuring Obligations as compared to the ratings and cost of funds of the underlying bonds if sold on an unenhanced bases (i.e., as Non Obligations).

Under a traditional approach, the cost of the BECM Structure might be minimized, relative to the cost of unenhanced bonds, by allocating Insuring Obligations related to a particular underlying bond to rating subclasses equal to and higher than the underlying rating on such bond. The cost can further be minimized by allocating as much as possible to the rating class(es) higher than the underlying rating. However, to enhance the ability of the BECM Structure to withstand downgrades of the underlying portfolio under severe economic conditions, it may be prudent to allocate a portion of the Insuring Obligations related to particular bonds to one or more lower rating categories. This may be in effect another form of coverage. Under normal circumstances there may be downgrades and upgrades occurring simultaneously.

Because the underlying bonds are individually rated, approaches to structuring the Insuring Obligations based on the rating of the underlying related bond can be developed. For example, rather than having the AA Insuring Obligations be enhanced by the lower rated Insuring Obligations, the AA Insuring Obligations can simply be related to bonds with ratings in the AA rating category. Thus, no enhancement may be necessary to achieve the AA rating level provided that the use of such Insuring Obligations to enhance the AAA Insured Obligations did not adversely affect their ratings. No adverse impact may occur if the Insuring Obligations rated below AA were sufficient to enhance all of the lower-rated Insured Obligations (i.e., with underlying ratings below AA) at least to the AA level.

In one embodiment, the Insuring Obligations related to bonds can be included in a particular rating category in the same rating category of Insuring Obligations. Thus, the tranche of BBB Insuring Obligations may be in an amount corresponding to the Insuring Obligations for which the related Insured Obligations have BBB underlying ratings and may have a lower loss position than the tranche for A-rated Insured Obligations. The tranche of A-rated Insuring Obligations may be in an amount corresponding to the Insuring Obligations for which the related Insured Obligations have A underlying ratings. The loss position of the A-rated Insuring Obligations may in turn be lower than that for the AA Insuring Obligations. Under this structure, each rating level of Insuring Obligation may achieve its rating without the benefit of any enhancement by the lower-rated Insuring Obligations.

A step 1512, the ratings of particular Insuring Obligations can be configured from two distinct perspectives:

First, the rating of the underlying bonds that are the source of security for the Insuring Obligations ("Underlying Ratings"), and Second, rating resulting from the obligations imposed on such Insuring Obligations by the BECM Structure to enhance Insured Obligations and, if applicable, other (senior) Insuring Obligations and, if applicable, the obligations imposed on other (subordinate) Insuring Obligations to enhance such Insuring Obligations ("Structure Ratings"). The Structure Ratings of the tranches of Insuring Obligations may generally correspond to their loss positions in the event of a default on a bond related to an Insured Obligation, i.e., the lower the BECM Structure Rating, the lower the loss position. So, the lowest rating category may have the first loss position.

With respect to particular Insuring Obligations, the BECM Structure Ratings (the credit impact of the BECM Structure on the Insuring Obligation) can be at a higher or lower rating level than the Underlying Rating. If Insuring Obligations only enhance Insured Obligations and do not enhance other Insuring Obligations, from a marketing perspective, the rating of a particular Insuring Obligation may be the lower of its Structure Rating and its Underlying Rating. So, if all of the Insuring Obligations relating to a particular bond are allocated to rating subclasses at or above its Underlying Rating, the credit impact of the BECM Structure may be minimal. Note that the loss position, and therefore the BECM Structure Rating of particular Insuring Obligations can either be fixed at issuance or can float with the Underlying Rating.

If Insuring Obligations do enhance and are enhance by other Insuring Obligations, the BECM Structure Rating may govern.

In yet another embodiment of FIG. 15, based on the S&P bond insurer rating criteria, the amount of credit enhancement necessary to enhance the ratings of BBB or below bonds to the A level is only a portion of the credit enhancement required to achieve AAA ratings (step 1502). However, the portion of the credit enhancement required to achieve AAA ratings that is necessary to achieve A ratings is greater than the amount required to achieve the AA level which is also greater than the portion necessary to achieve the AAA level.

At step 1504, the Insuring Obligations added with additional series of Insured Obligations can be allocated among various Structure Rating categories of Insuring Obligations based on the minimum requirement at each rating level to maintain the ratings of the next higher rating category of Insuring Obligations. At each rating level, the Insuring Obligations in or below that rating category may have to be sufficient to enhance the ratings of the Insured Obligations with underlying bonds at or below that rating level to the next higher rating (1510). For example, the Insuring Obligations in or below the BBB Structure Rating category may have to be sufficient to enhance the ratings of the Insured Obligations with underlying bonds rated BBB or below to the A rating category. Thus, the inclusion of bonds rated BBB or below may not affect the BECM Structure Ratings of Insuring Obligations in the A or AA categories.

At step 1504, the use of both Underlying and Structure Ratings (i.e., lower-rated subclasses of Insuring Obligations do not enhance the higher-rated subclasses) may allow Insuring Obligations to be priced based on spreads to a related bond sold on an unenhanced basis. The virtue of assigning a AA Structure Rating to an Insuring Obligation with a BBB Underlying Rating is that the credit impact of the BECM Structure on the holder of such obligation may obviously be minimal, so that the additional yield required by such holder (relative to an uninsured bond of the related issuer) for participating in the BECM Structure may also be minimal. The lower the BECM Structure Rating, the higher the spread that may be required relative to an uninsured bond. However, if the BECM Structure Rating is no less than the Underlying Rating, arguably, the spread to uninsured may be modest, even for a low (e.g., BBB) Structure Rating.

If the Insuring Obligations with lower Structure Ratings, in addition to enhancing the AAA Insured Obligations, also enhance the Insuring Obligations with higher Structure Ratings, the Underlying Rating is subsumed and the rating of the Insuring Obligations may be the BECM Structure Ratings (a "Structure Enhanced Rating"). In this CDO-like approach, the ratings (Structure Enhanced) of the Insuring Subclasses may be maximized. The lowest loss position subclass associated with a particular Insured Obligation may be configured to be rated at the same level as the related bond. Some of the insuring subclasses, related to a particular Insured Obligation other than the lowest loss subclass, can be insured with traditional bond insurance. The use of Structure Enhanced Ratings for the Insuring tranches can result in the ratings of the Insuring Tranches (even conceivably the lowest tranche associated with an underlying obligation) being fixed at the time of issuance. This rating stability may allow the pricing of Insuring Tranches to be optimized. To fix the rating of a BBB tranche, it may be necessary to have a non-investment grade tranche supporting it.

At step 1508, a method of allocating Insuring Obligations by Structure Rating subclass may be to allocate portions of the related Insuring Obligations to each rating category at or higher than the rating on the underlying bonds A related, but more conservative approach is to allocate portions of the Insuring Obligations related to each rating subclass from the subclass with the rating immediately below the rating of the underlying bonds to the AA Structure Rating subclass. This may provide protection in the event of a severe economic downturn from the credit enhancement not being sufficient to maintain the BECM Structure Ratings of the Insuring Obligations. Under this approach, allocating an equal portion of Insuring Obligations to the next lower rating category may be unduly conservative. (Building a coverage factor over rating agency capital requirements into the amount of Insuring Obligations created with respect to Insured Obligation addresses the potential impact of an economic downturn on the AAA Insured Obligations and also provides protection for the BECM Structure Ratings of the Insuring Obligations.)

Another variation (that may also address the potential impact of adverse conditions on the ratings of the Insuring Obligations) is to tie the BECM Structure Rating category/loss position of Insuring Obligations to the rating of the underlying borrower to which they are related. In the event that the underlying ratings on an Insured Obligation were changed, the loss position of the related Insuring Obligation can be changed to reflect the change. That may mitigate against adverse selection of the credits included within the BECM Structure by either rewarding or penalizing the related Insuring Obligor for any changes in the credit. However, given the significant differences between the credit spreads for Insuring Obligations in different rating categories, that approach might create volatility in the market price of Insuring Obligations.

Another variation on having separate Underlying and Structure Ratings, which may also mitigate against adverse selection, is to keep the BECM Structure Rating categories/loss positions static (based on the initial allocation of Insuring Obligations to various rating categories) with respect to a default by an nonrelated borrower, but, with respect to a default by a borrower, to make the related Insuring Obligors bear the cost of the default before any loss is allocated to non-related Insuring Obligations. In one embodiment, this does not materially affect the Underlying Ratings of the Insuring Obligations since it is equivalent to normal subordination which typically has a one-notch impact at most. However, using this approach may make even more remote the possibility of any Insuring Obligor incurring a loss due to a non-related borrower.

Also, at step 1508, there may be various subclasses of Insuring Obligations including for example subclasses (Loss Position Subclasses) that are required to absorb the dollar amount of a loss in a specified order. So for example, the first loss subclass might be required to assume all losses up to the full amount of the payments owed to it. Any additional losses may then be allocated to the second loss subclass, and so on and so forth.

The subclasses can also include subclasses (Loss Category Subclasses) that are required to assume certain types of losses before any portion of the loss is allocated to other nonrelated Insuring Obligations. For example, various types of credits might be divided into separate subclasses based on the underlying credit type and/or rating agency risk category (Credit Subclasses). So, any loss on Insured Obligations that are hospital bonds might be allocated as follows:

First to the related Insuring Obligations (i.e., Insuring Obligations that are part of the Defaulting Issue), if applicable Second to nonrelated Insuring Obligations for which the underlying bond is also a hospital bond (i.e., Insuring Obligations in a "related" Loss Category Subclass—the Hospital Loss Category Subclass)

Third, to nonrelated Insuring Obligations that are part of the same risk subclass (e.g., the subclass consisting of bonds in the same "risk category" using S&P risk categories for determining the capital requirement for bond insurers). Such Insuring Obligations may also be part of a "related" Loss Category Subclass with a higher loss position than the Hospital Loss Category Subclass.

Fourth, to Insuring Obligations that are part of a nonrelated Loss Category Subclass (e.g., Insuring Obligations that are GO bonds or water and sewer bonds).

Loss Category Subclasses may be further subdivided into Loss Position Subclasses (e.g., within a particular Loss Category Subclass such as Hospital Bonds, subclasses of Insuring Bonds that are required to absorb the dollar amount of losses in a specified order). The number of Loss Position Subclasses can vary across Loss Category Subclasses and even within a Loss Category Subclass.

In order to minimize the impact of the BECM Structure on the ratings of Insuring Obligations, there can be distinct Loss Category Subclasses (Rating Subclasses) for each rating category of bonds, e.g., AA, A, BBB, and non-rated The percentage of obligations that are Insuring Obligations (the "Insuring Obligation %") can vary across Loss Category Subclasses (e.g., Credit Subclasses) and, perhaps, within a Loss Category Subclass (e.g., different Insuring Obligation %'s for different Rating Subclasses within the same Credit Subclass).

In a fully developed structure, each Loss Category Subclass might independently achieve AAA ratings for the Insured Obligations of that subclass without taking into account the credit enhancement provided by the Insured Obligations of nonrelated Loss Category Subclasses.

Thus, in the event of defaults on bond issues within the General Obligation Bond Subclass, no portion of the default might be allocated to nonrelated Loss Category Subclasses (such as the Hospital Bond Subclass) unless without such contribution from the non-related Insuring Bonds, AAA-rated Insured General Obligation Bonds may otherwise default.

At step 1512, each Rating Subclass can achieve the immediately higher rating category so that the cross-collateralization provided by Insuring Obligations of one Loss Category Subclass to the Insured Obligations of another Loss Category Subclass may have minimal or no impact on the ratings of such Insuring Obligations.

The one potential obstacle to having each Loss Category Subclass independently achieve the immediately higher rating is borrower concentration. If the rating of a large issuer like NYC falls into a new rating category, it could create a concentration problem for the receiving subclass. The new S&P pool rating criteria make this problem much easier to deal with since the move away from a strict 10% of pool criteria for determining borrower concentration. A virtue of using the credit enhancement structure as reinsurance is that the bond insurer can take any such concentration risk. As new borrowers are added to the receiving subclass, the concentration issue may quickly disappear. Also, additional cash capital can be allocated to mitigate the concentration issue.

At step 1514, benefits/issues for issuers include better pricing than traditional bond insurance. Also, since a portion of the cost of credit enhancement may be funded with annual payments to Insuring Owners and since in the event of a refunding, no payments may be made on the Insuring Obligations after the call date of the bonds, the issuer may automatically avoid that portion of the cost of enhancement in the event of a refunding. The portion of the cost of credit enhancement that goes to the program can be funded either with ongoing payments or upfront payments. Also, ongoing payments can be reflected in higher interest payments on the bonds related to the Insuring Obligations than are actually passed through to the Insuring Owners.

Other benefits include more credit enhanced bonds since the BECM Structure may facilitate the enhancement of bonds that the bond insurers may not insure directly. Since bond insurers have the right to approve amendments to issuer's bond documents, it is important for the same capability to exist within the structure. Processing then continues to other steps.

FIG. 15 may be modified with alternate steps, embodiments, and implementations as explained below. At step 1502, in yet another embodiment of the structure of the BECM, in pricing bonds, the issuer establishes two sets of coupons and yields for each maturity: (a) One set of coupons and yields for Insured Obligations—typical of coupons and yields on typical insured bonds; (b) A separate set of coupons and yields for Insuring Obligations to compensate them for providing credit enhancement of the Insuring Obligations.

Issuer pays an additional insurance premium either up front or over time. Combination of two sets of coupons/yields plus insurance premium produces a lower all-in cost for the issuer than the cost produce by conventionally structured bonds with bond insurance. Issuer agrees to use pro rata redemptions when calling Insured and Insuring Obligations to maintain the strength of the credit enhancement.

There are several unique characteristics of Insuring Bonds from an Issuer's perspective, that is provided by the BECM system, method, and structuring. Insuring Bonds are bonds of the same maturity as related Structure Insured bonds if they are priced simultaneously. However the Insuring Bonds of each maturity can have a distinct yield from the BECM Structure Insured Bonds because they are priced as uninsured. They can have an additional coupon that increase the yield, but not the price of the Insuring Bonds. They can be called for redemption if they are called pro rata with the BECM Structure Insuring Bonds or the same maturity. They can be issued in smaller denominations than the BECM Structure Insured bonds. For small loans, the BECM system can be configured either to have very small denominations or term bonds comprised of installments with different yields.

In one embodiment, denominations can be configured: (a) for smaller issues, the structure may require different denominations, rounding, and terming conventions for insuring bonds; (b) $100 denominations; (c) rounding to the nearest $1; and/or (c) Term bonds might have different yields on amounts amortized in various years At step 1512, credit enhancement provided by Insuring Obligations, together with a reduced amount of cash capital, as compared to municipal bond insurers results in AAA ratings on Insured Obligations. Issuer realizes additional savings relative to bond insurance upon a refunding by recapturing the additional yield on the Insuring Obligations after the call date. Insuring Obligations achieve ratings similar (within one notch) of the ratings on the underlying bonds.

Alternatively, Insuring Obligations can be given two separate ratings, one to reflect the rating of the related bond (a "Underlying Rating") and another to reflect the impact of the structure on the credit of the Insuring Obligation (a "Structure Rating"). In that case, the yield spreads for Insuring Obligations versus the related bonds might be based primarily on the BECM Structure Rating, e.g., a low spread for a AA Structure Rating and high spread for a BBB Structure Rating. Insuring bondholder receives significantly higher return than uninsured bonds—analyses performed assume 50 to 200 basis points, depending on the credit and on the bondholder's loss position.

At step 1514, the spread to insured bonds can range from 57 basis points to 300 basis points. Analyses performed include at least two subclasses of Insuring Obligations—the first and second loss position subclasses—with average spreads to uninsured bonds ranging from 75 to 150 basis points. Thus, the average spreads to insured bonds range from 82 to 250 basis points. In each case the analyses performed assume the same spreads for all maturities of Insuring Obligations. Upon a defeasance of the bonds, the insuring bondholder realizes a significant gain. For bonds refunded immediately like the Commonwealth of Mass bonds, the incremental gain over the gain realized if uninsured bonds are refunded might range from 5 points to 15 points. The return on cash capital under the structure ranges from two to three times the return on capital for bond insurance, depending on the (a) specific type of credit and (b) how much is required to fund fixed charges. Generally, the better the underlying credit, the higher the return on capital for bond insurance. So, better credits result in higher incremental returns for the structure.

Figure 16:
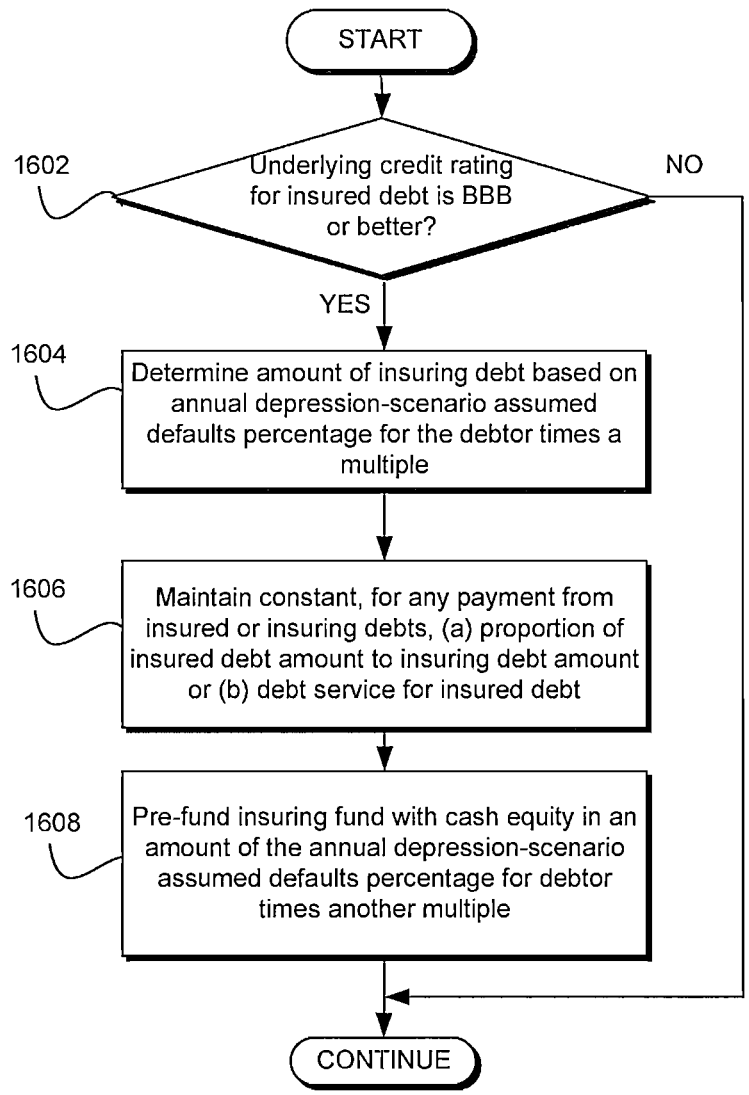

FIG. 16 shows a flow chart for a process for managing debt insurance. At decision step 1602, it is determined if an underlying credit rating for the insured debt is BBB or better. The rating can be determined by a computer based analysis of the history of the issuer, the type of industry of the issuer, the financial condition of the issuer, or the like. The rating can be received over a network from a rating agency such as Moody's.

At step 1604, an insuring debt amount of the insuring debt is determined based on an annual depression-scenario assumed defaults percentage for the debtor times a multiple. In one embodiment, the Insuring Bond portion of each maturity can be sized so that the debt service thereon exceeds the level of average annual defaults that would occur under a depression scenario. The Insuring Bonds can be further sized to take account of an computed downgrade function of a portion of the insured portfolio plus coverage (e.g., 1.6 times the amount previously calculated). The downgrade function is described in more details in conjunction with FIG. 24 and FIGS. 29A and 29B. Proceeds of the insured and Insuring Bonds can equal 100% of the amount required by the issuer, just as in any Insured Bond issue. For example, if the Insuring Bonds equal 3.5% of the bond issue, 96.5% of the proceeds would be from the insured issue and the balance from the Insuring Bonds. Of the cost of insurance (e.g., 75% of the benefit), a portion (e.g., 25% of the 75%) would can paid up front, with the balance paid annually as a interest coupon on the Insuring Bonds.

At step 1606, a proportion of the insured debt amount to the insuring debt amount is maintained constant, for any payment (redemption) from the insured or insuring debts. In an alternate embodiment, the debt service for the insured debt that is based on the insuring debt (intercepted coupons, principal, etc. of the insuring debt) is maintained constant for any payment from the insured or insuring debts. In one embodiment, at least a portion of the Insuring Bonds deposited in the Trust are used at least in part to pre-fund, as Insured Bonds are issued, capital sufficient to pay (ignoring timing issues) debt service for the full life of the portfolio on Insured Bonds in an amount greater than either: assumed depression scenario defaults; or the actual level of four-year defaults that have historically been covered by monoline equity. Insuring Bonds of each issue can fund an amount of capital in excess of the incremental capital charge associated with adding such issue to the insured portfolio. However, the Insuring Bonds related to a specific issue may not alone provide the credit enhancement that enables the related Insured Bonds to be rated Aaa. The source of that rating may be based on the portfolio of non-related Insuring Bonds held by the Trust whose debt service can be intercepted in the event of a default by the related borrower.

At step 1608, the insuring fund is pre-funded with cash equity in an amount of the annual depression-scenario assumed defaults percentage for the debtor times another multiple (e.g., between 1 and 3). The pre-funding of capital and the significant level of default protection for the life of the portfolio can eliminate concerns with obtaining additional capital under stress scenarios, can remove the concern with profitability as a critical metric of the rating assessment, and can eliminate the risk of capital removal other than in a runoff scenario. In a runoff scenario, the Insuring Bonds and cash equity can provide protection for the life of the portfolio (e.g., 20 years) and are reduced only in proportion to reductions in the insured portfolio.

Computing then continues to other steps for further processing

Figure 17:
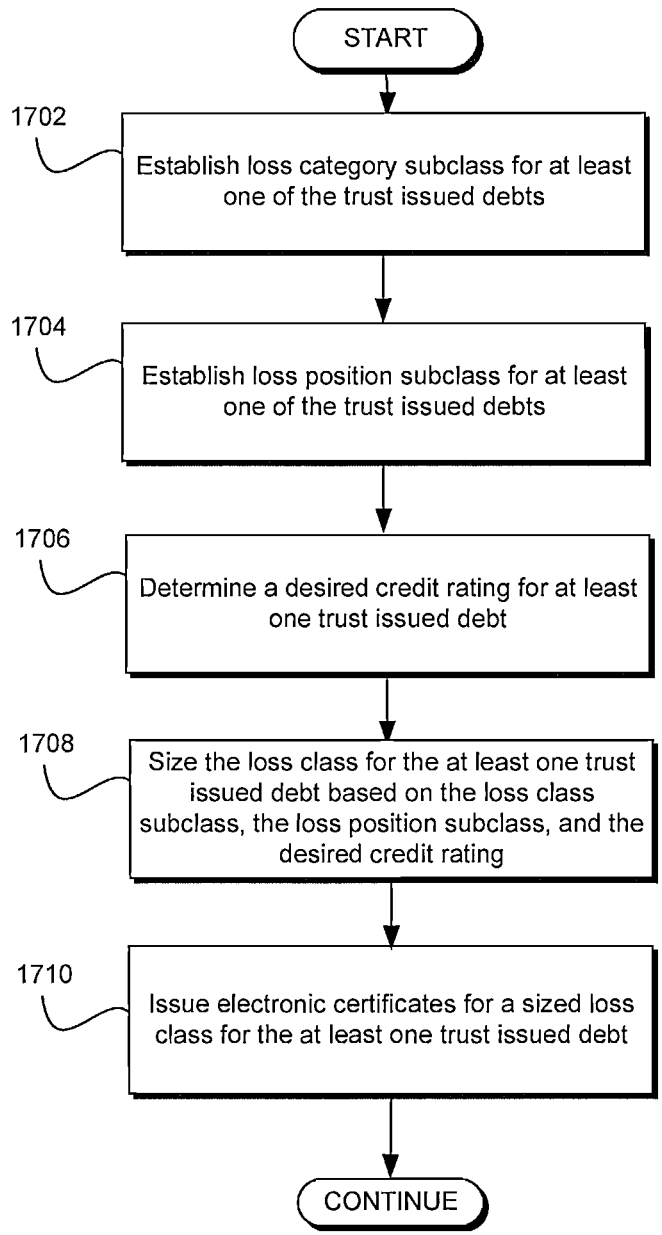

FIG. 17 shows a flow chart for a process for managing debt insurance. At step 1702, a loss category subclass for at least one of the trust issued debts is established. Loss category ("LC") subclasses are configured to group insuring certificates into groups where the bonds have similar risks to ensure that: (a) the risk to insuring certificate holders is as similar as possible to the risk of nonpayment of their underlying bonds; conversely, the risk that cash flows will be intercepted to fund a default within a riskier credit type may be extremely remote; and (b) the credit strength of Insured Bonds of stronger credit types is not weakened by the enhancement of Insured Bonds of weaker credit types.

Loss category subclasses can ensure: (a) the risk to insuring certificate holders is as similar as possible to the risk of nonpayment of their underlying bonds. Conversely, the risk that debt service can be intercepted to fund a default within a riskier credit type may be extremely remote; (b) the credit strength of Insured Bonds of stronger credit types is not weakened by the enhancement of Insured Bonds of weaker credit types. Loss position subclasses are intended to indicate the order in which insuring certificate cash flows will be intercepted within the same loss category subclass.

At step 1704, a loss position subclass for at least one of the trust issued debts is established. Loss position ("LP") subclasses are configured to indicate the order in which insuring certificate cash flows will be intercepted within the same loss category subclass.

At step 1706, a desired credit rating for at least one trust issued debt is determined. In one embodiment, the insuring certificates (and the corresponding Insuring Bonds) will enhance the Insured Bonds, but not other insured certificates (or Insuring Bonds). So, the Insuring Bonds can have two distinct rating attributes: (a) the "underlying rating" of the issuer of the corresponding bond (e.g., Aaa, Aa, A, etc.); and (b) a "structure rating" or desired credit rating of the insuring LP subclass—a separate rating that reflects the risk that debt service of such subclass can be intercepted to cure a borrower default. The various loss position subclasses of insuring certificates and their target ratings are:
  5th loss position—Aa
  4th loss position—A
  3rd loss position—Baa
  2nd loss position—Ba
  1st loss position—NR At step 1708, the loss class for the at least one trust issued debt is sized based on the loss class subclass, the loss position subclass, and the desired credit rating. Although the insured portfolio can consist of conservatively selected bonds rated Baa or better, of which the overwhelming majority will be rated A or better, the target structure ratings of the 1st and 2nd LP subclasses can be below Baa. Such ratings reflect the possibility of a deterioration in the credit quality of the portfolio; the desire to maintain stable ratings for all of the insuring subclasses; and rating criteria for monoline insurers with target ratings below Aaa, which include a capital charge for Insured Bonds with ratings higher than the monoline insurer's target rating. In one embodiment, at least some of the LP subclass of Insuring Bonds can be configured as a monoline insurer with a target rating equal to its structure rating. The function of each loss position subclass is to raise the rating of the portfolio of Insured Bonds to the target rating of the next higher subclass and, in the case of the 5th LP subclass, to Aaa Since each LP subclass will be sized to raise the structure rating of the Insured Bonds to the structure rating of the next higher subclass, the structure related risk to each subclass is the rating of the Insured Bonds achieved by the lower LP subclasses. One embodiment of subclass sizing include:
  1. The 1st to 5th LP insuring subclasses will be sized in aggregate to raise the structure rating of the Insured Bonds to Aaa
  2. The 1st to 4th LP insuring subclasses will be sized in aggregate to raise the structure rating of the Insured Bonds to Aa. So, the structure risk to the 5th LP subclass is a Aa quality risk
  3. The 1st to 3rd LP insuring subclasses will be sized in aggregate to raise the structure rating of the Insured Bonds to A. So, the structure risk to the 4th LP subclass is an A quality risk
  4. The 1st LP insuring subclass will be sized to raise the structure rating of the Insured Bonds to Ba. So, the structure risk to the 2nd LP subclass is a Ba quality risk In sizing each of the LP subclasses, the same assumed defaults are used (including assumed portfolio deterioration and coverage) as are used to support the Aaa rating of the Insured Bonds. However, the coverage required to support the structure rating of each of the LP subclasses is lower as appropriate for its target rating:
  5th LP (Aa)—1 time
  4th LP (A)—0.8 times
  3rd LP (Baa)—0.64 times
  2nd LP (Ba)—0.52 times The coverage for each LP subclass is also affected by the relationship between the rating of the underlying bond and the target subclass rating. If the underlying bond is rated at or higher than the subclass rating, the coverage requirement is a fraction of the multiple stated above:
  Same rating category—25%
  1 rating category higher—20%
  2 rating categories higher—15%
  3 rating categories higher—10%
  4 rating categories higher—0%

Figure 18:
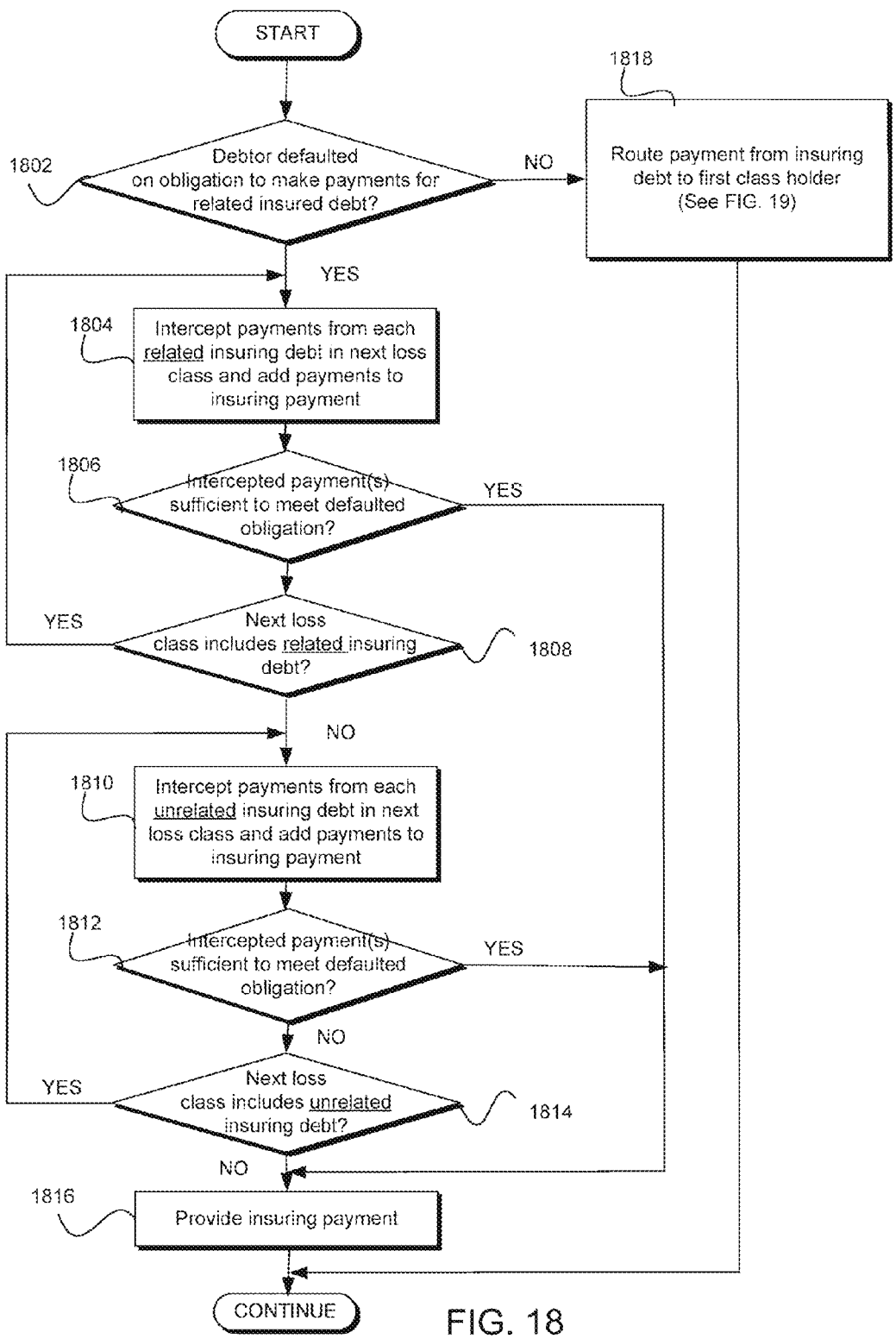

For example, assume that startup cash equity is $200 million for both the BECM and a conventionally structured monoline insurer and that both capital allocated to an insured issue and capital not yet allocated are available to cure a defaults. The BECM can have significantly greater capital (i.e., capacity to withstand defaults) at every point in time from the issuance of the first Insured Bond until the monoline insurer's startup capital is fully allocated. The bond portfolio is assumed to consist of A and Baa rated City GOs. The monoline insurer's capital is fully allocated when $19.6 billion of bonds have been insured whereas the cash equity available under the BECM will support the enhancement of $136 billion. The BECM's default tolerance significantly exceeds that of the conventional monoline at every point in time both over a four-year depression scenario and over the term of the bonds At step 1710, electronic certificates are issued to the first and second classes based on the credit rating of the classes, wherein holders of the electronic certificates are entitled to satisfaction from the insuring trust for the trust held debt. The number of electronic certificates can be issued based on the sizing of the loss class, and the payments recorded as an obligation in computer media that is due to the holder of the electronic certificate is based on the a function that increases as the loss class position decreases. For example, a holder of 2nd LP is paid a higher premium for assuming more risk than a 3rd LP holder. Computing then continues to other steps for further processing FIG. 18 shows a flow chart for a process for managing debt insurance. FIG. 18 shows an alternate embodiment of at least a portion of the processes of FIGS. 1 to 6.

Figure 19:
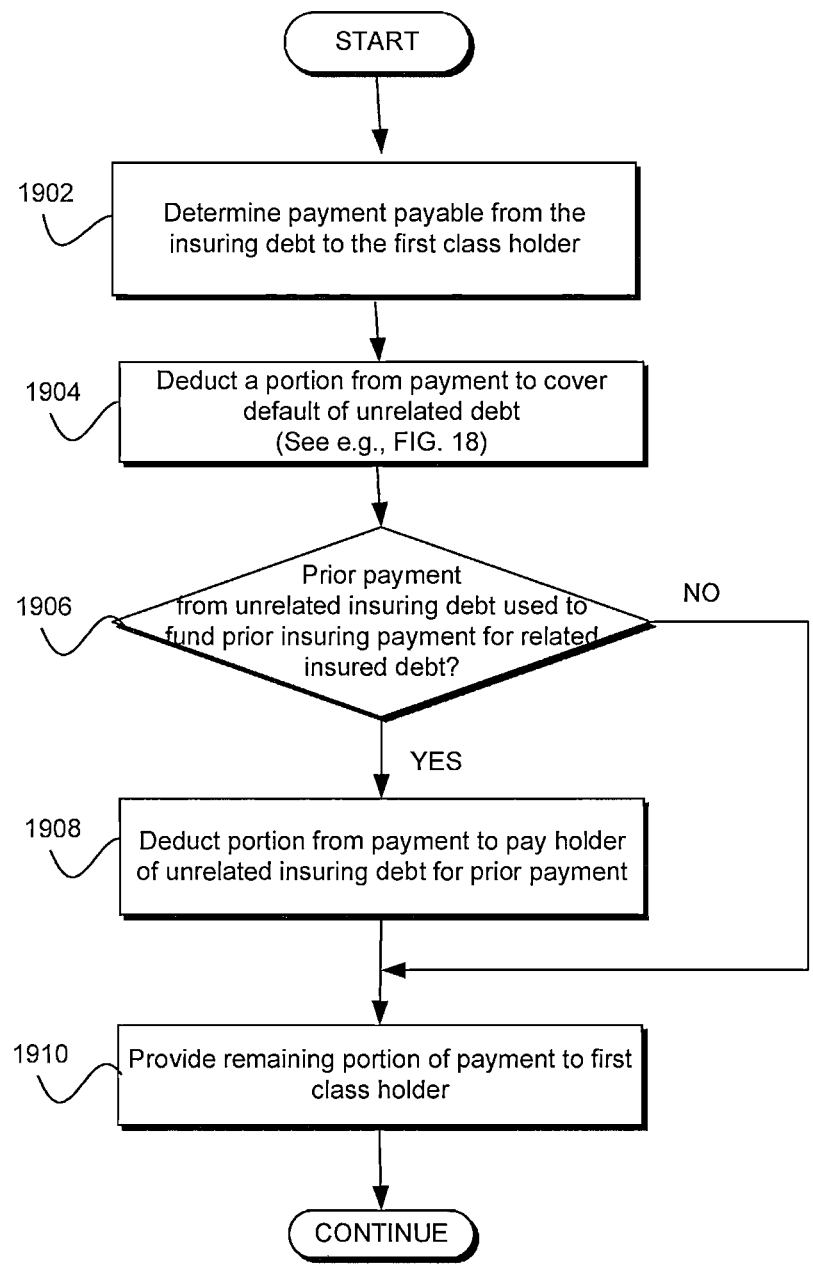

Generally, FIGS. 18 and 19 show a process where portions of the payments to certificate holders (e.g., the first and second class holders) are partially or fully used to cover defaults of related insured debt associated with a related insuring debt and a first class holder and/or an unrelated insured debt associated with an unrelated insuring debt and a second class holder. In one embodiment, an insuring payment for an insured debt is provided based on intercepted payment payable from an insuring debt. In one embodiment, if a default occurs, the Insuring Trust can intercept payments due on the insuring trust certificates (first class holders and second class holders) to cure the default. In one embodiment, Insuring Bonds can fund a net default equal to their percentage of the total portfolio of insured and Insuring Bonds. For example, assume that insured and Insuring Bonds equal 96.5% and 3.5% of each maturity within the total portfolio and there is a default of issuers representing 3.5% of the portfolio. In this scenario, the non-defaulting Insuring Bonds equal 96.5% of 3.5% of the portfolio, which is sufficient to cover the defaulting Insured Bonds, 3.5% of 95.5% of the portfolio. So, the Insuring Bond percentage of the aggregate outstanding bonds represents the Trust's default tolerance capacity net of a like amount of borrower defaults. In one embodiment, because the BECM can cover a higher level of defaults and will do so for the life of the portfolio, it is much less leveraged that the capital of a traditional monoline insurer. A borrower may not be affected by the default of another issuer.

In general, upon a default, debt service of insuring certificates can be intercepted to the extent needed in the following intercept order:
1. Insuring certificates of the same issuer and credit ("related" certificates)
2. Insuring certificates of the same (i.e., a "unrelated") loss category subclass
3. Insuring certificates of other (i.e., "unrelated") loss category subclasses Making insuring certificate holders primarily responsible for defaults of the issuer of the related Insured Bond is configured to: (a) discourage adverse selection of bonds in the insured portfolio and (b) make it highly unlikely that insuring certificate holders will ever suffer a nonpayment (as distinct from a delayed payment) due to a default by a nonrelated issuer and/or nonrelated issuer in a different loss category subclass.

Referring to FIG. 18, at step 1802, it is determined if a debtor defaulted on an obligation to make payments for a related insured debt. To make this determination, a computer based monitoring system can monitor cash flows for payments, can receive a signal indicating default over a network, or the like. If the debtor defaulted, processing continues to step 1804. Otherwise, processing continues to step 1818 where a payment from the insuring debt is routed to the firs class holder. The process of step 1818 is described in more detail in conjunction with FIG. 19.

At step 1804, a payment payable from a related insuring debt in a particular loss class that is related to the defaulting insured bond are intercepted. Upon a default, debt service of insuring certificates can be intercepted to the extent needed based on the above described intercept order. Future payments by of the defaulted amounts can be applied to reimburse insuring certificate holders in the reverse of the intercept order.

A portion of the intercepted payments is added to the insuring payment to cure the default. In other embodiments, insuring funds from cash capital, other unrelated payments, or the like can also be added to the insuring payment.

At decision step 1806, it is determined if the related insuring fund's intercepted payment is sufficient to meet the defaulted obligation of the related insured debt. A comparison between the amount of the default and the intercepted payment is performed. If the determination is yes, processing branches to step 1816. Otherwise processing continues to step 1808.

At decision step 1808, it is determined if the next loss class has a related insuring fund. If so, processing loops back to step 1804. Otherwise, processing continues to step 1810. A computer memory can record the ordering of the classes in a rating scale, e.g., within a database, or the like. Thereby, the related insuring funds in a lower loss class are intercepted before related insuring funds in a higher loss class. The determinations of junior or senior holder of financial instruments (loss classes) are described in more details in conjunctions with FIGS. 1 to 6.

At step 1810, a payment payable from an unrelated insuring debt in a particular loss class that is unrelated to the defaulting insured bond are intercepted. Future payments by of the defaulted amounts can be applied to reimburse insuring certificate holders in the reverse of the intercept order. A portion of the intercepted payments is added to the insuring payment to cure the default. In other embodiments, insuring funds from cash capital, other unrelated payments, or the like can also be added to the insuring payment.

At decision step 1812, it is determined if the unrelated insuring fund's intercepted payment is sufficient to meet the defaulted obligation of the insured debt. A comparison between the amount of the default and the intercepted payment is performed. If the determination is yes, processing branches to step 1816. Otherwise processing continues to step 1814.

At decision step 1814, it is determined if the next loss class has a related insuring fund. If so, processing loops back to step 1810. Otherwise, processing continues to step 1816. A computer memory can record the ordering of the classes in a rating scale, e.g., within a database, or the like. Thereby, the unrelated insuring funds in a lower loss class are intercepted before unrelated insuring funds in a higher loss class. The determinations of junior or senior holder (loss classes) of financial instruments are described in more details in conjunctions with FIGS. 1 to 6.

At step 1816, the insuring payment is provided. In one embodiment, the insuring payment is provided over a network, in a computer account, over an exchange, or the like. The insuring payment is provided to at least one debt holder of the insured debt to cure any defaults by an issuer of the insured debt to fulfill an obligation to pay the debt holder. Computing then continues to other steps for further processing.

FIG. 19 shows a flow chart for a process for managing debt insurance. FIG. 19 shows an alternate embodiment of at least a portion of the processes of FIGS. 1 to 6. At step 1902, a payment based on an obligation to pay interest or principal on the insuring debt is determined for the first class holder based on the obligation owed to the first class holder. The obligation recorded in computer memory for payments from the insuring debt triggers a first payment based on configured parameters. The payment can then be allocated, and set aside for payment to the first class holder based on the recorded obligation (e.g., electronic trust certificate) to pay the first class holder. The allocation and payment, if a trigger occurs, can be recorded in computer memory and can cause a computer system to make the payment as described in the steps below. Payments can be made over an exchange, in a computer account, or the like.

At step 1904, a portion is deducted from the payment to the first holder to cover the default of unrelated debt. When a debt that is unrelated to the insuring debt but that is insured by another insuring debt defaults, and the other insuring debt's intercepted funds are insufficient to cover the default, the portion to cover the default is deducted from the payment to the first holder. In one embodiment, the portion covers the default completely. In another, the portion can be combined (e.g., pro-rata) with other unrelated insuring debts that are in the same loss class to cover the default. Additional details for this step 1904 are described in more detail in conjunction with FIG. 18. While FIG. 18 describes the operations with respect to the first class holder that is associated with the related insured debt, FIG. 18 can be readily applied to the second class holder that is associated with the unrelated debt.

At decision step 1906, it is determined if a prior payment from an unrelated insuring debt was used to fund a prior insuring payment for the related insured debt. In one embodiment, the unrelated insuring debt's payments are obligated to be paid to the second class holder. This situation can occur if, for example, the related insured debt defaulted on a payment and the intercepted funds from the insuring debt was insufficient to cover the default, and other unrelated insuring debt payment was interpreted to pay the default. If the determination is yes, processing continues to step 1908. Otherwise, processing continues to 1910.

At step 1908, a portion is deducted from payment to pay the second class holder. The portion can be some or all of the amount that was paid by the unrelated insuring debt to previously cure the default of the related insured debt. The deducted portion can be provided to the second class holder over a network, exchange, or the like. The deducted portion can be used to reimburse insuring certificate holders. In one embodiment, future payments by of the defaulted amounts can be applied to reimburse insuring certificate holders in the reverse order of the intercept order.

At step 1910, the remaining portion of payment is provided to the first class holder. The portion remaining after the deduction described above are provided to the first class holder over a network, exchange, or the like. The portion of the remaining debt service (e.g., coupons) can be paid as a pass through to the certificate holder of the loss position for the Insuring Bonds. The amounts can be stored as an obligation in computer memory by the trustee of the insuring trust to pay the certificate holders. In one embodiment, the amounts are not held by the trust, but rather passed through to the certificate holder. A computer based mechanism can be programmed to track the fund obligations and payments. Computing then continues to other steps for further processing.

Figure 20:
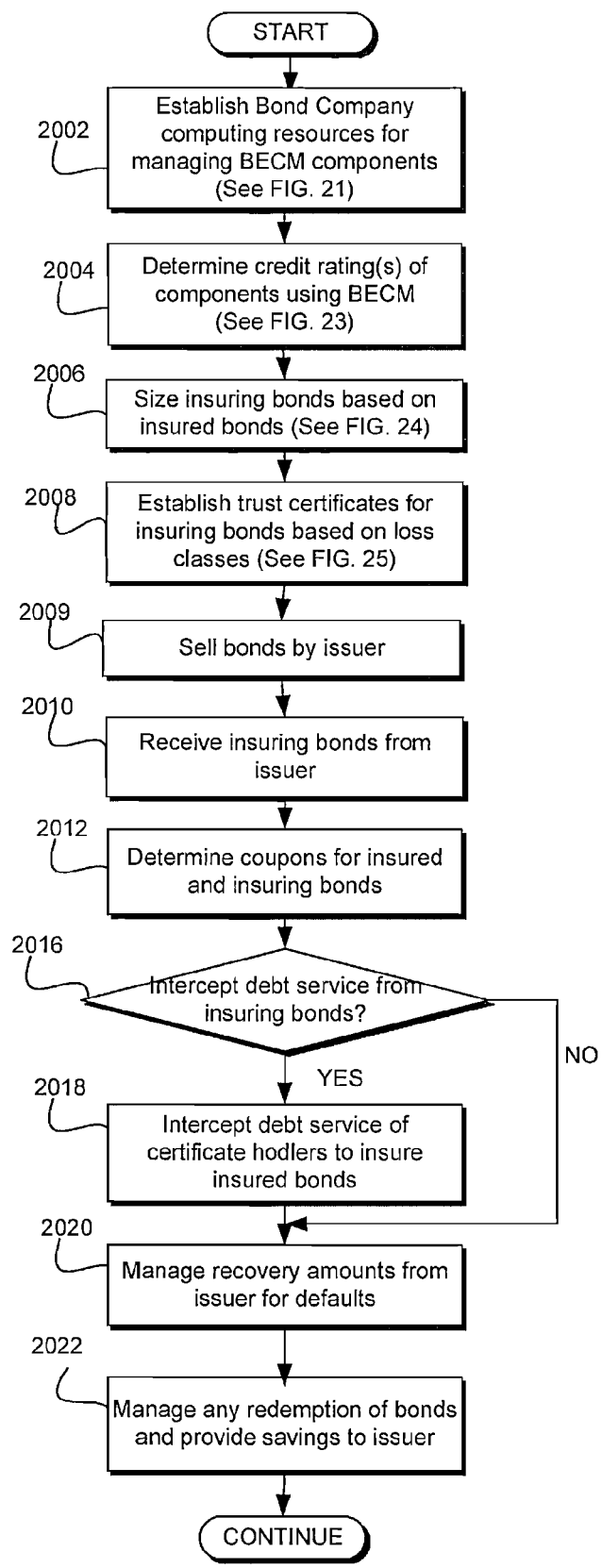

FIG. 20 shows another embodiment of a process flow for managing a BECM system. At step 2002, the Company's computing resources and system for managing BECM components are established. Briefly, an insurer establishes a capital structure within a computer memory of a computer system, the capital structure designed to minimize risk and structured with regulatory capital and a cash stream that is pledged to fund the default. In one embodiment, computer operations to manage components of the BECM are established, underwriting requirements of BECM components are determined, insuring fund intercept functions and conditions are established, and monoline functions may also be performed. In one embodiment, computer resources related to these operations such as database triggers, comparisons, data, or the like are recorded in computer readable media. Data associated with Insured Bonds, Insuring Bonds, liquidity providers, insuring certificates, regulatory capital, payments, and the operations of the company are initiated. The operations of step 2001 are described in more detail in conjunction with the process of FIG. 21A.

At step 2004, the credit rating(s) of various components that uses or performs BECM methodology is determined. Briefly, a determination of whether the established capital structure is sufficient to cover a depression scenario period to obtain a minimal target credit rating for the insurer is generated, and the target rating based on the generated determination is electronically received. In one embodiment, the target credit rating is AAA, wherein the investment comprises an Insured Bond issued by an issuer, and the cash stream is produced from an Insuring Bond issued that is related to the Insured Bond and that is issued by the issuer. In another embodiment, the investment comprises at least one of a debt, a bond or a loan, wherein the cash stream is produced from the investment, or a dividend or an account receivable associated with the investment. In yet another embodiment, the investment comprises a previously issued bond issued by an issuer, and the cash stream is produced by an investment unrelated to the issuer and is used as re-insurance for the previously issued bond. In yet another embodiment, determining the credit rating can include increasing in the at least one computer memory the credit rating for a first credit based on an increased likelihood that a payment default can be fully absorbed, wherein the credit rating is representative of a probability of a party owing the first obligation to make specified payments for the first credit to meet the first obligation.

In one embodiment, various capital parameters are examined by the computer system. Capital pre-funding is examined, capital adequacy of the insurer based on the period at the end of a depression scenario is examined, capital adequacy of the insurer based on the period during the depression scenario is examined, and a credit rating of the BECM components are determined based on these various electronic examinations. One embodiment of the operations of step 2004 are described in more detail in conjunction with the process of FIG. 23.

At step 2006, Insuring Bonds can be appropriately sized for the Insured Bonds. In one embodiment, sizing can include receiving from an issuer, data about the Insured Bond for minimizing the Insured Bond's risk of default; and sizing, by the computer system, an Insuring Bond based on the received data about the Insured Bond, wherein the sized Insuring Bond produces the cash stream that provides the capital structure necessary to achieve the target credit rating. In one embodiment, the pledged bonds, (e.g., the Insuring Bonds), can represent a portion of at least some and in one embodiment every maturity and are sized in a computer readable media using the computer implemented processes described based on the following computer readable parameters:

Projected depression scenario defaults,

Current underlying ratings of the Insured Bond issues,

A downgrade function of a portion of the Insured Bonds, and

Coverage at or above the level typically provided by monoline insurers.

This sizing of the Insuring Bonds can also be a tangible result and transformation provided by the computer system such that the use of the sized amount creates efficiencies for the insurer. In one embodiment, no additional funds need be raised with the proper sizing, and such proper sizing can maintain the appropriate amount of funds available for insurance so that an appropriate increase in credit rating can be achieved for the Insured Bonds.

In one embodiment, in the event of an insured default determined electronically by a computer system, debt service on Insuring Bonds otherwise payable to the Insuring Certificate holders (e.g., the Insuring Certificate Payments) is intercepted within the at least one electronic exchange by the Insuring Trust in an amount sufficient to cure the default. Insuring Bonds is recorded in computer readable media to not be able to be sold by the Trust. Intercepted Insuring Certificate Payments are recorded as available to cure defaults. The operations of step 2006 are shown in further details with respect to FIG. 24.

At step 2008, trust certificates for Insuring Bonds are established based on loss classes. In one embodiment, loss category subclasses are established, a type of the loss category subclasses are determined, Insuring Bonds are pledged, and trust certificates for the Insuring Bonds are issued. In one embodiment, establishing can include establishing, by the computer system, a trust certificate, wherein a payment from the Insuring Bond is pledged to be paid to a holder of the trust certificate.

In one embodiment, the computer system allocates a first credit having a first obligation to make specified payments and a second credit having a second obligation to make specified payments, each of the first credit and second credit being in a non-default state when a respective obligation is met and being in a default state when a respective obligation is not met. In one embodiment, the computer system associates a first senior holder and a first subordinate holder with the first credit using (a) a respective first senior holder financial instrument through which payments from the first credit flow to the first senior holder and (b) a respective first subordinate holder financial instrument through which payments from the first credit flow to the first subordinate holder. In one embodiment, the computer system associates a second senior holder and a second subordinate holder with the second credit using (a) a respective second senior holder financial instrument through which payments from the second credit flow to the second senior holder and (b) a respective second subordinate holder financial instrument through which payments from the second credit flow to the second subordinate holder. In one embodiment, the computer system structures the first senior holder financial instrument and the first subordinate holder financial instrument in the computer memory to give priority to payments due the first senior holder prior to payments due the first subordinate holder in the event the first credit enters the default state.

In one embodiment, it is determined, in the computer memory, for the trust certificate, a type of the loss category subclass, wherein a type comprises (i) a horizontal loss position subclass wherein a loss that obligates payment is allocated based on a position within a plurality of loss position subclasses, with each of the loss position subclasses allocating the loss based on a category rating within that loss position subclass, or (ii) a vertical loss position subclass, wherein the loss is allocated based on another position within a plurality of categories, with each category allocating the loss based on a loss position rating within that category. In one embodiment, establishing can include establishing a plurality of loss category subclasses; and determining a yield above a coupon amount for the Insuring Bond for each position in the loss category subclasses, wherein the yield increases as the position decreases. The operations of step 2008 are shown in further details with respect to FIG. 25.

At step 2009, the issuer sells the insured bonds.

At step 2010, the Insuring Bonds may be received, by, for example, the Company, the Insuring Trust, or the like. The Insuring Bonds may be issued by the issuer, segmented from pre-existing debt, or the like.

At step 2012, coupons for Insured and Insuring Bonds are determined and paid. In one embodiment, in addition to the coupons payable on Insured and Insuring Bonds, the issuer pays over the at least one electronic exchange a coupon on Insured (and optionally Insuring Bonds) representing an annualized portion (e.g., 75%) of the bond insurance premium. The premium coupons on Insured Bonds are detached and assigned (within a computer memory) to the Insuring Trust at the time the bonds are issued. In another embodiment, the upfront premium may go to the Regulated Company and not the Insuring Trust. (This discussion assumes, however, that the coupon is payable solely on Insured Bonds, but other scenarios may be used without departing from the invention.) The balance of the issuer's insurance premium (e.g., 25%) is paid upfront at issuance over the at least one electronic exchange.

In one embodiment, the Insuring Trust sends the at least one electronic exchange a portion of the annual premium payments as a supplemental coupon on the Insuring Certificates. The supplemental coupon is based on the additional risk that the Insuring Certificates Payments may be intercepted (e.g., this obligation is recorded in computer readable media) to take the first loss as described in the paragraph below. The balance of the premium payments, together with the upfront premium and earnings thereon, is paid over the at least one electronic exchange to the Company for operating expenses and return on BECM cash capital. After these payments, the remaining annual insurance premiums represent the net revenue to the Company.

At step 2016, it is determined if the debt service payments (e.g., coupons and/or principal) of Insuring Bonds should be intercepted. In one embodiment, the determination of whether the payments of the Insuring Bonds should be intercepted is based on a legal obligation recorded in computer memory. In one embodiment, in the event that the Trustee receives notice from the Company's or from a paying agent of an Insured Bond Issue's computer system, based on a determination of the computer system, that insufficient funds are available from the issuer to make timely payment of amounts coming due, the Trustee's computer system can be triggered to intercept Insuring Bond Payments thereafter received by the Insuring Trust. The interception software routines can determine the interception in the amounts sufficient to assure payment of all amounts payable pursuant to the Guaranty. If it is determined that the payments should be intercepted, processing continues to step 2018. Otherwise computing continues to step 2020.

At step 2018, at least a portion of the debt service payments (e.g., coupons and/or principal) of the Insuring Bonds (e.g., that is configured to be paid to certificate holders) is intercepted. In one embodiment, debt service payments are constrained by the computer system of the payment to the holder of the trust certificate based on a legal obligation to pay secured holders of a plurality of Insured Bonds, which includes the Insured Bonds, wherein the legal obligation is recorded in the computer memory. The computer system can intercept the payment, based on the recorded legal obligation; and electronically send the payment to the secured holders, based on the recorded legal obligation. In one embodiment, the computer system uses payments from the second subordinate holder financial instrument to perform the first obligation of the first credit for the benefit of the first senior holder to the extent that the first credit enters the default state and payments due the first senior holder are not available, wherein both the first subordinate holder and the second subordinate holder are junior to the first senior holder.

In one embodiment, the Trustee's computer system can intercept payments received with respect to such Insuring Bonds and in such amounts as can be specified by the Company (e.g., through a user interface) in accordance with the terms of the Trust. For example, the user interface will allow inputs based on the terms of the Trust recorded in computer readable media.

At step 2020, a recovery or repayment amounts from the issuer are managed. If a default of an insured bond of the issuer was covered by the operations of the BECM system as described herein, the issuer pay repay the covered amounts to the Company and/or the Trust. The recovery or repayment amounts may be received over a network, stored in computer memory and/or credited to an electronic account.

At step 2022, any (early) redemption of bonds are managed and savings provided to the issuer for such redemptions. In one embodiment, it is determined if the bonds are redeemed early. The issuer may send an electronic message to the trust or the Company that the bonds should be redeemed early. The issuer may compute that this early redemption will save on both fees paid to insure the Insured Bonds as well as interest payments due to factors such as reduced interest rates, or the like. If the bonds are not redeemed early, processing continues to other steps, including looping back to step 2016 until the end of the term of the insured/insuring bonds.

Otherwise, the bonds are redeemed and a savings of fees for insurance are provided to the issuer. In one embodiment, based on an early redemption of the Insured Bonds, the issuer realizes savings of fees that are not paid to the insurer for insuring the Insured Bonds in a remaining period for the Insured Bonds. In one embodiment, the early redemption benefit to issuer is that the issuer does not have to make large upfront payment as compared to a monoline scheme, and saves on fees upon redemption. The bonds can be redeemed all at once, where both insured and Insuring Bonds are redeemed. In another embodiment, the Insured Bonds may be redeemed without redeeming the insuring bonds. Computing then returns to other processing.

FIG. 20 may be modified with alternate steps, embodiments, and implementations as explained below. In one embodiment, at step 2002, under the structured approach of the BECM, a portion of the capital needed to meet rating agency requirements can be provided by the insuring bondholders (at step 2004). Cash capital is need primarily for liquidity and in aggregate represents a modest percentage (at most 25% and, more likely, 25% of 25% or 6.25%) of the cash capital requirement for bond insurance. Only a modest percentage of the aggregate cash capital requirement under the structured approach (e.g., 25%) is actually risk capital, rather than providing liquidity until funds from the insuring investments can be intercepted. The return on capital for the structured approach might be two or more times the return on capital for bond insurance, even if all of such cash capital were risk capital. If the returns of risk capital are "leveraged" by providing a lower return for cash capital that only provides liquidity, the structured approach provides returns on cash risk capital that are 3 to 5 times the returns on capital for bond insurance. If the risk capital is given a fixed return at least equal to the typical target return for bond insurance and the net revenues are retained as "program revenues" (representing a return on intellectual capital), such program revenues may be substantial. Note that the return on risk capital in this structure can both be higher and more certain than the return on risk capital for bond insurance while still leaving substantial program revenues.

A distinction between existing monoline bond insurance and the new approach is that each new insured credit results in an increase in the capital and diversification of the structured enhancement and, therefore, strengthens the structured credit. Under the monoline insurance model, each new credit increases diversification but consumes unallocated capital.

At step 2006, by tranching municipal credits (using either a classic CDO approach or an alternative approach like the method of allocating risk described above) and using the credit enhancement provided by the lower or "insuring" tranches to enhance the higher or "insured" tranches, it is possible to create a new class of high yield securities (i.e., the insuring tranches) that are unique in that they will have a very low probability of default (including failure to achieve its target investment return).

In one embodiment, the primary impediment to creating such a class of securities based on municipal credits is that the credits which are the best candidates to be included in such a structure (i.e., the credits with virtually no likelihood of default) are immediately insured in the primary market (or immediately thereafter in the secondary market) by the municipal bond insurers.

Other obstacles include (I) the difficulty of stripping interest coupons while maintaining the portion of the original coupons on the insured securities (i.e., the difference between an uninsured yield and an insured yield) that are transferred to the insuring securities in exchange for the credit enhancement and (II) converting what may have been interest on the insured securities (if they had been uninsured) to compensation to the insuring securities (e.g., higher interest coupons thereon) without affecting the marketability of the insured securities by depositing them into a trust, partnership or similar entity.

At step 2008, in one alternate embodiment, the compensation to the insuring securities can be in the form of a fee or other payment (paid at step 2018) provided that the credit enhancement is added in the primary market, instead of payments paid to trust certificates.

A close analog is so-called State Revolving Funds (SRFs). Each state has an SRF which, from a credit perspective, consist of a pool of municipal loans together with equity held in the form of either cash or loans. The credit of an SRF is generally dependant on the ability of the SRF's cash flows to tolerate loan defaults. S&P has published guidelines setting forth the amount of assumed defaults that the program cash flows must tolerate to achieve various rating levels. In general, the more diverse the loan portfolio, the lower the amount of defaults required to be assumed in evaluating the pools default tolerance. The number and types of loans included within an SRF portfolio are less diversified than in an bond insurer's portfolio, first, because of the lack of geographic diversity (all borrowers are from the same state) and second, because, in one embodiment, the credits are general obligation bonds are water and sewer revenue bonds. Due to the reduced diversification, as compared to the loan pool for a bond insurer, the rating agencies assume that the defaults may be higher on a percentage basis for an SRF than for a bond insurer. So, the rating agencies impose higher capital charges on SRFs than on bond insurers. However, using a structured approach to provide bond insurance, the levels of borrower defaults required are configured in computer memory to be assumed (and the capital charges imposed) to be the same as for a bond insurer. Based on reports of prior discussions with the rating agencies, this issue is discussed at length below.

At step 2008, in yet another embodiment, if structured CDO type tranches of municipal credits (which can be individual credits or groups of credits) are combined with existing portfolios of bond insurers, the combination can be configured as a single integrated portfolio for rating purposes. The bond insurer's capital and the insuring obligations under the structured approach (collectively, the "combined insuring obligations") can be configured together as a single source of credit enhancement. The bonds insured by the bond insurer and the obligations enhanced by the structure (collectively, the "combined insured obligations") can similarly be configured together and configured to be combined insuring obligations as a source of credit enhancement.

The bond insurer's capital and the insuring obligations under the structured approach can be treated as separate subclasses of the combined insuring obligations, with specific rules for determining when either subclass is used to fund a payment on the opposite subclass of combined insured obligations.

The legal framework enforced by software trigger and ˆalgorithms for creating such combined insuring obligations can be set forth in a separate agreement database or it can be self-contained within the document database for establishing the structured approach.

The integration of the structured credit with the existing portfolio can eliminate the startup issues (critical mass of participating borrowers, portfolio diversification, concentration, redemption risk, etc.) that can typically be addressed in contemplating a structured approach to credit enhancement of municipal credits.

At step 2008, in yet another embodiment, because the amount of Insured Obligations may be significantly greater than the Insuring Obligations, the return on the Insuring Obligations, particularly, the first-loss Loss Position Subclass, which may receive a significantly higher return than the normal uninsured yield on the related bonds. For example if (i) the Insured Obligations are 85% of the bond issue par of $100, (ii) the benefit of the credit enhancement/bond insurance is 25 basis points, and (iii) 70% of the benefit of bond insurance goes to the issuer and to program costs (leaving 30% to go to the Insuring Owners), then there are 85×25×30%=$0.0637 to be allocated among the $30 of Insuring Obligations.

Assuming two Loss Category Subclasses and that the first-loss subclass gets 80% of the benefit: (a) the second-loss subclass may get $0.0128 and the first-loss subclass may get $0.051. (b) the yield impact of those dollars on the $15 of bonds in each subclass may be 34 basis points for the second-loss subclass and 136 basis points for the first-loss subclass.

At step 2012, the preferred mechanism for compensating Insuring Owners (at least the holders of Insuring Obligations, where possible) is to have the issuer of the underlying bonds establish a higher interest coupon/yield for the Insuring Bonds at the time they are initially priced. From the borrower's perspective, each maturity of an Included Issue may have split coupons/yields—insured coupons/yields on the Insured Obligations and higher coupons/yields on the Insuring Obligations—but the borrower may achieve a lower overall cost of funds. In one embodiment, such compensation can be structured as a fee or otherwise and the coupon splitting need not be done at the time of bond issuance.

In one embodiment, enhancement premiums (coupons) can be configured to have separate premiums for refunding and new money bonds. The establishment of the coupons and yields by the issuer can allow the creation of a subclass of high-yield securities with a very low probability of default.

In one embodiment, if any maturity of bonds is called for redemption, Insured and Insuring Obligations can be called pro rata in order to maintain the strength of the credit enhancement provided by the Structure.

Having split coupons/yields also should minimize legal authority issues relating to the issuer making ongoing annual payments for credit enhancement of its previously issued bonds.

In an alternate embodiment, the computer system can structure in computer memory information about a partnership and configure the Insured and Insuring Obligors to receive distributions of the appropriate cash flows from the partnership. However, the sale of Insured Obligations that represent interests in a partnership may impose an additional cost (estimated at 25 basis points) versus the sale of Insured Obligations that are bonds. Such a yield penalty versus bond insurance may make it impossible to be cost-effective versus bond insurance. It may be more cost-effective (and certainly simpler) simply to pay a higher yield on the Insuring Obligations.

If the insured obligations under the structured approach were also insured by a single bond insurer, each additional issue of insured and insuring obligations may create the following rights and obligations for the bond insurer:

At step 2016, an obligation on the part of the bond insurer in the event that the amounts available under the structured approach were inadequate to cover payments due on insured obligations in the event of a bond default.

At step 2018, a right on the part of the bond insurer in the event of a default on included credits in it its portfolio to receive amounts otherwise payable on insuring obligations. Thus portions of the bond insurer's cash capital analogous to 2nd through 4th loss insuring obligations may be protected by the 1st loss insuring obligations under the structured approach.

In this construct, the combining of bond insurers' cash capital and capital representing bond debt service payable on insuring obligations is analogous to combining SRFs which use the Reserve model (cash capital) and the Cash Flow Model (equity invested in loans).

Also, a portion of a bond insurer's capital might be used to provide liquidity for the insuring obligations under the structured approach (which may otherwise require additional cash capital) without adversely affecting its timely availability to fund defaults in the bond insurer's portfolio of credits. Thus, the portfolio integration approach can enable bond insurers to earn an additional return on otherwise idle capital.

At steps 2020-2022, the Insuring Owners may realize a significant gain in market value upon the refunding of the related Insured and Insuring Obligations since the yield on the pre-refunded Insuring Obligations may be much higher than the normal yield on pre-refunded bonds.

At step 2022, in further embodiments of the BECM system, various options may be configured and/or modified using computer implemented mechanisms. Call Provisions can be configured to: use pro rata between insured and insuring bonds; structure at least the insuring bonds as noncallable; permit the insured bonds to be refunded, with the refunding bonds to benefit from the credit enhancement provided by the insuring bonds.

In one embodiment, at step 2004, bond insurer ratings criteria can be applied to the BECM structuring as follows. The ratings for the components are not "municipal" ratings—e.g., are instead analogous to corporate ratings; the required default tolerance is 25% of the default tolerance for a municipal pool. The ratings can be configured as "insured ratings" obtained for the BECM Structure, which is designed to compete with bonds insurance and does not look like a traditional municipal pool or a traditional CDO structure. If the BECM structure's enhancement starts with below investment grade borrowers (which may not be insured by monoline insurers), the Company can seek AAA ratings from rating agencies other than Fitch, Moody's and S&P, e.g., Duff & Phelps or AMBest. The Company can receive underlying ratings from one or more of the traditional agencies to facilitate (a) integration of the structure with existing insurer portfolios and (b) eventual receipt of AAA ratings from at least one of the traditional rating agencies.

At step 2004, in yet another embodiment, the ratings can be configured to incorporate:

Bond ratings

Structure ratings (traditional CDO where the structure doesn't secure the higher rated bonds)

Structure ratings where the structure secures the insured bonds

Underlying Ratings

Structure Rating—the rating impact of the contribution of particular Insuring Obligations to the AAA rating of the Insuring Obligations Structure Enhanced Rating—the rating produced by the combination of the credit enhancement provided to a particular Insuring Obligation by the lower loss position Insuring Obligations and the credit enhancement provided by that particular Insuring Obligation both to higher loss position Insuring Obligations and the Insuring Obligation.

Figure 21A:
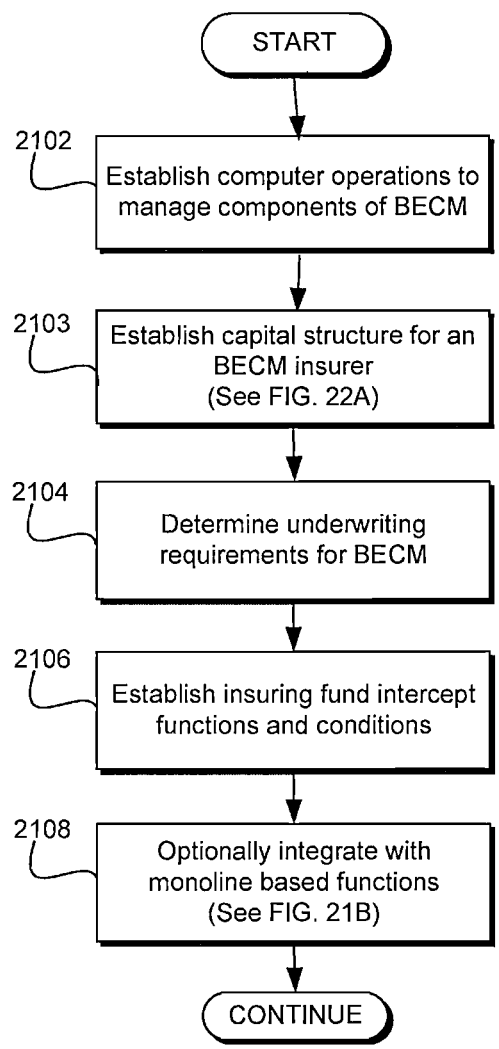

FIG. 21A shows a process for managing the operations of the Company for minimizing a risk as to a default on payments associated with an investment. At step 2102, operations of the computer system of the Company are established to manage the activities of various components of the BECM. In one embodiment, the Company's computer system can be programmed to direct the various activities of the Insuring Trust, subject to the terms thereof, for the benefit of:

- Insured Bonds—beneficiaries of the right to be paid from Additional Liquidity Instruments, regulatory capital, and Insuring Bond Payments,
- Liquidity providers—beneficiaries of the right to be reimbursed from regulatory capital and Insuring Bond Payments,
- Insuring Certificates—Beneficiaries of the right to receive pass through payments of principal, interest, and other portion of the Insuring Certificate Payments, subject to the right and obligation of the Insuring Trust to intercept such amounts as needed to fund insured defaults,
- Regulatory capital—beneficiaries of the right to be reimbursed from Insuring Bond Payments, and
- The Company—recipient of the upfront premium and a portion of the issuer's coupon/premium payments to pay operating expenses and to provide a ROE on regulatory capital and infrastructure capital, with the balance thereof to represent net income.

At step 2103, the capital structure for an insurer performing the BECM methodology is established. Briefly, regulatory capital is allocated, an investment criteria for the capital is selected, additional liquidity sources are determined, and the capital structure of pledged Insuring Bonds are determined. The operations of step 2103 are described in more detail in conjunction with the process of FIG. 22A to 22B.

At step 2104, underwriting determinations are performed. The Company's computer system controls underwriting decisions, subject to parameterized requirements, as to which issues to insure and determinations regarding the characteristics of Insuring Bonds deposited into the Insuring Trust, in each case with the parameters configured for:

- Maintaining the creditworthiness of BECM's insured credit, and
- Establishing and maintaining a market identity and trading levels truly consistent with AAA rating.

At step 2106, the company's computer system can programmed in computer memory with conditions of when payments should be intercepted. Company mandated procedures, as recorded in computer readable media, and used in determining computer processes described herein, can direct the trustee to intercept payments or automatically intercept payments on Insuring Certificates as required to fund insured defaults.

At step 2108, the Company's computer system can be configured to integrate the BECM system into a traditional monoline structure. One embodiment of the operations of step 2108 are described in more detail in conjunction with FIG. 21B. In one embodiment, this step may be optional and not performed. In one embodiment, monoline based operations are performed. The Company's computer system can also optionally perform other functions that are typical of a monoline insurer such as:

- Marketing BECM's credit strength to municipal issuers and bond investors,
- Credit analysis of insurance candidates, and
- Surveillance of the credits in BECM portfolio.

In yet another embodiment, at step 2108, the integration of the BECM structure with monoline insurers' portfolios is a potential response in the event that the rating agencies resist applying bond insurer rating criteria to the Structure.

One approach may be to have a monoline insurer with the same target rating as the insured or insuring Structure subclass insure that subclass. There may be no capital impact on such monoline insurers since the BECM Structure more that meets the rating agency default tolerance requirements. However the use of monoline insurance may address any rating agency objections that may be applied to the BECM Structure alone.

In yet another embodiment, another approach may to be to have a single monoline insurer credit enhance each (at least all subclass with the same or a higher target rating than the rating of the monoline insurer) of the BECM Structure insured and insuring subclass. Since the structure independently meets the default tolerance requirements for the target rating for each subclass, the monoline insurance commitment is really required to address rating concerns with diversification and commitment.

In yet another embodiment, at step 2108, an alternative approach to integrating bond insurance with the BECM Structure may be to combine the credits under the BECM Structure with the portfolio or portfolios of one or more existing bond insurers (and/or reinsurers) with the traditional bond insurers bearing the same responsibilities with respect to their existing portfolios of insured credits as the holders of Insuring Obligations may bear with respect to Insured Obligations under the Structure. Under this approach the Insuring Obligations may in effect cross-collateralize the insured bonds in the existing portfolio(s) and the Insured Obligations under the structure may be cross-collateralized by the bond insurer(s) capital. The bond insurer(s) may in effect play the role of non-related Insuring Obligors, but certain portions of the bond insurer's portfolio might be in a Loss Category Subclass that is related to the defaulting bond. However, the bond insurers may fund any payments owed by them with cash capital rather than through the diversion of payments due on Insuring Obligations. The objective may continue to be to impose any actual loss up to the amount of the capital requirement for such credit under the BECM Structure on the related Insuring Obligor Any loss beyond such amount may be imposed on the appropriate Loss Category and Loss Position Subclasses, including both Insuring Obligations under the BECM Structure and bond insurer capital allocated to such credit and subclasses Integrating insurer or reinsurer portfolios with the portfolio of a structured credit enhancement product can comprise integration of insurer/reinsurer portfolios with the portfolio under the BECM Structure.

This approach can eliminate issues with regard to ramping up the BECM Structure since diversity may be achieved immediately and individual credits under the BECM Structure can easily be added to the combined portfolio. It may even be possible easily to add bonds in the secondary market to the Structure, including credits for which bond insurance/credit enhancement may not otherwise be available. The Insuring Obligations can either be insured by the bond insurer or not.

This approach may enable bond insurers to earn fees from insuring bonds for which they may not directly provide the risk capital. This result may be facilitated by the use of "real" subordination of the Insuring Obligations as discussed above and by allocating losses first to any related Loss Category Subclass.

In yet another embodiment, even if the agencies refuse to apply the bond insurer rating criteria, the same result can be achieved indirectly (at least for tranches that meet the AAA, AA, and A rating standards for which rating levels, traditional monoline bond insurers currently exist) by integrating the relevant tranche of the BECM Structure into the appropriate bond insurer's capital structure. The integration of the BECM Structure with an insurer's capital structure can be accomplished by the use of both options.

In one embodiment, the Company's computer system can configure the insurer components in each rating category insure only those bonds in the tranche of the BECM Structure with the same target rating. In the case of insuring tranches, the insurance applies to the Insuring Obligation related to each bond within the tranche. So, in performing any default tolerance analysis of the insurer's portfolio, the BECM Structure will meet all capital requirements (based on the underlying bond rating) that are necessary to achieve the insurer's target rating, without requiring any other source of capital. In one embodiment, the BECM Structure represents soft capital, which is limited to 25% of an insurer's capital structure. But, the better answer is that coverage based capital (which the structure provides in a transparent way) is not soft. Even in the more rigorously rated municipal rating sector, no distinction is made between coverage based and cash based default protection. At every rating level, the source of capital/default tolerance is the coverage provided by the lower-rated structure tranches.

This configuration may be sufficient and addresses concerns that could be raised about the BECM Structure viewed in isolation: (a) Portfolio diversification; (b) Institutional commitment; (c) Liquidity.

In this embodiment, the capital within the BECM Structure may not be available to support defaults that occur within the non-Structure portion of the Insurer's portfolio. But, the insurers each achieve their target ratings, e.g., AAA. In one embodiment, the BECM Structure is excluded from the analysis and also pass the same test if the BECM Structure is included. Also, the BECM Structure viewed in isolation can sustain a longer duration default than required for the insurers target ratings.

In one embodiment, the Company's computer system can configure to have a single insurer, e.g., an A rating insurer, insure the A, AA, and AAA Structure subclasses. Note that the requisite default tolerance is already achieved by the BECM Structure itself, The monoline insurance commitment provides liquidity, additional diversity, and addresses the rating agency concern with institutional commitment.

In other embodiments, the Company's computer system can be configured to cross collateralize the insurers non-structure commitments with the cash flows of the portion of the structure that is insured by the respective insurer (i.e., the portion which independently meets the same rating criteria as are applicable to the insurer's non-structure portfolio).

Processing then continues to other steps.

Figure 21B:
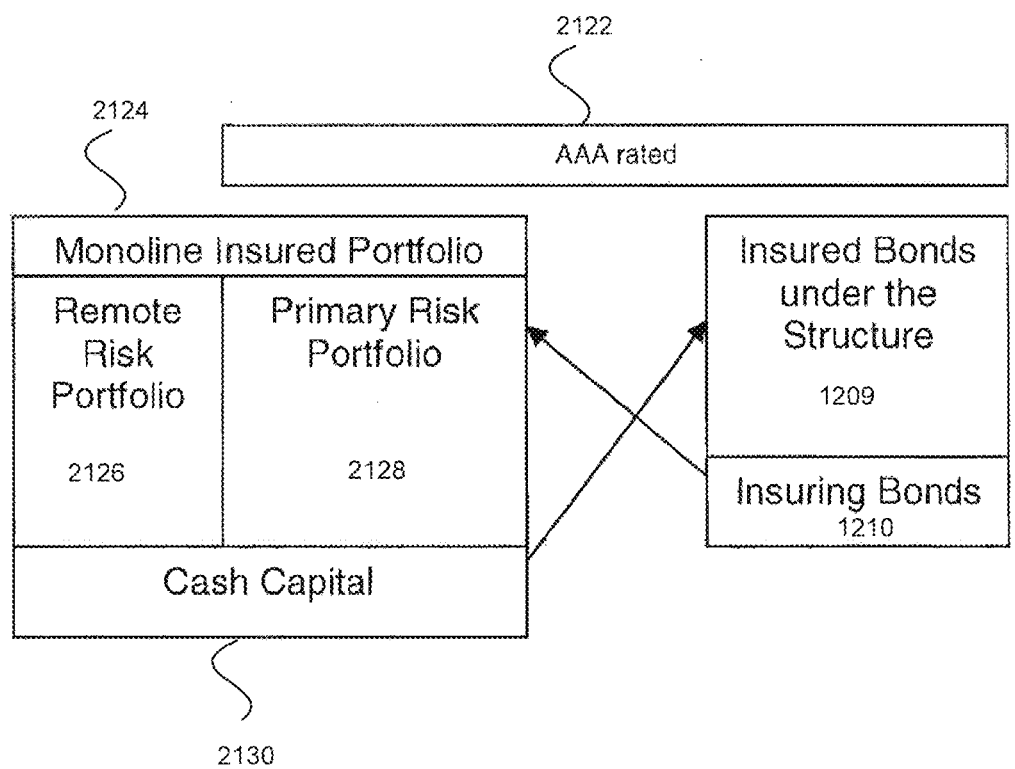

FIG. 21B shows a process for integrating the operations of the BECM system with a traditional monoline system (the "Integrated Structure"). Under the integrated approach, the insured bonds 1209 under the Integrated Structure can be enhanced by the monoline insurer and both the cash capital of the insurer and the insuring bonds 1210 under the Integrated Structure are available to offset defaults with respect to either set of insured bonds 1209.

In this embodiment, insuring bonds 1210 are not a debt of the monoline insurer or soft capital. The Integrated Structure is most similar to collateralized trust funds used as a means to enhance reinsurance. Insuring bonds 1210 are assets that are set aside and legally pledged (not a contractual promise to provide support) to meet the insurer's obligations. In this embodiment, insuring bonds 1210 are akin to the insurer taking cash capital and investing it in a municipal portfolio, for example. That would ordinarily be inefficient, versus investing in Treasuries, because the claims-paying impact of the municipal portfolio would have to be discounted to reflect potential defaults. Given that under the Integrated Structure, the credits in the insuring municipal portfolio can be the same as those in the insured liability portfolio, there may no different default assumptions in connection with the asset portfolio than in connection with the liability portfolio. Under the Integrated Structure, it is efficient to have the insuring assets invested in a municipal portfolio (even taking account of the impact of assumed defaults). Also, the use of a portfolio of insuring tranches of municipal issues on the asset side, results in superior claims paying ability to the claims paying ability achieve by using cash under the conventional approach.

The portfolio and capital of the monoline insurer, viewed separately, can achieve AAA ratings. When the insurer's liability portfolio and capital are integrated with the insured bonds and capital (insuring bonds) under the Integrated Structure, the integrated entity also would meet the monoline AAA ratings criteria. A portion of the monoline insurer's cash capital meets its statutory capital requirement. Assuming that the statutory requirement must be met with cash, the statutory capital structure for insured bonds under the Integrated Structure can be met with the insurer's cash capital that is above its existing statutory requirement.

A tangible transformation and result of the integrated structure is to distribute credit risk so that the aggregate risk to each insuring bondholder resembles as closely as possible the credit risk the bondholder would assume by purchasing its particular underlying bond. Exposure to certain risks in the monoline insurer's portfolio can be very remote from the perspective of the insuring bondholders, e.g., CDO exposure.

Referring to FIG. 21B, the insurer 2124's liability portfolio can be segmented into (I) a portion for which the Integrated Structure capital (intercepted insuring bond debt service) is the last capital applied (the "remote risk portfolio" 2126) and (II) a portion in which the insuring bonds are more directly exposed to the insured risk of the monoline (the "primary risk portfolio" 2128). With respect to credits in the remote risk portfolio, the insuring bonds 1210's exposure is to a AAA monoline credit 2122 in that the monoline is rated AAA without the Integrated Structure and the insuring bonds 1210 would be the last capital applied to cure a default in the remote risk portfolio. Similarly, with respect to defaults within the Integrated Structure and the primary risk portfolio 2128, the allocated capital, including the insuring bonds 1210, can be required to be exhausted prior to touching capital associated with the remote risk portfolio 2126.

The size, diversity and capital associated with the primary risk portfolio 1218 can be such that it, together with the Integrated Structure insured bonds 1209 and insuring bonds 1210, independently meets the requirements for a AAA monoline rating. This is not necessary for the purpose of the AAA monoline rating, but may be needed to permit distinct ratings to be established for different subclasses of the insuring bonds as described below. The subdivision of the insurer and structure capital into different classes can allow the cost of capital (at least within the Integrated Structure) to be more efficiently priced. The capital allocated to the primary risk portfolio and the insuring bonds can be segmented into subclasses that are applied to cure defaults in a predetermined order. The subclasses could be identified by their loss position, e.g., the subclass of capital with the 1st loss position would be tapped to cure, a default before any capital belonging to a subclass with a higher loss position would be utilized. Each subclass can consist of similar proportions of cash equity and insuring bonds. The creation of the subclasses may allow different ratings to be assigned to the insuring bonds within the various subclasses based on their loss position, which determines the degree of risk that such subclass may be impacted by an insured default.

Each such subclass ("loss position" or "LP" subclass) can be sized so that it, together with the lower subclasses contains sufficient capital to meet the requirements to enhance the insured bonds within the primary risk portfolio and the Integrated Structure (collectively the "Insured Bonds") to a particular rating level.

The criteria for the ratings analysis can be the rating agency criteria for monoline insurers of various target ratings. However, it may not be necessary to get ratings on the subclasses of insuring bonds from all three rating agencies. The subclasses can include:

- 4th LP subclass—sized to support AAA Insured Bond ratings
- 3rd LP subclass—sized to support AA Insured Bond ratings
- 2nd LP subclass—sized to support A Insured Bond ratings
- 1st LP subclass (senior tranche)—sized to support BBB Insured Bond ratings
- 1st LP subclass (junior tranche)—sized to support BB Insured Bond ratings.

With respect to the 1st through 3rd LP subclasses, the size, diversity, and credit quality of the insured bond portfolio, the business strategy for acquiring additional business, and the access to capital are significantly superior to those of a traditional non-AAA monoline insurer. Currently, the business strategy for a non-AAA monoline insurer must inherently rely on insuring more risky credits that no AAA monoline will insure. Using the Integrated Structure, however, the fundamental characteristics of even the BB LP subclass are the same as for a traditional AAA monoline.

In analyzing the required size of the insuring subclasses relating to a particular credit, an issue arises relating to the capital charge (i.e., assumed defaults) for a LP subclass when the insured bond has a higher rating than the target rating of the subclass. Under the traditional rating approach to pooled municipal credits, if the target rating of a pool were an A rating, no defaults would be assumed for bonds rated at A or higher. However, a capital charge may be assessed, even if the insured bond were more highly rated than the insuring entity. For example, if the bond is rated one category higher than the monoline, the capital charge can be 20% of the normal capital charge and the charge can be 25% of the normal charge if the bond and insurer have the same rating.

The credit quality of each LP subclass (its "structure rating") is determined, not by the rating level that it supports for the insured bonds 1209, but by the ratings that would be supported for the insured bonds 1209 solely by the lower subclasses. For example, the 4th LP subclass is exposed to the risk that the 3rd and lower subclasses may not be sufficient to cure all insured defaults, which is a AA risk. Under this approach, each insuring bond 1210 can have two ratings: the underlying rating of the bond and the Integrated Structure rating of the LP subclass of which such bond is a part.

This presence of distinct ratings is different from a traditional CDO approach under which the insuring subclasses each enhance the higher insuring subclasses, and so there is one rating, analogous to the Integrated Structure rating. That traditional approach might be implemented as part of the Integrated Structure at the point at which the size of the Integrated Structure portfolio is sufficient to support ratings on the higher LP subclasses without being integrated with the cash equity associated with the cash portfolio. The reason that it can work in the Integrated Structure portfolio is that debt service on insuring bonds that is not needed to fund defaults on Insured Bonds gets paid to the insuring bondholder and does not remain as a part of the capital under the Integrated Structure. So, any amounts that are not needed to fund defaults on insured bonds 1209 could be used to fund defaults that affect insuring bonds without any adverse affect on the insured bonds 1209.

An advantage of having distinct underlying and structure ratings is that the insuring bonds 1210 for each bond issue (even those that are part of the 4th LP subclass) can take the first loss if that bond issue defaults, even before the any bonds in the 1st loss LP subclass that are part of non-defaulting bond issues. This reduces the possibility that insuring bondholders associated with a non-defaulting issue will bear the burden of funding a default on another bond issue.

Under the S&P monoline rating criteria, the assumed defaults for a portfolio of insured credits (which must be covered by the monoline insurer's capital) are based on the credit quality and credit type of the underlying bonds held in the portfolio (See FIG. 26). The assumed defaults have the same starting point, regardless of the target rating of the monoline insurer. However, if the insurer's target rating is below the underlying rating of an insured bond, a discount is applied to the normal assumed defaults. As a result of this discount, for any insured bond, the LP subclass with the largest capital requirement will be the subclass whose structure rating is the same as the underlying bond rating. The LP subclass with the same structure rating, together with the lower LP subclasses, are sized to support the next higher rating for the insured bonds 1209, i.e., sized to cover the assumed defaults without any discount.

Different minimum coverages of the applicable assumed defaults by the insurer's capital are required, depending on the monoline insurer's target rating (or in our case, the target structure rating of the LP subclass), e.g., 1.25x for a AAA rating, 1.0x for a AA rating, 0.80x for an A rating. In practice, the monoline insurers have capital in excess of the minimum requirement.

Since all of the Insured Bonds under the Integrated Structure and in the primary risk portfolio are likely to be investment grade, the practical risk to the holders of the below investment-grade insuring LP subclasses can be minimal.

Within each LP subclass, credits could be further grouped into subclasses based on credit types ("loss category" or "LC" subclasses). The loss categories might be based on the various categories of credits for which the rating agencies have established different assumed defaults (i.e., capital charges) based on their perceptions of the degree of risk associated General obligation bonds
  States; Cities and counties; and Schools
Tax-supported debt
  Sales, gas, excise, gas, and vehicle registration: Local or Statewide·Health care
Utilities
Special revenue: Airports, Ports, Parking, Toll roads
Housing.

A default of an Insured Bond within a particular loss category subclass could be allocated, within each LP subclass, first to the cash capital and insuring bonds within the same loss category and then, if needed to the capital of different loss category subclasses. This would have little to no rating impact, but would reduce the risk that an insuring bondholder could be affected by a default on a riskier credit-type. An example of different loss positions and categories and the segmented between (1) the monoline's portfolio and cash capital and (2) the insuring bonds 1210 are shown in TABLE 5 below. In some embodiments, local sales tax may be split between the monoline's portfolio and cash capital and the insuring bonds.

TABLE 5

| Monoline Cash Capital | | Insuring Bonds | | |
|---|---|---|---|---|
| 4th Loss | State GO | City GO | Local sales tax | Airport |
| 3rd Loss | State GO | City GO | Local sales tax | Airport |
| 2nd Loss | State GO | City GO | Local sales tax | Airport |
| 1st Loss (senior) | State GO | City GO | Local sales tax | Airport |
| 1st Loss (junior) | State GO | City GO | Local sales tax | Airport |

The segmentation of (A) the cash capital into the primary and remote risk portfolios and of (B) the cash capital and insuring bonds into the LP and LC subclasses may have little or no adverse credit or other impact. The segmentation is used to determine the order in which various portions of the capital structure are applied to cure defaults. The segmentation is sued further for:
- In the case of the remote risk portfolio, mitigating market concerns about exposure of the insuring bonds to riskier credit types.
- In the case of the LP subclasses, enabling the various LP subclasses to meet the monoline rating criteria for specific target ratings.
- In the case of the LC subclasses, allocating risk of various credit types first to insuring bonds of the same credit types. All of the cash and insuring bond capital would be available as needed to cure any insured defaults.

The various types of segmentation can facilitate efficient pricing of the insuring bonds versus pricing all insuring bonds based on the lowest common denominator—the risk that single default may occur within a strong credit type or that defaults may occur within a riskier credit type. The result is that the insuring bondholders can provide marketing enhancement and need not take any material credit risk different than the risk of owning their underlying bonds.

A (small) amount of cash equity 2130 may also be required under the Integrated Structure. The reason for the cash equity 2130 would be to provide the required capital at the final maturity of the insuring bonds. If all of the bond issues in the Integrated Structure portfolio matured on the same date, it would be possible to intercept insuring bond 1210 debt service to meet any insured defaults on that date. However, the bonds insured using the Integrated Structure will mature on many different dates and will have many different payment dates.

Timing issues relating to having different payment dates within each year can be addressed by the use of liquidity facilities. However, cash equity 2130 is needed to address the issues at final maturity given the different payment dates. Even if all of the insured bonds matured in the same year, it might be possible that the bonds that defaulted would be the last bonds to mature. In that case, (absent some ability to retain insuring bond debt service in the final year), cash would be needed to cover the assumed defaults.

However, under S&P's monoline criteria, the assumed defaults/capital charge in the year a bond issue matures is 25% of the normal requirement. So, the assumed defaults to be covered with cash equity is equal 1.25 times 25% of the amount of assumed (annual) defaults for the issue. Since the assumed defaults for an issue equal 25% of the total monoline capital charge (given the assumption of a 4 year default), the minimum cash equity requirement under the Integrated Structure is 25% of 25% (i.e., 6.25%) of the cash equity requirement under a conventional monoline capital structure, assuming the same target coverage of assumed defaults (e.g., 1.50 times). Under the Integrated Structure, fewer bonds are insured that would be insured under a conventional approach (e.g., 95 to 97%). So, the cash equity 2130 under the Integrated Structure will be closer to 6% of what it would have been if the same bond issue had been insured by a conventional monoline insurer.

In one embodiment, the cash equity 2130 can be sufficient if it equals 1.25 times 25% (i.e., 31.25%) of the normal level of assumed 1 year defaults. The cash capital 2130 would also be available to meet the rating agency 4 year depression-scenario stress test. Over 4 years, the Integrated Structure cash capital 2130 would be sufficient to cover at least a 7.81% of the assumed annual defaults. If cash capital were funded at 1.50 times the assumed defaults in the final year, it would cover 37.5% of the normal level of assumed 1 year defaults and would be sufficient over 4 years to cover 9.38% of the assumed annual defaults.

There is much less risk associated with the cash equity 2130 under the Integrated Structure than with the cash equity of a conventionally structured monoline insurer. In the event of a default, the cash equity 2130 would be used only after available insuring bond 1210 debt service has been applied, and the cash equity 2130 could be reimbursed by insuring bond 1210 debt service when received. In essence, the cash equity 2130 under the Integrated Structure is more akin to equity, except in the case of a default at final maturity of the bond issue.

Also, there may be no need for cash equity for bond issues which finally mature earlier that a substantial number of other bond issues under the Integrated Structure. The ability to intercept debt service on the later maturing bonds obviates the need for cash equity on the earlier maturing bond issue. Accordingly, over time, the aggregate amount of cash equity required under the Integrated Structure can be substantially less than 6.00% of the normal monoline cash equity requirement.

Rating agencies may take into account to the presence of municipal risk in both the liability and asset portfolios of the monoline insurer in determining credit ratings 2122 under the Integrated Structure. The total amounts of assumed defaults for which the combined portfolio and capital of the monoline and the Integrated Structure will be stressed are known pursuant to the monoline insurer rating criteria. For example, the assumed defaults/capital charge for a BBB city GO issue is 13% of total debt service, representing 3.25% in annual defaults over 4 years for insured bonds of that credit type and rating. In determining its ratings, the rating agencies may determine how the aggregate amount of assumed defaults will be allocated between the cash portion of the portfolio and the Integrated Structure portion of the portfolio.

The sizing of the insuring bonds can take account of both the assumed defaults and a targeted coverage thereof, which will exceed the coverage required for a AAA rating 2122. The minimum coverage of assumed defaults for a AAA rating is 1.25 times. If, for example, the targeted coverage is 1.50 times, for all BBB city GO issues, the insuring bonds would need to be at least 4.88% of the issue (or 5.12% of the insured bonds). Given that sizing, if 4.88% of such bonds default, the non-defaulting insuring bonds would still provide the targeted 1.50 times coverage for 3.25% of defaults of insured bonds. Stated more generally, even if defaults of bonds under the Integrated Structure were to exceed the assumed defaults by the targeted coverage amount, the non-defaulting insuring bonds will still be sufficient to provide the targeted coverage of the assumed defaults.

There is little to no difference in the legal obligation of the issuer to pay insured bonds 1209 and insuring bonds 1210. In this embodiment, the insuring bonds 1210 are not subordinate to the insured bonds. So the assumed defaults are identical for both insured bonds 1209 and insuring bonds 1210.

The following scenarios help to further illuminate the benefits and potential issues relating to using municipal insuring bonds within the asset portfolio of a monoline insurer using the Integrated Structure.

Scenario I: Suppose we compare the default tolerance of two alternative capital structures for a mature monoline insurer:

In the first alternative, the capital structure consists entirely of cash equity invested in treasuries ("cash" approach).

In the second alternative, the capital set aside for each issue of insured bonds consists of insuring bonds together with the (small) amount of cash equity discussed above (Integrated Structure approach).

Assume that under each alternative, the capital is funded at a level sufficient to cover 1.50 times the level of assumed 4-year portfolio defaults.

(A) First, assume that the actual defaults over a 4 year period equal 1.50 times the assumed level.

Under the cash approach, at the end of the 4-year period, all of the insured defaults have been funded, but none of the original capital is left. Under the insuring bond approach, (1) all of the insured defaults have also been funded; (2) the insuring bonds on the issues that never defaulted continue to provide capital to meet future needs; and (3) the previously defaulted insuring bonds are once again being paid. The available capital continues to be sufficient to cover future defaults in an amount equal to 1.50 times the assumed level. Under the above set of assumptions, the insuring bond approach provides a superior result.

(B) Second, assume that defaults equal 1.0 times the assumed level.

Under the cash approach, at the end of the 4-year period, all of the insured defaults have been funded, but the remaining capital equals 0.5 times the original assumed defaults—below the coverage level that is extrapolated for a BB monoline insurer. Capital can be increased to 1.25 times the assumed defaults to meet the AAA rating requirements. Under the insuring bond approach the result would be the same as in scenario 1(A) except the fewer defaults would have needed be covered.

Note that payments on insuring bonds that are not needed to cover insured defaults go to the insuring bondholder (i.e., do not remain as a part of the Integrated Structure capital). Accordingly, the fact that insuring bond debt service is used to fund defaults has little to no impact on the future ability of the Integrated Structure to withstand defaults.

Scenario 2: Suppose the assumptions are the same as in Scenario 1 (including target coverage of 1.50 times), but we examine the impact of the defaults if a monoline insurer's Insured Bond portfolio is secured by a capital structure consisting in part of cash equity and in part of insuring bonds. Given the use of loss position and loss category subclasses, regardless of which portion of the portfolio a default occurs in, the capital used to pay the insured bonds could be derived either from cash capital or from insuring bonds. However, for simplicity this discussion will assume that if a default occurs in either the cash or insuring bond portion of the portfolio of insured credits, the capital associated with that portion of the portfolio is expended prior to using capital associated with the other portion.

(A) Assume that the actual defaults are allocated pro-rata between the portion of the Insured Bond portfolio for which the capital is cash capital and the portion that uses insuring bonds. As in scenario 1, the insuring bond approach will produce a superior result. In fact, assume that cash and insuring bond portions are equal and capital equals 1.50 times the assumed defaults. If actual defaults over 4 years equal the assumed level, at the end of that period, the remaining cash capital would cover 0.5 times the assumed defaults for that portion and the insuring bond capital would cover 1.50 times the assumed defaults for its portion of the portfolio. The combined capital would still meet the AA monoline rating requirement at 1.0 times the original assumed defaults and would have to be increased by only 0.25 times assumed defaults to meet the AAA requirement.

(B) Suppose that the insured bonds are divided equally between cash equity and insuring bond capital. What would the impact be if the defaults equal the assumed level for the entire portfolio, but they are disproportionately allocated either to the cash or insuring bond portion? For simplicity and clarity, assume that the combined cash and structure portfolio is comprised of bond issues for which the assumed annual defaults/capital charge equal 3.25%, such as city GO bonds.

I. If all of the assumed defaults are in the cash portfolio, the defaults allocated to it equal 2.0 times the level assumed for it, whereas, the cash equity will accommodate defaults equal to 1.5 times the assumed level. At the end of 4 years, all of the insured obligations would have been funded, but all of the cash capital would have been expended. The insuring bonds would be sufficient to fund 1.50 times the level assumed for the insuring bond portion, assuming all of such defaults occur within such portion. To the extent that such defaults are spread across the entire portfolio, a larger amount of defaults could be funded because fewer insuring bonds would be in default.

II. If all of the assumed defaults are in the Integrated Structure portfolio, the defaults allocated to it equal 2.0 times the level assumed for it under the rating criteria. Accordingly, 6.50% of the bond issues in the Integrated Structure portion of the portfolio would be in default. The insured bonds in Structure portion of the monoline's portfolio represent 95.1% of the total of insured and insuring bonds under the Integrated Structure. The amount of defaulted insured bonds under the Integrated Structure equals 6.18% of the total insured and insuring bonds, 95.12% times 6.50%. The non-defaulting insuring bonds would equal 4.56% of the total of insured and insuring bonds, 4.88% times (1 minus 6.50%). The non-defaulting insuring bonds are sufficient to cover 1.40 times the 3.25% defaults assumed under the rating criteria for the Integrated Structure portion of the portfolio. In addition, the cash equity under the Integrated Structure would be sufficient to cover 0.09 times such assumed defaults. The remaining defaults, 0.51 times the level assumed, would be covered by the capital allocable to the cash portion of the portfolio. The cash capital would equal 1.50 times the assumed defaults (the assume defaults are the same for each half of the portfolio). So, at the end of the 4 year period, the remaining cash capital would be sufficient at least to cover 0.99 times the assumed defaults for each half of the portfolio and the insuring bonds would be sufficient to cover 1.50 times such defaults. In aggregate, the monoline insurer's capital would be sufficient to cover 124.5 times the defaults assumed for the total portfolio, the average of 0.99 and 1.50 times. To meet the AAA requirement, additional cash capital would be needed to fund the 0.5 times coverage shortfall and to replace the cash capital under the Integrated Structure. The result produced by the capital structure combining cash and insuring bonds is superior to the result achieved with a cash only approach.

In practice, the targeted coverage level under the Integrated Structure may be higher. A targeted coverage of 1.75 times, for example, might used to size the insuring bonds. In the example above, the non-defaulting insuring bonds would cover 1.63 times the originally assumed defaults. Only 0.37 times the assumed defaults would be funded from cash capital.

III. Suppose the facts are the same as in scenario II except that (a) the Integrated Structure portion of the combined cash and Structure portfolio exactly equals the amount of the assumed defaults under the rating criteria for the combined portfolio and (b) all of the defaults occur in the Integrated Structure portfolio. In that case, the assumed defaults equal 3.25% of the combined portfolio, and the insured bonds under the Integrated Structure equal 3.25% of the combined portfolio. The cash portion of the insured portfolio equals 96.75% of the combined portfolio. The cash capital for that portion is sufficient at least to fund a 3.25% annual 4 year default on 96.75% of the portfolio with coverage of 1.50 times, i.e., sufficient to fund a 4.73% annual default of the entire portfolio. Since all of the insuring bonds are in default, the cash capital would be used to fund the defaults. (In this case, the cash capital under the Integrated Structure would not be material, less that 1% of the capital under the cash portfolio.) At the end of the 4 year period, cash capital remaining would be sufficient to fund a 4 year default equal to 1.47% of the combined insured bond portfolio, which represents 0.45 times coverage of the original assumed defaults. Also, the insuring bonds would no longer be in default and would be sufficient to fund defaults equal to 0.16% (1.50 times 3.25% on 3.25%) of the total portfolio. Together, the cash capital and insuring bonds would cover a default of 1.63% of the combined portfolio, representing 0.50 times coverage of the original assumed defaults. This is the same result as if the capital structure for the insured portfolio consisted entirely of cash. Also, if the coverage of assumed defaults in the cash portfolio is at least 1.3 times, the cash capital will meet the 1.25 times AAA rating requirements for the entire portfolio, even if the allocation of assumed defaults is such that all of the bonds in the Integrated Structure portfolio are assumed to be in default.

The best case is that the rating agencies view that the assumed defaults as allocable pro rata between the cash and Structure portions of combined portfolio from the outset. The worst case should be that the portion of the assumed defaults that are allocable to the Integrated Structure is determined based on the standards for municipal pools applied to State Revolving Funds ("SRFs"), with the remaining amount of assumed defaults allocated to the cash portion of the portfolio. Under the SRF standards, all of the insuring bonds might be assumed to default until the number of bonds issued under the Integrated Structure equals at least 10. However, this is less onerous than the facts assumed in Scenario 2(B)(III) because the Integrated Structure portion of the portfolio will initially be substantially less than the total amount of assumed defaults. So, the amount by which the targeted coverage for the cash portfolio would need to exceed 1.25 times would be less than the 0.05 times indicated in that scenario to meet the AAA requirement in spite of the allocation of assumed defaults. The portion of the assumed default allocated to the Integrated Structure portfolio can be reduced over time as the number of credits in the Integrated Structure portfolio increases. In fact, as the number of credits insured within the Integrated Structure portfolio increases, the allocation of assumed defaults between the cash and Structure portfolios should approach pro rata.

In any event, the assumed defaults that allocated to the Integrated Structure portfolio may not exceed the assumed defaults on the entire portfolio for the particular credit type and rating category. If the assumed defaults on the Integrated Structure portfolio equal 20% of the total assumed defaults for BBB city GO bonds, then at most 5 times the normal assumed defaults may be allocated to the Integrated Structure.

Given insuring bonds structured to cover at least equal 1.50 times the normal assumed defaults, even if the assumed defaults allocated to the Integrated Structure portion are several times the overall level of assumed defaults, the non-default insuring bonds will still be sufficient to cover more than the minimum 1.25 times of the overall level of assumed defaults necessary to support the AAA rating without requiring additional cash capital. For example, in our example above, even if the defaults allocated to the Integrated Structure portion equal 5 times the overall level of assumed defaults, the insuring bonds would still be sufficient to meet the 1.25 minimum coverage requirement for the level of defaults assumed on the entire portfolio. Given a 1.75 times target coverage, the allocated defaults could be more than 8.5 times the overall assumed level and the non-defaulting insuring bonds would still provide 1.25 times coverage of the overall assumed defaults. In each case, capital allocated to the cash portfolio would be needed to fund a portion of the defaults disproportionately allocated to the Integrated Structure portfolio. But, non-defaulting insuring bonds would meet capital requirement necessary to support the AAA rating.

Based on the SRF criteria, the assumed defaults allocated to the Integrated Structure portfolio for a BBB city GO might initially be 40%, 12 times the amount of the assumed defaults under the monoline criteria applicable to the combined portfolio. One solution would be to rely on the excess cash capital in the monoline portfolio until the size of the insuring bond portfolio is large enough to get more moderate allocation of the defaults assumed for the combined portfolio. Another alternative is to increase the size of the insuring bonds such that even taking account of a 40% default in the Integrated Structure portfolio, the non-defaulting insuring bonds would be sufficient to provide the minimum 1.25 times coverage. In our BBB city GO example above, if the insuring bonds were structure to provide 2.25 times coverage of the assumed defaults, the non-defaulting insuring bonds would meet the 1.25 times coverage requirement, even given a 40% default. The insuring bonds would be 7.32%, rather than 4.88% of the issue. However, if the Integrated Structure cash equity is also used, insuring bonds sized to provide 2 times coverage of assumed defaults would be sufficient that the non-defaulting insuring bonds and cash would provide the required 1.25 times coverage. Note that the cash equity does not have to be grossed up in order to address a disproportional allocation of defaults to the Integrated Structure portfolio.

Under the SRF criteria, for a pool of 9 or fewer credits, the assumed defaults would be 100%. For a pool of 10 to 19 credits, the assumed defaults for BBB credits (ignoring concentration issues) would be 40%. For a pool of 20 to 49 credits, the assumed defaults (ignoring concentration issues) for BBB credits would be 25%. For a pool of more than 50 credits, the assumed defaults (ignoring concentration issues) for BBB credits would be 18%.

In our BBB city GO example above, if the Integrated Structure portfolio is between 20 and 50 credits, the annual defaults allocated to the Integrated Structure portfolio (absent concentration issues) would be 18%, as compared to 3.25% assumed defaults for the portfolio as a whole. Insuring Bonds structured to provide 1.70 times coverage of assumed defaults would be sufficient that, even given 25% defaults allocated to Structure portfolio, non-defaulting insuring bonds would provide 1.25 times coverage of the overall level of assumed defaults. If the Integrated Structure cash equity were also considered, Insuring Bonds structured to provide 1.60 times coverage would be sufficient.

It can be expected that concentration issues will be evaluated separately based solely on the Integrated Structure portfolio. However, the total amount of assumed defaults should still be limited based on the aggregate cash and Integrated Structure portfolios.

Figure 22A:
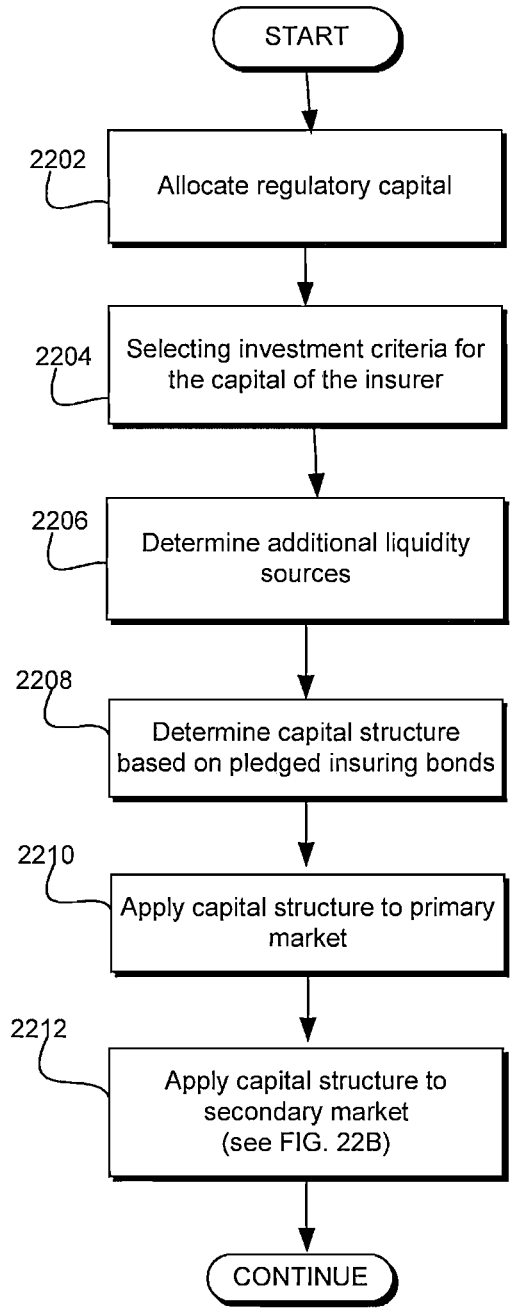

FIG. 22A shows a process for managing capital structures for the insurer of debt (e.g., bonds). In one embodiment, a computer system can be programmed to manage the BECM such that the BECM's differentiating capital structure consists of (i) cash capital and (ii) pledged bonds. BECM can meet all traditional requirements for AAA monoline insurers including $200 million of hard, startup capital. However, because of BECM's innovative approach, $200 million of startup capital can be the equivalent of a conventional monoline insurer having more than $1 billion of startup capital.

The committed capital can fall into two categories:
Regulatory Capital which are funds recorded in computer readable media at least equal to the amount necessary to meet state regulatory requirements and rating agency requirements—including amounts necessary to meeting startup requirements for a new AAA monoline insurer (e.g., $200 million of hard capital); and
Infrastructure Capital which are funds recorded in computer readable media sufficient to pay initial expenses prior to commencement of operations and during the first 24 months of operations (e.g., estimated to be $20 million). BECM will also incorporate additional sources of liquidity ("Additional Liquidity Instruments").

Such Additional Liquidity Instruments may include letters of credit, lines of credit and reinsurance contracts secured by the Insuring Certificate Payments, all of which are recorded in computer media. Amounts drawn on Additional Liquidity Instruments will be reimbursed from Insuring Certificate Payments over the at least one electronic exchange.

At step 2202, regulatory capital can be allocated. Allocating can include allocating the regulatory capital in the computer memory to an amount equal to at least a coverage factor multiplied by an average annual depression scenario default percentage for the investment. Several alternatives for determining regulatory capital allocation are can be used, recorded, and modeled in a computer system with respect to the entity holding the regulatory capital. In one embodiment, the regulatory capital can be deployed for an insurer performing the methodology of the BECM. In one embodiment, a computer system can be programmed to manage the BECM such that the BECM can deploy at least the same level of upfront regulatory capital as a traditional AAA monoline insurer (i.e., $200 million), while reducing, in one embodiment, a monoline insurer's leverage ratio from 100 to 1 to less than 30 to 1 by introducing "pledged bonds" into the capital structure. This results in a more robust and resilient credit structure. Of equal importance, BECM can increase the leverage of cash capital. As tangible result and transformation, accounts of an insurer using BECM software based methods, system, or apparatus may have available additional funds that are not available to a monoline based method, system, or apparatus.

For example, using a traditional monoline capital structure, $200 million of regulatory capital supports approximately $21 billion of municipal bonds. Using BECM's technology, the same $200 million supports $125 billion of municipal bonds. Thus, the invention enables the regulatory capital to support more than 5 to approximately 6 times as much of the bonds. The invention can be tailored to enable the regulatory capital to support from 2 to 3 to as much as 10 times the amount of bonds supported by the traditional monoline capital structure.

In one embodiment, the regulatory capital can be held by a Special Purpose Company. Earnings on such capital are applied by the Special Purpose Company to the ROE (return on equity) on regulatory capital. Regulatory capital is allocated in a computer system to each Insured Bond issue in an amount sufficient, together with the Insuring Certificate Payments and Additional Liquidity Instruments, to make timely payment of insured defaults under a depression scenario. Both allocated and unallocated regulatory capital are available in the computer system to fund insured defaults. Regulatory capital can also be applied to reimburse over the at least one electronic exchange any provider of liquidity to the extent that reimbursement is not promptly made from Insuring Certificate Payments. Initially, regulatory capital will be allocated in a computer media to each Insured Bond issue in an amount equal to the average annual depression scenario default for the bond issue and credit category. The appropriate amount of regulatory capital and other liquidity is reviewed on an ongoing basis using user interface, algorithm determining sufficiency of coverage for depression scenarios, or the like. To the extent that regulatory capital is used directly or indirectly to fund an insured default, such capital will be replenished from Insuring Certificate Payments using a computer intercept components, such as triggers in a database, stored procedure, electronic determination of a need for replenishment, or the like.

Liquidity contributes to BECM's ability to guaranty the timely payment of Insured Bonds' principal and interest payments. For this purpose, liquid funds include moneys than can be immediately accessed using a computer system and over the at least one electronic exchange without the possibility of any material loss.

The first source of liquidity configured in computer memory to be used for the guaranty can be the regulatory capital—initially $200 million. As bonds are insured, an amount of regulatory capital equal to 1 times that average annual depression scenario assumed default will move from unallocated and will become allocated in a computer memory (e.g., a field in a database can tag the funds as "allocated"). (By contrast, to provide 1.5 times coverage of a four year depression scenario default, a conventionally structured monoline would allocate 6 times the average annual assumed default.) Once the initial regulatory capital is fully allocated, additional regulatory capital will be raised over the at least one electronic exchange to grow the insured portfolio.

In yet another embodiment, at step 2202, the capital structure of the BECM Structure can be configured differently from the capital structure of municipal bond insurers. The bond insurer's capital is primarily in the form of cash funded from equity, with a portion provided through reinsurance. Presumptively, the reinsurers have a similar need to fund their obligations with cash. The capital provided by both the municipal bond insurer and the reinsurer is risk capital funded from equity.

On the other hand, the risk capital in the BECM Structure is provided by the Insuring Obligations. Unlike the capital provided by bond insurers, which may be sufficient to cover the rating agencies assumed (i.e., 4-year) default scenario, the capital provided by the Insuring Bonds may be sufficient to fund a default that continues for the life of an issue. (Of course, such a default may be allocated to nonrelated Insuring Obligation).

A need for cash capital under the BECM Structure is to provide liquidity (in the event that debt cannot be used) since it can take up to a year to intercept sufficient payments due on Insuring Obligations to make the payments due on Insuring Obligations. To provide liquidity, 25% of the capital normally provided by bond insurers (i.e., enough to cover the first year of a 4 year default scenario) should be sufficient. In the SRF context, S&P now assumes a 7 year default in which the amount of defaulted bonds ramps up over time. Under that approach, cash capital equal to 1/16th or 6.25% of the normal bond insurer requirement should be sufficient.

If the payment dates of the underlying bonds are distributed throughout the year, the need for liquidity can be significantly reduced if the assumed defaults are assumed to be distributed across the year. Even if the defaults are presumed to occur simultaneously, the period during which any loan from cash capital or other sources may remain outstanding can be reduced.

Accordingly, cash capital under the BECM Structure is more akin to debt or preferred stock than to common equity. Accordingly, the return required on any such capital can be lower. Also, there is a strong argument for allowing a portion of such capital to funded from letters or lines of credit or for relying, at least in part, on the ability of the BECM Structure to borrow.

The exception is upon program termination. Cash capital used as a result of any default occurring in the last year might be wholly unreimbursed. However, S&P's capital charges (i.e., the risk of default) decline as bonds near maturity. The calculated capital charge for the last year is about 25% of the initial capital charge. Two years before maturity, the capital charge is 40% and three years before maturity, the charge is 45% of the initial capital charge. Given the 1.5 times coverage of assumed defaults, cash capital used to fund a default in the third year prior to final maturity may be fully recovered. The only cash capital at risk is the larger of (i) 50% of the second to last year's cash capital requirement and (ii) 100% of the last year's capital requirement. Actually, coverage of assumed defaults will grow dramatically over time if we do not reduce the amount of Insuring Obligations as the capital charge declines. So the amount of clause (i) should be reduced. Calculations indicate that coverage will be well in excess of 2 times so that only a default in the last year puts cash capital at risk. Thus, the real risk capital should be viewed as 25% of the initial capital charge.

To provide a DSRF surety policy for a full year's reserve, a bond insurer should have to increase its capital requirement by 25% (i.e., be able to withstand a 5-year default rather than a 4-year default). However, the BECM Structure can already withstand a 5-year default by diverting revenues from the Insuring Obligors for an additional year. Accordingly, no additional cash capital should be required to provide a DSRF surety under the BECM Structure. It should only be necessary to confirm that under any realistic scenario, any loss can still be imposed on the related Insuring Obligations.

At step 2204, the investment criteria for the capital of the insurer can be selected. Selecting can include selecting by the computer system an investment criteria to invest the regulatory capital to create an investment return. Regulatory Capital, whether allocated as bonds are insured or whether not yet allocated, can be selected to be invested over the at least one electronic exchange in very short term investments, including investments providing daily liquidity either in general or in the event of an insured default. The selection can be algorithmic, based on a decision tree, determined by human assistance, or the like. Using a computer based trading systems such as those determining appropriate securities matching appropriate criteria, the investment return that are being targeted over time on Regulatory Capital is the inflation rate, which can be achieved with investments providing daily liquidity. In the event of an insured default, using the automatic computer based triggers, regulatory capital will be applied (in the absence of other immediate sources of liquidity) to cure the default. Note that given the percentage of Insuring Bonds that BECM incorporates (e.g., 3 times that annual assumed defaults), even in the unlikely event that at any particular time all Regulatory Capital were allocated (i.e., no unallocated Regulatory Capital), Regulatory Capital is configured to be expended using the computer system to fund Insured Bond defaults and reimbursed from intercepted Insuring Certificate debt service up to three times (3) within a single year. Without departing from the scope of the invention, the factor can be increased to 4-5 times with appropriately sized initial regulatory capital.

At step 2206, additional liquidity sources can be determined. Additional liquidity equal to 1 times the aggregate average annual assumed default for the Insured Bond portfolio is available over the at least one electronic exchange. This liquidity level, together with the allocated Regulatory Capital, provides access to immediate liquid funds at all times equal to half of the defaults assumed to occur over a four year depression scenario. Also, unallocated equity is an additional source of liquidity.

Additional liquidity may come from a variety of sources, including:

Lines of credit and letters of credit,

Reinsurance,

Debt financings, including short term, intermediate term, and long term financings, and Maintaining a minimum balance of unallocated regulatory capital.

At step 2208, the capital structures of the pledged Insuring Bonds can be determined. The process of determining can include determining by the computer system a portion of the capital structure for a pledged insuring investment that produces at least a portion of the cash stream and securing a draw on sources of the regulatory capital based on the portion of the cash stream. The capital structure of the pledged Insuring Bonds, including sizing of the pledged Insuring Bonds, obligations to pay funds from the Insuring Bonds, or the like can be recorded in computer memory and can cause a computer system to configure and use the Insuring Bonds as described herein. In one embodiment, even if all cash funds (regulatory capital and such additional liquidity) were expended to cure insured defaults, the pledged Insuring Bonds are required to be sized such that the cash funds would be covered 1.5 times by the Insuring Certificate (which provides the pledged Insuring Bonds debt service) that can be intercepted over the at least one electronic exchange within each year to fund insured defaults. In one embodiment, draws on sources of additional liquidity are secured based on the Insuring Trust's intercepted debt service. In each case, any draws on such sources of additional liquidity can be secured based on computer recorded obligations by the ability of the Insuring Trust to intercept Insuring Certificate debt service in order to reimburse such amounts and interest thereon. In other words, these draws are secured by AAA quality cash flows, which will affect both the certainty that such sources of funds will be available (even in times of economic and financial stress) and the cost thereof. This also provides the Company with the flexibility to respond quickly and easily to changing perceptions regarding the appropriate amount of liquidity. The economics of BECM's approach are such that the Company can increase the amount of liquidity without any material financial impact. In the case of a debt financing, the debt may also be secured (in the absence of a default) by: (i) the invested proceeds of the debt financing and (ii) by revenues of the Company.

At step 2210, the determined capital structures can be applied to a primary market of debt. The primary market can include newly issued debt, including newly issued bonds from an issuer. The issuer can be municipalities, and the issued debt can be a series of Insured Bonds and Insuring Bonds. The capital structures can be recoded in computer memory and associated with various primary market debt, characteristics, or the like. The stored data, assumptions, and associations can be used by the steps 2010-2022 of FIG. 20 to manage supported debt.

At step 2212, the determined capital structures can be applied to a secondary market. The secondary market can include already issued debt, securities, equity, or any other type of financial instruments. The capital structures can be recoded in computer memory and associated with various secondary market instruments, characteristics, or the like. The stored data, assumptions, and associations can be used by the steps 2010-2022 of FIG. 20 to manage support of the supported debt, investments, etc. The operations of step 2212 are described in more detail in conjunction with FIG. 22B. Processing then returns to other processing.

FIG. 22B shows an application of the BECM system to guarantee opportunities in the secondary market for municipal securities (est. $2.7 trillion). Approximately $1 trillion of the outstanding municipal bonds meet BECM's credit and selection criteria as described herein (e.g., BBB or above). The mechanics of secondary municipal bond guarantees is a well established and accepted practice. While much of the description herein is directed to insuring newly issued bonds, the process, system, media, and apparatuses described herein can be modified such that instead of issuing Insuring Bonds for newly issued Insured Bonds, an existing bond pool can be split into a insured and insuring pool. Processing can use the split insured and insuring debt/bonds as described herein to enhance the credit of the insured bonds and/or the components of the BECM.

In one embodiment, writing guarantees on bonds owned by investors entails the steps shown in FIG. 22B. At step 1, secondary market bonds are identified. For example, the information shown is an identity received, selected and/or determined electronically for a market bond. The information includes issuer, CUSIP/State, par, maturity, current dollar price, coupon/yield, commissions AAA/Trust, issuer underlying ratings, issue insured ratings. At step 2, an AAA guarantee is added. Information electronically selected, determined, and received for adding the guarantee is shown, including AAA dollar price, AAA yield, Acquisition bonds, Trust bonds percentage (e.g., corresponding to the insuring debt described herein), AAA bond par, Trust bond par, AAA Bond proceeds, Trust bond proceeds, and total proceeds. At step 3, the bonds are reoffered with an AAA guarantee. Information electronically selected, determined, and received for reoffering the bond is shown, including the total proceeds, less acquisition costs, less supplemental coupon, less commissions, less legal and admin costs, and less capital markets percentage. Also shown are any nets, profits, and/or revenues produced form the guarantee that is provided to the company as a tangible result and transformation of the components of the BECM.

In one embodiment, the Company may not position bonds but may partner with capital markets desks to underwrite secondary market guarantees. In addition to the guarantee premium, the components of the BECM (e.g., the Company) may retain a portion of the profit resulting from the increased value of the security. The Company's capital markets partners may be required through computer based trigger and rules to retain for their own account and/or underwrite the Trust Bonds associated with the BECM secondary guarantee. Capital Market partners may receive a percentage of the net transaction revenues after all costs, including: Trust Bond supplemental coupon, legal, and sales commissions.

Hurdles to implementation of the BECM structure are similar to those faced by new bond insurers (I) achieving market acceptance that allows the new entry's credit enhancement to produce the same pricing benefits versus unenhanced bonds as other enhancers, and (II) achieving critical mass—a diversified portfolio of insured credits.

For bond insurers, market acceptance is gained through general marketing efforts and by insuring credits for which established insurers are capacity constrained or at reduced returns until the new entry's trading spreads become competitive.

For bond insurers, the critical mass issue is addressed by pre-funding the cash capital required (including, to the extent permitted by the rating agencies, secondary sources of cash capital) to insure a diversified portfolio of credits. The actual portfolio is acquired over time as the insurer's trading spread diminishes and it wins bids to provide insurance.

With respect to FIG. 22B, marketing and portfolio diversification issues, as well as program termination and tax issues can be avoided or simplified by (1) having the Insured Obligations be further insured by municipal bond insurance and (2) configuring the credit enhancement provided by the structure as reinsurance to the municipal bond insurers. Under the second approach, either (I) the bond insurers can provide the cash capital necessary to provide the liquidity necessary for a AAA rating or (II) the BECM Structure can provide the capital, in which event the bond insurer's capital requirement may be based on an already AAA Insured Obligation.

Given alternative (II), the bond insurers may benefit from the AAA credit quality of the enhancement and should be able to significantly reduce or eliminate any capital charge relating to the insured bonds that benefit from the structure.

If the rating of the Insured Obligations insured by a bond insurer were initially below AAA, it may be possible to have all or a portion of the obligations of the bond insurer terminate at some point, e.g., once the bonds within a particular subcategory independently achieve AAA ratings.

This approach may avoid any initial marketing penalty, and any bonds that also benefited directly from the credit enhancement provided by the structure should actually achieve better pricing than ordinary insured bonds.

Tax issues relating to use of payments due to the Insuring Obligations to pay defaulted amounts on Insuring Obligations may be avoided since such amounts may technically go to reimburse the bond insurer who may initially advance the funds to make the Insured Owners whole.

Certain risks, such as validity risk may likely remain with the bond insurer or simply not be covered risks. There are many variations for integrating bond insurance into the structure.

For example, rather than having 4 Loss Position Subclasses, the bonds allocable to the third loss and fourth-loss positions can be sold as Non Obligations and the bond insurer can cover the risks that may otherwise have been allocated to those bonds. Also, the third and fourth loss position subclasses can be insured by the bond insurers.

Alternatively, the structure can be created without cash capital and the contribution of the insurer can be to provide the necessary cash capital. As noted below, it may be possible for a bond insurer to use a portion of its existing capital to meet the liquidity requirement associated with the Structure. To that extent, every additional dollar of income may increase the return on the bond insurer's capital.

Another alternative for implementation of FIG. 22B may be initially to establish the BECM Structure in the secondary market by enhancing credits for which bond insurance is not available. In the primary market, it might be easiest to establish the BECM Structure in connection with competitive sales. In that context, it may be clearly demonstrable that the issuer is achieving savings by using the BECM Structure instead of traditional bond insurance. That should minimize the pressure to provide extraordinary discounts to issuers to get them to use the Structure. Also, in this context, there may be no tax issue relating to offering the Insuring Obligations to the public prior to subjecting the underlying bonds to the obligations imposed by the structure which are the basis for the additional interest payable on such bonds.

The quality of the credit provided by the structure is superior to that provided by municipal bond insurance since the ability to divert payments from the insuring bonds continues beyond the period necessary to fund the rating agencies assumed 4 year default. In fact, given cash capital sufficient to fund the first years default, the structure can withstand a default that lasts to maturity of the defaulting bonds. Since the credit support provided by the 1st loss subclass goes on indefinitely, the risk of an ultimate los to the 2nd loss and higher subclasses is negligible. So, the risk associated with applying municipal bond insurance to loss subclasses other than the 1st loss subclass associated with a particular bond issue may be non-existent.

Figure 23:
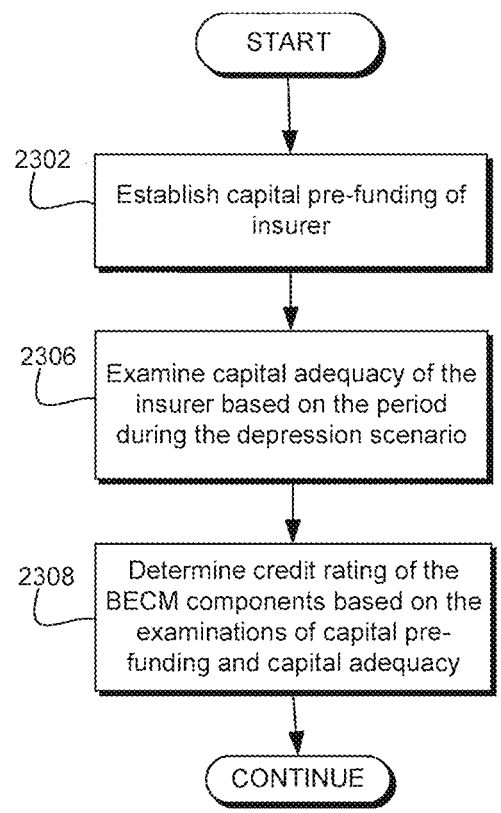

FIG. 23 shows a process for determining credit ratings for various components of the BECM. At step 2302, the capital pre-funding of the insurer is established by including a capital pre-funding in the capital structure. In one embodiment, the capital pre-funding in the capital structure is established by a computer system in an amount that is a multiple of an average annual depression scenario default percentage that is based on the credit rating of the investment.

In another embodiment, the computer system determines an amount of the capital pre-funding by the insurer that is sufficient to cover a default and that is calculated by (a) at least a pre-funding coverage factor multiplied by (b) a downgrade function that is applied to an average annual depression scenario default percentage for the investment based on the credit rating of the investment. In one embodiment, the downgrade function comprises a weighted sum of a percentage of a given insured investment issued by a given issuer that is at a current credit rating falling to a lower credit rating multiplied by another default percentage that is associated with the given issuer's industry and the lower credit rating. The establishing can be performed using, for example, the interfaces of FIGS. 27A to 33F.

In one embodiment, the basis for the capital charges can be the rating agencies' assessment of the risk of municipal default for each credit type and each rating category during a four year depression scenario. The capital charges represent the anticipated percentage defaults within the insurer's portfolio for each such credit type and rating category Under BECM's method, for the capital structure that is implemented in a computer system, sufficient capital is pre-funded in computer based accounts to withstand rating agency depression scenario defaults and still retain sufficient capital to meet the Aaa criteria. The amount of capital pre-funding and a numeric ratio representing whether the capital is sufficient to withstand the depression scenario can be provided as electronic parameters.

In contrast the BECM system and method, to achieve AAA monoline rating, the monoline insurer's capital must cover the aggregate capital charges (i.e., its assumed four year depression scenario defaults) by at least 1.25 times. In practice the monoline insurers have been capitalized at slightly higher level, e.g., 1.5 times to 1.6 times. Based on these parameters, monoline insurers habitually accumulated risk exposure at insured risk to capital ratios in excess of 100:1.

If insured defaults occur at the assumed depression scenario levels, the monoline insurer's remaining capital is short of the minimum AAA capital requirement by 0.65 times to 1 times. The monoline insurer is then expected to raise additional capital to maintain its AAA level and to pay claims, if needed. Similarly, if the credit quality of the portfolio deteriorated so as to increase the monoline insurer's capital charges beyond its available capital or to decrease the coverage margin below 1.25 times, the insurer is also expected to raise additional capital. In financial crises, raising capital at a time when the credit markets are under stress is very difficult and at times impractical.

At step 2306, the capital adequacy of the BECM insurer is examined based on the period during the depression scenario. During the depression period, if the assumed level of defaults were to occur, BECM can continue to meet the Aaa monoline criteria as long as the Insuring Bonds are computed to be sized to equal at least 2.3 times the assumed depression scenario defaults for the BECM portfolio. The BECM computer based insuring system can sustain that assumed level of defaults for the life of the portfolio (e.g., 20 years) without falling below the Aaa capital requirements. A result of this examination can be provided as a electronic parameter. In general, for steps 2304-2306, the computer system can examine the capital adequacy of the insurer's capital structure to cover a default based on a default scenario that occurs during or at an end of the depression scenario period.

At step 2308, the credit rating of the BECM components are determined based on the examinations of capital pre-funding and capital adequacy. The BECM components that can have their credit ratings determined include loss classes, the insurer, and/or the Trust. In one embodiment, determining can include determining the credit rating for the insurer based on the determined capital pre-funding and the examined capital adequacy. In one embodiment, the computer system generates determination of whether the established capital structure is sufficient to cover a depression scenario period to obtain a minimal target credit rating for the insurer. The steps of examining the capital adequacy and generating the determination can be performed using, for example, the interfaces of FIGS. 27A to 33F.

The electronic parameters can be received from the steps described above. Based on the received parameters, a rating function or algorithm may be used to determine the credit rating of the insurer, the Company, the trust, or other components of the BECM. The rating function can be a determination of whether the parameters meet certain thresholds, a determination of whether an average, weighted average or the like of the parameters meets certain thresholds, or the like. The thresholds can correspond to the credit ratings, AAA, AA, A, etc. In one embodiment, the thresholds can correspond to adequacies of capital to withstanding defaults in depression scenarios as described above. Multiples above the adequate capital can correspond to different thresholds such as AAA, AA, A, or the like. As described above, the multiples can be well above 1.5 to 2 times. In such cases, the ratings can be determined to be AAA or even higher, such as a "True AAA".

Given the quality of the credit enhancement provided by the structure, it may be possible for the structure to borrow (using EMCP or letters or lines of credit, for example) in order to make payments due on a timely basis and in order to avoid a need to divert funds payable on nonrelated Insuring Obligations. Such debt may be highly secure since it (and any debt issued to take it out) can be secured by all of the payments due to Insuring Obligations of all Loss Subclasses.

Given the rating agency assumptions with respect to the period of time that a municipal borrower may remain in default (generally 4 years if a AAA rating is sought) and the ability to borrow on a temporary basis using the credit of the structure, the risk that losses will be allocated to nonrelated Insuring Obligations can be minimized by using debt to make the Insured Owners whole. Assuming the defaulting borrower resumes payment as assumed, the cost of the default (interest on any debt incurred and any unpaid principal) can be allocated the related Insuring Obligations. Note that the assumptions regarding the duration of any default are conservative in light of actual experience with the few municipal defaults that have occurred.

Processing then continues to other steps.

Figure 24:
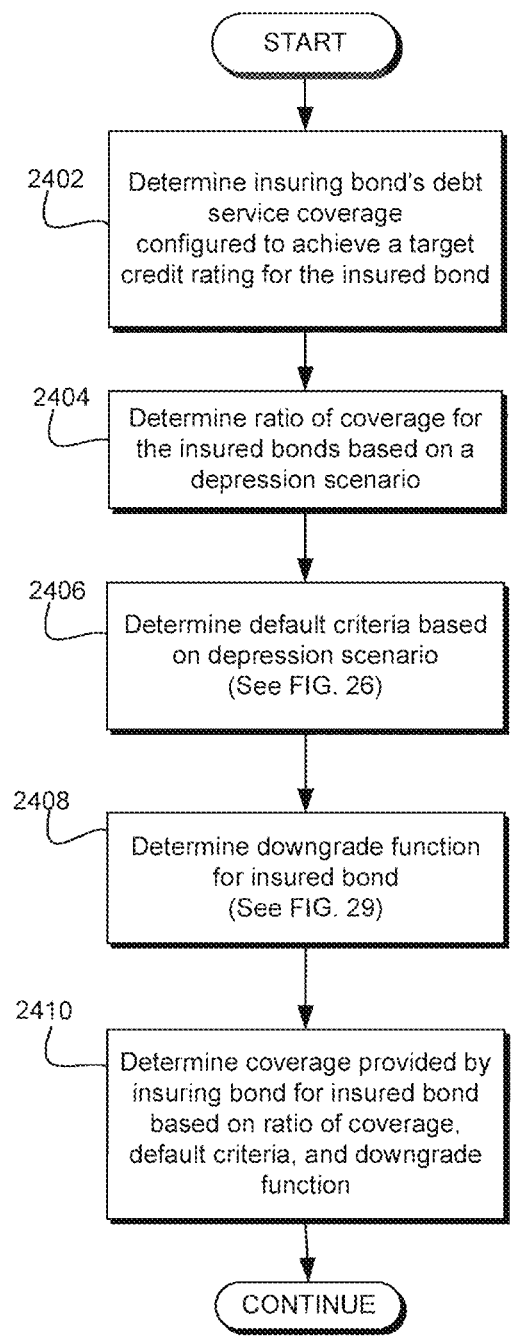

FIG. 24 shows a process for sizing an Insuring Bond. At step 2402, an Insuring Bond's debt service coverage is determined and is configured to achieve the target credit rating such as the credit rating determined from step 2004. For example, in one embodiment, during the depression period, if the assumed level of defaults were to occur, BECM can continue to meet the Aaa monoline criteria as long as the Insuring Bonds' debt service is computed to be sized to equal at least 2.3 times the assumed depression scenario defaults for the BECM portfolio.

In one embodiment, the S&P capital requirement (and presumptively, the others as well) decreases (in each by 25% of the original requirement) for maturities less than 5,3, and 1 years—e.g., the capital requirement for a 1 year maturity is 25% of the requirement for a maturity beyond 5 years. As a result, the amount of Insuring Bonds can be decreased at each of those points with either the released bonds becoming Non Obligations or a portion thereof becoming Insured Obligations and the balance remaining as Insuring Obligations. In either case, the Insuring Owners will realize an increase in the market value of their holdings. However, even though probability of default is lower, it may be best to leave the Insuring Obligation percent unchanged. First, doing so might reduce the likelihood that a default can be imposed solely on the related Insuring Obligations. Second, leaving the % unchanged results in increased coverage of the capital charge (i.e., assumed defaults) over time. So, the time it may take to reimburse expended capital declines, increasing the likelihood that a bond insurer's existing capital can be used to provide liquidity for the Structure. Also, since coverage exceeds 2 times for a period prior to final maturity, only the last year's capital requirement needs to be viewed as risk capital. The remainder of the Structure's capital is for liquidity and can be borrowed. Substantial coverage also increases the likelihood that debt can be issued to fund a default.

At step 2404, the ratio of Insuring Bonds to the Insured Bonds can be determined. In one embodiment, appropriately sized Insuring Bonds can cover a default equal to the same percentage of the Insured Bonds as the Insuring Bonds represent of the entire portfolio of Insured and Insuring Bonds. For example, assume that the Insuring Bonds equal 3% of the total bonds issued and Insured Bonds equal 97%. If 3% of the portfolio defaults, the non-defaulting Insuring Bonds equal 97% of 3% of the portfolio and the defaulting Insured Bonds equal 3% of 97% of the portfolio. Accordingly, the debt service on the non-defaulting Insuring Bonds is sufficient and can be used to cure over the at least one electronic exchange the 3% default of Insured Bonds. This ratio (e.g., 3% to 97%) can be used for various functions, including the function of maintaining constant any payment or redemption of the insured or Insuring Bonds.

At step 2406, the criteria for determining whether the insured or Insuring Bond would default (the "default criteria/ criterion") is calculated. In one embodiment, determining can include determining the default criteria/criterion based on the depression scenario, wherein the default criteria/criterion comprises a plurality of default percentages for a plurality of issuers based on the depression scenario, and wherein an insurance coverage based on a factor of one of the plurality of default percentages is sufficient to achieve the target credit rating. BECM's default criteria/criterion recorded in computer media and used by the computer system can be based on the Standard & Poor's criteria/criterion for monoline insurer capital charges (FIG. 26), but any other similar criteria/criterion can be used without departing from the scope of the invention. The criteria/criterion assumptions can be recorded in a database structure, file, spreadsheet, or the like. The criteria/criterion shown in FIG. 26 outline for each identified bond type, the capital charge which indicates the percentage of the bonds of that credit type that would be assumed to default ("default percentage") over a four year depression scenario. For example, the capital charge for an A rated or BBB rated city or county general obligation bond is 7% and 13% respectively. This criteria/criterion may be changed on an periodic basis or even in real-time, and may be transmitted to the BECM's computer system over a network, or even accessed remotely (e.g., from S&P's website as a web service) by the BECM's computer system.

At step 2408, a downgrade function is determined for the Insured Bond based on at least a portion of a plurality of Insured Bonds insured by the insurer being downgraded to a lower credit rating. In one embodiment, the portfolio downgrade function for each Insuring Bond managed by a BECM Trust is computed, including Insuring Bond associated with the recorded default criteria/criterion. The Insuring Bonds are structured (e.g., sized in a computer readable media and required to be issued at the size) using the average annual assumed default over a four year depression scenario, e.g., 1.75% or 3.25% for an A rated or BBB rated city or county GO bond, respectively. BECM in turn computes and records the assumption of a downgrade of a portion of the bonds of each rating category. This computation is shown in FIGS. 29A and 29B. Specifically the downgrade function can be a step wise function such as one that computes the downgrades as 25% of A rated bonds are downgraded to BBB and that 20% of BBB bonds are downgraded to BB, or the like. Other steps of percentages downgrades can also be used. Accordingly, for an A rated credit the baseline assumed default represents 75% times the A rated assumed default percentage (1.75%) plus 25% times the BBB rated assumed default percentage (3.25%). In turn, BECM's assumed default for an A rated city or county general obligation would be 2.125%. Accordingly, the Insuring Bonds' sizing is structured based on the computed downgrade assumed defaults.

At step 2410, the debt service coverage provided by the Insuring Bond for the Insured Bond can be determined based on the determined ratio of coverage, default criteria/criterion and the downgrade function. In one embodiment, BECM's Insuring Bonds are structured to provide coverage of the assumed defaults in excess of what has traditionally been provided by monoline insurers. The downgrade function can be applied to the appropriate default percentage from the default criteria/criterion that is associated to the Insuring Bond. The result of the function is the Insuring Bond coverage. The Insuring Bond coverage takes into account the state of flux regarding rating agency criteria/criterion and the uncertain direction of municipal ratings. The Company's computer system can structure coverage at 2.3 times the assumed defaults, but other coverage percentages can be used without departing from the scope of the invention. For example, for an A rated city or county general obligation bond, this calculation results in structuring Insuring Bonds to raise 4.89% of the issuer's bond proceeds. The computing system can round up the Insuring Bonds to 5.25%, representing: 2.47 times the Company's assumed 2.125% default, and 3 times the assumed defaults for an A rated city and county general obligation bond under the Standard and Poor's default criteria/criterion as computed in step 2406. Computing then returns to other processing.

Figure 25:
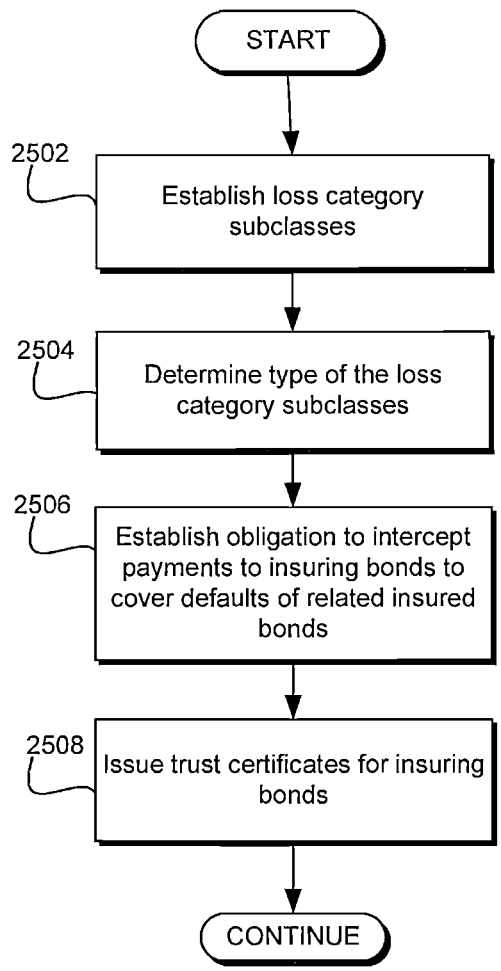

FIG. 25 shows a process for determining loss category subclasses. At step 2502, the loss category subclasses is established. In one embodiment, establishing comprises establishing a loss category subclass for the trust certificate. The loss category subclasses can be recorded and managed in a computer system to group the Insuring Bonds so that, in the event of a default that cannot be funded by intercepting debt service payable on the related insuring certificates (i.e., the certificates associated with the Insuring Bonds of the defaulting issuer), the cash flows from non related insuring certificates that are intercepted to cure the default, are determined to be from insuring certificates related in computer readable media to bonds with similar characteristics to the defaulting bond issue. The loss category subclass can be recorded as a type field in a database for an insuring certificate. For example, the individual bond types described in "Standard and Poor's Single Risk Categories" can represent loss category subclasses, e.g.:

General Obligation Bonds of City and Counties (category A)
Tax Supported Debt—Sales, gas, excise, gas and vehicle registration—Statewide (category B)
Public power agencies and utilities with no special project risk and little nuclear dependence (category C)
Water, sewer, electric, and gas utilities (revenue secured) (category D)
Investor Owned Utilities—Electric distribution system (category E)

In addition, each of the single risk categories themselves (i.e., credit types rated 1, 2, and 3, respectively) can be represent in the computer fields as a loss category subclass.

Alternatively, a loss category subclass might be comprised of more than bond type or single risk category, e.g.:
Multiple bond types
General obligation City and County bonds plus water, sewer, electric, and gas utilities (revenue secured) (category F)
Personal income tax with a population of less than 1 million plus local sales, gas, excise, gas and vehicle registration taxes (category G)
Multiple risk categories
Single risk category 1 (category H)
Single risk category 2 plus single risk category 3 (category I)
Insured Bonds issued within a particular state, e.g., California (category J)

At step 2504, the type of the loss category subclasses can be determined. In one embodiment, there can be at least two variations on the use of loss categories subclasses in structuring the Insuring Bonds.

1. Loss category subclasses can be used "horizontally" within each loss position subclass. Under this approach, in the case of a default under category B, the loss would be allocated by intercepting debt service payable to Insuring Certificates in the following order determined by a database trigger, stored procedure, or any other computer implemented algorithm:

Related Insuring Bonds
1st loss subclass
   Category B bonds—not rated
   All other categories of bonds
2nd loss subclass—Ba rated
   Category B bonds
   All other categories of bonds
3rd loss subclass—Baa rated
   Category B bonds
   All other categories of bonds
4th loss subclass—A rated
   Category B bonds
   All other categories of bonds
5th loss subclass—AA rated
   Category B bonds
   All other categories of bonds The use of horizontal loss category subclasses does not require any additional credit analysis as compared to structuring the Insuring Bonds without loss category subclasses.

2. Loss category subclasses can also be used "vertically" so that there are loss position subclasses within each such vertical loss category subclass. Under this approach, in the case of a default under category H, the loss would be allocated in computer readable media by intercepting debt service payable to Insuring Certificates in the following order:

Related Insuring Bonds
Category H—Single risk category 1
  i. 1st loss subclass (and horizontally with respect to loss category subclasses within the $1^{st}$ loss subclass)
  ii. 2nd loss subclass (and horizontally with respect to loss category subclasses within the 2nd loss subclass)
  iii. 3rd loss subclass (and horizontally with respect to loss category subclasses within the 3rd loss subclass)
  iv. 4th loss subclass (and horizontally with respect to loss category subclasses within the 4th loss subclass)
  v. 5th loss subclass (and horizontally with respect to loss category subclasses within the 5th loss subclass)
Category I—Single risk categories 2 and 3
  i. 1st loss subclass (and horizontally with respect to loss category subclasses within the $1^{St}$ loss subclass)
  ii. 2nd loss subclass (and horizontally with respect to loss category subclasses within the 2nd loss subclass)
  iii. 3rd loss subclass (and horizontally with respect to loss category subclasses within the 3rd loss subclass)
  iv. 4th loss subclass (and horizontally with respect to loss category subclasses within the 4th loss subclass)
  v. 5th loss subclass (and horizontally with respect to loss category subclasses within the 5th loss subclass)

The use of vertical loss category subclasses may include an additional credit analysis as compared to structuring the. Insuring Bonds without loss category subclasses because each vertical loss category subclass can have sufficient size to support the target ratings of the various loss position subclasses within each such vertical subclass.

At step 2506, an obligation to intercept payments to insuring bonds to cover defaults of related insured bonds is established. In one embodiment, Insuring Bonds are deposited at issuance the Insuring Bonds into a trust (the "Insuring Trust"), using for example, computer based recording software, bank account routing, and other mechanism for modifying a computer readable media. The Insuring Trust holds the Insuring Bonds for the benefit of BECM's Insured Bondholders. That is the legal obligation to the Insured Bondholders can be recorded in memory and can constrain the operations that can be applied to funds from the Insuring Bonds that relate to the Insured Bondholders, e.g., the funds cannot be transferred out of an account if the funds are needed to make the Insured Bondholders whole due to a default and/or the funds deemed for the Insuring Bondholders are automatically sent to the Insured Bondholder's account based on a computer determination of default by the issuer of the Insured Bonds. These Insured Bonds can be configured in a computer readable media to be secured by both the: (i) Insuring Trust and (ii) BECM's cash capital. That is, cash capital in another account can be transferred to the Insured Bondholders to make the bondholders whole based on an electronic determination of the default by the issuer.

At step 2508, trust certificates are issued for the Insuring Bonds. In one embodiment, the Insuring Trust purchases the Insuring Bonds from the issuer through at least one electronic exchange and sells a mirror image trust certificate (e.g., the Insuring Certificate) for each Insuring Bond deposited into the trust through the at least one electronic exchange. For new issues, the (i) deposit of Insuring Bonds into the Insuring Trust and (ii) sale by the Insuring Trust of the Insuring Certificates occurs simultaneously with the issuance of the bonds, using for example, electronic triggers in database records to cause such simultaneous issuance. The proceeds raised by the sale of the Insuring Certificates can be identical to the proceeds paid to the issuer by the Insuring Trust. Insuring Bonds bear yields over at least one electronic exchange based on the underlying ratings of the issuers' bonds. In the absence of an insured default determined electronically by a computer system, payment of principal and interest on each Insuring Bond is passed through to the owner of the related Insuring Certificate over the at least one electronic exchange.

In one embodiment, Insuring Certificate holders may be provided certain rights and/or obligations and those rights and/or obligations may be recorded in computer media and programmed to cause the computer systems described herein to perform actions, such as receiving consent from Insuring Certificate holders (e.g., over a user interface, a network, or the like). The rights and/or obligations can include receiving the coupons and/or principal from the Insuring Bond for the Insuring Certificates, and can include additional yields for the added risk of holding the Insuring Certificates rated at a particular credit rating. Yields of each loss position or category can be incrementally higher as the position or category class decreases (e.g., yields increase in inverse to position or category). The sum of the additional yields can be at least the amount of up front fees paid to the Trust over time for the issuers in aggregate. In one embodiment, the sum can even be greater by adding an amount received from issuer's fees paid over time. Other provisions recorded in computer media requiring consent of affected can include:

Any change in the right of a certificate holder to be paid the Insuring Certificate Payments specified with respect to such certificate, excluding any provision relating to intercepting Insuring Certificate Payments Any change in the order in which or purposes for which Insuring Certificate Payments are intercepted except as noted below:

At the direction of the Company, subclasses of Insuring Bonds may be created and/or modified in order to group related credits and risks together so that the Insuring Bond Payments of Insuring Bonds that are similar to a defaulted Insured Bond Issue are intercepted before the Insuring Bond Payments of dissimilar or less similar credits as reasonably determined by the Company. However, no such change can be made which results in a reduction of the rating of any Insuring Bond by any Rating Agency then rating such bond Any amendment to these provisions.

In one embodiment, the Company may exercise the voting rights of all Insured and Insuring Bonds Except as noted above, amendments to the provisions of the Insuring Trust can be made. In one embodiment, the computer may be programmed to require that amendments to rights and obligations do not result in any reduction of the rating of any Insured Bond or Insuring Bond. Computing then returns to other processing.

FIG. 25 may be modified with alternate steps, embodiments, and implementations as explained below. In one embodiment, at step 2502, credit losses is imposed on those Insuring Owners who specifically purchased bonds of (or specifically accepted the credit risk relating to) the defaulting borrower. This is different from simply having a distinct Underlying Rating which reflects the likelihood of payment of the Insuring Obligor by the underlying borrower, but does not subordinate the Insuring Obligor (both to the related Insured Obligation and to the non-related Insuring Obligations) in the event of a default by such borrower. Benefits of this approach include reducing the effect on nonrelated Insuring Obligors of the inclusion of weaker credits within the pool. It discourages adverse selection by making each Insuring Owner responsible for the credit that it enables to be enhanced.

At step 2504, with respect to any payment shortfall on an Included Issue (a "Defaulting Issue"), the default may be allocated as follows:

First, to the related Insuring Obligations. So, in the event of a partial or temporary payment default, it may be possible that the entire default may be absorbed by the related Insuring Obligations. There may be subclasses of the related Insuring Obligations that are required to absorb the dollar amount of losses in a specified order (See "Loss Position Subclasses", below). So, for example, the first-loss subclass might be required to assume all losses up to the full amount of the payments owed to it. Any additional losses may then be allocated to the second-loss subclass up to the full amount of the payments owed to it. It may be natural for the loss position subclasses for Insuring Obligations related to a particular bond to correspond to the BECM Structure Rating subclasses.

Second, to nonrelated Insuring Obligations. Their may be subclasses of nonrelated Insuring Obligations that are required to absorb the dollar amount of losses in a specified order (See "Loss Position Subclasses", above).

By allocating losses first to the related Insuring Obligations, any actual losses are configured to be allocated to the related Insuring Obligations. The nonrelated Insuring Obligations provide marketing enhancement in the same way as bond insurance—bond insurers view themselves as not actually taking any credit risk, but only providing marketing enhancement. The resultant rating of an Insuring Obligation may be the lower of its Structure Rating and its Underlying Rating.

The bonds underlying the Insuring Obligations might be held within a trust or otherwise pledged or subject to a lien such that even in the event of a bankruptcy of a borrower, the proceeds of the bankruptcy delivered to the holders of related Insuring Obligations may be used to reimburse any amounts used to pay the Insured Obligations, including amounts diverted from nonrelated Insuring Obligations. This approach may achieve a real subordination of the Insuring Obligations, as compared to subordination at the borrower level that may not survive bankruptcy. Any recoveries from a defaulting borrower may be applied first to reimburse non-related Insuring Obligations and second to reimburse related Insuring Obligations. Also, any loss position subclasses may be reimbursed in inverse order of their loss position. So, within each category of Insuring Obligations, the second-loss subclass may be reimbursed prior to the first-loss subclass.

At step 2508, ratings subclasses can be used to ensure that Insuring Obligations not exposed to a default by a nonrelated borrower that is lower rated than such Insuring Obligation unless the credit enhancement provided by a subclass of Insuring Obligations that is not lower rated is insufficient to cure such default. This might be accomplished, first, by allocating the cost of any loss to be allocated to nonrelated Insuring Obligations only to Insuring Obligations with the same or a lower rating as the defaulting issue. Second, the credit enhancement provided the Insuring Obligations in each Rating Subclass may have at least to equal the next highest rating category.

For example, the BBB Rating Subclass of Insuring Obligations should achieve at least an A rating when viewed only with respect to the subclass of BBB-rated Insured Obligations. Similarly, the BBB and A Rating Subclasses of Insuring Obligations should collectively achieve at least a AA rating when viewed solely with respect to the subclass of BBB and A-rated Insured Obligations. Or, alternatively, the A Rating Subclass can be structured separately to achieve a AA rating when viewed solely with respect to the subclass of A-rated Insured Obligations.

In some cases, additional cash capital may be necessary for a particular Rating Subclass to achieve its target rating—i.e., the immediately higher rating category.

So, even on a weak link basis, the Insuring Obligations within a particular Rating Subclass may achieve the same rating category as the related underlying bonds. This ignores the potential credit impact of the greater severity of a loss on the Insuring Obligations, since the full impact of the loss may be imposed on the Insuring Obligations related to a Defaulting Issue. Hence, a partial loss on the Defaulting Issue can be a complete loss on the related Insuring Bonds. However, this may not be qualitatively different from the impact of normal subordination as long as losses are imposed solely on related Insuring Obligations.

In order to address the fact that ratings of underlying bonds will change from time to time, the Rating Subclass of a particular Insuring Obligation can change with the rating of the underlying bond. If for example the City of New York general obligation bond rating is changed from A to AA, the Insuring Obligations related to all New York general obligation bond issues within the structure may move from the A-rated Rating Subclass to the AA-rated Rating Subclass. In one embodiment, this rating volatility can be avoided by a Structure Enhanced Ratings.

The Structured Enhanced Ratings can be implemented using computer-implemented mechanisms for determined and storing the ratings. A mechanism for split rating is implemented. In order to achieve the objective of not adversely affecting the ratings of the Insuring Obligations with in a rating subclass, it may probably be necessary to use the lowest rating to determine the rating subclass. Fewer ratings (i.e., Moody's and S&P) may seem to be better to minimize the possibility of split ratings. The impact of split ratings might be minimized if the higher rating were to determine the Rating Subclass of the Insuring Obligations for purposes of allocating non-related losses to the split-rated Insuring Obligations (the BECM Structure Rating may be the higher of the split ratings) and the lower Rating Subclass were to determine the Rating Subclass of the Insured Obligations to determine the allocation of a loss if the split-rated borrower should default. In one embodiment, non-related losses are allocated first to the lower rating subclasses (rather than to all subclasses at the same or lower rating level than the defaulting credit).

As described above the processes of FIGS. 12A to 12E and 14A to 25 are directed to insuring newly issued debt or bonds, or even to insuring and/or to re-insure already existing bonds or debts. In general, in one embodiment, without departing form the scope of the invention, the BECM can use in the place of the Insuring Bond or debt in the above processes any stream of income and need not be income from a bond or debt. Such streams can be tied to or otherwise associated with the Insured Bond (e.g., be paid by the issuer of the Insured Bond). The streams can include debt, dividends, accounts receivables, or the like.

In one embodiment, the debt managed by the processes described herein can be a variable rate bond. A structure for variable rate bonds include being able to issue the Insuring Obligations for variable rate bonds that are Insured Obligations as unenhanced, with an interest rate equal to the rate on the Insured Obligations plus the insured/uninsured spread plus the spread over uninsured bonds allocated to Insuring Obligations. Such high yield variable rate bonds may be candidates for tender option programs and may not expose the principal in the program to interest rate risk. Assuming a single class of Insuring Obligations, the spreads to uninsured might range from 85 basis points to more than 150 basis points. Alternatively, another structure for variable rate bonds include issuers simply selling the Insuring Obligations as fixed rate bonds, thus preserving variable rate debt capacity for the Insured Obligation portion of future issues. Another structure for variable rate bonds include a mechanism where variable rate bonds might tend to be used by larger, more creditworthy borrowers so the real risk of default may be extraordinarily low.

FIG. 26 shows an example of a data model for determining a percentage of possible defaults ("default criteria/criterion") over a 4 year depression scenario for a type of debt with a particular credit rating or for a single-risk category. For example, States that are rated CCC are modeled to have a 30% chance of defaulting within a 4 year period. An average annualized percentage of possible default can be determined by dividing the 4 year period percentage by 4. For example, States with CCC rating has an average annualized percentage of default of 30%/4=7.5%.

FIGS. 27A to 33F shows user interfaces and algorithmic models for managing insurance of debt that is implemented in computer readable and executable instructions for managing BECM based components. In one embodiment, the user interfaces can be a web interface, graphical user interface, database program, Excel files and associated formulas executed by a computer to provide an Excel user interface. In one embodiment, the interfaces and algorithmic models can be used by the systems, processes, media, and apparatuses of FIGS. 1 to 26.

In one embodiment, the user interface component which can include any of the screens, data-model and algorithms of FIGS. 27A to 33F can be configured for receiving input relating to the insured bond and the insuring bond to generate a model of applying the insuring bonds to enhance the insured bond's credit rating; providing a break-even comparison of applying established capital structure to a monoline insurance of the insured bond; generating an indication of the determination of whether the established capital structure is sufficient to cover the depression scenario period to obtain the minimal target credit rating for the insurer; and sending a message to another computer system (e.g., the company computer system) to establish an appropriate capital structure that was modeled using the user interface and based on the indication.

As shown, the Company, issuers (e.g., municipalities), and rating agencies are provided the analytical computer based tool and user interfaces shown to do a model, analyze, and confirm the numerical performance of insuring debt based on the BECM and to compare the BECM against other models. For example, a breakeven analysis can be provided, thus showing municipalities the savings benefit of using the BECM versus the Monoline. For example, the municipalities can be shown that savings can come from a higher rating of AAA on their Insured Bonds, thus lowering the cost of borrowing. Users can enter underlying assumptions and parameters in the user interfaces.

As described and shown in the FIGS. 27A to 33F provides modeling, analysis and interfaces for managing loss position classes, among other things. The term "lower loss position" or "LLP" and "higher loss position" or "HLP" used in the description herein for these FIGS and in the terms FIGS corresponds to the loss position subclasses described above but uses different terminology. The junior lower loss position and senior loss position correspond to the $1^{st}$ and $2^{nd}$ loss subclasses, respectively described above with respect to FIGS. 12A to 25. The higher loss position classes $2^{nd}$, $3^{rd}$, $4^{th}$ corresponds to the $3^{rd}$, $4^{th}$, and $5^{th}$ loss subclasses, respectively described above with respect to FIGS. 12A to 25.

As a summary of the computations performed from the various interfaces, parameters are entered into the interfaces of FIG. 27A to 28D. Based on the parameters, and the loss position information and downgrade functions of FIGS. 29A and 29B, a percentage of the insuring bonds to the insuring bonds is determined. An additional yield for the portion of the insuring bonds is used to adjust the coupons of the insuring bonds based on maintaining level debt service and pricing, as shown in FIGS. 30A to 31I. The portion of the coupons of the insuring bonds (including the adjustment to the coupon) is used to pay fees, etc. The remaining portion is used to pay the coupons to the holder of the loss positions, including the adjusted coupons associated with each loss position. The debt service is maintained level for the loss positions while varying the coupons and/or additional yields that are different to each loss positions, as shown in FIGS. 32A to 32F. Based on the pledge of the debt service for each loss position (that is computed and maintained level) to enhance the insured bonds and/or a higher loss position insuring bonds, a credit rating for each loss position and an enhanced credit rating of the insured bonds are computed in FIGS. 33A to 33F.

Referring to FIG. 27A, information about the BECM system can be entered and modeled, including entering and modeling the underlying Insured Bond's rating, and other options such as whether the model should also enhance the loss classes, the bond's characteristics, current spread assumptions, premium parameters, and the like. FIG. 27A shows entry of the assumed target insured bond (e.g., BBB-rated hospital system), whether the insured bonds are only enhanced or whether the loss classes are also enhanced, bond term, target bond proceeds, insuring bond par, and call provisions. Given the entered assumed information, the percent of Insuring Bonds needed to give the Insured Bond a AAA rating is returned and displayed, the coverage of Insured Bond debt service, and the target and actual 4-year default tolerance are displayed. Based on these parameters entered or shown, various data interfaces can be provided that shows possible results of using a BECM model versus a monoline model, as shown in FIG. 27A itself and FIGS. 27B to 27H. In one embodiment, entering data into the interfaces of FIG. 27A, causes an automatic change in the interfaces of FIGS. 27A to 27H. Of note, the % of Market Spreads as a of particular date to MMD used in the analysis is shown, thus showing the benefit to the purchasers of insuring bonds and associated trust certificates above other types of similar debt instruments.

FIGS. 27B to 27C show user interfaces displaying and modeling computations and parameters for BECM components assuming yields to maturity for the insured and Insuring Bonds. The statistics show comparisons between uninsured bonds, monoline Insured Bonds, total structures of bonds, insured and Insuring Bonds using the BECM methodology, the total structures of the BECM components, and investment grade insuring subclasses. As shown, yields information, including yields with and without an additional coupon or annual charges, yields with certain portions, etc. are determined for different bond scenarios (e.g., with and without BECM). Yields benefits are also shown. The costs of the different bond scenarios are also shown. As shown, the yields and other parameters are at least comparable and superior to those provided by monoline insured bonds and/or uninsured bonds.

FIGS. 27D to 27E show user interfaces displaying and modeling computations and parameters for BECM components assuming yields to call for the insured and Insuring Bonds. The types of information is substantially similar to the user interfaces of FIGS. 27B to 27C, except that the insurer realizes a significant savings in terms of cost of insurance by redeeming the bonds early using the BECM model.

FIG. 27F show user interfaces displaying and modeling computations for a summary of yields provided by using the BECM system given the parameters computed and entered from FIGS. 27A to 27E. As shown, various yields of monoline versus the BECM are shown. The yields show yields from premiums, for various subclasses, yields retained by the Company/Trust (e.g., the Program), annual yields, net yields, return on equity, or the like.

FIG. 27G shows a user interface displaying and modeling computations for a summary of premiums and costs of applying the BECM system. As shown, the net upfront structured premium, premiums on structured insuring and insured bonds, total upfront premiums, total cost of structuring, annual cost of structure, percent of and annual cost of insuring bonds, upfront cost of the structuring, upfront cost of insuring bonds, cost of insuring bonds as a percent of structured cost, any additional yields on equity and profits, percent of total costs of structure available, upfront monetary equivalent to the percent available, max upfront cost net of program costs and annual dollar equivalents to the percent available.

FIG. 27H shows a user interface displaying and modeling computations for a summary of different loss classes/positions, including each class/position's as a percent of the bond issue and as a cumulative percent of the insuring bond.

FIGS. 28A to 28I show other user interfaces displaying and modeling computations for a summary of using the BECM system. FIG. 28A shows the insuring bond sizing and associated subclass sizing, using the computations and downgrade functions of the processes described herein, including the processes of FIGS. 20, 24, and 25. FIG. 28A shows entry of the assumed target insured bond (e.g., BBB-rated hospital system). FIG. 28A provides different assumed annual default percentages, coverage to enhance a security to AAA, suggested insuring bond sizes, actual insuring bond size, and other assumptions and calculations. Also provided are different sizing of different loss subclasses, including a minimum percentage insuring bonds, estimated, proposed, and actual subclass sizing, and the like.

FIG. 28B shows another user interface displaying and modeling computations for breakeven analysis with respect to the BECM and the monoline systems. The managed and displayed monoline information includes: benefits of the monoline insurance, breakeven calculations of the monoline versus uninsured bonds, premiums information, and the like. As a comparison, cost and benefit information for using the BECM system is provided, including total cost of the structure, annual costs, annual expenses, upfront costs, amounts available (e.g., profits), etc. Also shown are input assumptions such as target of additional return on structured equity, base investment return on cash equity, other investment returns, discount rates to determine present values, percent of premiums allocated to expenses, or the like. Also shown are margins over required coverage of assumed defaults by insuring subclasses, and other insuring bond sizing information.

FIG. 28C shows another user interface displaying and modeling computations for structured spreads to unenhanced yields, and structured spreads to monolines insured for various ratings. As shown, various assumptions can be entered and modeled, including the percent of current market spreads (based on for example, municipal market data) that is being used in the calculations described herein, cash equity as a percent of insuring bond debt service, various loss position yields, and the like. Also provided are different basis points for spreads for various rated structures of insuring bonds (loss positions/classes) over a simple uninsured target bond (e.g., BBB-rated hospital systems). Moreover, also provided are structured spreads for various insured and insuring bonds compared to monoline spreads for various target ratings.

FIG. 28D shows another user interface displaying and modeling computations for yields for various loss positions insuring bonds including on senior and junior lower loss positions insuring bonds. For each loss position subclass, the yields, spread to an unenhanced comparable security, an increment between each loss position of the spreads, various tax information, and other information are provided. Also provided are revenues percentages that are available to cure an insured default from various sources including net program revenues after all outflows, additional equity return, and other reserved amounts. Moreover, also provided are downgrade analysis of the target insured bond, and the various insuring bonds for different loss classes/positions. Information provided for each bonds include the gross required coverage of assumed defaults, required coverage for the initial rating, percent of minimum capital for the rating category, percent of original capital supporting the structured rating, original excess capital, requirements for downgrade analysis, minimum capital required assuming downgrade, increase in minimum capital required for downgrade, percent of subclass that can be downgraded without causing a downgrade of the target insured bond, percent of respective bond that can default without causing a default on payments of the insured bond debt, or causing a downgrade of the insured debt, or the like.

FIGS. 28E to 28I show other user interfaces for providing various inputs and calculating and providing parameters for the BECM system. FIG. 28E shows an input and analysis for general inputs for the target insured bond, including various attributes of the bonds such as total amount of the issued bonds, whether there is principal amortization, various associated dates, including maturity dates, call dates, amortization periods, cost of issuance and additional underwriter's discount for insuring bonds, and the like.

FIG. 28F shows specific inputs and analysis for the structured bonds including the credit type and underlying bond ratings for the target insured bonds, and various spreads comparing enhancement of the credit of the insured bonds under various methodologies to uninsured bonds, insured bond percentages and insuring bond percentages under the BECM (which may be calculated based on the processes of FIGS. 21 to 22A). Various information about the loss position subclasses are also managed including the number of insuring subclasses, the maximum additional yields on the lower loss position bonds, the lower loss position senior and junior bonds percentage and coupon limit for the senior and junior lower loss position bonds, the percentage of the insuring bond loss positions breakdown for loss positions of various credit ratings. Also shown are premiums, coverage and tolerance information under the BECM methodology, including the minimum required coverage of the assumed defaults for insuring and insured bonds of various ratings, various tolerances, including an average annual weighted default tolerance, average worst case assumed annual defaults, structured upfront premiums and annualized premiums. Parameters for comparison against monoline and uninsured are also included such as the target for additional structure benefit to issuer versus benefit of monoline insurance, actual benefit to issuer versus monoline, and total structure benefit versus uninsured. Also shown is the amount of money retained for the annual program revenues, liquidity fees, return on equity, etc., for applying the BECM, and the lower loss position tranches of insuring bonds in percentages.

FIG. 28G shows specific inputs and analysis for the marketing penalties for using the BECM, including for issuing trust certificates and bond insurance inputs. Shown are the higher loss positions insuring bond penalty for the structure, any taxes, and additional penalties. Shown also are the bond insurance inputs, including information for the underlying bonds. The information includes whether the bond is callable, and whether the issuer has access to a monoline insurer. Also shown is a breakeven analysis compared to monolines including information about monoline bond insurance premiums as percent of total debt service and as a percent of the breakeven premium, monoline costs, benefits, and breakeven versus uninsured, etc. The algorithm for the analysis does the following: calculate breakeven monoline premium by doing a sizing with an estimated premium greater than zero. Even if insurance is not available for underlying bonds, since insurance is used to calculate the premium for the HLP Bonds, show insurance as available with a premium equal to the breakeven premium.

FIG. 28H shows specific inputs and analysis for the structured insured bonds, and the insuring bonds. To reflect the availability of monoline insurance for Structure Insured, the algorithm for the analysis does the following: First, do a bond sizing with no insurance available. Second, paste the value of the insurance benefit and equivalent upfront premium into the cells to the right. Third, do another bond sizing with insurance available. The breakeven comparison information includes whether the AAA monoline is available for this type of bond, net pricing benefit of the monoline bond insurance on the structured insured bonds, estimate of upfront premium equivalent to net benefit, percentage of monoline insurance benefit paid to bond insurer, annualized upfront premium for structured insured bonds net basis points available for insuring bonds and program, and upfront monoline insurance premiums.

Also shown are similar breakeven analysis for the insuring bonds. The breakeven comparison information includes whether the AAA monoline is available for this type of bond, benefit of bond insurance on the higher loss position bonds comparisons, monoline insurance premium comparisons, percentage of monoline insurance benefit paid to bond insurer, annualized monoline premiums for higher loss position bonds, upfront monoline insurance premiums, benefits of bond insurance on the higher loss positions bond net bond insurance premiums and credit spreads.

FIG. 28I shows specific inputs and analysis for rounding inputs and conventions for performing calculations shown in the various interfaces. Liquidity and equity inputs are also provided, including liquidity as a percent of insuring bond debt service and as a percent of total insured and insuring bond debt service, liquidity in dollars plus fees, equity as a percent of insuring bond debt service and as a percent of 4 year assumed default covered by structure cash equity, equity in dollars plus return on equity above investment return, and investment return on cash equity and upfront premiums. Also provided is a comparison of the BECM structure to the monoline insurance and conventional CDOs, including information about a portion of the monoline premium allocated to hard program expenses, monoline cash equity capital amount plus unrated insuring bonds earnings on equity-like return, and the marketing penalty on insured CDOs plus tax on reallocated interests in basis points on all bonds.

FIGS. 29A and 29B show an example of a method, data model, and interface for computing a downgrade function, and sizing the Insuring Bond and loss class and/or category subclasses. The method, data model, and interface takes into account of assumed defaults, assumed portfolio deterioration downgrades, and coverage. In this example, the analysis assumes that startup cash equity is $200 million for both the BECM and a conventionally structured monoline insurer and that both capital allocated to an insured issue and capital not yet allocated are available to cure a defaults. For each bond with an underlying particular credit rating, a downgrade function or relation is provided to determine the percentage of the bond that will deteriorate to a lower credit rating. For example, for the A rated bond, 75% will remain A, while 25% will fall to BBB. The function may be over the lifetime of the bond or over a 4 year period. Also shown is the assumed default for each bond type over the 4 year or 1 year period. The percentage that degrades can be multiplied to the average annualized depression scenario coverage percentage (from FIG. 26) for the associated debt/bond type (e.g., GO). This weighted sum can be used as the coverage percentage for a particular debt/bond. As shown, the BECM has significantly greater capital (i.e., capacity to withstand defaults) at every point in time from the issuance of the first Insured Bond until the monoline insurer's startup capital is fully allocated. The bond portfolio can comprise A and Baa rated City GOs. The monoline insurer's capital is fully allocated when $19.6 billion of bonds have been insured whereas the cash equity available under the BECM can support the enhancement of $136 billion. The BECM's default tolerance significantly exceeds that of the conventional monoline at every point in time both over a four-year depression scenario and over the term of the bonds (e.g., 20 years).

FIGS. 30A to 30C show examples of a method, data model, and interfaces for providing calculations of sizing of structured insured and insuring bonds. FIG. 30A shows that the structured insured bonds is determined to be 75.5% of the issued bonds for the particular type of target bond (e.g., BBB-rated hospital system). The various information about the debt service, including the level of debt service, proceeds information, bond par, surplus versus target, the yields of the insured bonds (base and all-in), and the like. Shown for each payment date (on a semi-annual basis) for the insured bonds, are the various structured insured bond sizing and the present value of the debt service for the base yield and the all-in yield (column CC–CD). Base yield includes the yield at which the gross proceeds of an issue are borrowed. All-in yield includes the base yield plus the annualized cost of any upfront monoline insurance premium or upfront structure premium. For each payment date, the sizing information includes preliminary bond proceeds (BT), bond par (BU) and maturity interest (BV), and final bond proceeds (BW), bond par (BX), maturity interest (BY), semi-annual debt service (BZ). Also shown are annual debt service (CA), and any bond takedowns (CB).

FIG. 30B show examples of a method, data model, and interfaces for providing various data parameters for the insured bond, including structured insured costs versus monoline insured, structured insured benefits versus uninsured bonds, and an analysis of the economics based on the base yields of the structured insured versus an uninsured bond. The analysis includes a base yield benefit of the structured insured versus insured in basis points, less annualized bond insurance premium, less annualized upfront structure premium, less benefit of monoline bond insurance retained by issuer, less additional benefit to the issuer provided by the structure, plus gross benefits of certain insuring bonds versus uninsured, less a premium for monoline insurance of on the certain insuring bonds, less interest on those certain insuring bonds. The net of the foregoing numbers provides the net benefit for the structured insuring bonds that are available for insuring the insured bonds. This number can also be provided in basis points on the insuring bonds as the net benefit available for the insuring bond.

FIG. 30C shows an example of a method, data model, and interfaces for providing the pricing structure of the insuring bonds before additional interest. As shown, the insuring bonds is computed to be 24.4% of the issued bonds. For each payment date, information shown for the insuring bonds (column CG–CQ) is substantially the same as for the insured bond, except that aggregate base yield information is also provided. The present value of the debt service for the aggregate base yield (CR) is also provided over the period of years for the payment dates (on a semi-annual basis) of the insuring bonds. The computations and interfaces of FIGS. 30A-30C are configured to be used by the issuer to determine the proceeds, par, maturity, etc. that the issuer is obligated to pay for the insured and insuring bonds.

FIGS. 31A to 31F show examples of a method, data model, and interfaces for providing calculations of coupons, proceeds, and yields paid by an issuer for insuring bonds. FIG. 31A shows an a model and interface for computing the adjusted structured insuring bonds to maintain a level pricing to the issuer. The computation provides an adjusted coupon that takes into account the incremental yield provided to the insuring bond to keep the proceeds or price of the bond level, thereby to provide a level debt service. The higher yield is paid to compensate the holders of the insuring bonds for the extra risk of coupons form the insuring bonds will be intercepted. The extra coupon is structured as a debt service obligation and not a fee to make the payment more secure for the holder of the insuring bonds and the trust certificates. As shown, for each payment date (on a semi-annual basis) for the insuring bonds, the interface provides the priced to call or maturity selection (column CS), the original yields to maturity (CT), the original yields to call (CU), the insuring bond price (CV), the adjusted yields to worst (CW), estimated adjusted price to worst (CX), initial versus adjusted price to worst (CY), the estimated adjusted maturity coupon (CZ), incremental maturity coupon (DA), adjusted yields to best (DB), adjusted price to worst (DC), and the adjusted bond proceeds (DD). As can be seen, the bond pricing remains level on a semi-annual basis. Taking into account the adjusted yields, an incremental coupon is computed using various methodologies including search, estimation, iterative computation, or the like. In one embodiment, the coupon is computed using the Excel function GOALSEEK. The adjusted bond proceeds can be computed based on the adjusted coupon. The information provided by FIG. 31A can be displayed in FIG. 30C, including providing the level debt service for the insuring bond. Additionally, the adjusted bond proceeds of FIG. 31A can be provided to the interface of FIG. 30C for example in the Final bond proceeds column.

FIG. 31B shows an example of a method, data model, and interfaces for providing another computation of adjusted structured debt service reflecting issuer level pricing. The information of FIG. 31B include parameters such as total structured bond par, bond proceeds, up front and insured premiums, underwriter's discount, cost of issuance, net proceeds, bond yields ad proceeds for base yields and all-in yields, and various other information. Shown for each payment date for the adjusted insuring debt service, are insuring bond par (column DE), interest coupons (DF), maturity interest (DG), adjust semi-annual debt service (DH), annual insuring debt service (DI), present values of debt service for different types of yields (DJ–DK, DN–DO), total semi-annual structured debt service (DL), and an annual structured debt service (DM—the sum of most recent two semi-annual structure debt service). Similar to FIG. 31A, for the adjusted insuring debt service, the interest coupons is computed based on an iterative computation that is based on keeping the pricing for the bond level, while increasing the yield.

FIG. 31C shows an example of a method, data model, and interfaces for providing another computation of adjusted structured debt service for higher level loss positions reflecting issuer level pricing. Similar to the computations above, the coupon is adjusted to take into account a higher yield while keeping the price level. Shown for each payment date, are original yields to maturity (column DQ), original yields to call (DR), original insuring bond price (DS), adjusted yields to worst (DT), estimated adjusted prices to worst (DU—which is maintained level), initial versus estimated adjusted price to worst (DV), estimated adjusted maturity coupon (DW—which is computed based on the level pricing and extra yield), additional maturity coupon (DX), adjusted yield to best (DY), adjusted prices to worst (DZ), and adjusted bond proceeds (EA).

FIG. 31D shows an example of a method, data model, and interfaces for providing an analysis of the economics of insuring bond subclasses taking into account level debt service. An increment to the uninsured yield available to the insuring bond is provided. The higher loss position subclass economics is also provided, including marketing penalty due to the structure of the higher loss position bonds (e.g., trust certificate marketing), certain portions, credit spreads, total yields, adjustments to yields, and increment to coupon (as described in FIG. 31C). The lower loss position subclass economics can be determined from the above information and other information, including the incremental yield (above uninsured yield and the portion of the marketing penalty on the higher loss position insuring tranches), bond proceeds retained for annual program revenues, liquidity fees, and return on equity. The sum of the incremental yield and bond proceed retained, etc., is equal to the yields available for lowest position bonds, above the uninsured bond yield and the portion of the marketing penalty and net program revenues, fees, etc. This number in basis points can be converted to the yields in basis points on the lower loss position bonds.

FIG. 31E shows an example of a method, data model, and interfaces for computing yields, coupons, and level debt service for a plurality of loss positions. The interface provides for each payment date, the adjusted coupons on the insuring coupon (column ED—as computed by the interfaces of the FIGS. 31A to 31B. above), the coupons adjusted only for the highest loss position's marketing penalty (EE), fees (EF), net additional coupons on the insuring bonds (EG), the equivalent additional coupons on the lower loss positions (EH—as computed in FIG. 31C), additional lower loss position supplemental coupon after any coupon limit (EI), the total coupon on the lowest subclass (EJ), the yield to maturity of the lowest subclass (EK), the additional lower loss position subclass yield to maturity (EL), yield to call on the lowest subclass (EM), additional lower loss position subclass yield to call (EN), and the additional lower loss position subclass yield to worst (EO). As shown, the predicted average and weighted averages of various columns are also shown.

FIG. 31F shows an example of a method, data model, and interfaces for computing a verification, data, and computation check of the calculations of FIGS. 31A to 31E. As shown, for each payment date, the interface provides the par of the highest loss position insuring bonds (column EP), interest to maturity on the highest loss position insuring bonds (EQ), debt service on higher loss position insuring bonds (ER), par of lower loss position insuring bonds (ES), interest to maturity on the lower loss position insuring bonds (ET), debt service on the lower loss position insuring bonds (EU), total par of the insuring bonds (EV), the total debt service on the various insuring bonds subclasses (EW—sum of the previous mentioned debt services), surplus interest due to coupon limit on lower loss position bonds or no loss position bonds (EX), bond proceeds for annual program revenue, fees, and return on equity (EY), total debt service on the insuring bonds before subdivision into various subclasses (EZ), and the surplus debt service on insuring bonds from truncating the highest loss position subclass yields (FA). The verification check should show that the sum of column EW (total DS of various insuring subclasses) and EX (various surpluses) and EY (bond proceeds for fees) should be near or equal to EZ (total debt service of insuring bonds) plus FA (a miscellaneous surplus DS of insuring bonds due to truncating of various values).

FIG. 31G to 31H show an example of a method, data model, and interfaces for computing a summary of the bond yields and the yield related calculations as computed from the above FIGS. Shown are, for a base yield and an all-in yield, bond yields on insuring bonds, various parameters and calculations for bond yields paid by the issuer, various parameters and calculations for bond yields on insuring bonds as further adjusted within the structure, with various parameters and calculations for comparisons to the monoline alternatives. The comparison of the insured and insuring bonds to the monoline insured system includes data for costs, yield comparisons to uninsured bonds, upfront premiums, or the like. A comparison between the monoline and the aggregate structure of the insured and insuring bonds are also provided, including aggregate benefits versus uninsured, incremental costs, and the like.

FIG. 31I shows an example of a method, data model, and interfaces for computing a summary of the components of adjusted insuring debt service. The summary information includes the total program revenues (e.g., to the Trust of Company). Shown for each payment date are additional debt service on insuring bonds (column FX), marketing penalty on the highest loss insuring maturities (FY–FZ), additional yields on the lower loss position maturities (FZ), additional yield on lower loss position bonds (GA-GB), liquidity and equity expenses (GC), annual program revenues (GD), surplus interest from coupon limits or truncating (GE) and the total amount paid to the insuring bond holders and the program (GF). Also, certain surplus interest due to coupon limits are also shown.

FIGS. 32A to 32F show examples of a method, data model, and interfaces for providing calculations of coupons, proceeds, and yields payable to holders of loss position subclasses. FIGS. 32A to 32B show examples of a method, data model, and interfaces for managing the detailed structure level cash flows for the $4^{th}$ loss position. Referring to FIG. 32A, to maintain the adjusted insuring bond price level while providing an extra yield for the $4^{th}$ loss position, the coupon to be paid to the holder of a certificate for the $4^{th}$ loss position is computed, using for example, GOALSEEK. That is an additional coupon is added representing the risk that the holder takes that the coupons will be intercepted. Shown for each payment date, are subclass principal (column D), adjusted coupon on insuring coupon (E), base insuring bond coupon (F), based insuring bond yield (G), yields for AA insuring subclass structured enhance (H), AA insuring subclass spread to base yield, which is the additional yield for this class for taking the extra risk (I), credit spread which can be empty (J), credit spread which can be the same as from column I, a marketing penalty (L), marketing penalty (M), net penalty (N), total yield (O), and amounts net yield that are available (P).

FIG. 32B continues the calculations and interface. Shown for each payment date are total net yield from bond (Q=G+O), original insuring bond price (R), adjusted insuring bond price (S), interest coupon surplus or shortfall % (T) estimated adjusted versus target price to worst (U), the estimated adjusted maturity coupon which is computed, for example, using GOALSEEK based on the proceeds/pricing being level and the adjusted yield (V), final insuring bond coupon (W which can be the same as V), original bond proceeds (X), adjusted bond proceeds (Y which is kept level with X), and any interest coupon surplus or shortfall (Z). FIG. 32A to 32B are examples for the $4^{th}$ loss class, but other loss classes' information, e.g., for the higher loss classes, can be computed and displayed in a similar manner.

Because these loss positions' credit rating are not associated standard market yield information, to maintain the debt service constant, and to provide a coupon that is at a predetermined increment above the previous loss position levels, the incremental yield is computed, using any financial projection algorithm, including the YIELD function of Excel, as shown in FIG. 32C to 32E. FIGS. 32C to 32E show examples of a method, data model, and interfaces for calculating of reallocated interest available for lower loss position classes. A summary is provided which includes interest reallocated from the higher loss position bonds to the lower loss position bonds, the impact of the higher loss position bonds credit and marketing penalty, interest reallocated to the higher loss position bonds, and total higher loss position debt service. Shown for each payment date are par of higher loss position insuring bonds (CV), original higher loss position maturity interest (CW), original higher loss position debt service (CX), higher loss position interest rate including reallocated interest from structured insured bonds (CY), higher loss position maturity interest reallocated from the structured insured bonds (CZ), higher loss position debt service including reallocated interest (DA), reallocated interest on higher loss position bonds from structured insured bonds (DB), reallocated interest on higher loss position bonds from structured insured bonds as a percent of par (DC).

The calculations continue on interface of FIG. 32D. For various subclasses, a summary is provided including adjusted proceeds, any bond insurance premiums, COIs, base takedowns, and net bond proceeds. Shown for each payment date, are the fourth loss subclass interest rate calculated from FIG. 32B (column DD), the fourth loss subclass maturity interest (DE), the fourth loss subclass debt service which is maintained level for FIG. 32B (DF), third loss subclass interest rate (DG), third loss subclass maturity interest (DH), third loss subclass debt service (DI), second loss subclass interest rate (DJ), second loss subclass maturity interest (DK), second loss subclass debt service (DL), higher loss insuring bonds debt service adjusted for credit spread and marketing penalty (DM), net impact of credit spread and marketing penalty on higher loss position bonds (DN), and reallocated interest from higher loss position bonds available for the lower loss position bonds and program expenses (DO). Thus, the amount of DO can be used to pay the coupons for the lower loss positions holders.

The calculations continue on interface of FIG. 32E. A summary is provided for the original and adjusted higher loss position proceeds (which should be the same or substantially the same). Shown for each payment period, are the lower loss position insuring bonds par (column DP), the reallocated interest on the lower loss position insuring bonds from the structured insured bonds in percents (DQ), the reallocated interest on the lower loss position insuring bonds from the structured insured bonds in dollars (DR), the semi-annual interest reallocated to the lower loss position bonds from the structured insured bonds in dollars (DS), the program revenues as a percentage (DT), program revenues as dollar amounts (DU and DV), total interest reallocated to the lower loss position insuring bonds in dollars (DW), lower loss position reallocated interest on the lower loss position insuring bonds in basis points on the lower loss position par (DX), reallocated interest on the lower loss position insuring bonds to maturity in dollars (DY), additional coupons on the lower loss position bonds to maturity in percent (DZ), interest coupon on lower loss position insuring bond to maturity (EA), and the bond yield on the lower loss position insuring bonds to maturity which is calculated based on EA and maintaining the pricing level using, for example the YIELD function (EB).

The calculations continue on interface of FIG. 32F. FIG. 32F shows an of a method, data model, and interfaces for summarizing the allocation of the lower loss position reallocated interest to the senior and junior lower loss positions. A summary of calculated information is shown, including senior lower loss position bond proceeds, junior lower loss position bond proceeds, total lower loss position bond proceeds. Each proceeds information may include additional takedowns, base takedowns, cost of issue, and net proceeds. Shown for each payment date, are senior lower loss position insuring bond par (column EC), reallocation interest on senior lower loss position to maturity in dollars (ED), additional coupon on senior lower loss position insuring bond to maturity which is a portion of he reallocated interest from the higher loss position calculated above (EE), interest coupon on senior lower loss position insuring bonds to maturity (EF which includes EE), bond yield on senior lower loss position insuring bond to maturity which is computed using the YIELD function based on the adjusted coupon and the level pricing of the senior lower loss position (EG), interest reallocated to senior lower loss position bonds in dollars and basis points (EH and EI). Corresponding information for the junior lower loss position bonds are also calculated and provided. Shown for each payment date, are junior lower loss position insuring bond par (column EJ), reallocation interest on junior lower loss position to maturity in dollars (EK), additional coupon on junior lower loss position insuring bond to maturity which is a portion of he reallocated interest from the higher loss position calculated above (EL), interest coupon on junior lower loss position insuring bonds to maturity (EM which includes EL), bond yield on junior lower loss position insuring bond to maturity which is computed using the YIELD function based on the adjusted coupon and the level pricing of the junior lower loss position (EN), interest reallocated to junior lower loss position bonds in dollars and basis points(EO and EP). Also provided is the surplus interest from the coupon limit (EQ).

FIGS. 33A to 33E shows an example of a method, data model, and interfaces for providing calculations of debt service coverage based on debt insurance. As shown, a bottom up computations is provided of coverage for a semi-annual basis, but other time-based analysis can be provided without departing form the scope of the invention. The amount of debt that is repaid alternates semi-annually because of the need to pay principal back in part of the year.

FIG. 33A shows credit enhancement provided to the Insured Bonds by the junior lower loss position bonds to provide at credit enhancement to the Insured Bond and the Insuring Bonds at the next higher loss position level to be a BB credit rating. A summary of the calculation shows the average annual worst case assumed defaults for the type of Insured Bond (e.g., A rated City and County GO), an average annual weighted default tolerance based on the debt service coverage shown, the coverage of the target default tolerance (weighted average divided by worst case assumed defaults), the minimum for BB coverage as a percent of the total bond amount, and the margin of the actual debt service coverage provided by the BECM method over the a required coverage (coverage of target default tolerance minus minimum BB coverage). The margin shows that the debt service covers over an assumed default at a higher rate. Also shown are effects due to downgrade of the Insured Bonds' credit rating one or two levels below the current level. The margin decreases with the downgrade of the credit rating.

As shown in FIG. 33A, column IQ provides the semi-annual amount of the Senior Insuring Bond debt service. IR shows the Junior Insuring Bond debt service (e.g., that can be intercepted). IS shows other available moneys that can be used to pay the Insured Bond debt service. IT shows the covered debt service that is provided for the. Insured Bond. IU shows the total amount of available insured debt service (e.g., IR+IS+IT). IV shows the coverage of insured debt service (e.g., IU/IT). Column IW shows the semi-annual default tolerance (e.g., (IV−1)/IV). IX shows the two semi-annual default tolerance averaged together for the year. IY shows the 4-year default tolerance which is the running count from IX of the last 4 years. IZ shows the required default tolerance for a AAA rating. JA shows the excess of coverage from IX or IY over that required to enhance a bond to be BB. JB shows the percentage of Insuring Bonds that are used as the intercepted debt service shown in IQ and/or IR.

FIG. 33B shows one level of enhancement above those shown in FIG. 33A. The debt service of FIG. 33A can be intercepted and used to enhance Insured Bonds and the Insuring Bonds at the next level to a BBB credit rating. The summary is substantially the same as FIG. 33A, except the average values are computed for the scenario shown, and the minimum BBB coverage requirement is to compute the margin of actual over required coverage of assumed defaults.

As shown in FIG. 33B, column IF includes the subclass debt service provided by the debt service of FIG. 33A (e.g., from column IQ+IR of FIG. 33A). This subclass debt service can be intercepted as described herein. All other values of IG–IO are similar to the calculation shown in FIG. 33A. As shown, the 4-year default tolerance provided is much higher than that required by the minimum BBB coverage requirement.

FIG. 33C shows one level of enhancement above those shown in FIG. 33B including intercepting the debt service from FIG. 33B, and enhancing the next highest level and the Insured Bond to be an A credit rating. The calculations are substantially similar to those described above.

FIG. 33D shows one level of enhancement above those shown in FIG. 33C including intercepting the debt service from FIG. 33C, and enhancing the next highest level and the Insured Bond to be an AA credit rating. The calculations are substantially similar to those described above.

FIG. 33E shows one level of enhancement above those shown in FIG. 33D including intercepting the debt service from FIG. 33D, and enhancing the Insured Bond to be an AAA credit rating. The calculations are substantially similar to those described above.

FIG. 33F shows an example of a method, data model, and interface for providing a summary of a debt service coverage based on debt insurance. As shown, a top down computations is provided of coverage for a semi-annual basis, but other time-based analysis can be provided without departing form the scope of the invention. In this example, the debt service coverage results in a credit enhancement of an A-rated City and County GO bond to an AAA rated. A summary of the calculation shows the average annual worst case assumed defaults for this type of bond, an average annual weighted default tolerance based on the debt service coverage, the coverage of the target default tolerance (weighted average divided by worst case assumed defaults), the minimum for AAA coverage as a percent of the total bond amount, and the margin of the actual debt service coverage provided by the BECM method over the a required coverage (coverage of target default tolerance minus minimum AAA coverage). The margin shows that the debt service covers several orders of magnitude above what is needed to enhance the credit of the bond to AAA. For example, this margin can enhance this bond to a "True AAA."

Column GI shows the amount available for the Adjusted Debt Service plus other available less certain fees. The amount for column GI shows the cash streams from the underlying Insuring Bonds and other capital (e.g., regulatory capital). Column GJ shows the amount of structured insure debt service that is needed to be paid to the Insured Bond holders. Column GK shows the coverage the amounts from Column GI divided by the amount from Column GJ. Column GL shows the semi-annual default tolerance (e.g., (GK−1)/GK). The average for the year of any two numbers in the year is shown in GM. The 4 year default tolerance of GN is a running average of the GM in the last 4 years. Column GO shows the worst case assumed annual defaults. As shown, the amount from GM is much higher than the worst case scenario of GO, thus increasing the credit rating of the covered bond.

Further aspects and embodiments of the invention described herein relates to a computer-implemented system for minimizing risk as to a default on payments associated with an investment. The system can include a company computer implemented component. The component can be configured for establishing by an insurer a capital structure within a computer memory of a computer system, the capital structure designed to minimize risk and structured with regulatory capital and a cash stream that is pledged to fund the default; determining whether the established capital structure is sufficient to obtain a minimal target credit rating for the insurer; and electronically receiving the target rating based on a determination that the capital structure is adequate to cover a depression scenario period.

In one embodiment, the target credit rating is AAA, wherein the investment comprises an Insured Bond issued by an issuer, and the cash stream is produced from an Insuring Bond issued by the issuer.

In yet another embodiment, the investment can include a previously issued bond issued by an issuer, and the cash stream is produced by an investment unrelated to the issuer and is used as re-insurance or the previously issued bond.

Establishing the capital structure can include allocating the regulatory capital in the computer memory to an amount equal to a coverage factor multiplied by an average annual depression scenario default percentage for the investment; selecting by the computer system an investment criteria to invest the regulatory capital to create an investment return; determining by the computer system a portion of the capital structure for a pledged insuring investment that produces at least a portion of the cash stream; and securing a draw on sources of the regulatory capital based on the portion of the cash stream.

In one embodiment, determining the credit rating can include including a capital pre-funding in the capital structure; determining by the computer system an amount of capital pre-funding by the insurer that is sufficient to cover a default and that is calculated by (a) at least a pre-funding coverage factor multiplied by (b) a downgrade function that is applied to an average annual depression scenario default percentage for the investment based on the credit rating of the investment; examining by the computer system, a capital adequacy of the insurer's capital structure to cover a default based on a default scenario that occurs during or at an end of a depression scenario period; and determining the credit rating for the insurer based on the determined capital pre-funding and the examined capital adequacy.

The invention also relates to a processor readable medium for minimizing risk as to a default on payments associated with an investment, comprising processor readable instructions that when executed by a processor causes the processor to perform actions. The actions can include establishing by an insurer a capital structure within a computer memory of a computer system, the capital structure designed to minimize risk and structured with regulatory capital and a cash stream that is pledged to fund the default; determining whether the established capital structure is sufficient to obtain a minimal target credit rating for the insurer; and electronically receiving the target rating based on a determination that the capital structure is adequate to cover a depression scenario period.

The invention also relates to a computer-implemented method, system, apparatus, and media for insuring a default of debts specified in financial instruments. The method may include the steps of establishing, by a computer processor, an insuring debt related to an insured debt of a debtor based on an insured debt amount representing at least a proportion of the insured debt; allocating, in a computer memory associated with an insuring trust, a first loss class and a second loss class; and routing, over a computer network, a payment payable from the insuring debt to a first class holder in the first class, wherein the first class holder is entitled to the payment based on a debt to the first class holder of an insuring fund of the insuring trust, and wherein the insuring fund is for insuring an obligation to make payments for the insured debt.

The method may further include intercepting at least a portion of the payment, when the debtor defaults on the obligation to make payments for the insured debt; allocating at least a portion of the payment to the first class holder less an unrelated payment to cure an unrelated default of an unrelated insured debt associated with the second class, when the first class is junior to the second class in a rating scale; and intercepting an unrelated payment from an unrelated insuring debt associated with the second class, when the second class is junior to the first class in the rating scale, and when the debtor defaults on the obligation to make payments for the insured debt.

The method may further include intercepting providing an insuring payment from the insuring trust to a holder of the insured debt, when the debtor defaults on the obligation to make payments for the insured debt, wherein the insuring payment is deducted from a related fund in the insuring trust related to the insured debt before the insuring payment is deducted from an unrelated fund in the insuring trust that is unrelated to the insured debt.

In one embodiment, allocating includes providing a credit rating for trust issued debts associated with the first class or second class based on a subordination of the first class to the second class; and issuing electronic certificates to the first and second classes based on the credit rating of the classes, wherein holders of the electronic certificates are entitled to satisfaction from the insuring trust for trust held debt.

In one embodiment, the insured debt and the insured debt are bonds issued by a municipality, wherein the payments are credit enhancement coupons. This establishing can include determining that a credit rating for the insured debt is BBB or better; determining an insuring debt amount of the insuring debt based on an annual depression-scenario assumed defaults percentage for the debtor times a multiple of at least 2; and maintained constant, for any payment from the insured or insuring debts, a proportion of the insured debt amount to the insuring debt amount; pre-funding the insuring fund with cash equity in an amount of the annual depression-scenario assumed defaults percentage for the debtor times another multiple of at least 1. The multiples can be selected as desired for optimum safety in the investment.

The method may further include sending a credit information record of the insured debt based on an insurance payment configuration for the insured debt that is structured in the computer memory; and receiving an increase in a credit rating for the insured debt based on the sent credit information record.

Another embodiment of the invention is a device for debt management. The device can include a computer memory configured to manage financial data; and a computer processor configured to perform actions. The actions can include establishing an insuring debt for a debtor related to an insured debt of a debtor based on proportion of an insured debt amount of the insured debt to the insuring debt amount of the insuring debt, wherein the proportion is maintained constant for any redemption from the insured or insuring debts; allocating an insuring trust, a first loss class and a second loss class; and routing a first payment payable from the insuring debt to a holder in the first class, wherein the holder is entitled to the first payment based on a debt to the holder of an insuring fund of the insuring trust, and wherein the insuring fund is for insuring an obligation to make payments for the insured debt.

The actions of the processor can further include intercepting a first payment of the payments when the debtor defaults on the obligation to make payments for the insured debt; allocating a second payment of the payments to cure an unrelated default of an unrelated debt associated with the second class, when the first class is junior to the second class in a rating scale; allocating an unrelated payment from an unrelated insuring debt associated with the second class, when the second class is junior to the first class in the rating scale, and when the debtor defaults on the obligation to make payments for the insured debt; debiting a remaining payment from a cash capital when other payments are insufficient to cover the defaults on the obligation to make payments for the insured debt; and providing an insuring payment from the insuring trust to holders of the insured debt, when the debtor defaults on the obligation to make payments for the insured debt, wherein the insuring payment comprises at least one or a combination of the first payment, the unrelated payment, or the remaining payment.

The actions of the processor can further include receiving, before the issuance of the insured debt, loss class payments in exchange for ownership in the loss classes, wherein the loss class payments is for pre-funding a portion of the insuring fund; sending a credit information record of the insured debt based on an insurance payment configuration for the insured debt that is stored in the computer memory; receiving the increase in the credit rating for the insured debt based on the sent credit information record; routing the increase to the debtor, thereby enabling the debtor to decrease an interest payment payable by the debtor for the insured debt; and receiving a portion of savings from a decreased interest payment from the debtor.

In one embodiment, the insured debt and the insuring debts are bonds, wherein the payments payable from the insuring debt are credit enhancement coupons. The actions can further include structuring, in a field in the computer memory associated with the insuring fund related to the Insured Bond, an upfront payment amount from the debtor, wherein the upfront payment is a portion of a full amount due for insuring the Insured Bond; structuring, in the field, a remaining portion of the full amount less the upfront payment, wherein the remaining portion is funded by the debt of the insuring fund; structuring, in a field of the computer memory associated with a payment fund, at each of a plurality of time intervals, a plurality of credit enhancement coupons payable from the Insuring Bond, wherein the fund is for paying the debt of the insuring fund, and wherein a sum of the credit enhancement coupons over the time intervals covers the remaining portion; and providing an insuring payment to holders of the Insured Bonds, when the computer memory indicates required payments to cure the default, wherein the insuring payment is deducted from the insuring fund that is related to the Insured Bond before the insuring payment is deducted from an unrelated fund that is unrelated to the Insured Bond.

In one embodiment, the upfront payment is insufficient to cure the default, the insuring payment is deducted from a portion of the insuring fund associated with at least one of the credit enhancement coupons, and wherein an outgoing payment from the payment fund is prohibited when a default to pay at least a portion of the insured debt amount occurs.

Another embodiment of the invention is a system for managing debt insurance over a computer network. The system can include a computer-implemented issuer component for establishing an insuring debt related to an insured debt of a debtor based on an insured debt amount representing at least a proportion of the insured debt, wherein the proportion is maintained constant for any redemption from the insured or insuring debts.

The system can include a computer-implemented insuring trust component for allocating, in an insuring trust, a first loss class having a first loss class holder and a second loss class having a second loss class holder; routing, over the computer network, a payment payable from the insuring debt to a first class holder in the first class, wherein the first class holder is entitled to the payment based on a debt to the first class holder of an insuring fund of the insuring trust, and wherein the insuring fund is for insuring an obligation to make payments for the insured debt.

In one embodiment, routing to the first loss class holder the related payment further includes allocating the related payment. In one embodiment, (a) a portion of a defaulted insured debt service for a default of an obligation on the insured debt is deducted from the related payment; and (b) a portion of the defaulted insured debt service for the default of the obligation is deducted from the related payment, if another debtor defaults on an unrelated obligation and the first loss class is junior to the second loss class; and (c) a portion of the related payment is added to an unrelated payment, if a portion of a prior unrelated payment from an unrelated insuring debt was used to fund the defaulted insured debt service for the insured debt.

In one embodiment, the computer-implemented insuring trust component is further configured for routing to the second loss,class holder the unrelated payment for an unrelated insuring debt, by allocating the unrelated payment. In one embodiment, (a) a portion of the defaulted insured debt service for a default of the unrelated obligation is deducted from the unrelated payment; (b) a portion of the defaulted insured debt service for the default of the unrelated obligation is deducted from the related payment, if the debtor defaults on the obligation and the second loss class is junior to the first loss class; and (c) a portion of the unrelated payment is added to the related payment, if a portion of a prior related payment from the insuring debt was used to fund the defaulted insured debt service for the unrelated insured debt.

In one embodiment, the computer-implemented trust component is configured to provide the first loss class holder with an first electronic certificate in the insuring trust related to the insured debt, and to provide the second loss class holder with a second electronic certificate in the insuring trust unrelated to the insured debt, and wherein the insured and insuring debts are bonds.

The system may also include a computer-implemented trustee component configured for receiving, over the network, non-default principal and interest payments for the insured debt and the insuring debt from the issuer component; and routing pro-rata amounts of the non-default payments between holders of the insured debt and the insuring trust that holds the insuring debt.

The system may also include a computer-implemented guarantor component configured for receiving, over the network, an insuring trust payment in an amount of the defaulted insured debt service; routing to the trustee component, based on the received insuring trust payment, a default amount sufficient to satisfy the obligation on the insured debt; receiving an upfront payment from the issuer component for guarantying the insured debt; pre-funding at least a portion of the insuring trust with funds from the first loss class holder that are received in exchange for a first electronic certificate for the first loss class; receiving a contractual record indicating a right to receive a portion of the principal and interest in the insuring debt's cash flow, if the default occurs; sending, to the insuring trust component, a portion of the upfront payment, wherein the portion of the upfront payment is configured to be paid by the insuring trust component into the defaulted insured debt service if the default occurs; and receiving a portion of interests in at least one of a plurality of debts managed by the insuring trust component.

In one embodiment, the system can include a computer-implemented credit agency component configured for receiving, over the network, a credit information record of the insured debt based on insurance payment structuring for the insured debt; and providing an increase in a credit rating for the insured debt based on the received credit information record.

Another embodiment of the invention is processor readable medium comprising instructions that are executable by a computer processor to cause the processor to perform actions. The actions can include establishing an insuring debt related to an insured debt of a debtor based on an insured debt amount representing at least a proportion of the insured debt; allocating, in a computer memory associated with an insuring trust, a first loss class and a second loss class; and routing, over a computer network, a payment payable from the insuring debt to a first class holder in the first class, wherein the first class holder is entitled to the payment based on a debt to the first class holder of an insuring fund of the insuring trust, and wherein the insuring fund is for insuring an obligation to make payments for the insured debt.

In one embodiment, the actions further includes increasing a credit rating for the insured debt based on a credit formula with inputs that are independent of a profitability of the insuring trust, wherein the inputs comprises an amount of insurance available for insuring the obligation that includes an amount in the insuring funds for insuring the obligation.

It is to be understood that the invention is not to be limited to the exact configuration as illustrated and described herein. Accordingly, all expedient modifications readily attainable by one of ordinary skill in the art from the disclosure set forth herein, or by routine experimentation there from, are deemed to be within the spirit and scope of the invention as defined by the appended claims.

For the sake of brevity, it should be understood that certain structures and functionality, or aspects thereof, of embodiments of the present invention that are evident from the illustrations of the Figures have not been necessarily restated herein.

A computer or processor readable medium such as a floppy disk, CD-ROM, DVD, etc. may be use to store the processes, techniques, software, and information illustratively described herein. The media may store instructions, which when executed by a computer processor causes the processor to perform the processes described herein. The media can also be stored on devices, such as a server device, within a database, within main memory, within secondary storage, or the like.

Further still, the memory of the system may comprise a magnetic hard drive, a magnetic floppy disk, a compact disk, a ROM, a RAM, and/or any other appropriate memory. Further still, the computer of the system may comprise a stand-alone PC-type micro-computer as depicted or the computer may comprise one of a mainframe computer or a mini-computer, for example. Further still, another computer can access the software program being processed by the CPU by utilizing a local area network, a wide area network, or the Internet, for example.

ATTACHMENT A

ATTACHMENT A shows one example of a definition for implementing the BECM system. ATTACHMENT A is disclosed as a non-limiting example of the definitions, rules, algorithms, and parameters for implementing the BECM system. The components of the BECM system can be programmed by one skilled in the art to perform the operations as defined below. Other embodiments or variations of ATTACHMENT A can be implemented without departing from the scope of the invention.

Key Provisions of Trust Agreement

Article I: Definitions

"Administrator" means, with respect to the Regulated Guarantor, The BondModel Company LLC, a Delaware limited liability company (and its successors and assigns) or a successor firm selected by the Regulated Guarantor.

"Aggregate Loss Subclass Percentage" means, for each Loss Position Subclass and with respect to each Supported Bond Issue or Supported Transaction, the Average Annual Assumed Default multiplied by the Loss Subclass Minimum Coverage multiplied by the Loss Subclass Discount Percentage multiplied by the Loss Subclass Coverage Factor. This represents the sum of the Loss Subclass Percentage Requirements for each Loss Position Subclass and all of the lower Loss Position Subclasses. For example, initially, for an A rated city or county general obligation bond issue, the Aggregate Loss Subclass Percentage for the 4th Loss Position Subclass equals 1.75% multiplied by 1.00 multiplied by 100% multiplied by 1.6, or 2.80%. Correspondingly, the Aggregate Loss Subclass Percentage for the $3^{rd}$ Loss Position Subclass equals 1.75% multiplied by 0.80 multiplied by 25% multiplied by 1.6, or 0.56%. A more detailed illustration of the calculation of Aggregate Loss Subclass Percentage is included in Exhibit I. For each Supported Bond Issue or Supported Transaction, the Aggregate Loss Subclass Percentage shall be deemed to be met for any Loss Position Subclass for which either:

A. The par amount or proceeds for each maturity of such subclass and the lower subclasses at least equals the calculated percentage of the par amount or proceeds, as the case may be, of the Supported Bonds and Trust Bonds of such maturity or B. The Average Annual Debt Service on the Trust Bonds of such subclass and the lower subclasses at least equals the calculated percentage of Average Annual Debt Service for such periods on the total Supported Bonds and Trust Bonds of such Supported Bond Issue or Supported Transaction.

For a particular Supported Bond Issue or Supported Transaction, it is not required that the Trust Bonds in each Loss Position Subclass meet the Aggregate Loss Subclass Percentage so long as the requirements of Section 201 D relating to Minimum Trust Debt Service are met for each Loss Position Subclass.

"Aggregate Trust Bond Requirement" means the Aggregate Loss Subclass Percentage for the highest Loss Position Subclass.

"Agreement" means this Trust Agreement between the [Regulated Guarantor] and the Trustee dated as of the date hereof.

"Allocated Capital Multiple" means 1.0× or such higher multiple as may be established by the Regulated Guarantor, provided that, for any Supported Bond Issues or Supported Transactions for which the Cash Alternative Capital Requirement is applied, it shall mean 9.2× (i.e., 4 times 2.3). The higher multiple applicable for purposes of the Cash Alternative Capital Requirement shall be applicable solely to the calculation of the Capital Requirement and not for purposes of other calculations hereunder, such as calculation of the Liquidity Requirement. The Allocated Capital Multiple may be reduced by the Regulated Guarantor upon confirmation by each Rating Agency that such modification will not cause a reduction of the Rating of any outstanding Supported Obligations or Trust Certificates.

"Allocated Capital Requirement" means the Annual Weighted Average Capital Charge for the entire Supported Bond portfolio multiplied by the Allocated Capital Multiple multiplied by the Average Annual Debt Service for such Supported Bond portfolio (including Other Supported Obligations). In the event that the Cash Alternative Capital Requirement is used for any portion of the Supported Bond Portfolio, for purposes of determining the Capital Requirement, the Allocated Capital Requirement shall consist of two parts that are calculated separately based on the two distinct multiples. For the purpose of calculating the Capital Requirement relating to portion of the portfolio for which the Alternative Cash Capital Requirement is used, the Capital Requirement shall be calculated separately for each Supported Bond Issue or Supported Transaction using the Average Annual Debt Service of such bond issue or transaction.

"Annual Weighted Average Capital Charge" means 25% of the Weighted Average Capital Charge. Such percentage may be modified by the Regulated Guarantor upon confirmation by each Rating Agency that such modification will not cause a reduction in the Rating of any outstanding Supported Obligations or Trust Certificates.

"Appropriation Bond" means a bond the payment on which is subject to appropriation by the issuer thereof. A determination by the Chief Credit Officer that a particular bond issue or issuer credit does or does not represent an Appropriation Bond credit shall be dispositive for purposes of this Agreement unless and until revised by the Chief Credit Officer.

"Authorized Officer" means, with respect to the Regulated Guarantor or its Administrator, the Chief Executive Officer, Chief Operating Officer, Chief Financial Officer, or Chief Credit Officer or another officer designated by the Chief Executive Officer thereof. Where a particular officer is specified herein as authorized to perform certain actions, another officer may also be designated by the Chief Executive Officer.

"Average Annual Assumed Default" means the average annual assumed default over an assumed depression scenario for purposes of structuring the Support Trust. Until modified as described below, the Average Annual Assumed Default for any Supported Bond Issue shall be 25% of the Capital Charge for such bond issue. In using the Average Annual Assumed Default to size the Trust Bonds and Trust Certificates related to any Supported Bonds, such Capital Charge shall apply to the total amount of Supported Bonds and related Trust Bonds, rather than solely to the Supported Bonds. For example, for an A rated city or county general obligation bond issue (and assuming that both Supported Bonds and related Trust Bonds are part of the Supported Bond Issue), the Average Annual Assumed Default is 25% of 7% or 1.75%. As a result, and before application of other factors (such as Loss Subclass Minimum Coverage, Loss Subclass Discount Percentage, and Loss Subclass Coverage Factor), the Trust Bonds would represent 1.75% of the total par amount, proceeds, or debt service of Supported Bonds and Trust Bonds of each maturity. The Average Annual Assumed Default may be modified by the Regulated Guarantor upon confirmation by each Rating Agency that such modification will not result in a reduction of the Rating of any outstanding Supported Obligations or Trust Certificates.

"Average Annual Debt Service" means:

I. For purposes of determining the Weighted Average Capital Charge, with respect to the Supported Obligations of each Supported Bond Issue or Supported Transaction and any related Other Supported Obligations, (A) the total debt service on such Supported Obligations for the period from the date of issuance to the maturity of such bonds and obligations divided by (B) the period from such date of issuance to the final maturity of such Supported Bond Issue; and II. For all other purposes with respect to particular Obligations, including with respect to the entire portfolio of Supported Obligations, (a) the total debt service on such Obligations for the period from the date of the calculation to the latest final maturity of such Obligations divided by (b) such period.

The Average Annual Debt Service may be modified by the Regulated Guarantor upon confirmation by each Rating Agency that such modification will not result in a reduction of the Rating of any outstanding Supported Obligations or Trust Certificates.

"Bond Issue Rating" means for each Rating Agency and with respect to each Obligation, the rating of such Obligation without regard to any Support Requirement hereunder and without regard to any guarantee provided by another monoline insurer. For all purposes hereunder, Bond Issue Rating shall mean the rating category of an Obligation, without regard to pluses or minuses or numeric designations. For example, the Rating of an Obligation with an assigned rating of A3 or A1 by Moody's or of A– or A+ by Standard & Poor's or Fitch, shall be "A". For purposes of any provision of this Agreement that requires a single Bond Issue Rating (such as Capital Charge and Loss Subclass Discount Percentage), the Bond Issue Rating of a Supported Bond Issue shall mean the lowest Bond Issue Rating of such issue from any Rating Agency unless (a) the Chief Credit Officer shall specify that the Rating from another Rating Agency shall be used or (b) the Regulated Guarantor shall adopt distinct methodologies for the different Rating Agencies, which may occur only upon confirmation from each Rating Agency that the adoption of such distinct methodologies will not result in a reduction in the Rating on any outstanding Supported Obligations or Trust Certificates. Wherever Bond Issue Rating appears in this Agreement, the Regulated Guarantor, by action of its Chief Credit Officer, may substitute Underlying Rating, provided that each Rating Agency shall have determined that such change shall not result in a reduction of the rating of any outstanding Supported Obligations or Trust Certificates.

"Bond Year" means the period selected by the Regulated Guarantor for the calculation of annual aggregate debt service for the Supported Bonds. Unless otherwise determined by the Regulated Guarantor, the same period shall be used for the calculation of annual aggregate debt service on other Obligations. For the purposes of calculating annual aggregate debt service on Trust Certificates and Trust Bonds, the Regulated Guarantor may select a distinct period. The Regulated Guarantor may modify the period selected as the Bond Year for any Obligations upon confirmation by each Rating Agency that such modification will not result in a reduction of the Rating on any outstanding Supported Obligations or Trust Certificates.

"Borrowed Funds" means money obtained by the issuance of debt by the Regulated Guarantor or the Support Trust, which debt is secured in whole or in part by:

1. Investment earnings on such Borrowed Funds;
2. The obligation to apply such Borrowed Funds to repay the principal of such debt at the maturity thereof; and
3. The obligation of the Trustee pursuant to Section 301 hereof, in the event that any such Borrowed Funds and earnings are applied to fund a default with respect to Supported Obligations, to reimburse the amounts so applied with interest thereon.

"Capital" means funds being used to meet the Capital Requirement.

"Capital Charge" means for a Supported Bond Issue, the capital charge for such issue determined in accordance with S&P's 2009 Monoline Criteria. For example, the Capital Charge for an A– rated city or county general obligation bond issue is 7%. The Capital Charges for various credit types are set forth in Exhibit II. Such Capital Charges may be modified by the Regulated Guarantor upon confirmation by each Rating Agency that such modification will not cause the reduction of the Rating on any outstanding Supported Obligations or Trust Certificates.

"Capital Fund" means the fund established under this Agreement by the Trustee to hold the Capital and investments thereof.

"Capital Requirement" means the greater of the Rating Minimum Capital Requirement and the Allocated Capital Requirement.

"Cash Alternative Capital Requirement" means an alternative method permitted hereunder for funding required capital for specific Supported Bond Issues or Supported Transactions using cash only rather than Trust Bonds. This requirement represents the amount of cash capital required to withstand a full depression-scenario default and to still retain AAA ratings.

"Chief Credit Officer" means _____.

"Chief Legal Officer" means _____.

"Counsel" means Winston and Strawn LLP or such other firm selected by the Regulated Guarantor.

"Debt Service" or "debt service" means, for any period and with respect to any Obligation, the principal and interest (and, if applicable, any other payments that are the subject of a Support Requirement) coming due during such period. In determining debt service payable on Supported Bonds and any Other Supported Obligations, debt service shall mean the higher of (a) the ongoing debt service payable on such Supported Bonds and Other Supported Obligations and (b) the debt service that would be payable on such Supported Bonds and Other Supported Obligations upon the occurrence of any event which would have the effect of accelerating the issuer's amortization of such Obligations. The Regulated Guarantor or Financial Advisor may make such adjustments or refinements to the calculation of debt service or amounts payable with respect to Obligations (for example, refinements to deal with variable rate debt or capitalized interest and including annual fees or other ongoing payments as debt service) as it deems appropriate, provided that each Rating Agency has confirmed that such adjustments and refinements will not result in a reduction in the Rating on any outstanding Supported Obligations or Trust Certificates.

"Default Tolerance Requirements" means, with respect to each Rating Agency, all of the tests and requirements contained in the methodology established under Section 203 for such Rating Agency.

"Designation" means a designation by the Regulated Guarantor that certain Qualifying Bonds and Other Related Obligations, in accordance with the terms hereof, shall be beneficiaries of a Support Requirement hereunder. A Designation shall become effective, subject to issuance of an insurance policy by the Regulated Guarantor, at the time that the Regulated Guarantor:

1. Enters into a contractual agreement based on such Designation, regardless of whether such agreement is subject to conditions;
2. Submits a bid or proposal to enter into such a contractual agreement; or
3. Delivers a certificate modifying the amount of Supported Bonds or Trust Bonds of a Supported Bond Issue in accordance with Section 201.

Upon such a Designation and the issuance of the related insurance policy, the Qualifying Bonds shall become Supported Bonds and the Other Related Obligations shall become Other Supported Obligations. With respect to a Supported Bond or Other Supported Obligation, "designated" means that such Obligation is the subject of a Designation.

"Financial Advisor" means ButcherMark Financial Advisors LLC or such other qualified firm selected by the Regulated Guarantor.

"Fitch" means Fitch Ratings, Ltd.

"Insurance Law" means the New York Insurance Law, as the same may be modified from time to time.

"Liquidity" means:
1. Funds held under this Agreement, including Borrowed Funds, being used to meet the Liquidity Requirement; and
2. Amounts available under a Liquidity Facility pursuant to which the Trustee or the Regulated Guarantor has the right to draw funds needed to provide liquidity, provided that each Rating Agency confirms that the use thereof will not cause a reduction in the Rating of any outstanding Supported Obligations or Trust Certificates.
3. The portion of Capital required due to the use of the higher Allocated Capital Multiple applicable for purposes of the Cash Alternative Capital Requirement.
4. Regulatory capital held by the Regulated Guarantor and premiums held by the Regulated Guarantor, provided in each case that investments of such amounts would be permitted investments of Liquidity under this Agreement.

The initial term of any debt issued to provide such Borrowed Funds shall not be less than _____ years and remaining term of such debt shall not be less than _____ months unless each Rating Agency for the Supported Obligations has confirmed that the shorter term will not cause a reduction in the Rating of any outstanding Supported Obligations or Trust Certificates. Such limitation as to term shall not apply to the repayment obligation with respect to a Liquidity Facility.

"Liquidity Facility" means a letter of credit, line of credit or other similar agreement upon which the Trustee may draw to fund a defaulted payment on Supported Obligations.

"Liquidity Fund" means the fund established under this Agreement by the Trustee to hold the Liquidity and investments thereof.

"Liquidity Multiple" means 2.0×. The Liquidity Multiple may be modified by the Regulated Guarantor upon 30 days notice to each Rating Agency, provided that it shall not be less than the Rating Liquidity Multiple.

"Liquidity Requirement" means the Liquidity Multiple multiplied by the Allocated Capital Requirement (calculated without regard to the Cash Alternative Capital Requirement). The Liquidity Requirement is a measure of liquid resources required to be available either within the Trust, or directly to the Regulated Guarantor, solely for the purpose of making payments required to cure a payment default on a Supported Obligation.

"Loss Category Subclasses" means subclasses of bonds established by the Regulated Guarantor within a Loss Position Subclass for the purpose of allocating losses within the subclass first to those Trust Certificates whose related bonds have characteristics (such as credit type) that, in the judgment of the Chief Credit Officer, are similar to the other bonds within such subclass, thereby reducing the possibility that such losses will be allocated to Trust Certificates whose related bonds have characteristics that are dissimilar to any defaulted Supported Bonds. Loss Category Subclasses may also be established by the Regulated Guarantor where such subclass includes multiple Loss Position Subclasses (i.e. losses within the Loss Category Subclass would be allocated by Loss Position Subclass). In either case, prior to any Loss Category Subclasses being established, each Rating Agency must confirm that the use thereof will not result in a reduction in the Rating on any outstanding Supported Obligations or Trust Certificates.

"Loss Position Subclasses" means various subclasses of Trust Certificates (and the Trust Bonds related to such Trust Certificates) that indicate the order in which the amounts payable with respect to the Trust Certificates are intercepted in order to cure a default with respect to a Supported Bond Issue. The inverse of such order represents the order in which the subclasses are to be reimbursed for funds intercepted to fund a defaulted payment or reimbursement therefore. Until modified as described below, the loss subclasses shall be:

$1^{st}$ Loss Position Subclass
$2^{nd}$ Loss Position Subclass
$3^{rd}$ Loss Position Subclass
$4^{th}$ Loss Position Subclass
$5^{th}$ Loss Position Subclass A lower number associated with a Loss Position Subclass means that such subclass is more exposed to having its cash flows intercepted than a subclass with a higher number. Trust Certificates may also be issued which are comprised of multiple Loss Position Subclasses. The Loss Position Subclasses may be modified by the Regulated Guarantor at any time (and for purposes of determining Minimum Trust Debt Service) upon confirmation by each Rating Agency that such modification will not result in a reduction of the Rating of any outstanding Supported Obligations or Trust Certificates.

"Loss Subclass Capital and Liquidity Requirement" means, with respect to a particular Loss Position Subclass, a portion of the Capital and Liquidity equal to an amount specified by the Regulated Guarantor for such subclass, which portion of the Capital and Liquidity, to the extent available and provided that it is sufficient to cure any defaults on Supported Obligations:

A. Shall be applied to cure such defaults prior to the interception of Trust Certificate Payments of such subclass (or any higher subclass) for such purpose; and
B. Shall not be reimbursed from the Trust Certificate Payments of such subclass (or any higher subclass) for the period specified for such subclass; provided that the limitation on reimbursement from such payments shall not apply if in the judgment of the Chief Credit Officer of the Regulated Guarantor, the failure to reimburse Capital and Liquidity (a) might result in a reduction of the Rating of a higher Loss Position Subclass or of the Supported Bonds or (b) might impair the ability of the Support Trust to reimburse such Capital and Liquidity.

Initially, the Loss Subclass Capital and Liquidity Requirements and associated periods are as follows:

| Loss Position Subclass | Subclass Requirement (cumulative including lower subclass requirements) | Specified Period |
|---|---|---|
| $5^{th}$ Subclass | | |
| $4^{th}$ Subclass | | |
| $3^{rd}$ Subclass | | |
| $2^{nd}$ Subclass | | |
| $1^{st}$ Subclass | NA | NA |

The specified requirements and periods may be modified by the Regulated Guarantor (including during the pendency of a default) provided that each Rating Agency shall confirm that such modification will not cause a reduction in the Rating of any outstanding Supported Obligations or Trust Certificates.

"Loss Subclass Coverage Factor" means the Trust Coverage Requirement divided by the Loss Subclass Minimum Coverage for the highest Loss Position Subclass. For example, initially, the Loss Subclass Coverage Factor is 2.0 divided by 1.25 which equals 1.6.

"Loss Subclass Discount Percentage" means the percentage of the Loss Subclass Minimum Coverage that applies to each Loss Position Subclass for a particular Supported Bond Issue. Unless modified as described below, the Loss Subclass Discount Percentage for each Loss Position Subclass shall be based on the relationship between the Structure Rating category for the next higher subclass (and, in the case of the highest loss position subclass, for the Supported Bonds) and the Bond Issue Rating for the Supported Bond Issue as follows:

Bond Issue Rating lower than Structure Rating category for next higher subclass: 100%
Bond Issue Rating equal to Structure Rating category for next higher subclass: 25%
Bond Issue Rating one category higher than Structure Rating category for next higher subclass: 20%
Bond Issue Rating two categories higher than Structure Rating category for next higher subclass: 15%
Bond Issue Rating three or more categories higher than Structure Rating category for next higher subclass: 10%

The Loss Subclass Discount Percentage may be modified by the Regulated Guarantor upon confirmation by each Rating Agency that such modification will not result a reduction of the Rating of any outstanding Supported Obligations or Trust Certificates.

"Loss Subclass Minimum Coverage" means for each respective Loss Position Subclass, the following coverage of Average Annual Assumed Defaults:

$5^{th}$ Loss Subclass: 1.25
$4^{th}$ Loss Subclass: 1.00
$3^{rd}$ Loss Subclass: 0.80
$2^{nd}$ Loss Subclass: 0.64
$1^{st}$ Loss Subclass: 0.56

The Loss Subclass Minimum Coverage may be modified by the Regulated Guarantor upon confirmation by each Rating Agency that such modification will not result in a reduction of the Rating on any outstanding Supported Obligations or Trust Certificates.

"Loss Subclass Percentage Requirement" means for each Loss Position Subclass and with respect to each maturity of each Supported Bond Issue or Supported Transaction, the Aggregate Loss Subclass Percentage for such Loss Position Subclass minus the Aggregate Loss Subclass Percentage for the next lower Loss Position Subclass. For example, in the illustration used in the definition of Aggregate Loss Subclass Percentage, for the 4th Loss Position Subclass, the Loss Subclass Percentage Requirement equals 4.20% minus 0.84%, which equals 3.36%. For a particular Supported Bond Issue or Supported Transaction, it is not required that the Trust Bonds in each Loss Position Subclass meet the Loss Subclass Percentage Requirement.

"Minimum Trust Debt Service" means, for the period, beginning on the date of calculation, over which Supported Obligations and the related Trust Bonds are payable and for each Loss Position Subclass (together with the lower Loss Position Subclasses), the sum for all Supported Bond Issues and/or Supported Transactions of the following product: (a) the Average Annual Debt Service payable on the bonds of each such Supported Bond Issue or Supported Transaction (and any Other Related Obligation), in each case measured to the final maturity thereof, multiplied by (b) the Aggregate Loss Subclass Percentage of such subclass for such Supported Bond Issue or Supported Transaction. Minimum Trust Debt Service may be modified by the Regulated Guarantor upon confirmation by each Rating Agency that such modification will not result in a reduction of the Rating of any outstanding Supported Obligations or Trust Certificates. This definition is intended to ensure that there is adequate Trust Bond debt service in every Loss Position Subclass, together with the lower Loss Position Subclasses, even though for particular Supported Bond Issues or Supported Transactions, there may not be bonds in every Loss Position Subclass. The calculation of Minimum Trust Debt Service shall exclude any Supported Bond Issues or Supported Transactions for which the capital is funded using the Cash Alternative Capital Requirement, provided that such exclusion shall not be applicable until the Allocated Capital Requirement exceeds the Rating Minimum Capital Requirement.

"Moody's" means Moody's Investor Services, Inc.

"Net Trust Bond Payments" means, with respect to each Supported Bond Issue, the net amounts payable with respect to such issue taking account of (a) all amounts payable by the issuer to the Support Trust with respect to such issue, including debt service thereon, Supplemental Coupon payments, and any fees with respect thereto and (b) the portion of such amounts required to be applied to make the Trust Certificate Payments on related Trust Certificates and (to the extent such amounts have been dedicated to such purpose) unrelated Trust Certificates.

"Obligations" means Supported Bonds, Other Supported Obligations, Trust Bonds, and Trust Certificates.

"Other Available Funds" means any funds received by the Trustee other than Trust Certificate Payments, Net Trust Bond Payments (except to the extent designated by the Regulated Guarantor as Other Available Funds), Capital, Liquidity, Reserves and proceeds from the sale of Trust Certificates.

"Other Supported Obligation" means an Other Related Obligation that is designated by the Regulated Guarantor as the beneficiary of a Support Requirement hereunder.

"Other Related Obligation" means:
I. The following payments related to Supported Bonds, provided in each case that either (A) such payments are on a parity with such Supported Bonds or (B) the Bond Issue Rating for the Supported Bond Issue by each Rating Agency is deemed to be the same as such agency's Bond Issue Rating for such payments:
 a. Payments due with respect to a line of credit or letter of credit, insurance or reinsurance policy, or similar instrument that secures payment of such designated bonds; and
 b. Payments due on any interest rate swap or similar interest rate exchange agreement determined by the Regulated Guarantor to be related to such designated bonds, and
II. Other payments related to such bonds, provided that the Regulated Guarantor has approved including such payments as Other Related Obligations and that each Rating Agency has determined that including such payments as Other Related Obligations will not result in a reduction of the Rating on any outstanding Supported Obligations or Trust Certificates.

"Qualifying Bond" means a bond for which, at the time such bond is designated as a Supported Bond:
I. The Bond Issue Rating by each Rating Agency is in one of the four highest rating categories and
II. The credit type of such bond is listed in Standard & Poor's, in the $1^{st}$ or $2^{nd}$ Single-Risk Category as shown in Exhibit II. The Regulated Guarantor may adopt a separate list of qualifying credit types for each of Moody's and/or Fitch. The credit type of each bond that is designated as a Supported Bond must fit within the qualifying credit types for each Rating Agency for whom such a list is specified.

The list of credit types or ratings relating to any Rating Agency may be modified by the Regulated Guarantor upon confirmation by such Rating Agency that such modification is not inconsistent with their ratings and qualifying credit types previously in effect. Qualifying Bond shall exclude Appropriation Bonds unless the Specific Rating of such bonds is the same as the Specific Rating on the issuer's related non-Appropriation bonds. A determination by the Chief Credit Officer that a bond is a Qualifying Bond shall be dispositive for purposes of this Agreement.

"Rating" means a Supported Rating assigned to any Supported Bonds or Other Supported Obligations or a Structure Rating assigned to any Trust Certificates by a Rating Agency; provided, however, that for purposes of this Agreement, the Rating assigned to any such bonds by any Rating Agency shall not be deemed to be higher than the Target Rating with respect to such bonds. For any Trust Bond and for any Other Related Obligation (before taking account of any Support Requirement), Rating means an Underlying Rating or Bond Issue Rating assigned to such Obligation by a Rating Agency.

"Rating Agency" means, with respect to the Supported Rating of any series or subclass of Supported Bonds (or any Other Supported Obligation related thereto) or the Structure Rating of any Trust Certificates, any nationally recognized rating agency which has provided a rating for such series or subclass or such Trust Certificates at the request of the Regulated Guarantor. With respect to the Underlying Rating or Bond Issue Rating of any Supported Bond, Other Related Obligation, or Trust Bond, Rating Agency means any Rating Agency for the related Supported Bonds which has provided an Underlying Rating or Bond Issue Rating, as the case may be, for such Obligation.

"Rating Aggregate Loss Subclass Percentage" means, for each Loss Position Subclass and with respect to each maturity of each Supported Bond Issue or Supported Transaction, the Average Annual Assumed Default multiplied by the Loss Subclass Minimum Coverage multiplied by the Loss Subclass Discount Percentage multiplied by the Rating Loss Subclass Coverage Factor. This represents the sum of the Rating Loss Subclass Percentage Requirements for each Loss Position Subclass and all of the lower Loss Position Subclasses. For example, initially, for an A rated city or county general obligation bond issue, the Rating Aggregate Loss Subclass Percentage for the 4th Loss Position Subclass equals 1.75% multiplied by 1.00 multiplied by 100% multiplied by 1.6, which equals 2.80%. Correspondingly, the Rating Aggregate Loss Subclass Percentage for the $3^{rd}$ Loss Position Subclass equals 1.75% multiplied by 0.80 multiplied by 25% multiplied by 1.6, which equals 0.56%.

"Rating Liquidity Multiple" means 2.0x or such higher multiple as may be established by the Regulated Guarantor. The Rating Liquidity Multiple may be reduced by the Regulated Guarantor upon confirmation by each Rating Agency that such reduction will not cause a reduction of the Rating of any outstanding Supported Obligations or Trust Certificates.

"Rating Loss Subclass Coverage Factor" means the Rating Trust Coverage Requirement divided by the Loss Subclass Minimum Coverage for the highest Loss Position Subclass. For example, initially, the Rating Loss Subclass Coverage Factor is 2.0 divided by 1.25 which equals 1.60.

"Rating Loss Subclass Percentage Requirement" means for each Loss Position Subclass and with respect to each maturity of each Supported Bond Issue or Supported Transaction, the Rating Aggregate Loss Subclass Percentage for such Loss Position Subclass minus the Rating Aggregate Loss Subclass Percentage for the next lower Loss Position Subclass. For example, initially, for the 3$^{rd}$ Loss Position Subclass, the Loss Subclass Percentage Requirement equals 2.80% minus 0.56%, which equals 2.24%. For a particular Supported Bond Issue, it is not required that the Trust Certificates in each Loss Position Subclass meet the Rating Loss Subclass Percentage Requirement so long as the sum of the Trust Certificates in all of the Loss Position Subclasses meets the Rating Aggregate Loss Subclass Percentage for the highest Loss Position Subclass.

"Rating Minimum Capital Requirement" means $200 million. Such requirement may be increased by the Regulated Guarantor at any time. The Rating Minimum Capital Requirement may be otherwise modified by the Regulated Guarantor upon confirmation by each Rating Agency that such modification will not result in a reduction of the Rating on any outstanding Supported Obligations or Trust Certificates.

"Rating Trust Coverage Requirement" means 1.5× for the purposes of calculating the Loss Subclass Percentage Requirements and Aggregate Loss Subclass Percentages for a specific Supported Bond Issue or Supported Transaction and means 2.00 for all other purposes hereunder (e.g., for the purpose of calculating Minimum Trust Debt Service). This represents the minimum Trust Certificate coverage of Average Annual Assumed Defaults for rating purposes. The Rating Trust Coverage Requirement may be modified by the Regulated Guarantor upon confirmation by each Rating Agency that such modification will not result in a reduction of the Rating of any outstanding Supported Obligations or Trust Certificates.

"Regulated Guarantor" means _____, a monoline insurer regulated under the Insurance Law. There should be an agreement between the Support Trust and the Regulated Guarantor in which the Regulated Guarantor agrees only to insure obligations that have a Support Requirement by the Support Trust.

"Regulated Guarantor Action" means an action taken by an Authorized Officer of the Regulated Guarantor or of its Administrator on its behalf, by written notice to the Trustee, which action is permitted under the terms of this Agreement. Unless specifically stated herein, actions by the Regulated Guarantor authorized hereunder shall be taken by Regulated Guarantor Action and actions authorized hereunder to be taken by a particular officer of the Regulated Guarantor may be taken by the corresponding officer of the Administrator.

"Regulatory Capital Requirement" means $65 million or such higher amount as shall be equal to the applicable minimum regulatory capital requirement to provide monoline insurance under the Insurance Law from time to time. This may not be used if the Capital Requirement is all used in a manner that permits it to be counted for regulatory purposes.

"Reserve Fund" means a fund established under this Agreement by the Trustee to hold the Reserves and investments thereof.

"Reserve Requirement" means a requirement established by a certificate of the Regulated Guarantor that one or more Reserves are to be created and funded in the manner set forth in such certificate. Such certificate (a) shall set forth the order in which such Reserve shall be applied to cure a default with respect to Supported Obligations (b) may provide for the reimbursement of such reserve from Trust Resources. Once established, a Reserve Requirement, including the order in which the reserve can be used and the provisions for reimbursement thereof, may only be modified in accordance with the provisions, if any, for modification thereof that are set forth in the certificate establishing such requirement.

"Reserves" means funds being used to meet a Reserve Requirement.

"Specific Rating" means for each Rating Agency with respect to a bond or obligation, the rating of such bond including any pluses or minuses or numerical designations.

"S&P's 2009 Monoline Criteria" means the criteria setting forth capital charges for monoline insurers in Standard & Poor's Global Bond Insurance 20_____ attached hereto as Exhibit II.

"Standard & Poor's" means Standard & Poor's, a Division of The McGraw-Hill Companies, Inc.

"Senior Credit Officer" means _____.

"Structure Rating" means for each Rating Agency and with respect to each subclass of Trust Certificates, the rating assigned by such Rating Agency that reflects the risk that the amounts payable with respect to such certificates will be intercepted pursuant to Section 301 hereof.

"Supplemental Coupon" means, with respect to any Trust Bond maturity, any portion of the interest rate on such maturity which is in excess of the unenhanced interest rate otherwise payable by the issuer as determined by the Regulated Guarantor or Financial Advisor. Supplemental Coupon also shall also include, to the extent specified by the Regulated Guarantor, (1) annual fees payable to the Trust in connection with a Supported Bond Issue or Transaction, (2) debt service on any additional series of bonds (or portion thereof) delivered to the Trust in connection with a Supported Bond Issue or Transaction, or (3) payments generated from the investment of an amount deposited with the Trustee for such purpose in connection with a Supported Bond Issue or Transaction. Supported Coupon payments shall be allocable to particular maturities as directed by the Regulated Guarantor or Financial Advisor.

"Support Requirement" means any and all obligations of the Support Trust to provide Trust Resources (A) to the Regulated Guarantor to provide funds in the amount required to cure any default in the payment of debt service on designated Qualifying Bonds or Other Related Obligations or (B) to other parties on behalf of the Regulated Guarantor to provide funds in such amounts or to reimburse funds used to provide such amounts, together with interest thereon and/or related expenses, all as contemplated by Section 301 of this Agreement.

"Supported Bond Issue" means an issue of bonds any portion of which represents Supported Bonds. Unless the context otherwise requires, the phrase Supported Bond Issue shall refer only (a) to those maturities of such issue for which there are Supported Bonds and (b) to that portion of such maturities which are Supported Bonds or Trust Bonds (the "related" Supported Bonds and Trust Bonds, respectively) and/or to related Other Supported Obligations. Unless the context otherwise requires, with respect to a Supported Bond Issue or Supported Transaction, With respect to a specific Supported Bond Issue, any other Supported Bond Issue (and the corresponding Trust Certificates) that has the same issuer credit, as determined by the Regulated Guarantor (even if the legal entities issuing such bonds are different), shall be deemed to be related to such specific Supported Bond Issue. Any such determination may be modified at the discretion of the Regulated Guarantor based on then current facts and circumstances.

"Supported Bonds" means, with respect to a Supported Bond Issue or Supported Transaction, that portion of such issue which is the beneficiary of a Support Requirement.

"Supported Obligations" means Supported Bonds and Other Supported Obligations. All Supported Obligations shall also be the beneficiaries of a monoline insurance policy issued by the Regulated Guarantor.

"Supported Rating" means, for each Rating Agency and with respect to each Supported Bond and Other Supported Obligation, the rating assigned thereto that reflects the benefit of any Support Requirements.

"Supported Transaction" means all of the Qualifying Bonds of, and Other Related Obligations relating to, a Supported Bond Issue that either (i) become Supported Obligations as part of a single Designation or, (ii) if elected by the Regulated Guarantor, are insured by the Regulated Guarantor under a single insurance policy (and, in each case, any related Other Supported Obligation). Unless the context otherwise requires, the phrase Supported Transaction shall refer only (a) to those maturities of the issue for which there are Supported Bonds as part of the transaction and (b) to that portion of such maturities which become Supported Bonds or Trust Bonds as part of the transaction.

"Support Trust" means the trust estate established pursuant to this Agreement.

"Target Rating" means, for each Rating Agency and with respect to each subclass of Obligations, any target rating specified by the Regulated Guarantor for such subclass of Obligations. For Supported Bonds, the Target Rating shall mean a targeted Supported Rating. For each subclass of Trust Certificates, the Target Rating shall mean a targeted Structure Rating for such subclass. Unless modified, the Target Ratings for the Supported Bonds and for each Loss Position Subclass for Moody's, Standard & Poor's and Fitch, respectively, shall be as follows:

Supported Bonds: Aaa/AAA/AAA
$5^{th}$ loss: Aa/AA/AA
$4^{th}$ loss: A/A/A
$3^{rd}$ loss: Baa/BBB/BBB
$2^{nd}$ loss: Ba/BB/BB
$1^{st}$ loss: Not rated Each Supported Bond and Trust Certificate may be in more than one subclass with varying rights and may therefore have more than one Target Rating. Unless otherwise specified by the Regulated Guarantor, for Trust Bonds, Target Rating means at any time the Underlying Rating or Bond Issue Rating, as the case may be, of the related Supported Bonds. The Target Rating for any subclass of outstanding Obligations may not be reduced without the consent of the affected subclass.

"Trust Bond" means a bond deposited into the Support Trust at the direction of the Regulated Guarantor and related to a specified Trust Certificate and the related Supported Bond Issue. Such Trust Bond may be, but is not required to be, a part of such Supported Bond Issue. However, for purposes hereof, such Trust Bonds shall be deemed to be part of such Supported Bond Issue. Prior to the use of Trust Bonds that are not in fact, but are deemed to be, a part of the same bond issue as the related Supported Bonds, each Rating Agency for the Supported Bonds must confirm that the use of such Trust Bonds will not cause a reduction in the rating of any outstanding Supported Obligations or Trust Certificate.

"Trust Bond Payments" means, with respect to each Supported Transaction, the gross amounts payable to the Trustee with respect to the related Supported Bonds and Trust Bonds, including any annual or periodic fees from the bond issuer that are related to such transaction and payable to the Trustee.

"Trust Certificate" means a certificate issued by the Support Trust at the direction of the Regulated Guarantor which grants to the holder thereof the right to receive Trust Certificate Payments, subject to the terms of this Agreement with respect to the right and obligation of the Trustee to intercept such payments to secure each Support Requirement made by the Support Trust. Each Trust Certificate shall be payable primarily from payments received by the Support Trust with respect to a specific Trust Bond (the "related" Trust Bond). Trust Certificates and the related Trust Bonds shall be related to a specific Supported Bond Issue as specified by the Regulated Guarantor. Each Trust Certificate shall have a principal amount equal to the principal amount of the related Trust Bonds.

"Trust Certificate Payments" means, with respect to each Trust Certificate:

I. Payments of principal on the related Trust Bond at maturity or upon earlier redemption (including sinking fund payments), together with any redemption premium payable with respect to such bond;

II. A specified portion of the payments of interest payable on such related Trust Bond;

III. A specified portion of the payments of taxable interest payable on such related Trust Bond;

IV. A specified portion of any other payments of various types of interest or recurring fees payable with respect to the Supported Bonds of the related Supported Bond Issue or other Trust Bonds related to such bond issue; and V. Other specified amounts from funds available under this Agreement, including without limitation:

a. Debt service payments on related Trust Bonds or other Trust Bonds that are received by the Support Trust and that are not payable with respect to a specific Trust Certificate;

b. Recurring fees payable to the Support Trust with respect to any non-related Supported Bonds or Trust Bonds that are not payable with respect to a specific Trust Certificate; and c. Any other Trust Bond Payments or Other Available Funds.

"Trust Coverage Requirement" means 2.00. This represents Regulated Guarantor policy with respect to the minimum Trust Certificate coverage of Average Annual Assumed Defaults. The Trust Coverage Requirement may be modified by the Regulated Guarantor upon notice to the Trustee and upon 30 days notice to each Rating Agency provided, however, that it may not at any time be less than the Rating Trust Coverage Requirement.

"Trust Resources" means the following amounts which, to the extent available, may be used by the Trustee in accordance with this Agreement to fund any defaulted payments that are the subject of a Support Requirement:

1) Trust Certificate Payments on certificates related to the defaulted Supported Bond Issue:

First, such payments on certificates maturing on the dates that any such defaulted payments are due (or on the certificate payment dates corresponding to such dates), Second, such payments that are due on any such dates with respect to certificates maturing after such dates, and Third, other such payments due after such dates and within the shortest period needed to fully fund the requirements payable from such Trust Resources;

2) Trust Certificate Payments on certificates that are not related to the defaulted Supported Bond Issue:

To the extent consistent with the terms of this Agreement and of the Trust Certificates, including, without limitation terms concerning Loss Position Subclasses, Loss Category Subclasses and Trust Subgroups, the Regulated Guarantor shall exercise discretion as to:

Whether and when to apply such payments to fund the requirements payable from Trust Resources, and Which, if any, subclasses of Trust Certificates shall be used to fund any such requirements or portion thereof.

With respect to Trust Certificates within the same set of applicable subclasses, as determined by the Regulated Guarantor, requirements payable from Trust Resources shall be funded within the shortest period needed to fully fund such requirements from the date determined by the Regulated Guarantor to begin or resume funding such requirements from such set of subclasses.

3) Capital;

4) Liquidity from Borrowed Funds;

5) Liquidity from Liquidity Facilities;

6) Reserves established at the direction of the Regulated Guarantor; and

7) Other Available Funds dedicated for such purpose at the direction of the Regulated Guarantor.

"Trustee" means _____

"Trust Subgroups" means subclasses established by the Regulated Guarantor by allocating all of the Supported Obligations, together with related Trust Bonds and Trust Certificates and specified portions of the Capital, Liquidity, Reserves and Other Available Funds, into distinct subgroups such that:

I. Within each such Trust Subgroup, any losses from a default of a Supported Obligation within such subgroup would be funded first from Trust Resources allocated to such Subgroup (the "related" subgroup). Trust Resources allocated to other Trust Subgroups ("nonrelated" subgroups) may be applied only as deemed necessary by the Regulated Guarantor to make timely payment of a Supported Obligation or, to the extent that Trust Resources of the related subgroup are deemed to be insufficient, to reimburse amounts drawn from Liquidity or Capital allocated to the related subgroup. Any amounts used from a nonrelated subgroup shall be promptly reimbursed from Trust Resources of the related subgroup as funds become available.

II. At the time each such Trust Subgroup is established, each Rating Agency shall confirm that the creation of such subgroup will not result in the reduction of the Rating on any outstanding Supported Obligations or Trust Certificates.

Trust Subgroups previously established may also be modified by the Regulated Guarantor, provided that each Rating Agency shall confirm that such modification will not result in a reduction in the Rating on any outstanding Supported Obligations or Trust Certificates.

"Underlying Rating" means for each Rating Agency and with respect to each Obligation, the rating of such Obligation without regard to any Support Requirement hereunder. The Underlying Rating of a Trust Certificate shall be the Underlying Rating of the related Trust Bond. For all purposes hereunder, Underlying Rating shall mean the rating category of an Obligation, without regard to pluses or minuses or numerical designations. For example, the rating of an Obligation with an assigned rating of A3 or A1 by Moody's or of A– or A+ by Standard & Poor's or Fitch, shall be "A". For purposes of any provision of this Agreement that requires a single Underlying Rating, the Underlying Rating of a Supported Bond Issue shall mean the lowest Underlying Rating of such issue from any Rating Agency unless (a) the Chief Credit Officer shall specify that the Rating from another Rating Agency shall be used or (b) the Regulated Guarantor shall adopt distinct methodologies for the different Rating Agencies, which may occur only upon confirmation from each Rating Agency that the adoption of such distinct methodologies will not result in a reduction in the Rating on any outstanding Supported Obligations or Trust Certificates.

"Weighted Average Capital Charge" means:

I. For the Supported Bonds of each Supported Bond Issue, (a) the Average Annual Debt Service for such Supported Bonds multiplied by the Capital Charge for such issue divided by (b) the sum of the Annual Average Debt Service for the Supported Bonds of all Supported Bond Issues; and II. With respect to the entire portfolio of Supported Bonds, the sum of the Weighted Average Capital Charges for all Supported Bond Issues.

The Weighted Average Capital Charge may be modified by the Regulated Guarantor upon confirmation by each Rating Agency that such modification will not result in a reduction of the Rating of any outstanding Supported Obligations or Trust Certificates.

Article II

Section 201 Designation of Supported Bonds

At the time that any Supported Bonds and Other Related Obligations are designated by the Regulated Guarantor in connection with a Supported Transaction:

A. Such Supported Bonds shall be Qualifying Bonds.

a. Satisfaction of this requirement may be conclusively demonstrated by a certificate of a Senior Credit Officer or of the Financial Advisor.

B. The amount of each Loss Position Subclass of Trust Bonds related to such Supported Bonds shall be specified by a certificate of the Regulated Guarantor or the Financial Advisor or, if permitted hereunder, such certificate may specify that the Cash Alternative Capital Requirement is being used.

C. The Trust Bonds related to such Supported Bonds shall meet the Aggregate Trust Bond Requirement.

a. Satisfaction of this requirement may be conclusively demonstrated by a certificate of the Financial Advisor.

This requirement shall not apply with respect to any Supported Bond Issue or Supported Transaction for which capital is funded using the Cash Alternative Capital Requirement.

D. For each Loss Position Subclass, together with the lower Loss Position Subclasses and taking account of estimated debt service on the designated Supported Obligations and related Trust Bonds, the sum for all Supported Bond Issues and/or Supported Transactions of the Average Annual Debt Service calculated separately on each such Supported Bond Issue or Transaction, in each case measured to the final maturity thereof, shall not be less than the Minimum Trust Debt Service for such subclass.

a. Satisfaction of this requirement may be conclusively demonstrated by a certificate of the Financial Advisor.

E. Upon such Designation and taking account of estimated debt service on the designated Supported Obligations and related Trust Bonds, the Default Tolerance Requirements for each Rating Agency shall be met.
    a. Satisfaction of this requirement may be conclusively demonstrated by a certificate of the Financial Advisor.

F. The monoline insurance policy to be issued by the Regulated Guarantor shall be in a form approved by each Rating Agency.
    a. Satisfaction of this requirement may be conclusively demonstrated by a certificate of Counsel or of the Chief Legal Officer.

G. The amounts on deposit in the Capital Fund, the Liquidity Fund (including any Liquidity Facilities) and any Reserve Funds are not less than the Capital Requirement, the Liquidity Requirement, and any applicable Reserve Requirement, respectively, taking account of the designated Supported Obligations and, in each case, less any amounts applied to cure defaults pursuant to Section 301 that have not been reimbursed.
    a. Satisfaction of this requirement may be conclusively demonstrated by certificates of (a) the Trustee stating the respective amounts available in such funds (e.g., as of the last semi-annual valuation date), (b) the Regulated Guarantor indicating the deposits to such Funds since the such last valuation date, and (c) the Financial Advisor stating the respective requirements and indicating that the following sums are at least equal to the respective requirements:
        i. The amounts on deposit in each such fund minus
        ii. Any amounts that have been withdrawn pursuant to Section 301 and that have not been reimbursed.

H. The Trust Bond Payments and Other Available Funds specified by the Regulated Guarantor to make the Trust Certificate Payments on the Trust Certificates related to such Supported Transaction are sufficient for such purpose.
    a. Satisfaction of this requirement may be conclusively demonstrated by a certificate of the Financial Advisor.

For the purpose of performing the analyses required in connection with subparagraphs D, E and H of this section in connection with a Designation of Supported Obligations, the Financial Advisor may make such assumptions as it deems to be reasonable, including, without limitation, with respect to: (1) the specific terms of the Trust Certificates related to the Supported Transaction such as certificate payment dates and interest rates, (2) the amounts of variable interest rate payments, and (3) the amounts of interest earnings and Other Available Funds.

In the event that Trust Subgroups have been established hereunder, the requirements set forth in D, E, G, and H shall be separately both to each Trust Subgroup and to this Agreement as a whole. The amount of Trust Bonds and related Trust Certificates for a Supported Bond Issue may be modified by certificate of the Regulated Guarantor such that either (1) a larger amount of bonds are designated as beneficiaries of a Support Requirement or (2) the amount of Trust Bonds is reduced, provided that, at the time such certificate is delivered, the requirements of Section 201 are met for designation of the Supported Bonds.

Section 202 Trust Certificate and Trust Bond Requirements

The Regulated Guarantor shall provide reasonable notice to the Trustee of the terms of the Trust Certificates relating to each Supported Transaction, including the terms relating to the matters described in paragraphs I through V of the definition of Trust Certificate Payments. The Trustee shall issue and deliver such Trust Certificates to the purchaser's thereof in connection with the closing of the Supported Transaction and the delivery of a monoline insurance policy by the Regulated Guarantor. The payment dates of the Trust Certificates shall be identical to those of the Supported Bonds unless otherwise specified by the Regulated Guarantor. An example of a form of Trust Certificate is included in Exhibit III.

Section 203 Default Tolerance

The Regulated Guarantor may establish, and may from time to time modify, a methodology for each Rating Agency for determining whether, at the time the Supported Bonds relating to each Supported Transaction are designated, the Trust Resources available over the term of the portfolio of all Supported Obligations are sufficient to maintain the Supported Ratings of the Supported Obligations and the Structure Ratings of the portfolio of Trust Certificates. Any modification of such a methodology for a Rating Agency shall be effective only upon confirmation from such Rating Agency that such modification will not cause a reduction in its Rating of any outstanding Supported Obligations or Trust Certificates.

Article III

Section 301 Obligation to Apply Trust Resources to Cure Defaults

Each item listed in the definition of Trust Resources represents the loss position of the respective category of Trust Resources. The loss positions do not reflect the likelihood that a particular category of resources will be drawn upon in order to prevent a non-payment of Supported Obligations. However, the lower the number associated with a particular category of Trust Resources, the greater the ultimate exposure to non-payment risk since the categories with the lower loss position will be utilized to reimburse amounts that have been drawn from higher loss categories in order to cure a default. In establishing Reserves or Other Available Funds, the Regulated Guarantor may assign them a lower loss position than indicated in the definition of Trust Resources.

In the event that the Trustee receives notice from the Regulated Guarantor, any party designated by the Regulated Guarantor, or from a paying agent for a Supported Obligation that insufficient funds are available to make timely payment of amounts then due and owing with respect to such Obligation, the Trustee shall:

I. Apply Trust Resources as necessary to provide the funds needed to make full and timely payment of the Supported Obligations. To the extent that the Regulated Guarantor, or other party on its behalf, shall directly fund any such defaulted payments and shall become subrogated to the rights of the Supported Obligations, the obligation of the Trustee hereunder to make timely payment of such amount shall run to the subrogated party and the obligation to such party shall be deemed to be the Supported Obligation hereunder. There shall be no obligation hereunder to reimburse funds applied to pay Supported Obligations pursuant to a guarantee on such Obligations that existed at the time such obligations were designated as Supported Obligations hereunder.

II. If Trust Resources are used to cure a default on a Supported Obligation, the Trustee shall use available Trust Resources from the lowest loss position categories of Trust Resources to make timely reimbursement any amounts drawn from any higher loss position category, with such reimbursement going first to the highest loss position category that has not been fully reimbursed. Amounts payable pursuant to this paragraph II shall be subordinate to amounts then payable pursuant to paragraph I.

III. Intercept Trust Certificate Payments for the purpose of:
  A. Making funds directly available to cure a default relating to Supported Obligations;
  B. Reimbursing amounts actually used to cure a default either from higher loss categories of Trust Resources, from Trust Certificates that are not related to the defaulted Supported Obligations or from higher Loss Position Subclasses of Trust Certificates; and
  C. Paying interest or reimbursing lost earnings on amounts used from higher Loss Category Subclasses of Trust Resources and/or related expenses, but not interest on amounts intercepted from non-related Trust Certificates or from higher Loss Position Subclasses of Trust Certificates.

If the losses to be allocated within a set of subclasses to a maturity or payment date are less than the Trust Certificate Payments available to fund the losses, such losses may be allocated in the discretion of the Regulated Guarantor either pro-rata or to bonds selected at random.

If the Trustee receives timely directions from the Regulated Guarantor consistent with the terms of this Agreement and if adhering to such directions would (in the judgment of the Trustee) result in timely payment of the Supported Obligations or timely reimbursement of Trust Resources used to fund or reimburse such payments, the Trustee shall apply Trust Resources in accordance with such Regulated Guarantor directions. In the absence of direction from the Regulated Guarantor, if such directions are not consistent with this Agreement, or if adhering to such directions would not (in the judgment of the Trustee) result in timely payment, the Trustee shall apply Trust Resources in accordance with its best judgment in order to make timely payment of such Supported Obligations or such timely reimbursement. The Trustee may conclusively rely on advice of Counsel with respect to whether the Regulated Guarantor's directions or the Trustee's proposed actions are consistent with this Agreement.

Any recovery of defaulted payments realized with respect to any Trust Bonds shall be applied to reimburse the various categories of Trust Resources, including Trust Certificates, in accordance with this section.

Section 302 Trust Certificate Proceeds

The Support Trust shall use the proceeds from the sale of Trust Certificates solely to pay the purchase price of the related Trust Bonds to the issuers or underwriters thereof.

Section 303 Obligation to Make Trust Certificate Payments; No Sale of Trust Bonds Each such Trust Bond shall be held by the Support Trust and, subject only to the right and obligation of the Trustee to intercept Trust Certificate Payments pursuant to Section 301 of this Agreement, the Trust Certificate Payments with respect to the Trust Certificates related to such Bond shall be paid to the certificate holder on the payment dates of the certificate and shall be of first priority under this Agreement. The Trustee shall not sell, nor permit the sale or transfer of, any Trust Bond without the consent of the certificate holder of the related Trust Certificate.

Section 304 Net Payments from Supported Bond Issues

The Net Trust Bond Payments with respect to each Supported Bond Issue shall be promptly paid to the Regulated Guarantor unless otherwise specified by the Regulated Guarantor.

Section 305 Other Available Funds

Any Other Available Funds (including earnings on all of the funds and accounts hereunder and including amounts held in the Capital, Liquidity or Reserve Fund that are in excess of the respective requirements) received or held by the Trustee shall be promptly paid as specified by the Regulated Guarantor and, in the absence of other direction, shall be promptly paid to the Regulated Guarantor. Any direction of the Regulated Guarantor with respect to the disposition of Other Available Funds may be modified by the Regulated Guarantor except to the extent expressly limited in the document establishing such direction.

Section 306 Allocation of Potential Losses on Defaulted or Deteriorating Credits The Regulated Guarantor may at its discretion designate which Trust Certificates will be subject to having their Trust Certificate Payments intercepted to cure a future payment defaults with respect to existing defaulted credits or with respect to other specific credits, including the order in which such payments will be intercepted. The Regulated Guarantor may also specify that in the event that any Trust Certificates selected for such purpose are redeemed prior to the scheduled payment date thereof, the redemption proceeds may be retained by the Trustee to secure such potential future payment defaults until such scheduled payment date shall have passed.

The Regulated Guarantor may subordinate Trust Certificates outstanding prior to a specific date (relative to Trust Certificates issued thereafter) with respect to the risk of default of a designated Supported Bond Issues or Supported Transactions.

Article IV

Section 401 Revenue Fund

Pending disbursement hereunder, Other Available Funds shall be held on deposit in the Revenue Fund.

Section 402 Capital Fund

Unless being used pursuant to Section 301 to cure a default, Capital shall be held on deposit in the Capital Fund. Such Capital shall be used solely for the purpose of curing defaults of Supported Obligations in accordance with Section 301.

A portion of the Capital on deposit in the Capital Fund at least equal to the greater of the Regulatory Capital Requirement or the minimum surplus to policy holders required under the Insurance Law shall be invested in accordance with Section 1402 of Insurance Law.

Section 403 Liquidity Fund

Unless being used pursuant to Section 301 to cure a default or unless held by the Regulated Guarantor, Liquidity shall be held on deposit in the Liquidity Fund.

Section 404 Reserve Fund

Unless being used pursuant to Section 301 to cure a default, Reserves shall be held on deposit in a Reserve Fund.

Section 405 Trust Certificate Fund

Section 405 Other Funds and Accounts

At the direction of the Regulated Guarantor, the Trustee shall establish other funds and accounts provided that such directions are not inconsistent with the terms of this Agreement. Such funds and accounts shall be funded, applied, and modified as provided in such direction, provided that each Rating Agency shall have confirmed that such actions will not cause a reduction in the Rating of any outstanding Supported Obligations or Trust Certificates. In addition, the Trustee may create such accounts within the funds established hereunder as it shall deem necessary or desirable in order to carry out its responsibilities under this Agreement.

Section 407 Valuation of Investments

Unless otherwise directed by the Regulated Guarantor, investments hereunder shall be valued at amortized cost. Prior to any modification of an existing valuation approach for any investments held under this Agreement, each Rating Agency shall confirm that such modification will not result in a reduction of the Rating on any outstanding Supported Obligations or Trust Certificates.

Article V

Section 501 Miscellaneous

Provisions requiring consent of affected Trust Certificate holders include:

Any change in the right of a certificate holder to be paid the Trust Certificate Payments specified with respect to such certificate, other than those provisions relating to intercepting Trust Certificate Payments.

Any change in the order in which or purposes for which outstanding Trust Certificate Payments are intercepted, except that:

At the direction of the Regulated Guarantor, Loss Category Subclasses may be created and/or modified in order to group related credits and risks together so that the payments of Trust Bonds that are similar to a defaulted Supported Bond Issue are intercepted before the payments of dissimilar or less similar credits as reasonably determined by the Regulated Guarantor. However, no such change shall be made which results in a reduction of the rating of any Trust Certificate by any Rating Agency.

At the direction of the Regulated Guarantor, Trust Subgroups may be created and/or modified, provided that prior to the creation or modification of any Trust Subgroup, each Rating Agency shall confirm that such action will not result in a reduction of the rating of any outstanding Supported Obligations or Trust Certificates.

The Regulated Guarantor shall exercise the voting rights of all Supported Bonds and Trust Bonds. The Trust Agreement may be amended as directed by the Regulated Guarantor and without consent to adopt distinct methodologies for the different Rating Agencies for designating Supported Bonds, provided that any such amendment shall take effect only upon confirmation from each Rating Agency that the adoption of such distinct methodologies will not result in a reduction in the Rating on any outstanding Supported Obligations or Trust Certificates.

Except as noted above, amendments to the provisions of this Agreement can be made which, in the reasonable judgment of the Regulated Guarantor, do not materially adversely affect the rights or obligations of either Supported Bonds or Trust Certificates; provided, however, that each Rating Agency shall confirm that such amendments do not result in any reduction of the rating of any Supported Obligations or Trust Certificates.

The Trustee may conclusively rely on an opinion of Counsel with respect to the interpretation of any aspect of this Agreement. The Trustee shall interpret this Trust Agreement in accordance with an opinion of Chief Legal Counsel provided that the Trustee also receives a concurring opinion from Counsel.

Exhibit I

Calculation of the Aggregate Loss Subclass Percentage and Loss Subclass Percentage Requirement for an A Rated City or County General Obligation Bond Issue

| Loss Position Subclass (from low to high) | Targeted Subclass Structure Rating | Supported Bond Rating Achieved by Subclass, together with Lower Subclasses | Default Percentage (a) | Minimum Coverage (b) | Discount Percentage (Based on Bond Issue Rating vs. Subclass Structure Rating for next higher Subclass) (c) | Coverage Factor (d) | Aggregate Loss Subclass Percentage = a*b*c*d |
|---|---|---|---|---|---|---|---|
| 1st | NR | BB | 7/4 = 1.75 | .56 | 2 Steps lower; 15% | 2/1.25 = 1.6 | .35 |
| 2nd | BB | BBB | 7/4 = 1.75 | .64 | 1 Step lower; 20% | 2/1.25 = 1.6 | .53 |
| 3rd | BBB | A | 7/4 = 1.75 | .80 | Same; 25% | 2/1.25 = 1.6 | .84 |
| 4th | A | AA | 7/4 = 1.75 | 1.00 | 1 step higher; 100% | 3/1.25 = 1.6 | 4.20 |
| 5th Supported Bond Rating & Aggregate Trust Bond Requirement | AA AAA | AAA | 7/4 = 1.75 | 1.25 | 2 step higher; 100% | 2/1.25 = 1.6 | 3.5 |

Exhibit II
Capital Charges Percentages for Various Credit Types Representing Assumed Aggregate Percentage Defaults over a Four-Year Depression Scenario

| Ratings | CCC | B | BB | BBB | A | AA | AAA | Single-risk category |
|---|---|---|---|---|---|---|---|---|
| General Obligation | | | | | | | | |
| States | 30 | 21 | 15 | 4 | 2 | 2 | 1 | 1 |
| Cities and counties | 100 | 70 | 50 | 13 | 7 | 5 | 4 | 1 |
| Schools-elementary and secondary | 40 | 28 | 20 | 5 | 3 | 2 | 2 | 1 |
| Special district | 120 | 84 | 60 | 16 | 8 | 6 | 5 | 1 |
| Community college district | 100 | 70 | 50 | 13 | 7 | 5 | 5 | 1 |
| Tax-Supported Debt | | | | | | | | |
| Sales, gas, excise, gas and vehicle registration | | | | | | | | |
| Local | 150 | 105 | 75 | 20 | 11 | 8 | 6 | 2 |
| Statewide | 80 | 56 | 40 | 10 | 6 | 4 | 3 | 1 |
| Guaranteed entitlements | 100 | 70 | 50 | 13 | 7 | 5 | 5 | 1 |
| Special assessments, Mello Roos, tax increment financings | 250 | 175 | 125 | 33 | 18 | 13 | 10 | 4 |
| Hotel/motel | 250 | 175 | 125 | 33 | 18 | 13 | 10 | 4 |
| Personal income | | | | | | | | |
| Less than 1.0 million population | 150 | 105 | 75 | 20 | 11 | 8 | 6 | 2 |
| More than 1.0 million population | 80 | 56 | 40 | 10 | 6 | 4 | 3 | 1 |
| Cigarette, liquor | 250 | 175 | 125 | 33 | 18 | 13 | 10 | 4 |
| Health Care | | | | | | | | |
| Hospitals | 350 | 245 | 175 | 46 | 25 | 18 | 14 | 6 |
| Hospital systems (three or more hospitals with geographic dispersion) | 300 | 210 | 150 | 39 | 21 | 15 | 12 | 5 |
| Hospital equipment loan program | 350 | 245 | 175 | 46 | 25 | 18 | 14 | 6 |
| Health maintenance organization | 350 | 245 | 175 | 46 | 25 | 18 | 14 | 6 |
| Clinic practices closely affiliated with hospital | 350 | 245 | 175 | 46 | 25 | 18 | 14 | 6 |
| Nursing home | 350 | 245 | 175 | 46 | 25 | 18 | 14 | 6 |
| Nursing home system (three or more homes with geographic dispersion) | 300 | 210 | 150 | 39 | 21 | 15 | 12 | 5 |
| Life-care center | 350 | 245 | 175 | 46 | 25 | 18 | 14 | 6 |
| Life-care center system (three or more centers with geographic dispersion) | 300 | 210 | 150 | 39 | 21 | 15 | 12 | 5 |
| Human service providers | 200 | 140 | 100 | 26 | 14 | 10 | 8 | 3 |
| Utilities | | | | | | | | |
| Public power agencies and utilities with special project risk (1) | 400 | 280 | 200 | 52 | 28 | 20 | 16 | 6 |
| Public power agencies and utilities with high dependence on nuclear (2) | 300 | 210 | 150 | 39 | 21 | 15 | 12 | 5 |
| Public power agencies and utilities with no special project risk and little nuclear dependence (3) | 150 | 105 | 75 | 20 | 11 | 8 | 6 | 2 |
| Water, sewer, electric, and gas utilities (revenue-secured) (4) | 120 | 84 | 60 | 16 | 8 | 6 | 5 | 1 |
| Solid waste disposal to energy or landfill project (single site) | 250 | 175 | 125 | 33 | 18 | 13 | 10 | 4 |
| Solid waste system with landfill and/or waste-to-energy facility | 200 | 140 | 100 | 26 | 14 | 10 | 8 | 3 |
| Solid waste transfer stations, trucks (no landfill/waste-to-energy facility) | 150 | 105 | 75 | 20 | 11 | 8 | 6 | 2 |
| Special Revenue | | | | | | | | |
| Private colleges and universities and independent schools | | | | | | | | |
| General obligation | 250 | 175 | 125 | 33 | 18 | 13 | 10 | 4 |
| Auxiliary enterprises | 350 | 245 | 175 | 46 | 25 | 18 | 14 | 6 |
| Public colleges and universities and community college revenue bonds | | | | | | | | |
| General obligation-unlimited-fee pledge | 90 | 63 | 45 | 12 | 6 | 5 | 4 | 1 |
| General obligation-limited-fee pledge | 100 | 70 | 50 | 13 | 7 | 5 | 5 | 1 |
| Auxiliary enterprises and related foundations | 150 | 105 | 75 | 20 | 11 | 8 | 6 | 2 |
| Guaranteed student loans | 100 | 70 | 50 | 13 | 7 | 5 | 5 | 1 |
| Not-for-profit and 501(c)3s | 350 | 245 | 175 | 46 | 25 | 18 | 14 | 6 |
| Charter schools | 350 | 245 | 175 | 46 | 25 | 18 | 14 | 6 |
| Airports | 120 | 84 | 60 | 16 | 8 | 6 | 5 | 1 |
| Limited tax-backed | 100 | 70 | 50 | 13 | 7 | 5 | 5 | 1 |
| Passenger facility charge | 200 | 140 | 100 | 26 | 14 | 10 | 8 | 3 |
| Special facility (with rate flexibility) | 160 | 112 | 80 | 21 | 11 | 8 | 7 | 2 |

-continued

| Ratings | CCC | B | BB | BBB | A | AA | AAA | Single-risk category |
|---|---|---|---|---|---|---|---|---|
| Ports | 180 | 126 | 90 | 23 | 13 | 9 | 7 | 2 |
| Limited tax-backed | 140 | 98 | 70 | 18 | 10 | 7 | 6 | 1 |
| Special facility (with rate flexibility) | 300 | 210 | 150 | 39 | 21 | 15 | 12 | 5 |
| Parking | 250 | 175 | 125 | 33 | 18 | 13 | 10 | 4 |
| Toll roads | | | | | | | | |
| Five-year operating history | 200 | 140 | 100 | 26 | 14 | 10 | 8 | 3 |
| Less than five-year operating history | 300 | 210 | 150 | 39 | 21 | 15 | 12 | 5 |
| Bridges | | | | | | | | |
| Five-year operating history | 250 | 175 | 125 | 33 | 18 | 13 | 10 | 4 |
| Less than five-year operating history | 350 | 245 | 175 | 46 | 25 | 18 | 14 | 6 |
| Federal grant-secured obligations | 160 | 112 | 80 | 21 | 11 | 8 | 7 | 2 |
| Federal grant-secured obligations with additional credit support | 120 | 84 | 60 | 16 | 8 | 6 | 5 | 1 |
| Housing Bonds | | | | | | | | |
| HFA ICRs | 150 | 105 | 75 | 20 | 11 | 8 | 6 | 2 |
| PHA (capital fund financings) | 200 | 140 | 100 | 26 | 14 | 10 | 8 | 3 |
| PHA ICRs | 250 | 175 | 125 | 33 | 18 | 13 | 10 | 4 |
| State agency single-family** | 100 | 70 | 50 | 13 | 7 | 5 | 5 | 1 |
| Local agency single-family** | 200 | 140 | 100 | 26 | 14 | 10 | 8 | 3 |
| FHA-insured multifamily**¶¶ | 6 | 4.2 | 3 | 0.8 | 0.4 | 0.3 | 0.2 | 1 |
| Stand-alone affordable housing/Section 8/student housing | 350 | 245 | 175 | 46 | 25 | 18 | 14 | 6 |
| Mobile home parks/single-borrower pools | 300 | 210 | 150 | 39 | 21 | 15 | 12 | 5 |
| Military housing/multi-borrower pools | 250 | 175 | 125 | 33 | 18 | 13 | 10 | 4 |
| Investor-Owned Utilities | | | | | | | | |
| Electric distribution system | 120 | 84 | 60 | 16 | 8 | 6 | 5 | 1 |
| Water, electric, and gas | 120 | 84 | 60 | 16 | 8 | 6 | 5 | 1 |
| Gas distribution | 150 | 105 | 75 | 20 | 11 | 8 | 6 | 2 |
| Telephones | 150 | 105 | 75 | 20 | 11 | 8 | 6 | 2 |
| Natural gas pipeline | 450 | 315 | 225 | 59 | 32 | 23 | 18 | 6 |

Source: Standard and Poor's Single Risk Categories

Exhibit III

Sample Form of Trust Certificate

This Trust Certificate is related to the following Trust Bond: _____ in the amount of $_____.

This Trust Certificate is entitled to the following Trust Certificate Payments from such Trust Bond (subject to the right and obligation of the Trustee to intercept such Trust Certificate Payments to cure a payment default with respect Supported Obligations under the Agreement):

100% of the principal and redemption price payable on such Trust Bond

100% of a first type of interest on such Trust Bond: _____%

The following supplemental coupon, which represents a portion of the supplemental coupon payable on the such Trust Bond: _____%

Such Trust Bond is payable on _____ and _____ of each year. The Trust Certificate Payments shall be payable to the holder of this Trust Certificate (e.g., on the same dates as the Trust Bonds are paid).

This Trust Certificate is part of a series of Trust Certificates (the "Certificate Series") issued on the date hereof and in the amount of $_____ by _____ as Trustee under the Trust Agreement dated as of _____ between the Regulated Guarantor and such Trustee (the "Agreement"). Unless otherwise defined herein or the context otherwise requires, terms used herein shall have the meaning set forth in the Agreement. The rights of the holder of the Trust Certificate and the limitations thereon are fully set forth in the Trust Agreement.

The Certificate Series is related:
 A. To the following bond issue: _____ (the "Supported Bond Issue") and
 B. More particularly, to a portion of such issue (the "Series Trust Bonds") in the same amount as such Certificate Series.

The Series Trust Bonds and the related Series Trust Certificates are both related to a portion of the Supported Bond Issue in the amount of $_____ (the "Series Supported Bonds") which is the beneficiary of a Support Requirement under the Agreement.

At any time, the Supported Bond Issue shall be deemed to include (and to be related to):
 I. All outstanding Series Supported Bonds related to the Certificate Series together with all outstanding Supported Bonds related to any additional series of Trust Certificates related to the Supported Bond Issue that the Trustee has theretofore issued (the "Supported Bonds" related to the Supported Bond Issue), together with any Other Related Obligations; and
 II. All outstanding Series Trust Bonds related to the Certificate Series together with all outstanding Trust Bonds related to any additional series of Trust Certificates related to the Supported Bond Issue that the Trustee has theretofore issued (the "Trust Bonds" related to the Supported Bond Issue).

The Trust Certificates related to such outstanding Trust Bonds represent the Trust Certificates related to such Supported Bond Issue.

This Trust Certificate is part of the _____ Loss Position Subclass. This Trust Certificate can also be part of the following Loss Category Subclass within such Loss Position Subclass: _____

Pursuant to the Support Requirement under the Agreement which benefits all Supported Bonds, the Trustee has the right and obligation in the event of a payment default on:
- a. The Supported Bonds (and Other Related Obligations) related to the Supported Bond Issue, or
- b. Any Supported Bonds (and Other Related Obligations) related to any other Trust Certificates issued by the Trustee under the Agreement, to utilized Trust Resources, including Trust Certificate Payments which would otherwise be payable to the holder of this Trust Certificate, in order (1) to cure the default or (2) to reimburse certain amounts that have been used to cure such default together with interest on such amounts and/or related expenses. In the event that Trust Certificate Payments are used to fund such amounts, any payments thereafter made in respect of such amounts shall be payable to the holder of record of this Trust Certificate on the date such Trust Certificate Payments were due.

What is claimed is:

1. A computer-implemented method for minimizing a financial risk associated with an anticipated value of an investment, which comprises:
    establishing by a computer system of an insurer a capital structure within a computer memory, the capital structure designed to minimize the risk and being structured with regulatory capital and a cash stream that is pledged to fund a default on payments associated with the investment;
    generating by the computer system a determination of whether the established capital structure is sufficient to cover a depression scenario period to obtain a minimal target credit rating for the insurer; and
    electronically receiving the target rating based on the generated determination.

2. The method of claim 1, wherein the investment comprises an insured bond issued by an issuer, and the cash stream is produced from a trust bond issued by the issuer.

3. The method of claim 1, wherein the investment comprises at least one of a debt, a bond or a loan, wherein the cash stream is produced from the investment, or a dividend or an account receivable associated with the investment.

4. The method of claim 1, wherein establishing the capital structure comprises:
    allocating the regulatory capital in the computer memory to an amount equal to at least a coverage factor multiplied by an average annual depression scenario default percentage for the investment;
    selecting by the computer system an investment criteria to invest the regulatory capital to create an investment return; and
    determining by the computer system a portion of the capital structure for a pledged insuring investment that produces at least a portion of the cash stream.

5. The method of claim 4, wherein establishing the capital structure further comprises: securing a draw on sources of the regulatory capital based on the portion of the cash stream.

6. The method of claim 1, which further comprises:
    including a capital pre-funding in the capital structure; and
    determining by the computer system an amount of the capital pre-funding by the insurer in an amount that is a multiple of an average annual depression scenario default percentage that is based on an underlying credit rating of the investment.

7. The method of claim 1, which further comprises:
    including a capital pre-funding in the capital structure;
    determining by the computer system an amount of the capital pre-funding by the insurer that is sufficient to cover a default and that is calculated by a function of (a) at least a pre-funding coverage factor and (b) a downgrade function that is applied to an average annual depression scenario default percentage;
    examining by the computer system, a capital adequacy of the insurer's capital structure to cover a default based on a default scenario; and
    determining a credit rating for the trust based on the determined capital pre-funding and the examined capital adequacy.

8. The method of claim 7, which further comprises determining a credit rating of the insurer based on the determined credit rating of the trust.

9. The method of claim 7, wherein the downgrade function comprises a weighted sum of a percentage of a given insured investment issued by a given issuer that is at a current credit rating falling to a lower credit rating multiplied by another default percentage that is associated with the given issuer's industry and the lower credit rating.

10. The method of claim 1, wherein the investment is an insured bond, and the method further comprises:
    evaluating, by the computer system, issuer data about proceeds needed for minimizing the risk of default of the insured bond;
    sizing, by the computer system, an insuring bond based on the received data about the insured bond, wherein the sized insuring bond produces the cash stream that provides the capital structure necessary to achieve the target credit rating;
    establishing, by the computer system, a trust certificate, wherein a payment from the insuring bond is pledged to be paid to a holder of the trust certificate; and
    routing payments by the computer system of the payment to the holder of the trust certificate based on a legal obligation to pay secured holders of a plurality of insured bonds, which includes the insured bonds, wherein the legal obligation is recorded in the computer memory.

11. The method of claim 10, which further comprises, based on an early redemption of the insured bonds, providing savings of fees that are not paid to the insurer for insuring the insured bonds in a remaining period for the insured bonds.

12. The method of claim 10, wherein the sizing of the insuring bond comprises the computer system:
    determining a default criteria based on the depression scenario, wherein the default criteria comprises a plurality of default percentages for a plurality of issuers based on the depression scenario, and wherein an insurance coverage based on a factor of one of the plurality of default percentages is sufficient to achieve the target credit rating;
    determining a downgrade function for the insured bond based on at least a portion of a plurality of insured bonds insured by the insurer being downgraded to a lower credit rating; and
    determining the debt service coverage provided by the insuring bond for the insured bond based on the default criteria and the downgrade function.

13. The method of claim 10, wherein the establishing of the trust certificate comprises the computer system:
    establishing a loss category subclass for the trust certificate; and
    determining, in the computer memory for the trust certificate, a type of the loss category subclass, wherein the loss category type comprises (i) a horizontal loss position subclass wherein a loss that obligates payment is allocated based on a position within a plurality of loss position subclasses, with each of the loss position subclasses allocating the loss based on a category rating within that loss position subclass, or (ii) a vertical loss position subclass, wherein the loss is allocated based on another position within a plurality of categories, with each category allocating the loss based on a loss position rating within that category.

14. The method of claim 10, wherein the establishing of the trust certificate comprises the computer system: establishing a plurality of loss category subclasses;

and determining a yield above a coupon amount for the insuring bond for each position in the loss category subclasses, wherein the yield increases as each position decreases.

15. The method of claim 10, which further comprises:

allocating, with the computer system, a first credit having a first obligation to make specified payments and a second credit having a second obligation to make specified payments, each of the first credit and second credit being in a non-default state when a respective obligation is met and being in a default state when a respective obligation is not met;

associating, with the computer system, a first senior holder and a first subordinate holder with the first credit using (a) a respective first senior holder financial instrument through which payments from the first credit flow to the first senior holder and (b) a respective first subordinate holder financial instrument through which payments from the first credit flow to the first subordinate holder;

associating, with the computer system, a second senior holder and a second subordinate holder with the second credit using (a) a respective second senior holder financial instrument through which payments from the second credit flow to the second senior holder and (b) a respective second subordinate holder financial instrument through which payments from the second credit flow to the second subordinate holder; and structuring the first senior holder financial instrument and the first subordinate holder financial instrument in the computer memory to give priority to payments due the first senior holder prior to payments due the first subordinate holder in the event the first credit enters the default state.

16. The method of claim 15, which further comprises intercepting payments from the second subordinate holder financial instrument to perform the first obligation of the first credit for the benefit of the first senior holder to the extent that the first credit enters the default state and payments due the first senior holder are not available, wherein both the first subordinate holder and the second subordinate holder are junior to the first senior holder.

17. The method of claim 7, wherein determining the credit rating comprises increasing in the at least one computer memory the credit rating for the first credit based on an increased likelihood that a payment default can be fully absorbed, wherein the credit rating is representative of a probability of a party owing the first obligation to make specified payments for the first credit to meet the first obligation.

18. A computer-implemented system for minimizing a financial risk associated with an anticipated value of an investment, comprising:

a company computer implemented component for:

establishing by an insurer a capital structure within a computer memory of a computer system, the capital structure designed to minimize risk and structured with regulatory capital and a cash stream that is pledged to fund a default associated with the investment;

generating a determination of whether the established capital structure is sufficient to cover a depression scenario period to obtain a minimal target credit rating for the insurer; and electronically receiving the target rating based on the generated determination.

19. The system of claim 18, wherein the target credit rating is AAA, wherein the investment comprises an insured bond issued by an issuer, and the cash stream is produced from an insuring bond issued that is related to the insured bond and that is issued by the issuer.

20. The system of claim 18, wherein the investment comprises a previously issued bond issued by an issuer, and the cash stream is produced by an investment unrelated to the issuer and is used as insurance for the previously issued bond.

21. The system of claim 18, further comprising:

a guarantor computer component configured for:

allocating the regulatory capital in the computer memory to an amount equal to a coverage factor multiplied by an average annual depression scenario default percentage for the investment;

selecting by the computer system an investment criteria to invest the regulatory capital to create an investment return;

a trust computer component configured for:

determining by the computer system a portion of the capital structure for a pledged insuring investment that produces at least a portion of the cash stream; and securing a draw on sources of the regulatory capital based on the portion of the cash stream.

22. The system of claim 19, further comprising a user interface component configured for:

receiving input relating to the insured bond and the insuring bond to generate a model of applying the insuring bonds to enhance the insured bond's credit rating;

providing a break-even comparison of applying established capital structure to a monoline insurance of the insured bond;

generating an indication of the determination of whether the established capital structure is sufficient to cover the depression scenario period to obtain the minimal target credit rating for the insurer; and sending a message to the company computer system to establish the capital structure based on the model and the indication.

23. A non-transitory processor readable medium for minimizing a financial risk associated with an anticipated value of an investment, comprising processor readable instructions that when executed by a processor causes the processor to perform actions comprising:

establishing by an insurer a capital structure within a computer memory of a computer system, the capital structure designed to minimize the risk and being structured with regulatory capital and a cash stream that is pledged to fund a default associated with the investment;

generating a determination of whether the established capital structure is sufficient to cover a depression scenario period to obtain a minimal target credit rating for the insurer; and electronically receiving the target rating based on the generated determination.

24. A computer-implemented process for managing capital structures for the insurer of debt for minimizing a financial risk associated with an anticipated value of an investment, which comprises:
    establishing by a computer system of an insurer a capital structure within a computer memory of a computer system comprising;
        recording regulatory capital funds in computer readable media at least equal to the amount necessary to meet state regulatory requirements;
        recording infrastructure capital funds in computer readable media sufficient to pay initial expenses;
        allocating regulatory capital in the computer memory in an amount equal to at least a coverage factor multiplied by an average annual depression scenario default percentage for an insured debt;
        introducing pledged bonds into the capital structure, wherein the pledged bonds are sized in a computer readable media using the computer implemented processes to maintain the appropriate amount of funds available for insurance so that an appropriate increase in credit rating can be achieved for an insured debt;
    selecting by the computer system an investment criteria to invest the regulatory capital to create an investment return; and
    receiving investment returns from invested regulatory capital and cash flows generated by the pledged bonds, and recording the received amounts in the computer readable media, wherein the cash flows are pledged to fund a default on payments associated with insured debt.

25. The process of claim 24, which further comprises routing payments by the computer system over a computer network, from the insuring debt to a holder of the insured debt that is entitled to a payment due to a default on an obligation to make payments on the insured debt.

26. The process of claim 24, wherein the pledged bonds are dedicated to a particular project, and the process further comprises issuing insuring bonds for newly issued insured bonds.

27. A computer-implemented method for obtain a minimal target credit rating for an insurer of an investment, which comprises:
    creating a structure for minimizing a financial risk associated with an anticipated value of the investment by:
        establishing by a computer system of the insurer a capital structure within a computer memory, the capital structure designed to minimize the risk and being structured with regulatory capital and a cash stream that is pledged to fund a default on payments associated with the investment; and
        generating by the computer system a determination of whether the established capital structure is sufficient to cover a depression scenario period; and
    forwarding credit information on the created structure to a rating agency to obtain a credit rating for the insurer;
    wherein the computer system is capable of electronically receiving the target rating based on the generated determination.

\* \* \* \* \*